(12) United States Patent
Srinivasan

(10) Patent No.: US 7,979,844 B2
(45) Date of Patent: Jul. 12, 2011

(54) TICC-PARADIGM TO BUILD FORMALLY VERIFIED PARALLEL SOFTWARE FOR MULTI-CORE CHIPS

(75) Inventor: Chitoor V. Srinivasan, Port Saint Lucie, FL (US)

(73) Assignee: EDSS, Inc., Port Saint Lucie, FL (US)

( * ) Notice: Subject to any disclaimer, the term of this patent is extended or adjusted under 35 U.S.C. 154(b) by 241 days.

(21) Appl. No.: 12/435,426

(22) Filed: May 5, 2009

(65) Prior Publication Data
US 2009/0307660 A1 Dec. 10, 2009

Related U.S. Application Data

(60) Provisional application No. 61/195,965, filed on Oct. 14, 2008.

(51) Int. Cl.
*G06F 9/44* (2006.01)
*G06F 9/46* (2006.01)

(52) U.S. Cl. ........ 717/119; 717/104; 717/108; 717/116; 717/126; 717/149; 719/315

(58) Field of Classification Search ............... None
See application file for complete search history.

(56) References Cited

U.S. PATENT DOCUMENTS

| | | | |
|---|---|---|---|
| 6,289,502 B1 * | 9/2001 | Garland et al. | 717/104 |
| 7,159,211 B2 * | 1/2007 | Jalan et al. | 717/149 |
| 7,210,145 B2 | 4/2007 | Srinivasan | |
| 7,779,383 B2 * | 8/2010 | Bornhoevd et al. | 717/104 |
| 2006/0156284 A1 * | 7/2006 | Srinivasan | 717/119 |
| 2007/0277152 A1 * | 11/2007 | Srinivasan | 717/119 |
| 2008/0270838 A1 * | 10/2008 | Dorai et al. | 714/38 |
| 2009/0064115 A1 * | 3/2009 | Sheynin et al. | 717/149 |

OTHER PUBLICATIONS

Von Eicken, Thorsten et al., "Active Messages: A Mechanism for Integrated Communication and Computation," Proceedings of the 19th Annual International Symposium on Computer Architecture, 1992, pp. 256-266.*

* cited by examiner

*Primary Examiner* — Michael J Yigdall

(57) ABSTRACT

This invention teaches a way of implementing formally verified massively parallel programs, which run efficiently in distributed and shared-memory multi-core chips. It allows programs to be developed from an initial abstract statement of interactions among parallel software components, called cells, and progressively refine them to their final implementation. At each stage of refinement a formal description of patterns of events in computations is derived automatically from implementations. This formal description is used for two purposes: One is to prove correctness, timings, progress, mutual exclusion, and freedom from deadlocks/livelocks, etc. The second is to automatically incorporate into each application a Self-Monitoring System (SMS) that constantly monitors the application in parallel, with no interference with its timings, to identify and report errors in performance, pending errors, and patterns of critical behavior. This invention also teaches a way of organizing shared-memory for multi-processors that minimizes memory interference, protects data and increases execution efficiency.

11 Claims, 26 Drawing Sheets

LEGEND IN TABLE 1.
Simple Pathway

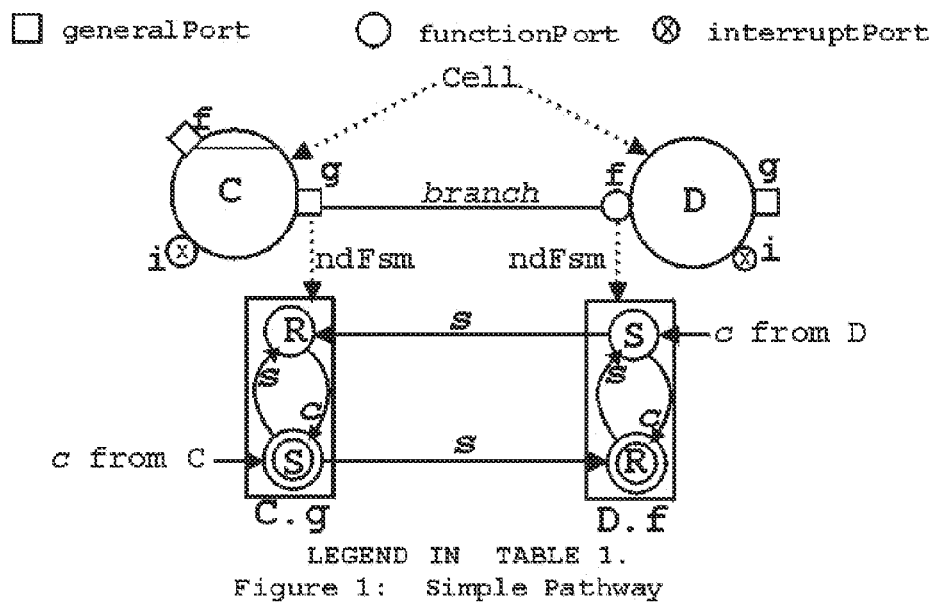
LEGEND IN TABLE 1.
Figure 1: Simple Pathway

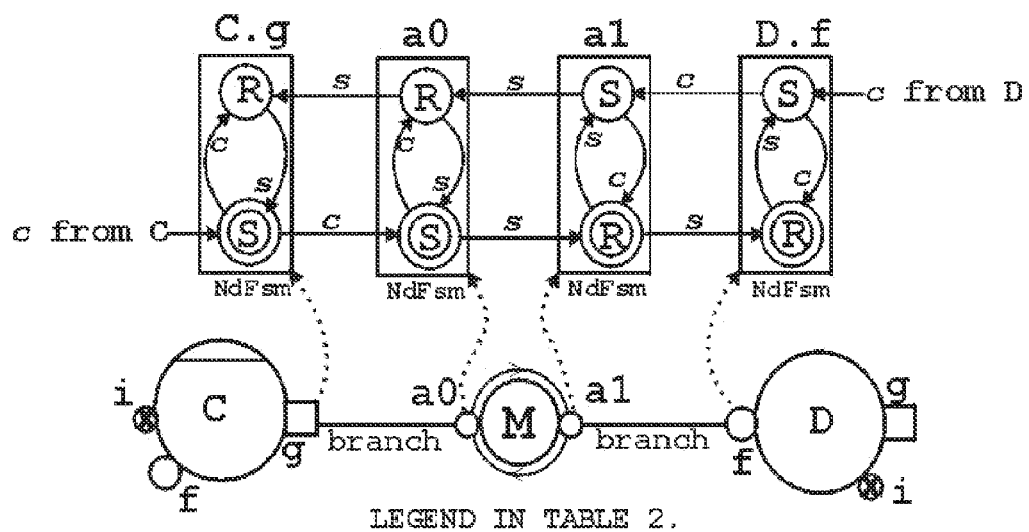
Figure 2: Point-to-Point Das Pathway with virtualMemory

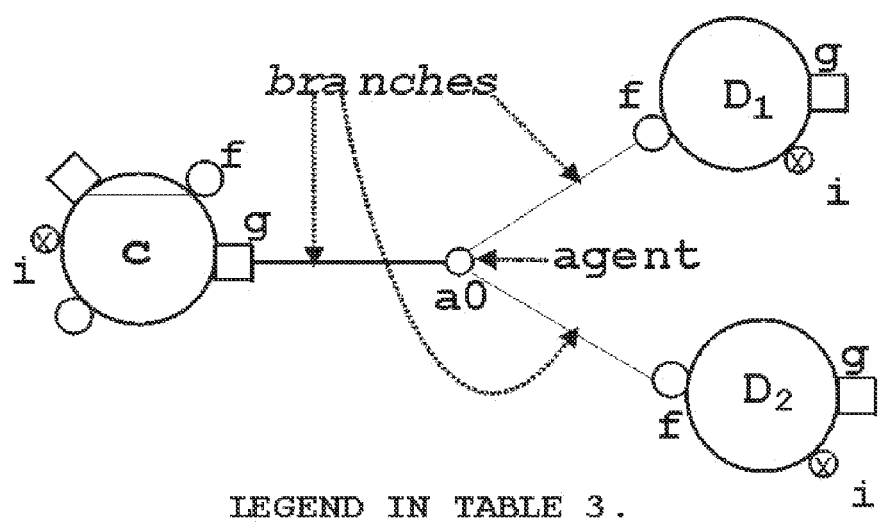
LEGEND IN TABLE 3.
FIGURE 3: A SIMPLE POINT-TO-GROUP PATHWAY

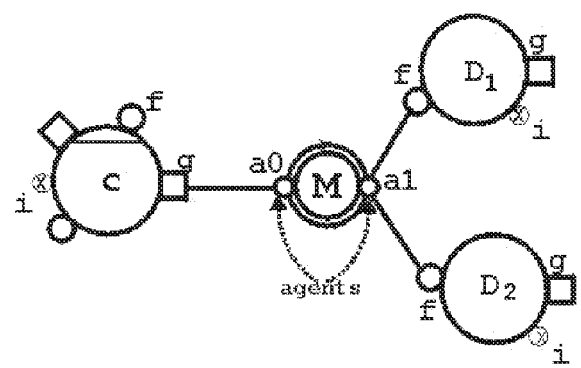
Figure 4: Point-to-Group Pathway with virtualMemory
LEGEND IN TABLE 4

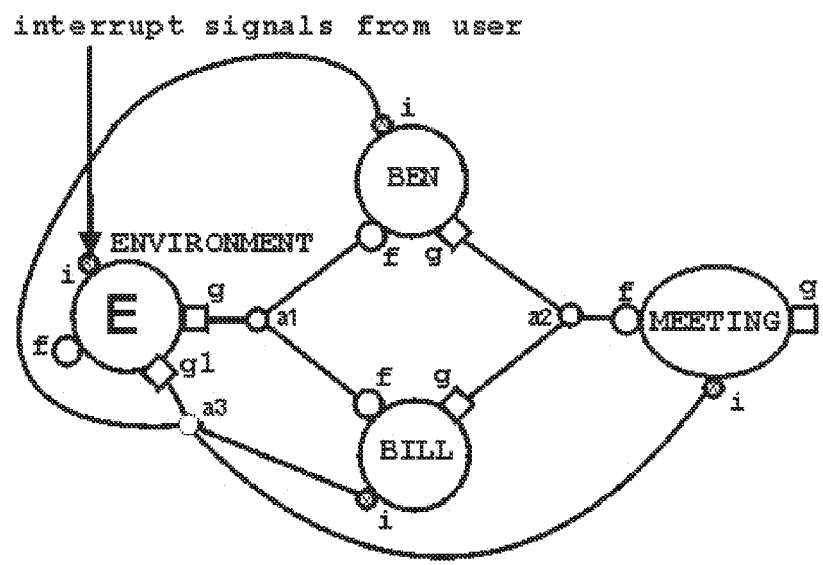
Figure 5: TICC-Network for the Bill-Ben Game

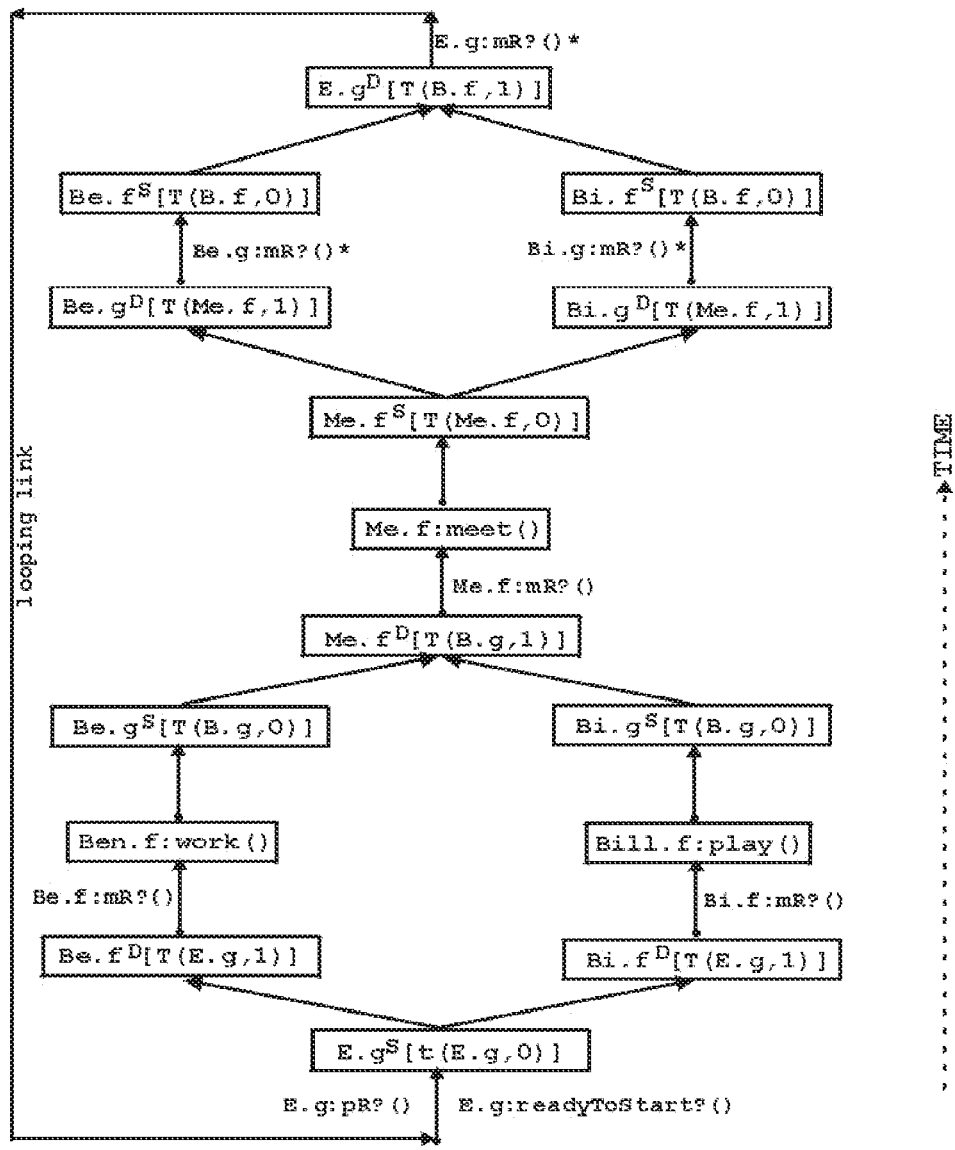
FIGURE 6A: ALLEOPS-GRAPH FOR BILL-BEN GAME

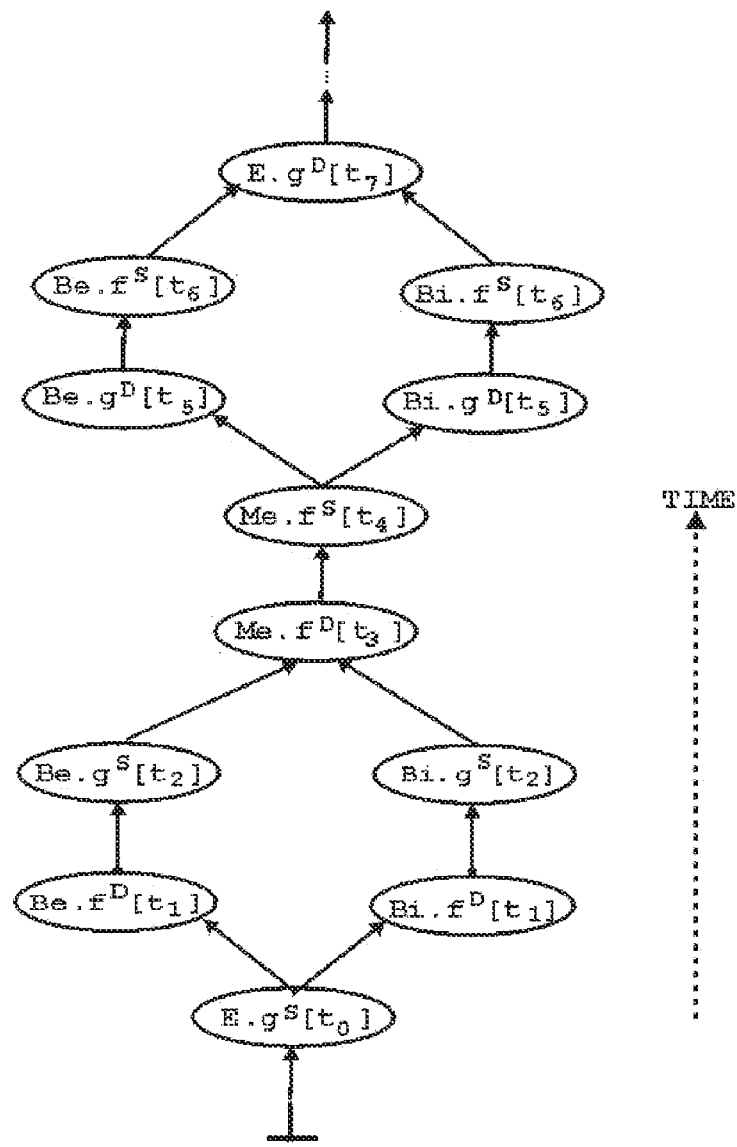
FIGURE 6B: CAUSALNET FOR SINGLE RUN OF THE GAME

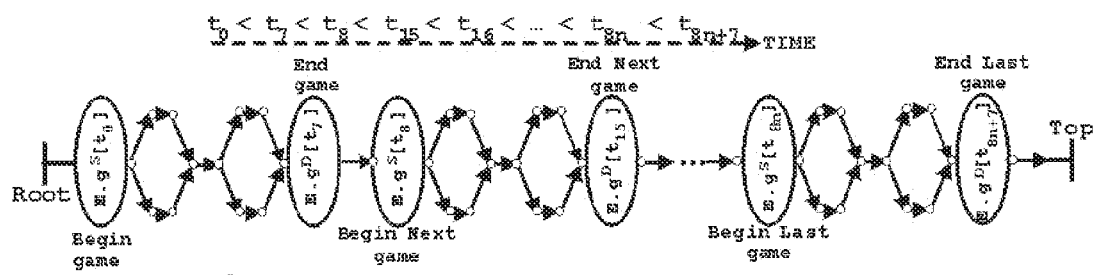
FIGURE 6C: CAUSALNET FOR BILL-BEN GAME WITH MULTIPLE ITERATIONS

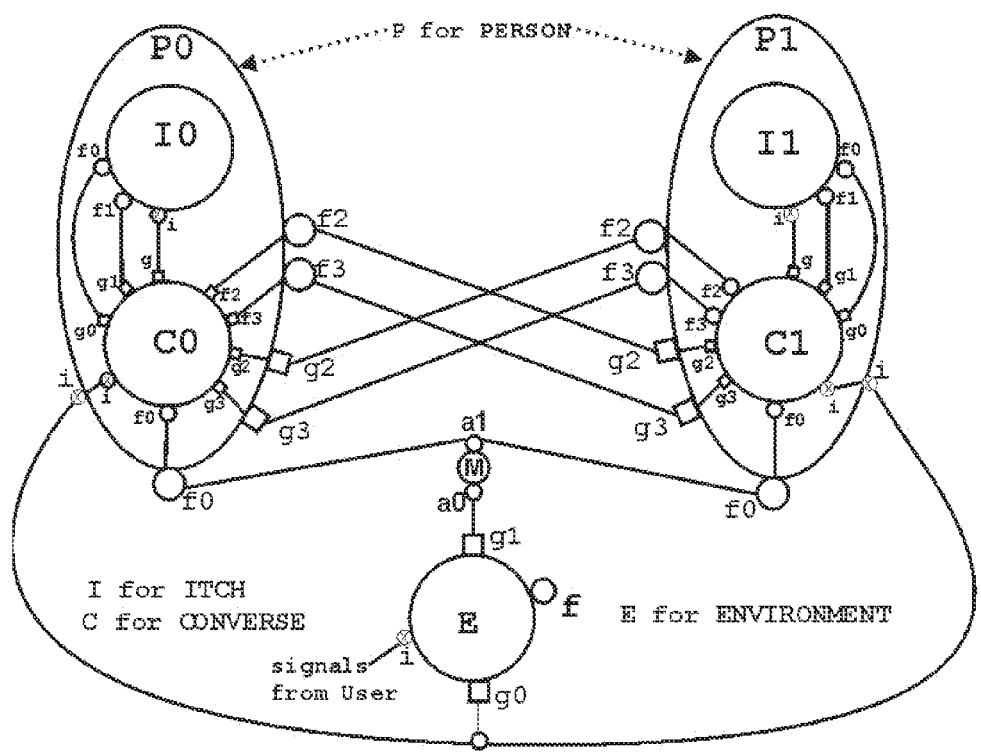
FIGURE 7: TICC-NETWORK FOR THE TALKING-ITCHING PROBLEM SOLUTION

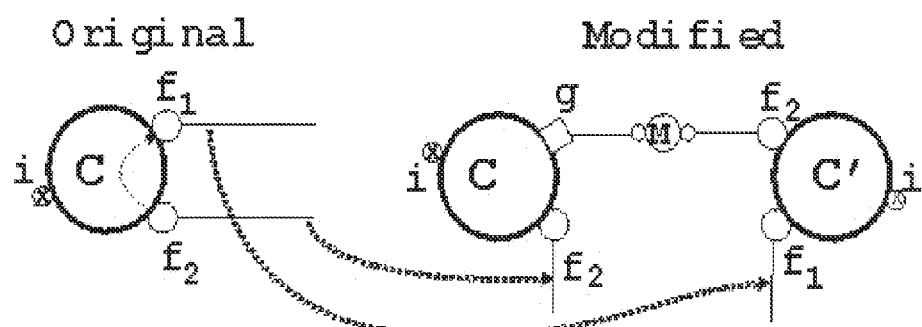
FIGURE 8: MOVING DEPENDENT PORT

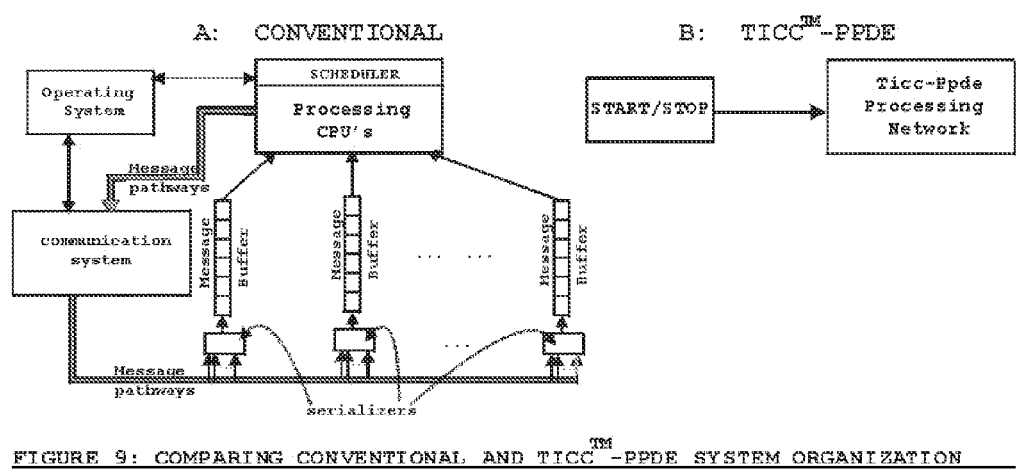
FIGURE 9: COMPARING CONVENTIONAL AND TICC™-PPDE SYSTEM ORGANIZATION

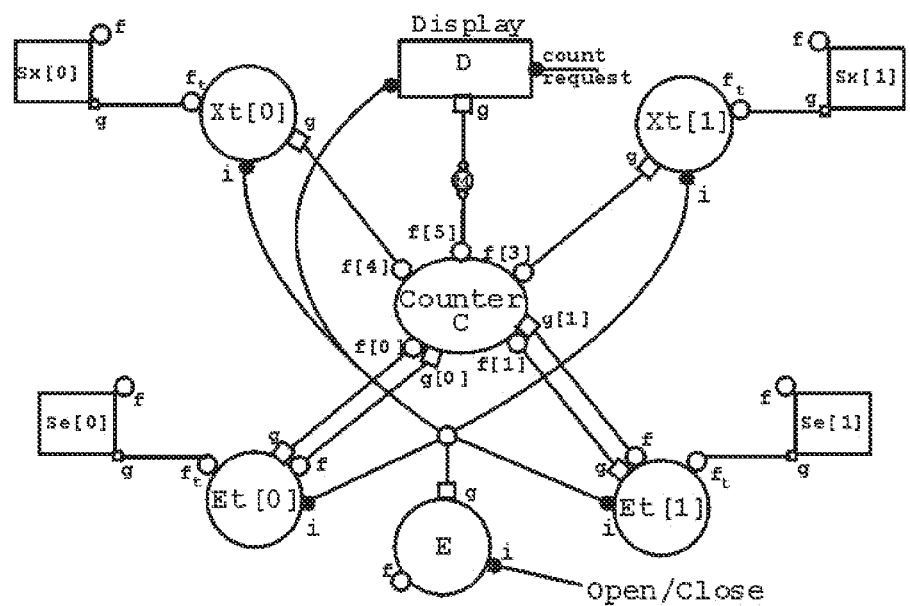
FIGURE 10: NETWORK FOR OG-SOLUTION

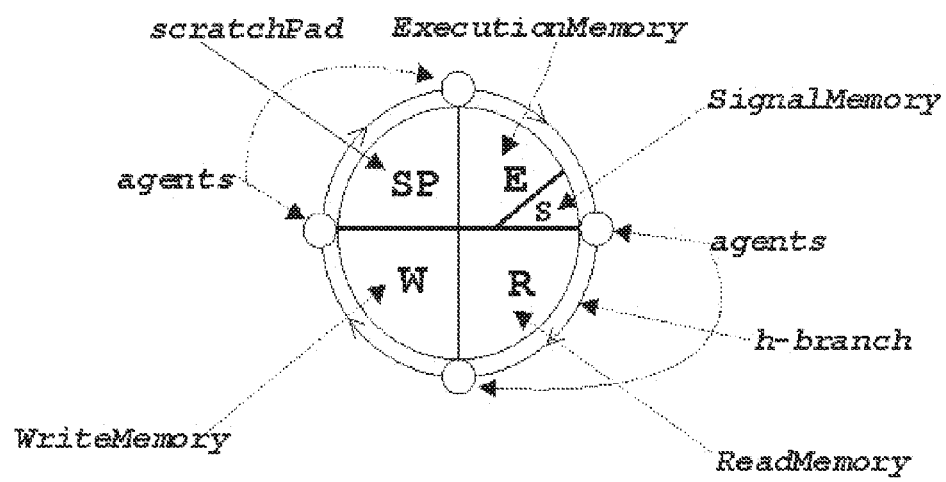
Figure 11: Structure of VirtualMemory

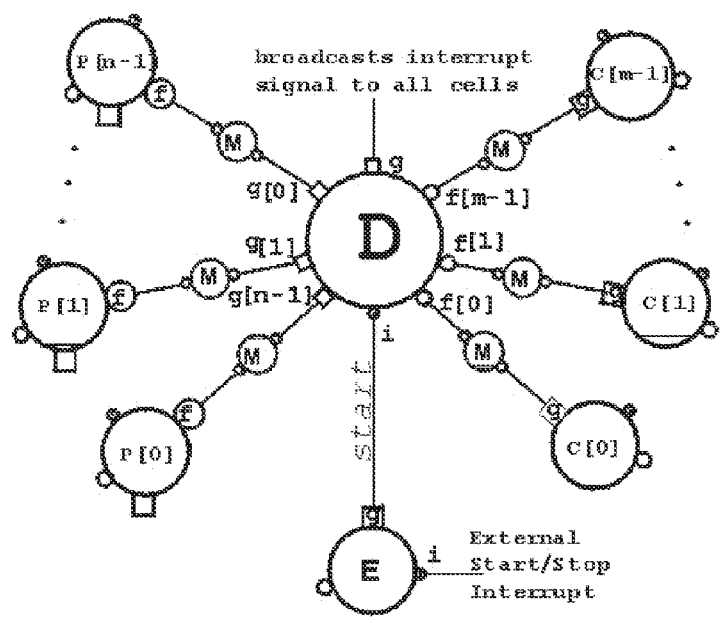
Figure 12: TICC-Network for the PC-Problem Solution

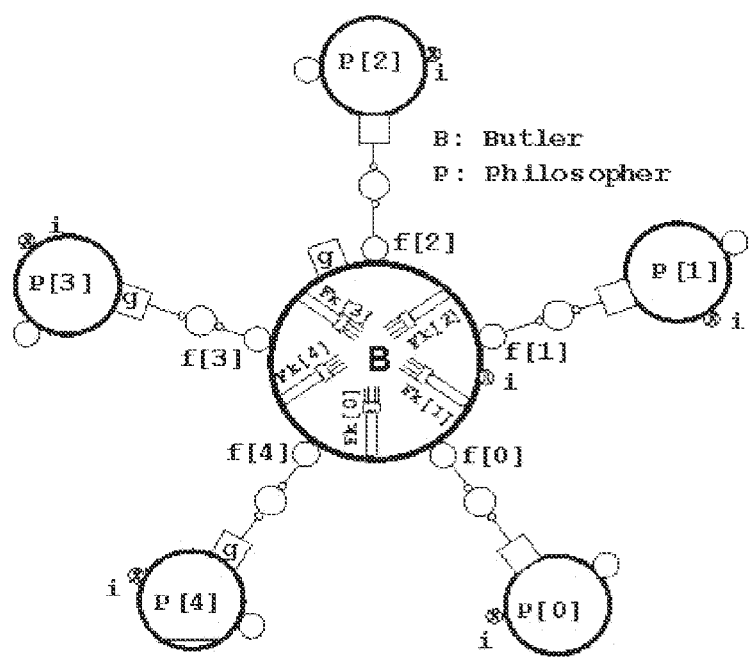
Figure 13: TICC-Network for DP-Solution.

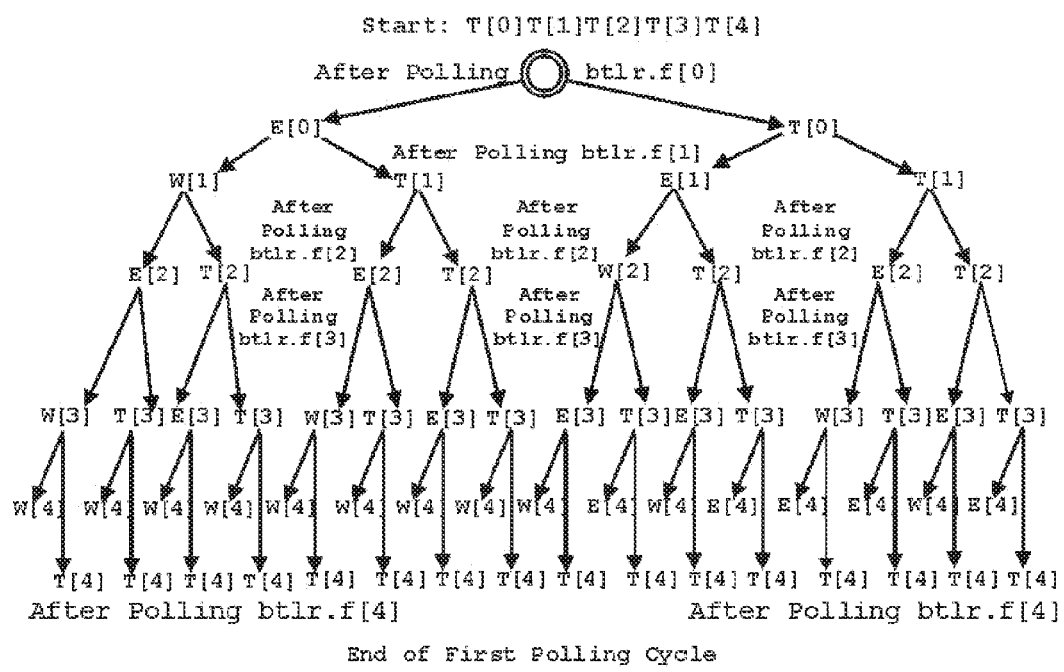
FIGURE 14: BRANCHING TREE OF CONFIGURATIONS IN A POLLING CYCLE OF BUTLER

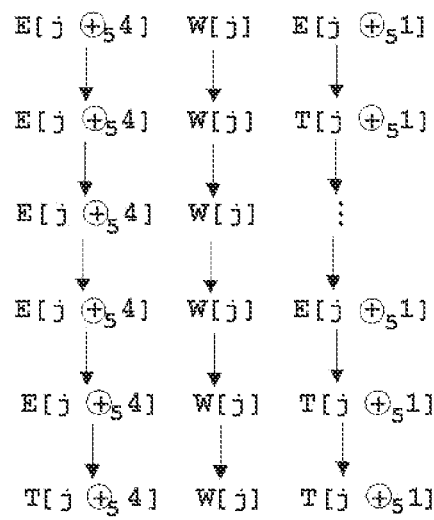
FIGURE 15: STATES OF BUTLER IN SUCCESSIVE POLLING CYCLES

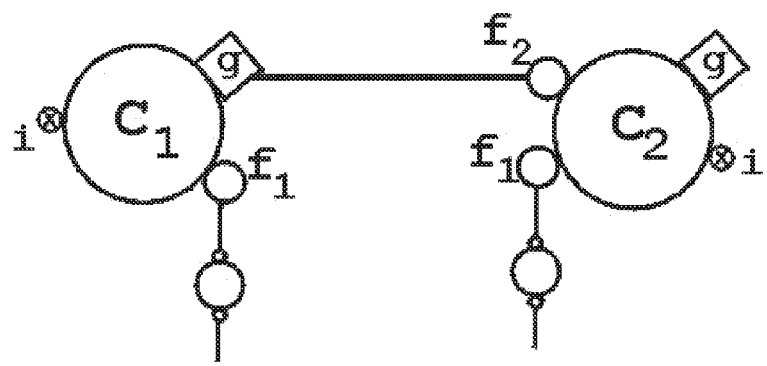
FIGURE 16: ILLUSTRATING ad hoc COORDINATION

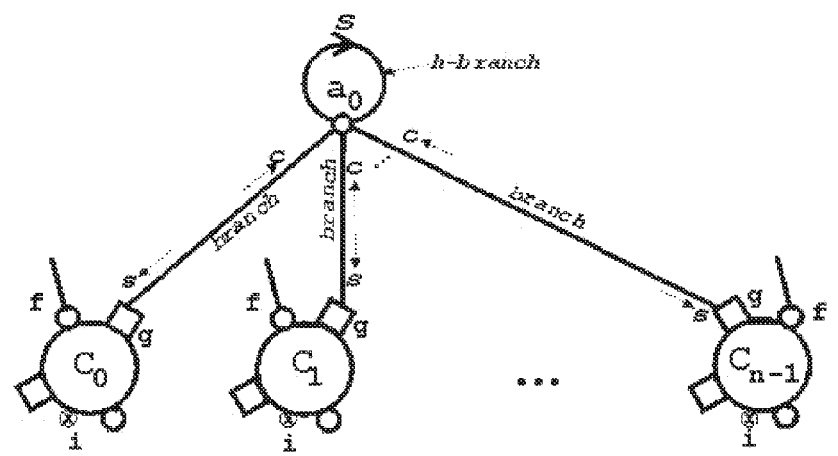
FIGURE 17: Ad hoc SYNCHRONIZATION NETWORK

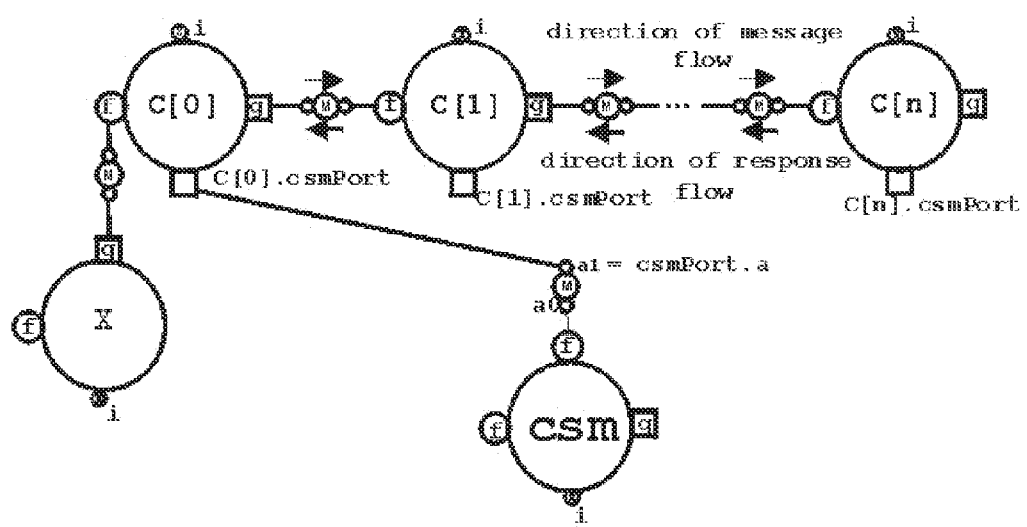
FIGURE 18: A NETWORK WITH NFSP ALLEOPS

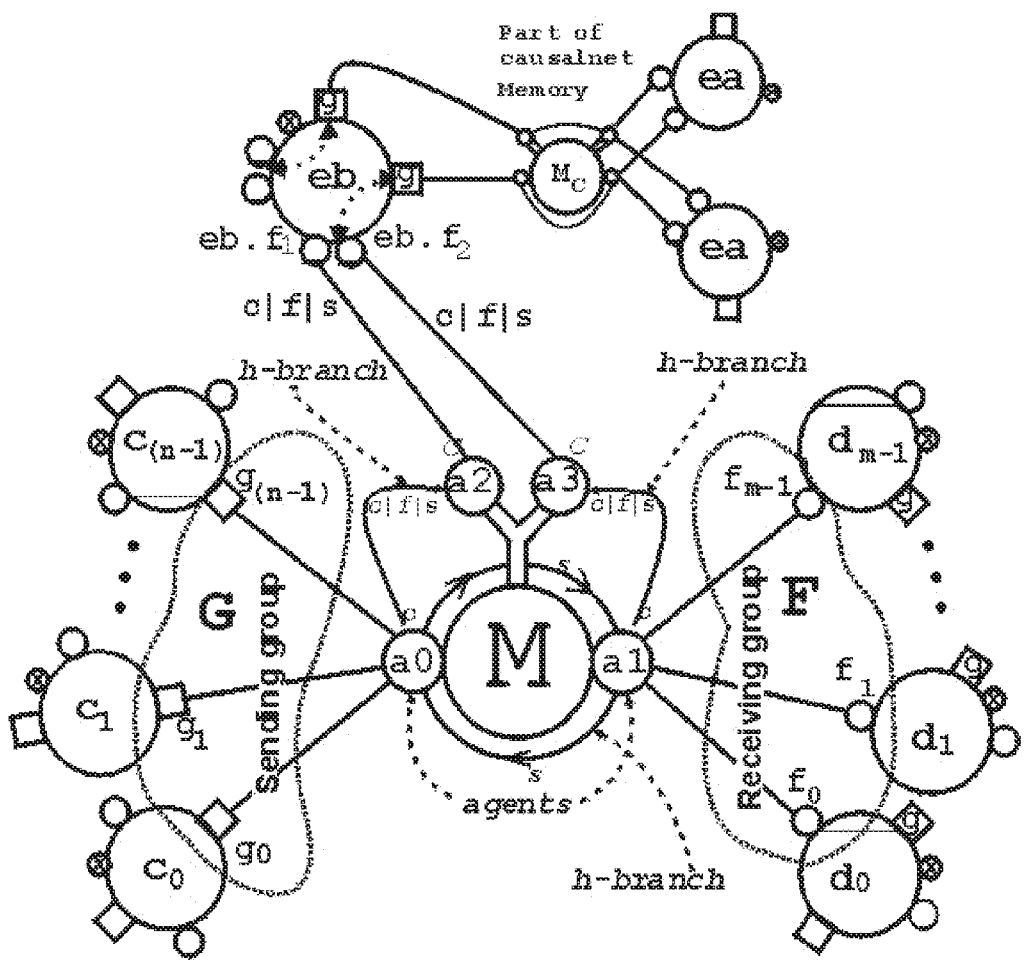
Figure 19: A Group-to-Group sm-pathway with infrastructure for SMS

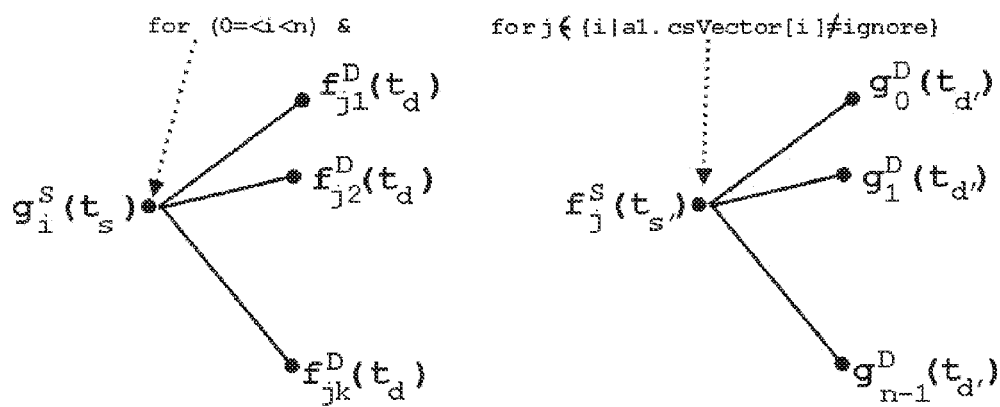
FIGURES 20 & 21: CAUSALNET FRAGMENTS IN GROUP-TO-GROUP COMMUNICATIONS

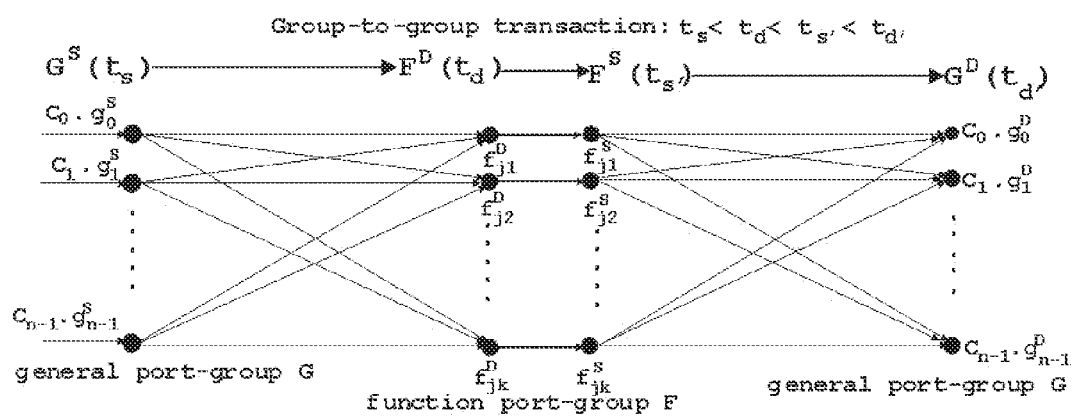
FIGURE 22: COMBINATION OF CAUSALNET FRAGMENTS IN FIGURES 20 & 21

○ agent
◉ interruptPort
○ functionPort
□ generalPort
G1 sends message to F1
F1 sends message to F2
F2 sends message to F3
F3 sends message to G1
SPLITS UP SEQUENTIAL
PROCESSING INTO
COMPONENTS
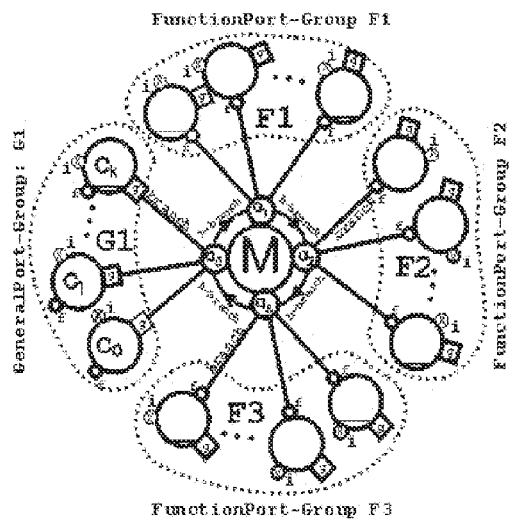
Figure 23: One-way Ring Pathway.

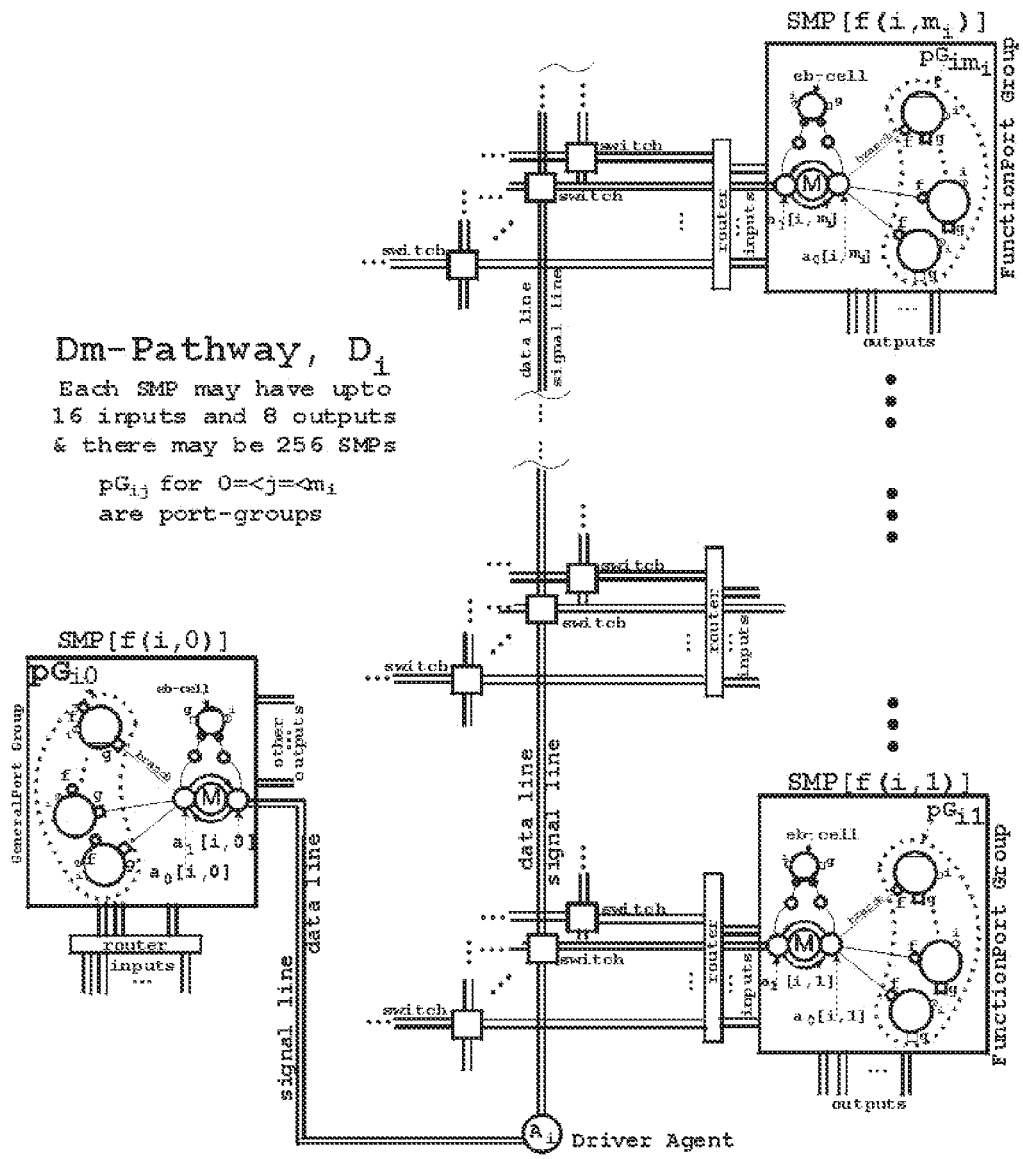
FIGURE 24: SCHEMATIC DIAGRAM OF A DM-PATHWAY

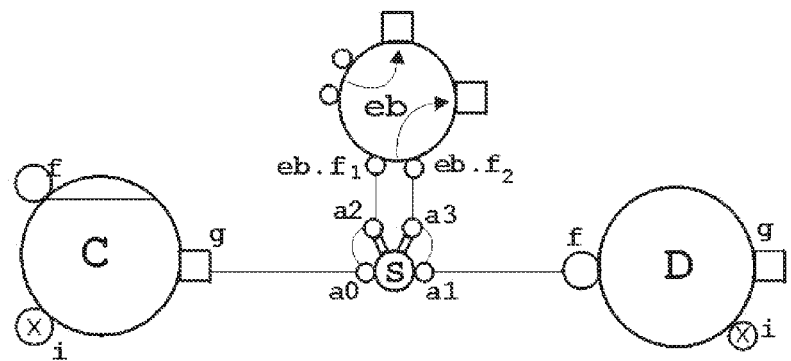
FIGURE 25: Simple Pathway with SMS attachments

TICC-PARADIGM TO BUILD FORMALLY VERIFIED PARALLEL SOFTWARE FOR MULTI-CORE CHIPS

BACKGROUND OF INVENTION

1. Motivation

Since the dawn of computer age in the 1950's, we have seen remarkable progress in computer hardware systems design and computer software systems design. This progress has now led us to where we are today. We have taken an unimaginably great leap from the days of our ancestors who lived in the tropical jungles of Africa 100 thousand years ago. We now enjoy and suffer unprecedented use of computers in every aspect of human life, unprecedented communication among peoples via internet, as also unprecedented opportunities for invasions of privacy, data stealing and cyber warfare.

There is now a growing gap between our ability to produce complex secure computing hardware systems at ever decreasing costs, and our ability to produce software systems that exploit available hardware configurations, at ever increasing costs. Cost of producing and maintaining software systems far exceed costs for hardware systems; at more than 12 trillion dollars per year around the world, cost of software systems is more than five times the cost of hardware systems. In spite of this enormous cost, software systems are intrinsically error prone, prone to attacks by intruders and cannot guarantee data privacy and system security. This has given rise to a vast industry catering to data and system protection from potential intruders.

Our computing technology has reached an impassable computing bottleneck. We will have several occasions to refer back to this computing bottleneck later in this chapter.

As software systems keep getting progressively more complex, they also keep getting progressively more error prone and more prone to attacks by hackers. Complexities of software systems design, implementation and maintenance, and our inability to deploy viable technological solutions to solve problems of unreliability, lack of security and ever increasing production costs, have led us to this bottleneck. Much of the advances in software engineering technology have been driven by corresponding advances in programming technology, and not advances in system design independent of programming. Presently, there does not seem to be any way out of this vicious cycle of programming and system implementation and the computing bottleneck it pushes us in to.

Almost all software systems we use today fall into the category of time sliced concurrent software systems. By "time sliced concurrent" we mean software systems in which the same CPU, performs multiple computations in multiple distinct non-overlapping time slices, controlled and coordinated by a monitor, no two computations being ever performed by any CPU simultaneously at the same time. As number of time slices per second increase, these computations become intrinsically unreliable and unpredictable.

With multicore technology we have today, and new technologies available for very fast parallel inter process communications [U.S. Pat. No. 7,210,145 B2], there is hope that parallel software systems may provide viable solutions to cater efficiently to ever increasing software complexity, lack of reliability and security and increasing costs. By "parallel software" we mean software systems in which multiple distinct computations in multiple ComPutinq Units (CPUs) occur simultaneously at the same time and the CPUs automatically coordinate their activities through communication with each other, with no need to use monitors.

However, there is little evidence that this hope could be realized using current technologies of parallel program design and development. This is because, current parallel processing technologies have serious limitations: parallel software systems that use current technologies are much harder to implement, even harder to debug and validate, and harder still to update and maintain, and do not run efficiently making optimal use of available hardware resources, and the gap between computation timings and communication timings is vast and growing ever wider in spite of all the advances we have made in communications technology.

There have been several discussions of different paradigms for parallel programming, based on languages and libraries used [1], based on different message passing interfaces [2]-[6], based on data flow models [7][8], based on different hardware architectures [8]-[10], based on network models [10]-[12] and based on communication models [π-calculus, 26,27]. All of these accept the inevitability of two fundamental incompatibilities and one serious limitation:

(i) Incompatibility between communication and computation speeds: this is usually compensated by increasing grain size of computations, grain size being the average amount of time spent on computations between successive message passing events in parallel processing systems.

(ii) Incompatibility between speed of data access from memories and CPU speeds; this is usually compensated by using cache memories [13], pipe-lined instruction execution [14], look-ahead instruction scheduling [15] and multiple instruction stream executions [16]. However, these make it impossible to predict instruction execution times. Also, when very high speed communication facilities are used, they cause cache incoherence, which makes different parallel execution units to see at the same time different data values for the same data item.

(iii) Difficulty of debugging parallel programs, updating them and maintaining them: Errors in parallel programs may cause them to deadlock and grind to halt, making them difficult to debug. Using parallel break points will disrupt execution timings and themselves lead to deadlocks. It is not possible to dynamically update and revalidate current parallel programs.

Thus, parallel programs become very difficult and very costly to develop and maintain, requiring special expertise not commonly available. One seeks higher productivity [17][18] by increasing peak flops/sec yields of parallel processors without having to increase parallel program execution efficiencies. Commodity based massively parallel cluster computing will find its limits in realizable flops/sec efficiency (which is currently about 30%), realizable flops/unit-of-power efficiency and flops/unit-of-space efficiency measures. These efficiencies are likely to decrease dramatically at scaling factors of $10^4$ or $10^6$. It is claimed, Blue Gene (IBM) has been scaled up to $10^5$ processors. Published papers indicate 30% efficiency with 9000 processors. It is not clear whether applications using all the $10^5$ processors have ever been written and tested.

With nano-scale computing and quantum computing [19], we may confront a need to perform massively parallel computations at scales of $10^6$ or more. Scalable parallel processing hardware networks appear in cellular automata [20][21], systolic machines [9], and asynchronous data-flow machines [7][8]. It is not, however, clear how these might be adopted to meet anticipated requirements of scalable software.

Thus, both concurrent and parallel software system design and implementation have now reached their limits of scalability and practical viability, and are caught in a computing bottleneck. Further scaling of these technologies to implement yet more complex, more reliable and more secure systems is no longer possible.

To make parallel programming address issues we face and solve problems we encounter, we need totally new ways of designing, implementing, validating, and maintaining parallel software systems. We need methods in which computer itself is used to help design, implement, validate and maintain such software systems. We need methods to arbitrarily scale our parallel software systems to meet ever increasing complexities through increased parallelism. Also we need self-monitoring capabilities that enable us to constantly monitor such software systems at run time, and issue timely reports on errors, pending errors and critical behaviors, and take appropriate predefined actions automatically in a timely fashion. We also need a framework in which self-diagnosis and self-repair become possible. Hardware technology to supply practically unlimited supply of hardware resources needed for such parallel software systems is here today in the form of multicore chips, and nano-technology based computing units are over the horizon. But, software technology to put available hardware resources to good use, is not here yet.

In the following we use acronym Ppde to refer to a viable Parallel program development and execution platform and postulate the set of requirements Ppde should satisfy in order to help us free ourselves from the computing bottleneck we are in today.

2. Desirable Properties of a Viable Ppde

There are compelling reasons to be open to scalable and efficient computer assisted methods which simplify parallel programming, updating and maintenance, formally verify them, and provide self-monitoring capabilities.

In the following, we use the phrase formal language to refer to a language which can be used to communicate with both computers and humans. Programming languages or languages of logic are examples of formal languages, while natural languages are not (at least, not yet!). We use the term 'cell' to refer to a parallel software execution unit. Each cell defines an independent parallel software process, run by a distinct ComPuting Unit (CPU) that is assigned to that cell. Cells have the capability to exchange messages among themselves, through communication pathways that interconnect them in a network of cells and pathways.

Cells are used in parallel software systems to process messages received from other cells, and to build and send messages to other cells. Each cell polls its input/output ports cyclically and either receives and processes messages delivered to the input ports and possibly respond to them, or builds service request messages and sends them to other cells through its output ports. These are the only operations performed by cells. This is similar to Actor systems [39,40]. There are several differences though between the proposed Ppde and Actor systems.

There are two kinds of cells: (i) Compound cell, which may be decomposed to a sub-network of cells and pathways that may be encapsulated with in the compound cell. (ii) Simple Cell, which cannot be further decomposed. We use the term 'cell' to refer to both compound and simple cells. A simple cell is abstract if computer programs used by the cell have not all been implemented (defined) yet. A compound cell is abstract if either its decomposition has not been specified yet, or the specified decomposition contains abstract cells. Defining computer programs used by an abstract simple cell is called cell refinement. Similarly, specifying decomposition of an abstract compound cell is called network-refinement. We now state the desirable properties of a viable Ppde as follows:

(i) Ppde should provide a formal language to specify requirements of any parallel software system for any parallel application Ap, that the design of Ap should satisfy. We use Ap:requirements( ) to refer to the set of assertions in the formal language that specify requirements.

(ii) We use Ap:design( ) to refer to the specification of an abstract design for Ap, consisting of cells and communication pathways together with abstract specifications of interactions among the cells in the network of cells and pathways. Ppde should provide a formal language to specify Ap:design( ). The formal language used to specify Ap:design( ) will be different from the formal language used in (i) above. Specification of Ap:design( ) should be free of characteristics that pertain to programming languages used to implement Ap:design( ). Ap:design( ) will not itself be an executable program, but should be such that Ppde could use Ap:design( ) specifications to automatically derive and prove properties of Ap:design( ) declared in Ap:requirements( ).

(iii) Ppde should provide interactive mechanisms, consisting of hardware, software and humans, which may be used to validate that Ap:design( ) satisfies Ap:requirements( ). We refer to this as formal verification, since verifications are done without having to execute (run) any of the specifications in Ap:design( ).

There are several languages available today that can be used to perform tasks in items (i) through (iii) above: FSP (Finite State Process) languages [32,33], TL (Temporal Logic) languages [34,35], CTL (Causal Temporal Logic) languages [31,33,34,35,38], PN (Petri Net) languages [36], NND (Neural Net Design) languages [37]. It is not, however, possible to express an abstract design and interactively verify properties of the design using these languages for realistic practical parallel software systems. Also, these languages do not satisfy requirements in items (iv) through (vii) below.

(iv) Ppde should provide interactive mechanisms to reduce Ap:design( ) to its implementation in a programming language through successive step by step and progressive refinements of abstract cells, pathways and their interaction specifications in Ap:design( ), preserving at each stage of refinement all validated properties in all previous refinements. We use Ap:implementation( ) to refer the validated implementation of Ap:design( ) at any stage of refinement.

(v) At each stage of refinement Ppde should provide facilities to modify Ap:design( ) and Ap:requirements( ) if necessary, update Ap:requirements( ) by adding new requirements, and formally validate all refinements performed up to that stage through formal verification of statements in Ap:requirements( ), without having to execute any of the defined computer programs in the refinements up to that stage. Ap:implementation( ) is fully refined only when Ap:design( ) does not contain any more abstract cells.

(vi) Ppde should provide facilities to formally validate the fully refined Ap:implementation( ) through formal verification of all statements in updated Ap:requirements( ), and provide criteria to ascertain that this verification does indeed fully validate the correctness of Ap:implementation( ). Implementation of Ap is complete and correct only when it satisfies all statements in the said criteria.

(vii) Ppde should provide facilities to incrementally update and modify Ap:implementation( ) at any stage of refinement, in order to correct errors and discrepancies encountered between Ap:implementation( ) and Ap:requirements( ), without having to start all over again with a new Ap:design( ) and a new Ap:implementation( ), every time.

(viii) Ppde should provide mechanisms to define data and system security features of Ap, which Ap:implementation( ) should satisfy. The mechanisms should be such that Ppde could automatically incorporate all specified data and system security features into Ap:implementation( ). Implementers should not be required to implement programs that enforce specified data and system security requirements, either after Ap:implementation( ) or during Ap:implementation( ).

Most system design and development methodologies do not consider issues of protection, privacy and security as an integral part of system design. They are usually added on after a system is designed or implemented, often enforced by the operating system in which the system runs. Implementers are held responsible to implement the enforcement system. We require here, security and protection should be an intrinsic built-in part of Ppde execution mechanism, requiring only definition of security and protection parameters needed for Ap at the time of design, but not their enforcement mechanisms.

(ix) Ppde should automatically provide a Self Monitoring System (SMS) to monitor performance of a completed Ap:implementation( ) at run time, throughout its life time, without interference with its timings and execution efficiency, in parallel with the running of Ap:implementation( ), in order to identify run time errors, pending errors and a priori defined critical behaviors, and promptly report them, or automatically take appropriate a priori defined remedial actions in a timely manner.

(x) SMS should have the infrastructure to eventually incorporate self-diagnosis, self-repair and learning abilities into Ap:implementation( ).

Implementers should not be required to specify any component of SMS. Ppde should automatically derive SMS specifications from given implementation and security specifications and install SMS in the implemented system.

(xi) Finally, the number of cells and pathways used in Ap:implementation( ) should be arbitrarily scalable, with minor modifications to the implementation without having to revalidate the scaled up version.

If we get a Ppde platform that satisfies all of the above requirements, and it can be easily used to systematically design, develop, update, validate and run self-monitoring parallel software systems, then we can surely escape from the computing bottleneck we are in today. We will then be ready to take the next great leap from benefits of computer revolution we enjoy and suffer today, to land in an era of next great computer revolution, this leap being analogous to a leap from the era of steam engine days to the era of fuel cells.

TICC™ (Technology for Integrated Computation and Communication) TICC™-Ppde (TICC™ based Parallel Program Development and Execution) platform, which are the subjects of this patent application, together satisfy all of the above requirements, as described in Chapter 2. The term TICC™-paradigm is used to refer to abstractions, methods, rules and conventions used in TICC™ and TICC™-Ppde to design and build parallel programming applications, validate them and run them with self-monitoring. Hereafter we will use the terms Ap:design( ), Ap:implementation( ) and Ap:requirements( ) to refer to TICC™-Ppde designs, implementations and requirements of parallel software system applications Ap using the TICC™-paradigm. We briefly outline principal features of the TICC™-paradigm, pertinent to this patent application, in the next subsection. Details are given in Chapter 2.

3. Features of TICC™ and TICC™-Ppde (i) Proof of concept prototypes of TICC™ and TICC™-Ppde have both been implemented and tested for parallel program development and execution to demonstrate that it is possible to build platforms that satisfy requirements listed in the previous subsection. Implementation and testing of the proof of concept prototypes of TICC™ and TICC™-Ppde were supported by NSF grants, DMI-0232073 and DMI-0349414 during the years 2003 through 2005. The prototypes are implemented in $C^{++}$ and work in HP PROLIANT 760 Shared Memory Multiprocessor (SMM) in Linux OS-environment.

TICC™-Ppde provides an API (Application Programming Interface) and a Graphical User Interface (GUI), called TICC™-GUI, for design, development and documentation. GUI is used to develop and display the network of cells and pathways in Ap:design( ), update the network, display properties of components in the network and activate components in the network, when requested to do so The network is called TICC™-network. TICC™-GUI was designed and implemented by Mr. Rajesh Khumanthem, Mr. Kenson O'Donald and Mr. Manpreet Chahal, as per specifications provided by this inventor. TICC™ and TICC™-Ppde were both designed and implemented by this inventor with in a period of two man years. Specifications for TICC™ and TICC™-Ppde were also designed and developed by this inventor.

(ii) TICC™-Ppde prototype uses Operating System only for memory management, secondary memory access, input/output and internet access: It does not use the Operating System for interrupt control, scheduling, coordination, synchronization, monitoring, process and pthread (parallel thread) activations, and communications. Application programmers do not have to write programs for scheduling, coordination, synchronization, process activations and monitoring in parallel software systems they implement. Once abstract system design is completed and specified, TICC™-Ppde automatically becomes self-scheduling, self-coordinating, self-synchronizing, self-activating, self-monitoring and self-communicating.

Each cell executes its own communication protocols, in parallel with other cells, to exchange messages asynchronously with other cells, with guaranteed message delivery having only 350 to 500 nanoseconds latencies. The number of parallel simultaneous message exchanges occurring at any given time being limited only by the number of available cells. TICC™-Ppde does not use sequential buffers to implement asynchronous communications. TICC™-Ppde provides validated compiled codes for all protocols likely to be used in any parallel programming system. The prototypes run completely autonomously using the operating system only for dynamic memory management and input/output. All of these features have been tested in the prototype TICC™-Ppde. Eventually all operating system functions may be installed in TICC™-Ppde itself thereby providing an integrated environment for design, development, validation, and running of self-monitoring parallel software systems.

(iii) TICC™-Ppde automatically derives and builds a formal model of computations specified in Ap:implementation( ) at every stage of its refinement, including the Ap:design( ) stage. Models are expressed in terms of ALLowed Event Occurrence Patterns (ALLEOPs). Intended computations in parallel software systems specified by Ap:design( ) and Ap:implementation( ) causes a set of events to occur at run time, which in turn cause other events to occur as computations and communications continue further. ALLEOPs identifies classes of events that may occur in intended computations, specify causal relations between classes of events, and describes patterns of causal chains of event classes that may occur at run time. ALLEOPs thus specify event class partial ordering causal model of Ap:implementation( ). This event class ALLEOP model is referred to here as Ap:ALLEOPs( ).

TICC™-Ppde uses Ap:ALLEOPs( ) for two purposes: (i) to prove properties of Ap:implementation( ), such as correctness, mutual exclusion, progress, freedom from deadlocks/livelocks, and other properties that may be specific to given applications, at different stages of refinement of Ap:implementation( ) including the completed implementation, and (ii) to interactively derive the self-monitoring system, Ap:SMS( ), for given Ap:implementation( ) using Ap:ALLEOPs( ), and automatically install it as a part of mechanisms used to execute Ap:implementation( ), the installed Ap:SMS( ) having all the features described in items (ix) and (x) in the previous subsection.

Properties to be proven are stated as assertions in a Causal Temporal Logic (CTL) language, as explained in Chapter 2. The set of all such CTL-assertions constitute Ap:requirements( ) Designers and implementers have the responsibility to specify Ap:requirements( ) and update them at each stage of refinement. TICC™-Ppde automatically updates Ap:ALLEOPs( ) at each stage of refinement of Ap:implementation( ), and automatically derives Ap:traces( ) and Ap:ECT-networks( ) (Event Characterization Tables networks) from Ap:ALLEOPs( ). Ap:traces( ) and Ap:ECT-networks( ) are used to interactively validate assertions in Ap:requirements( ), as illustrated in Chapter 2, Section 7.

(iv) TICC™-Ppde automatically incorporates into its execution mechanisms facilities needed for enforcement of data and system security specifications provided by designers and implementers: The specifications set values for pre-defined attributes in TICC™-Ppde for data and system components, as explained in Section 8 of Chapter 2. The attributes together constitute a universal system, which can be used to specify any kind of data and system security features, specific to any application implemented in TICC™-Ppde.

(v) Finally, TICC™-Ppde defines a single criterion, which may be used to ascertain that the set of all CTL-assertions in Ap:requirements( ), when validated, would indeed establish correctness of Ap:implementation( ).

(vi) Comments: All of these and many additional features of TICC™-Ppde are described and illustrated in Chapter 2. Static verification techniques used by TICC™-Ppde have not been implemented and tested yet, but this inventor has defined the denotational semantics of Parallel Programming Languages (PPL) used in TICC™-Ppde, called TICC™-PPL, and defined a proof theory to validate proof methods used in TICC™-Ppde. These will be published in appropriate journals in the near future and do not constitute patentable materials. Methods used to interactively build refinements of Ap:implementation( ) and proofs of assertions in Ap:requirements( ) at any stage of refinement, are informally defined and illustrated with examples in Sections 3 and 7 of Chapter 2. It is not hard to implement the static verification techniques described and illustrated in Chapter 2.

Proofs of mutual exclusion, freedom from deadlocks/livelocks, and synchronization/coordination characteristics, given in Chapter 2 are properties of implementations, derived from implementations, and not just properties of intended system designs stated in an abstract non-executable language. These are the first computer assisted interactive formal proofs of their kind that pertain to actual executable programs.

We present in Chapter 2 organizational principles that explain why TICC™-paradigm has the right structure and operational characteristics to provide the means to address all of the requirements listed in the previous section and all the features described above. As explained in Chapter 2, even without pressing need to scale by factors of $10^6$ or more, the new paradigm has several immediate benefits to offer. The paradigm is ideally well suited to build validated parallel software systems using multicore chips, validated real time systems, and secure systems with guaranteed security.

(vii) Nature of Inventions: The inventions here pertain to a collection of abstractions which facilitate the following: (i) specify abstract designs; (ii) provide methods to automatically derive ALLEOPs models from specifications of abstract designs and their refinements; (iii) provide guidance to perform successive and progressive refinements of designs and implementations, preserving at each stage of refinement properties validated in earlier stages; (iv) provide methods used to validate implementations at each stage of refinement using ALLEOPs; (v) modify TICC™ communication pathway structures and protocols in order to provide above mentioned characteristics; (vi) methods used to derive and install SMS for given design specifications; (vii) facilitate practically unlimited simultaneous parallel high-speed guaranteed asynchronous communications over TICC™-Ppde communication pathways, without having to use sequential buffers; (viii) enable program organization using virtualMemories; (ix) provide special facilities to ComPuting Units (CPUs), called TICC™-CPUs, to execute TICC™-Ppde programs without need to use an Operating System at any level of program execution; (x) enable precise prediction within given timing bounds, and control of execution times of program segments and protocols; (xi) enable automatic implementation of specified data and system security conditions; and (xii) leads to the specification of special hardware facilities in TICC™-CPUs, needed to execute TICC™-Ppde programs efficiently, validate implementations, enforce security and incorporate SMS.

An important invention that makes possible all of the above inventions, is the invention of Causal Communication Primitive (CCP) as a basic programming primitive [U.S. Pat. No. 7,210,145 B2], which can be used for hardware and software subsystems to dynamically communicate with each other by exchanging signals in order to coordinate and synchronize their activities, in a manner that is similar to how asynchronous hardware systems communicate with each other and coordinate their activities, CCP being implemented as a basic machine instruction and used to define communication protocols that enable guaranteed very high-speed parallel communications both in shared memory and distributed memory systems. As a machine instruction it will take only 5 nanoseconds (estimated) to execute a CCP in a 2 gigahertz CPU and it requires only about 8 CCP executions to deliver a message from one cell to another. Thus, with hardware assistance, communication latency may be drastically reduced to tens to a few hundreds of nanoseconds (estimated) or less. TICC™-Ppde using a variant of communications organization proposed in TICC™ [U.S. Pat. No. 7,210,145 B2]. Variation is quite small, but its consequences are profound.

Where as TICC™ communications were possible only in shared-memory software systems, TICC™-Ppde communications are possible both in shared memory and distributed memory parallel software systems. Distributed memory communications using CCPs over a local area TICCNET™. Also, TICC™ allowed only a limited number of parallel simultaneous communications. Message delivery latencies in TICC™ communications are not predictable. TICC™-Ppde allows unlimited guaranteed almost instantaneous and simultaneous parallel communications, with predictable message delivery times in nanoseconds, the number of such parallel communications that may occur at any given time being limited only by the number of available cells in a parallel software system.

(viii) No need to develop new technologies: As described in the concluding remarks of Chapter 2, the most important characteristic of inventions claimed here is that the inventions do not require any new technologies in order to be built and deployed. Inventions require only a new way or organizing computations and computing systems. Fully operational commercial version of TICC™-Ppde platform can be built, validated and deployed with in a period of 3 to 5 years, using only currently available technologies. The proof of concept prototype TICC™ and TICC™-Ppde, supported by NSF validate this claim. We outline in the concluding remarks of Chapter 2, short-term tasks that should be completed, in order to deploy TICC™-Ppde. TICC™-Ppde platform may then be used to build complex guaranteed high-speed high-efficiency validated secure parallel software systems in every area of human endeavor, some of which are outlined in the concluding remarks as long-term tasks.

(ix) Remarks: Both TICC™ and TICC™-Ppde are unique and are the first of their kind. There are no other integrated platforms of this kind in published literature or in patent literature with capabilities similar to TICC™ and TICC™-Ppde, except reference [22] below which pertains to TICC™, and the patent, U.S. Pat. No. 7,210,145 B2, for TICC™ issued to this inventor, for which international patent is still pending (patent application number, PCT/US2006/015305, published in PCT Gazette on Nov. 1, 2007, publication number WO 2007/123527). TICC™-Ppde uses a modified version of TICC™.

4. References for Chapter 1

1. M. Ehtesham Hayder, et al, "*Three Parallel Programming Paradigms: Comparisons on an archetypal PDE computation*", Center for Research on High Performance Software, Rice University, Houston, Tex. 77005, USA, hayder@cs.rice.edu, Parallel Processing Research Group, University of Greenwich, London SE18 6 PF, UK, c.ierotheou@gre.ac.uk, Computer Science Department, Old Dominion University and ICASE, Norfolk, Va. 23529-0162, USA, keyes@icase.edu.
2. William Gropp, et al [1999] *"Using MPI, Portable Parallel Programming with Message-Passing Interface, second edition*", The MIT Press, ISBN 0-262-57134-X. Also see http://www-unix.mcs.anl.gov/mpi
3. G. E. Karniadakis and R. M Kirby II, "*Parallel Scientific Computing in C++ and MPI: A Seamless Approach to Parallel Algorithms and Their Implementation*," Cambridge University Press, 2003.
4. A. Geist, et al, "*PVM: Parallel Virtual Machine A Users' Guide and Tutorial for Networked Parallel Computing*", MIT Press, 1994.
5. SHMEM: http://www.csar.cfs.ac.uk/user_information/tools/comms_shmem.shtml
6. OpenMP: http://www.llnl.gov/computing/tutorials/openMP/
7. P. C. Treleaven, D. R. Brownbridge, and R. P. Hopkins, "*Data-Driven and Demon-Driven Computer Architecture*", ACM Computing Surveys, Vol. 14, No. 1, pp 5-143, march 1982.
8. W. D. Hillis and L. W. Tucker "*The CM-5 Connection Machine: A Scalable Supercomputer*", Communication of ACM, Vol. 36, No. 11, pp 31-40, 1993.
9. T. Kung, "*Why systolic architecture*", Computer, Vol. 15, pp 37-45, January 1982.
10. Gregory F. Pfister, "*In Search of Clusters, The Coming Battle in Lowly Parallel Computing*", Prentice Hall PTR, Upper Saddle River, N.J., 1995., ISBN 0-13-437625-0.
11. Ian Foster and Carl Kesselman, "*The Grid: Blueprint for a New Computing Infrastructure*", Morgan Kaufmann Publishers, Inc., San Francisco, Calif., 1999, ISBN 1-55860-475-8.
12. Jarkko Kari, "*Theory of cellular automata: A survey*", Theoretical Computer Science 334 (2005): 3-33.
13. Donald L. Sollers, "*Cache memory based instruction execution*," Issued May 23, 2000, Filed on Mar. 11, 1997, U.S. Pat. No. 963,389.
14. Gary T. Corcoran and Robert C. Fairfield, "*Apparatus for controlling instruction execution in pipelined processor*," US patent issued Jul. 5, 1994, Filed on May 18, 1993, U.S. Pat. No. 4,873,630.
15. Barbara Bluestein Simmons and Vivek Sarkar, "System, method, and program product for instruction scheduling in the presence of hardware look-ahead accomplished by the rescheduling of idle slots," patent issued Mar. 23, 1999, filed Jun. 18, 1996, U.S. Pat. No. 555,719.
16. Gary Tyson and Mathew Farrens, "*Code Scheduling for Multiple Instruction Stream Architectures*," Computer Science Department, University of California, Davis, Davis, Calif. 95616 tel: (916) 752-678, fax: (916) 752-4767, email: tyson@cs.ucdavis.edu.
17. HECRTF, "*Report of High-End Computing Revitalization Task Force*", May 10, 2004, http://cray.com/downloads/HECRTF-FINAL_051004.pdf.
18. D. J. Kuck, "*High Performance Computing: Challenges for Future Systems*", New York, N.Y., Oxford University Press, 1996.
19. Sandeep K. Shukla, R. Iris Bahar (Eds.), "*Nano, Quantum and Molecular Computing: Implications to High Level Design and Validation*", Kluwer Academic Publishers, Boston, Mass., 2004.
20. Evolving Cellular Automata, Research at Santa Fe Inst., http://www.santafe.edu/projects/evca/evca1/papers.htm#EvCA
21. Vipin Kumar, et al, "*Introduction to Parallel Computing*", The Benjamin/Cummings Publishing Company, Inc., 1994, Chapter 10, pp 377-406, ISBN 0-8053-3170-0.
22. Chitoor V. Srinivasan, "*Technology for Integrated Computation and Communication*", references section of http://www.edss-ticc.com. This corrects an error in the paper, presented at PDPTA '03 conference at Las Vegas on Jun. 26, 2003, pp 1910-1916
23. L. V. Kale and S. Krishnan (1996). "*Charm++: Parallel Programming with Message-Driven Objects. In 'Parallel Programming using C++'*", (Eds. Gregory V. Wilson and Paul Lu), pp 175-213, MIT Press.
24. L. V. Kale, Milind Bhandarkar, Narain Jagathesan, Sanjeev Krishnan and Joshua Yelonl (1996) "*Converse: An Interoperable Framework for Parallel Programming*", Proceedings of the 10th International Parallel Processing Symposium, pp 212-217, April 1996."
25. Hoare, C. A. R., [1978] "*Communicating Sequential Processes*," CACM, vol. 21, No. 8, (August 1987), pp 666-677.

26. Milner, R., Parrow, J. and Walker D., *A calculus of mobile processes, Parts I and II*, Journal of Information and Computation, Vol 100, pp 1-40 and pp 41-77, 1992.
27. Robin Milner (1993), "*Calculi for Interaction*", Cambridge University Tech. Report. 1995
28. Robin Milner Communication and Concurrency_Prentice Hall, 1989
29. Ole Hogh Jensen, Robin Milner (2004), "*Bigraphs and mobile processes revisited*", University of Cambridge Computer Laboratory, Technical Report UCM-CL-TR 580, 15 JJ Thomson Avenue. Cambridge CB3 OFD, United Kingdom, phone +44 1223 763500, http://www.cl.cam.ac.uk.
30. Richard M. Karp and Vijaya L. Ramachandram "*A survey of parallel algorithms for shared-memory machines*", Technical Report UCB-CSD-88-408, Computer Science Division, University of California, Berkeley, March 1988. To appear in *Handbook of Z~e. Theoretical Computer Science*, North-Holland, Amsterdam, 1989.
31. Jeff Magee and Jeff Kramer, "*Concurrency, State Models & Java Programming,*" John Wiley & Sons, Ltd., 2006, ISBN-13 978-0-470-09335-9.
32. Robin Milner, "*A Calculus for Communicating Systems*", Springer-Verlag, ISBN 0-387-10235-3, New York, Heidelberg, Berlin, 1980.
33. Clark, E. M., "*Automatic Verification of Sequential Circuit Designs*": DBLP:conf/chdl/Clarke93, CHDL, 1993 IFIP conference proceedings, page 165.
34. Clark, E. M., Emerson, E. A., and Sistla, A. P., "*Automatic Verification of Finite State Concurrent Systems Using Temporal Logic Specifications*", ACM Transactions on Programming Languages and Systems, 8, 2 (April), 626-643 (1986).
35. Clark, E. M. and Wing, J. M., et al, "*Formal Methods, State of the Art and Future Directions*", ACM Computing Surveys, 28, 4, 607-625 (1996)
36. C. A. Petri and W. Reisig, (2008) Scholarpedia 3(4):6477, http://www.scholarpedia.org/article/Petri_net
37. Rinku Dewri, (2003), "*Evolutionary Neural Networks: Design Methodologies,*" http://ai-depot.com/articles/evolutionary-neural-networks-design-methodolgies/
38. Clark, E. M, Yuan Lu, Grumberg, 0, Veith, H., Jha, S., "*Counter example guided abstraction refinement for symbolic model checking,*" Journal of the ACM, Vol. 50, No. 5, September 2003, pp. 752-794.
39. Carl Hewitt, (1976) "*Viewing Control Structures as Patterns of Passing Messages*", A.I. Memo 410, M.I.T, Artificial Intelligence Laboratory, 545 Technology Square, 02139.
40. Gul Agha, (1986) "*ACTORS: A Model of Concurrent Computation in Distributed Systems*", The MIT Press Series in Artificial Intelligence, Dec. 17, 1986.

DETAILED DESCRIPTION OF TICC™-PARADIGM TO BUILD FORMALLY VERIFIED SOFTWARE FOR MULTICORE CHIPS

Basic Concepts and Illustrative Examples

1. Introduction

TICC™ message passing paradigm and TICC™-Ppde adapts and integrates aspects of seven other programming paradigms: (i) the OO (Object Oriented) paradigm [1,2,3,4], (ii) parallel computations as in Actors [5,6,37], (iii) interaction specifications as in π-calculus [7,8,9] (iv) integration of computation and communication as in CSP [10,11,12], (v) verification of implementations similar to design verification through FSPs (Finite State Processes) [13], (vi) verification of NFSP (non-FSP) systems similar to [15] and [16.17,18], and (vii) communication using RESTCLK-pathways [19]. Only the OO-paradigm is used practically unchanged. Among the rest, RESTCLK, TICC™ and proof methods are new.

Integration of these paradigms is made possible by the use of TICC™, which enables hardware and software computing components to exchange signals programmatically. All communications and pthread (parallel thread) interactions, scheduling, security enforcement, interrupt handling, synchronization, coordination and self-monitoring are driven by programmatic signal exchanges without need to use an Operating System (OS), while preserving mutual isolation of all software and hardware components. Computing units, called cells, operate in parallel and not in time sliced concurrency as in FSP [13] and CCS [14]. Each cell operates in its own assigned ComPuting Unit (CPU). TICC™ based parallel processing requires and can accommodate large numbers of CPUs. The paradigm is ideally well-suited to develop parallel programs that run in a grid of Shared Memory Multi-core Chips, SMMCs, interconnected by TICCNET™. Besides simplifying parallel programming and providing methods for formal verification and dynamic self-monitoring, TICC™ offers several other benefits. They are outlined in Section 1.1.

This chapter presents the following through a series of examples: (i) Principles of organization; (ii) Nature of communications and computations; (iii) Models of intended computations as defined by ALLowed Event Occurrence Patterns, ALLEOPs, which are automatically derived from implementations; (iv) Verification of implementations using evaluations of given CTL (Causal Temporal Logic) assertions over Event Characterization Tables (ECTs), which are automatically derived from ALLEOPs using interactively developed logical characterizations of actions; (v) synchronization, coordination, data protection, security enforcement and self-monitoring, (vi) design of software systems based on the TICC™-paradigm and refinement of design to implementation through successive refinements; (vii) design for CPUs, called TICC™-CPU that execute TICC™-Ppde parallel programs efficiently with dramatically increased efficiency data protection and system security, (viii) programming abstractions introduced by TICC™-Ppde that make all of the above possible and (ix) unique features of TICC™-Ppde platform.

Section 2 presents an overview of TICC™ pathways and presents the basic interaction machineries of TICC™-Ppde. It introduces the concepts of transactions, correctness of transactions, and the property of ports connected by pathways being well-matched to each other. An application implementation is correct if and only if all ports in the application connected by pathways are well-matched.

Section 3 presents two simple examples of implementations for problems taken from [13], which illustrate concurrency, automatic coordination and automatic synchronization in TICC™-Ppde, and encapsulation of networks of cells and communication pathways into a compound cell. Section 3 also introduces ALLEOPs models of intended computations derived from implementation specifications, traces derived from ALLEOPs, and causalnets, which are abstractions derived from traces by SMS. Several examples of syntax of TIPs (Thread Interaction Protocols), CIPs (Cell Interaction Processes), ALLEOPs, causalnets, and traces are illustrated here with informal description of rules for deriving ALLEOPs from TIPs and CIPs and rules for deriving traces from ALLEOPs.

Sections 4, 5 and 6 present an outline of computational and communication facilities in TICC™-Ppde that support general parallel computations. Section 4 presents additional features of pathways and comparisons with other currently used parallel programming paradigms. Section 5 presents details on TIPs and organization of computations in TICC™-Ppde. Section 6 introduces the OO-organization in TICC™-Ppde, concept of evaluation, nature of computation and communication, defines events and the concept of causality, concept of evaluations, and notation.

Section 7 presents three more examples of implementations, who's ECTs (Event Characterization Tables automatically derived from traces) are used to construct proofs, called ALLEOP-proofs, for correctness, mutual exclusion, condition synchronization, fairness, and freedom from livelocks and deadlocks. These illustrate the fundamental concepts in TICC™-Ppde implementations and ALLEOP-proofs through symbolic evaluations of CTL-assertions over ECTs. Appendices I through III describe implementations associated with the examples in Section 7, and their ALLEOPs.

Section 8 presents the protocol for group-to-group communication and shows how the infrastructure for SMS and data security are built into TICC™-Ppde communication mechanisms. Section 9 briefly presents details on developing specifications in TICC™-Ppde for abstract designs through successive network-refinements and reducing the abstract design to a validated implementation through successive TIP-refinements.

Section 10 summarizes hardware design requirements for TICC™-CPUs that run TICC™-Ppde cells and designs for TICC™-CPUs, to meet special requirements of TICC™-Ppde parallel programs, it also presents a new shared-memory organization using Shared Memory Modules (SMMs) that exploits the presence of software virtualMemories used in TICC™-Ppde implementations. The hardware enhancements enable efficient running of TICC™-Ppde parallel programs with dramatically increased data and system security. They also simplify CPU designs for CPUs in multi-core chips.

Section 11 summarizes the collection of new programming abstractions introduced in the TICC™-paradigm of parallel programming that simplify programming tasks, facilitate efficient running of programs in multi-core chips, and enable formal verification and self-monitoring. Section 12 concludes this paper with brief comments, directions for future research and developments, and the scope of applications that TICC™-Ppde can support.

1.1. Benefits of TICC™-Ppde

1. ALLEOPs and Proofs: There are two kinds of events: communication events and action events. Roughly speaking (more detail in Section 6), communication event is a pair, (p,t), where p is a port that sends or receives a message via a pathway, and t is the time at which message is sent or delivered. An action event is a pair, (name, t), where name is a variable, condition or action and t is the time at which name is generated and/or set and accessed, condition becomes true, or action is performed. Action is any statement in a programming language, any condition or method defined in that programming language. Whereas action events may change a world state, communication events will change only the states of components in communication pathways.

Timing here is a property of events used to model computations, not a parameter of computations. Every computational step has one or more events associated with it. All such events occur at discrete points of real time. During proof construction the time points are postulated for events in a manner that is consistent with ALLEOPs derived from implementation specifications. Event occurrence patterns, conditions associated with them, event timings and states of computing units are all used in proof construction.

ALLEOPs model both FSP (Finite State) and NFSP (Non-Finite State) processes. Unlike FSP models, ALLEOPs are not models of intended system designs, but they are models of both intended computations in abstract desiqn specifications and implementations that realize specified designs. Traces are derived from ALLEOPs and ECTs represent information in traces in a tabular form that is convenient for proof construction. Proofs are constructed through symbolic evaluation of CTL-101 assertions over ECT-networks. CTL-assertions are similar to assertions used in [38-40,41,42]; they are also similar in certain ways to the FSP language used in [13]. But, there are significant differences.

Proofs of properties of implementations are developed interactively, with users specifying implementations, CTL-assertions to be proven, and providing definitions, axioms and other assertions that may be pertinent to the proofs. We refer to the proofs as ALLEOP-proofs. A finite-ALLEOP is one that has an equivalent FSP model. A given ALLEOP may have both FSP and NFSP properties. Symbolic ECT-evaluations may be used to prove both kinds of properties; proofs of the latter will necessarily be more complicated.

2. Dynamic Self Monitoring: SMS (Self-Monitoring System) is an intrinsic built-in part of TICC™-Ppde program execution mechanism. Thus, once a TICC™-Ppde implementation is completed, self-monitoring is automatic, with no need for any component of SMS to be implemented by implementers. Monitoring is done in parallel with an application, while the application is running, with little or no degradation of program execution efficiency and its timings. SMS is used during the life time of an application, in order to identify errors in performance, pending errors, and patterns of critical behavior, and generate timely reports or a priori defined remedial actions. SMS provides the infrastructure for developing self-diagnosis, self-repair and learning capabilities, and capabilities to dynamically modify parallel program execution based on occurrences of pre-defined event patterns.

3. High-speed Parallel Communications: TICC™ adapts RESTCLK [19] communication paradigm. The adaptation enables high-speed message passing with self-synchronized self-coordinated secure and guaranteed message delivery, both in shared-memory and distributed-memory environments. Distinct cell-groups may simultaneously exchange messages in parallel with other cell-groups, the number of such parallel group-to-group message exchanges being limited only by the number of available cells. Each cell-group may contain one or more cells.

With the right kinds of hardware support (explained in Section 10) and 2-gigahertz computing units, and 1-gigabit memory bus, point-to-point messages may be exchanged in shared-memory environments with in tens of nanoseconds and group-to-group messages in hundreds of nanoseconds. Messages may be exchanged in distributed memory environments using TICCNET™ in about 500 nanoseconds (estimated) plus signal transmission time.

4. Self-synchronization and Self-Coordination: Coordination occurs between two sets of independently running parallel processes, when a new computation is started in one set only after all parallel processes in the other set have completed their, respective, computations. The term synchronization is used to denote temporal synchronization, where a set of computational events always occur at the same time, with in, say, nanoseconds, picoseconds or femtoseconds of each other, depending on the technology. Group to group communications and computations are automatically coordinated and synchronized. Cells in a cell-group all receive identical time synchronized messages and send out coordinated joint reply messages.

5. Efficient Low Grain-size Executions: Organization of TICC™-Ppde allows for high speed executions because of (i) elimination of OS-intervention in communications, process and pthread (parallel thread) activations, scheduling, coordination, synchronization, interrupt handling, data protection and security enforcement; (ii) very low communication latencies; (iii) parallel simultaneous message exchanges; (iv) elimination of sequential buffers in asynchronous communications; and (v) minimized memory contention. Since communication latencies are very low, it is possible to run parallel programs with good efficiencies (90% to 100%) even at low grain sizes of the order of 1 to a 100 microseconds, if cache memories are not used. Cache memories and speed-up techniques are not needed in TICC™-Ppde to achieve high throughputs. High throughputs may be achieved through arbitrary scaling of number of parallel processes executing very low grain size parallel computations.

6. Built-in Data Security and Protection: All processes and pthreads (parallel threads) are activated only through message exchanges, and messages are delivered to recipients only if each message recipient satisfies a priori specified security conditions for message the recipient receives. Ports attached to cells give access to the cells to methods and data to process or build messages only when they are allowed to do so. Each cell executes its own message exchange protocols, as soon as a message is ready to be sent. All message processing/building computations and protocol executions are self-activated by the cell itself, without using an operating system or any other augmentation, as described in Section 10. There is no distinction between message processing/building computations and communications performed by a cell. All security checks are built into communication protocols. Yet they add little to communication latencies; latencies quoted in this paper include in them times needed for security checks.

Each cell operates independently in its own assigned CPU. No CPU is ever shared among cells, unless a cell voluntarily suspends or terminates its computations, relinquishes its assigned CPU, and the CPU relinquished by one cell is assigned later to another cell by TICC™-Ppde. TICC™-Ppde performs all of its own CPU assignments and cell activations in CPUs assigned to them.

There are no monitors, no schedulers and no dynamic link libraries. Thus it is impossible for any intruder to track or interfere with either protocol evaluations or process/pthread activations.

7. Ideal Environment for Multi-core Chips: TICC™-Ppde provides the ideal environment for building formally verified parallel software systems that run in multi-core chips. Section 10 describes augmentations for TICC™-CPU in multi-core chips to make them compatible with TICC™-Ppde. The augmentations contribute to increased execution efficiency, increased data protection and increased security. Section 11 summarizes programming abstractions introduced by TICC™-Ppde that simplify parallel programming, program verification and self-monitoring. It also summarizes the unique features of TICC™-Ppde parallel programming platform. A scalability theorem for TICC™-Ppde parallel program asserts, as long as interaction overhead caused by scaling is small, when compared to program execution times, parallel programs in TICC™-Ppde are arbitrarily scalable. The interaction overhead and execution times are defined, relative to the structure of the TICC™-network (see Feature 3, Section 11.1) used for an application. Parallel computations may be scaled to millions of CPUs, if the necessary conditions are satisfied.

8. Dynamic Flexibility and Mobility: TICC™-Ppde parallel programs may be dynamically modified, dynamically tested and updated (see in situ testing in [19]). Program mobility is achieved by dynamically installing cells and pathways, and changing pathway connections. A cell may install other cells and pathways only if it has requisite privileges.

Five examples are presented in this disclosure: three from [13] and the remaining two are classical examples. The first example introduces organization of programs, ALLEOPs associated with them and traces derived from ALLEOPs. The second example introduces encapsulation in TICC™-Ppde, coordination and concurrency. The remaining three present TICC-Ppde solutions to the following problems: Ornamental Garden problem (from [13]), Producer/Consumer problem and Dining Philosophers problem. ALLEOP-proofs are presented for these three, for properties of implementations, such as synchronization, coordination, mutual-exclusion, fairness and freedom from deadlocks. Properties to be proven are stated as CTL-assertions.

The examples illustrate implementation methods used in TICC™-Ppde through successive refinements, methods used for automatic generation of ALLEOP models from implementations, traces from ALLEOPs and proofs using ECT-networks, and encapsulation of TICC™ sub-networks into compound cells or refinements of compound cells to TICC™ sub-networks. They illustrate similarities/differences between TICC™ paradigm and other programming and proof paradigms. Computational characteristics of adopted paradigms manifest in TICC™-Ppde significantly differently from their original incarnations. We begin with adaptation of RESTCLK [Das, 19] in TICC™ and compare TICC™ pathways with CSP channels. Later we compare TICC™-Ppde with π-calculus and Actor systems.

2. Causal Communication Primitives (CCPs) and Adaptation of RESTCLK Pathways

It is a necessary common practice in hardware systems to use signals to control, synchronize and coordinate activities of hardware components. In synchronous hardware, clock signals are used, and in asynchronous hardware start and completion signals are used. Gopinath [21] first proposed exchanging signals programmatically between software/hardware components, and Das [19] first defined the structure of shared memory RESTCLK-pathways over which signals may travel. Gopinath and Das used short threads to send, receive and process signals, and implemented their systems with time sliced concurrency managed by an Operating System (OS). Signal exchange mechanisms defined by threads, were used to implement message exchanges in shared memory environments. Communication over a distributed network was done using a network facility, such as for example, ETHERNET [22].

Time sliced concurrent thread scheduling and activation introduced non-determinism into signal exchanges. Messages could not be delivered within bounded latencies and messages were sometimes lost. TICC™ adapts and modifies the framework introduced by Gopinath and Das to provide thousands of guaranteed parallel simultaneous message deliveries with precisely predictable latencies in tens to hundreds of nanoseconds range, for application to parallel programming of shared memory and distributed memory systems in the context of an OO (Object Oriented) programming language.

Guaranteed programmatic exchange of signals between software/hardware components, at high speeds, allows software to directly control its execution in a hardware system, while preserving component isolation. In TICC™ we currently do this for all communications, CPU assignments and activations of cells in CPUs, process and pthread (parallel thread) scheduling and activations, interrupt handling, data protection, security enforcement, synchronization, coordination and self-monitoring in both shared-memory and distributed-memory environments. Prototype TICC™-Ppde uses the operating system only for memory management, paging, caching, and input/output. It should eventually be possible to implement all operating system services in TICC™-Ppde itself.

2.1. CCPs and Programmatic Signal Exchange

Signal exchange between pairs of hardware/software components, is programmatically specified in TICC™ by using a new programming primitive called Causal Communication Primitive, CCP. Each CCP has the form, $x:z \rightarrow Y$, where z is a start or completion signal, and x and Y are software or hardware components. Each type of signal may have sub-types defined for it. CCP is like an assignment in programming languages, in that it assigns a signal to a component. But, unlike an assignment in a programming language, the effect of signal assignment might manifest only after a certain delay. In TICC™ the desired effect is ultimately either message delivery or message dispatch; hence the name, CCP.

Specifying signal exchange using CCP has several advantages: (i) just as assignments in a programming language, CCPs may be freely embedded in to other programming statements and, more importantly, implemented as a machine instruction in a CPU, thus enabling programmatic signal exchanges with in a computation; (ii) flexibly organize program executions; (iii) eliminate the distinction between communication and computation; (iv) use the same protocol invocation formats for shared-memory and distributed-memory communications; and (v) make it possible to keep REST-CLK-pathway structures with only minimal changes, even though TICC™ signal exchange mechanisms and protocol execution mechanisms are different from those of RESTCLK [19].

Each CCP is implemented by a 2-state or 4-state ndFSM (non-deterministic Finite State Machine). The FSMs are non-deterministic only in the sense, state transitions are not defined for all inputs in every state of the FSM. It takes about 25 to 50 nanoseconds to execute a CCP implemented in software in a 2-gigahertz computer with 100 megabits/sec memory bus. If implemented in hardware as a machine instruction, in a 2-gigahertz CPU, it should take no more than 5 nanoseconds (estimated).

It takes only four 2-state ndFSMs controlled by CCPs for point-to-point message transfers, it may take 10 or more 2-state ndFSMs for transferring a message from one group of cells to another group of cells in shared memory environments, depending on the number of cells in each group (Section 8), and up to 24 or more 2-state and 4-state ndFSMs for similar message transfers in distributed memory environments using TICCNET™. Incorporating the SMS mechanism into message transfers requires four more 2-state ndFSMs (see FIG. 19) for each shared memory pathway, sm-pathway. It may require 10 or more additional ndFSMs for a distributed memory pathway, dm-pathway, depending on the number of functionPort groups to which message is transmitted (see FIG. 24). Thus, as mentioned earlier, it should take only tens or hundreds of nanoseconds for point-to-point and group-to-group message transfers if CCP is implemented as a hardware instruction.

Communication is reduced to a Turing computation [20] performed by ndFSMs, and becomes an integral part of computations performed by cells. Each cell transmits its message immediately as soon as it is ready, via hardware/software pathways connected to its ports. There are no synchronization and scheduling delays. Multiple protocols may be executed by cells operating in parallel without mutual interference. Each cell may at any time execute only one protocol. All communications are asynchronous and they do not use sequential buffers.

It is necessary to explain how these are made possible and how computations and communications performed by each cell are organized, before the reader can see how the benefits outlined in Section 1.1 flow directly from this.

2.2. Pathway Protocol, TIP, Message Transmission and Computation

Cells use their ports to exchange messages with each other, via pathways that interconnect the ports. Each port may be attached to only one unique cell called its parent-cell (prevents port interference), and each port may be connected to only one pathway (prevents message interference). There are three kinds of ports: qeneralPorts, g, through which cells send out service requests to other cells (these are like the output ports of π-calculus Agents [7,8,9]), functionPorts, f, through which they receive service requests from other cells and respond to them (these are like the input ports of π-calculus), and interruptPorts, i, through which they receive, interrupt messages from other cells (there are no π-calculus analogs for these). GeneralPort and FunctionPort are subclasses of the abstract class, Port. InterruptPort is a subclass of FunctionPort. Every Cell subclass should have at least one of each kind of Port.

Each port, C.p, attached to a cell C, holds the communication protocol, C.p.protocol, to send signals over the pathway, C.p.pathway, connected to it. This protocol is defined using concatenations of CCPs having the form $X:x \rightarrow Y:y \rightarrow Z$ where x, Y and z are components in the pathway and x and y are signals. CCPs may appear in a protocol possibly embedded in other programming language statements (Section 8). Protocols are dynamically updated as pathways are changed. Each pathway is defined by a collection of interacting ndFSMs which execute the CCPs. Only the parent-cell of a port may execute the protocol associated with that port.

Pathways and CSP Channels: Pathways in shared memory environments contain only software components, like CSP channels [10-12]. Pthreads (parallel threads) in TICC™-Ppde correspond to Communicating Sequential Processes in CSP. Unlike CSP (i) pathways allow group-to-group asynchronous communications with time synchronized message deliveries; (ii) data exchange mechanisms among interacting pthreads are not coded into the pthreads; (iii) unlike CSP channels pathways do not block senders and receivers; (iv) pathways transmit only signals; and (v) if messages are transmitted then pathways contain virtualMemories, which hold messages, and pthreads to build and process messages. Real memories are assigned to virtualMemories during compile time or run time.

Signals traveling over a pathway eventually establish the context in which the message in its virtualMemory is delivered to intended recipients in the case of shared memory pathways (sm-pathways), or transported to other virtualMemories belonging to intended recipients in the case of distributed memory pathways (dm-pathways). For each sm-pathway, the virtualMemory that holds the message, if there is one, is unique and private to that pathway. Similarly, for each dm-pathway (see FIG. 24) all virtualMemories in that pathway are private to that pathway. No pathway may use the virtualMemory of another pathway.

We refer to sm-pathways with virtualMemories as Das-pathways, since they were first introduced by Souripriya Das [19]. We use the term pathway to refer to both sm-pathways and dm-pathways.

2.3. Simple Sm-Pathways

Let us first consider some simple sm-pathways. The parent-cell C of a port C.p executes the protocol C.p.protocol at the port, in order to transmit signals via the pathway C.p.pathway connected to that port. While executing the protocol, the parent-cell uses only its local memory, and memories associated with the pathway components. Protocol execution will not invoke any method, pthread or process that is defined outside the protocol. Thus Operating System (OS) is not used for message exchanges.

A simple sm-pathway is shown in FIG. 1. Here, a software branch connects generalPort C.g of cell C to functionPort D.f of cell D. In FIG. 1, signal requesting a service travels first through the branch from C.g to D.f, and then the response signal indicating completion of the requested service, travels back from D.f to C.g. Cells use their ports (also software components) only when they send out signals via the ports, or when they receive and respond to signals received at the ports. Two cells connected to two ends of a pathway, as in FIG. 1, may never use the ports connected to that pathway at the same time. Signals travel over a pathway only in one direction at a time. These hold true for all pathways in TICC™.

Each port in FIG. 1 contains a 2-state non-deterministic finite state machine (ndFSM), with states S (send) and R (receive), as shown in the figure. All generalPorts g start with the initial state, S, and all functionPorts f with initial state, R (double circles in FIG. 1). The C.g.pathway in FIG. 1 is [C.g, D.f] and D.f.pathway is [D.f, C.g]; C.g.pathway≅D.f.pathway (read '≅' as congruentTo), since they both denote the same physical pathway. We will often write C.g.pathway=D.f.pathway; it should be understood as C.g.pathway≅D.f.pathway.

The initial state of C.g.pathway is [S,R] and the initial state of D.f.pathway is [R,S]. In its initial state, C.g.pathway is ready to send a signal from port C.g to port D.f and port D.f is ready to receive the signal sent by port C.g. In the following, we use the following convention: for any port or agent, x, x.state=x.ndFsm.state and x.input=x.ndFsm.input, where x.ndFsm is the ndFSM embedded in x. The pathway in FIG. 1 has no agents; we will later see pathways with agents.

Logical characterizations of CCPs: This is shown in Table 1. Characterizations are presented in Hoare's [Hoare, 15} pre-condition/post-condition notation. Pre-condition for a CCP in Table 1 may depend on the states of both signal sending and signal receiving ports. Interpretations of the CCP characterizations (1) through (10) in Table 1 are described below.

Signal Transmission from g to f: (1): When port g is in state S it accepts signal c (completion signal) as its input signal from its parent-cell C. (2): While in state S with input c, port g sends out signal s and moves to state R, while port f that receives this signal s is in state R. Port f accepts s as its input signal. (3): Port f moves to state S when its input signal s is sensed by its parent-cell D by executing the signal sensing test: f:mR?( ) ('mR?' for 'messageReady?'). If f.input=s then f:mR?( ) returns truth value true and f.state moves to S. (4): Else f:mR?( ) returns false. Signal s here is referred to as the delivery signal. Sensing of a delivery signal by a recipient cell constitutes message receipt by that cell. Since f:mR?( ) does not change the value of f.input, the delivered signal at f may be successfully sensed several times. As we shall see below f.input changes value only when D begins to send back its reply signal.

Reply Signal Transmission from f to g: (5): Cell D sends completion signal c to f indicating, it has completed its task. This sets f.input=c. (6): When f.state=S, f.input=c and g.state=R, f sends start signal s to port g and changes its state to R. This is the response signal from D. (7-10): Cell C may use one of two sensing tests to receive the delivery signal s at its port g: g:mR?( ) or g:pR?( ) ('pR?' for 'pathwayReady?'). Notice, the delivery signal at g may be sensed only once using the sensing g:mR?( ) test, since g.input is reset to ϕ (the empty symbol) after sensing. In both g:mR?( ) and g:pR?( ) tests, g.state moves to S. Whereas g:mR?( ) test will succeed only once on sensing a delivery signal, g:pR?( ) will succeed repeatedly after the first sensing, since the state of g changes to S.

For any port, p, whether p is a general or function port, sensing of a delivery signal always moves p to state S. This has a special significance, which we will later see in Sections 5.3 and 7.2.

Thread Interaction Protocols, TIPs: TIP (1) in Table 1 specifies the following: If the pathway is ready then C executes the pthread g:x( ), to do whatever it needs to do before sending a service request. This pthread is defined in the cell C,g:x(g) and is executed in the private memory assigned to C. Immediately after executing g:x( ), C executes g:s( ) ('s ( )' for 'send'), which causes the communication protocol (1) in Table 1 to be evaluated in the memory commonly shared by ports g and f. As we shall later see, one may think of this commonly shared memory as a signalMemory associated with the branch. The signalMemory holds input signals and states of ports in the pathway. This results in the delivery of service request signal s to port f.

TIP (2) in Table 1 specifies the following: When D senses the service request signal sent by C to its port f by applying the f:mR?( ) test, D begins to respond to the received signal by executing the pthread f:r( )≡D:r(f) ('r( )' for 'reply'), which is defined in cell D and executed in the private memory of D. Immediately after completing the execution of f:r( ), D executes f:s( ). This causes communication protocol (2) in Table 1 to be evaluated, which results in the delivery of reply signal s back to port g. Sensing of this reply signal by the parent-cell C of port q marks the end of the transaction, which began when C sent its service request signal to D.

Restrictions Imposed by Pathway State Changes: At the beginning of the transaction the state of C.g.pathway is [S, R] and the state of D.f.pathway is [R, S]. At the time the signal is sensed by cell D, the state of the pathways change to [R, S] and [S, R], respectively. In this new state, the pathway is ready to send back a reply signal. When the reply signal is sensed by cell C the transaction is completed and C.q.pathway state reverts back to [S, R]. These state changes enforce the following restriction: C.g can send a second service request signal and D.f can receive a second service request signal only after the first transaction has been completed. Successive service request signals may be sent through a pathway only after successive transaction completions. This hold true for all TICC™-Ppde pathways.

Mandatory Responses to Service Requests: Another general rule that holds true for all TICC™-Ppde pathways is that every service request is responded to without fail via the same pathway through which the request was received. An exception to this general rule occurs in "one-way ring-streets" (Section 8.1). Every transaction takes place through a dedicated pathway. Receipt of the response always resets the pathway to its initial state, even in one-way ring-streets.

Tuning: In each signal transmission session, each ndFSM in a pathway is always in a state in which it is ready to receive and immediately respond to the signal sent by another ndFSM. This is true for all TICC™ pathways, however complex they are, and however many ndFSMs are embedded in them. This is called tuning. Tuning eliminates the need for synchronization sessions during signal transmissions and speeds up signal transmissions considerably.

NdFSMs in a pathway that exchange signals are tuned to each other by (i) setting them to appropriate initial states. (ii) When a signal is sent one way through a pathway it resets the initial state of the pathway to a new state in which the pathway is ready to transport the response signal the other way. (iii) Sending the response signal through the same pathway always resets the pathway to back to its initial state. (iv) Tuning is maintained by requiring that every transaction initiated through a pathway should be completed by sending a reply signal through the same pathway, and (v) by requiring that a new transaction may be initiated through a pathway only after the current transaction over that pathway has been fully completed.

Integration of Computation & Communication: Computations and communications are both performed by the same cell. Computations occur by executing pthreads. Communications occur by evaluating protocols. Computations are defined by programs, sequences of statements in a programming language. Protocols are defined by sequences of CCPs, which may be embedded in programming language statements. Compiled codes for programs define computations, and compiled codes for protocols define communications. They are no different from each other, since each CCP may itself be compiled into a machine instruction. Thus, there is no distinction between executing pthreads to perform computations, and evaluating protocols to perform communications. They are both invoked and executed by cells when they execute TIPs. Every port of a cell has a TIP defined for it. TIPs are executed only by the parent-cells of ports at which they are defined.

It should, however, be noted, no protocol evaluation will occur in the middle of a pthread execution. Always protocols are evaluated only after pthread executions have been completed and messages are ready to be sent. They are never interleaved with each other. However, it is possible that after one pthread execution followed by a protocol evaluation at one port, another pthread execution and/or protocol evaluation at another port of the same cell may take place with in the same TIP. In all cases, TIPs always isolate message processing computations from protocol evaluations. A TIP at a port C.p of a cell C has the form, C.p:TIP( )=C.p:<guard>?( ){C.p:tip( );}. If C.p:<guard>?( ) is true at the time C.p is polled by C, then C executes the C.p:tip 0, else C skips port C.p. We refer to C.p:tip( ) as the TIP-body and C.p:<guard>?( ) as the TIP-guard.

Polling: Each cell polls its ports cyclically in some order. Polling order does not determine the order in which ports of a cell are serviced, since a service is performed only if a delivery signal is sensed at a port at the time it was polled, and signal delivery times and polling times are not synchronized to each other; communication is asynchronous.

2.3.1. Simple Das-Pathways with VirtualMemories

FIG. 2 shows a Das-pathway, with virtualMemory M. TIPs at the ports connected to M, protocols at the ports and CCP characterizations for agents and ports in FIG. 2 are shown in Table 2. The pathway has two agents, a0 and a1. Each port gives to its parent-cell, access to data in virtualMemory M that is connected to it, only if the state of the port is S. Data is protected and preserved in the virtualMemory until access is given and the data is used. Agents in the pathway in FIG. 2 route signals around the virtualMemory, as needed.

In Table 2, the pthreads, g:x( )≡g:msg( ):x(g) and f:r( )≡f:msg( ):r(f). These pthreads are defined in message subclasses of messages written by parent-cells of g and f in to the virtualMemory M. We refer to the virtualMemory M by g.vM=f.vM=M=g.pathway.vM=f.pathway.vM, since M in FIG. 2 is uniquely associated only with these ports and the pathway. Compiled codes for message subclasses of messages in a virtualMemory are also held in the virtualMemory. Here, M provides the execution environment for the pthreads thus defined in it, and M provides the shared memory environment for both cells C and D. Structure of virtualMemory that allows for this kind of activity is described in Section 7.2 and Section 10.

Cell D in FIGS. 1 and 2 may not sense the signal delivered to it at the time it was delivered; it is possible that D was servicing one of its other ports at that time. Eventually, when cell D polls its port D.f and evaluates the guard, D.f:mR?( ) in the second TIP of Tables 1 and 2, it will sense the delivery signal at D.f, if there is one. Cells never miss sensing any signal delivered to any of their ports. Signals missed in one polling cycle are caught in the ensuing cycle. CCP characterizations given in Table 2 are similar to the ones in Table 1.

2.3.2. Correctness of Transactions and Implementations

Let us suppose that m is the service request message sent by g in FIG. 2 and m' is the response message sent back to g by f. As in the case of FIG. 1, transaction will end at the time port g senses the delivery signal for the reply message, m'. Let us suppose m' was delivered to g at time $t_2$ and m was sent by g at time $t_1$, $t_1 < t_2$.

Correctness of Transactions: The transaction between ports g and f is correct iff the messages m and m' satisfy an a priori defined relation, $R_{[g,f]}(m,m')$, where $R_{[g,f]}$ is the name of relation that is specific to ports [g,f], and in addition $(t_2-t_1) \leq \tau_{max}(g,f)$ holds true, where $\tau_{max}(g,f)$ is the maximum time it may take for the transaction between g and f to complete. In cases where no messages are exchanged, as in FIG. 1, only the timing condition given above should hold true.

Well-matched Ports: Ports g and f are well-matched iff $R_{[g,f]}(m,m')$ and $(t_2-t_1) \leq \tau_{max}(g,f)$ hold true for all transactions between g and f, in which messages (m,m') were exchanged, and only $(t_2-t_1) \leq \tau_{max}(g,f)$ holds true when no messages were exchanged.

Correctness of an Implementation: An implementation is correct iff all pairs of ports in the implementation that are connected by pathways are well-matched.

2.3.3. An sm-Pathway with Fork and Join Operations

Port-groups: FIG. 3 shows a simple pathway with an agent, a0. The agent broadcasts a time-synchronized signal to both ports in [$D_1.f, D_2.f$]. Ports of the same kind (i.e., all generalPorts, all functionPorts or all interruptPorts) attached to distinct cells and connected to the same agent in a pathway form a port-group. Thus, ports [$D_1.f, D_2.f$] in FIGS. 3 and 4 constitute a port-group.

Agents: Signals are delivered to ports $D_1.f$ and $D_2.f$ at the same time by agent a0. However, since cells operate in parallel and cell activities are not synchronized with signal deliveries, $D_1$ and $D_2$ may not sense and respond to delivery signals at $D_1.f$ and $D_2.f$ at the same time. Eventually $D_1$ and $D_2$ will each sense the delivered signal and respond to it, each at its own time. Agent a0 will send a response signal back to C.g, only after receiving completion signals from both $D_1.f$ and $D_2.f$. We refer to this as dispatch coordination. The Agreement Protocol method a0:AP [$c_1,c_2$]* in the 2nd protocol in Table 3 enforces dispatch coordination, as described below. Agent a0 thus does time synchronized signal delivery to the port-group [$D_1.f, D_2.f$] and coordinated signal dispatch from [$D_1.f, D_2.f$].

Coordination of parallel protocol executions: Evaluation of protocol (2) in Table 3 proceeds as follows: Both $D_1.f$ and $D_2.f$ have similar protocols: We use p.protocol to refer to the protocol at a port p. The protocols at ports $D_1.f$ and $D_2.f$ are shown below:

(P1) $D_1.f.\text{protocol}=[D_1.f:c_1\rightarrow a0:AP[c_1,c_2]^*:s\rightarrow C.g]$,
and (P2) $D_2.f.\text{protocol}=[D_2.f:c_2\rightarrow a0:AP[c_1,c_2]^*:s\rightarrow C.g]$.

The protocols (P1) and (P2) above are evaluated in parallel, respectively, by cells $D_1$ and $D_2$. They may not, however, be evaluated simultaneously. $D_1$ and $D_2$ start evaluating their, respective, protocols in parallel, but not necessarily synchronously. After executing the CCPs, $D_1.f:c_1\rightarrow a0$ and $D_2.f:c_2\rightarrow a0$ that precede the agreement protocol method $AP[c_1, c_2]^*$ in (P1) and (P2) above, both $D_1$ and $D_2$ evaluate $a0:AP[c_1,c_2]^*$ in parallel. The condition $a0:AP[c_1,c_2]$ will become true only after a0 has received both signals $c_1$ and $c_2$, signal $c_1$ from $D_1.f$ and $c_2$ from $D_2.f$. $D_1$ or $D_2$, which ever starts evaluating $a0:AP[c_1,c_2]^*$ first, keeps evaluating $a0:AP[c_1, c_2]^*$ repeatedly until it becomes true. The cell that starts evaluating $a0:AP[c_1,c_2]^*$ last, it will evaluate to true the very first time it is evaluated. As soon as $a0:AP[c_1,c_2]^*$ becomes true, one of the cells $D_1$ or $D_2$ is non-deterministically chosen by a0 to execute the rest of the protocol and the other is forced to stop its protocol execution.

Reader may verify that the segment of the protocol that follows $a0:AP[c_1,c_2]^*$, is the same for both $D_1.f.\text{protocol}$ and $D_2.f.\text{protocol}$. Therefore, on satisfaction of $a0:AP[c_1,c_2]^*$, agent a0 in FIG. 3 sends response signal, s, to port C g, no matter who executed the protocol. Thus, a0 coordinates parallel execution of different segments of the protocol by parent-cells $D_1$ and $D_2$ of ports in the port-group $[D_1.f, D_2.f]$.

A Das-pathway with a virtualMemory similar to the pathway in FIG. 3 is shown in FIG. 4. Its associated TIPs and protocols are shown in Table 4. In this figure a1 does time synchronized message delivery and coordinated message dispatch: a0 does message dispatch when a service request is sent out, and message delivery when a response message is sent back.

Networks in FIGS. 3 and 4 represent synchronized fork/join operations: A fork occurs when signal is sent by port g to a functionPort group, and a join occurs when ports in the functionPort group send back response signal. We extend this notion of fork and join, to the situation where a generalPort group containing more than one port sends a joint service request to a functionPort group. Protocol for such group-to-group fork and join operations are discussed in Section 8.

It may be noticed, for any port p, always $p:mR?( )\Rightarrow p:pR?( )$ holds true, i.e. p always becomes ready to send out a message if the guard at the port returns true.

2.4. Shared Memory and Distributed Memory Pathways

Sm-pathways: Links that connect ports to agents or other ports are called branches. Links that interconnect agents are called h-branches (hidden branches). All components of a sm-pathway, ports, agents, branches, h-branches and virtualMemories, are software components. They all operate in the shared-memory environment of the pathway that contains them.

Dm-pathways: Agents and some ports in dm-pathways of the TICCNET™ are hardware components, each operating in its own local memory; branches and h-branches in dm-pathways are signal transmission lines. Besides agents, ports and virtualMemories, dm-pathways also have specialized hardware switches and routers embedded in them. Communication occurs in two phases: (i) pathway establishment and (ii) signals/data exchange. Switches and routers are used only during pathway establishment. A typical dm-pathway is shown in FIG. 24. Once established, a pathway is kept in place and repeatedly used until it is dismantled and a new pathway is established. Messages may be exchanged only through already established dm-pathways. Signal and data exchanges through signal/data transmission lines are managed through CCP evaluations. As in sm-pathways all agents and ports in a dm-pathway that exchange signals/data always remain tuned to each other. No two dm-pathways share components, except switches and routers, which are not used during message transmission. Thus, while there may be interference while trying to establish dm-pathways in parallel, there will be no interference while exchanging messages through already established dm-pathways. This coupled with tuning enables high-speed parallel message exchanges over TICCNET™. The TICCNET™ can accommodate thousands of distinct mutually non-interfering point-to-point and point-to-group dm-pathways allowing thousands of simultaneous parallel message exchanges.

Kinds of Pathways: There are only three kinds of pathways: (i) Simple pathways like the ones in FIGS. 2 and 3, (ii) Das-pathways like the ones in FIGS. 2, 4 and 19, and (iii) distributed memory pathways, called dm-pathways, like the one shown in FIG. 24. The first two kinds of pathways together constitute the shared memory pathways or sm-pathways. It should be noted, even simple pathways will have memories associated with them. Thus the pathways in FIGS. 1 and 3 will each have a signalMemory associated with it, which will be shared by the parent cells of ports connected to that pathway. It is not shown in FIGS. 1 and 3. Every virtualMemory will also have a signalMemory component (see FIG. 11). SignalMemory will hold signals and states associated with ports and agents embedded in a pathway and it will also hold compiled codes of protocols associated with those ports. Parent cells of ports connected to a pathway will use the signalMemory of that pathway to execute the, respective, protocols.

Pathway Subclasses and Parameterized Protocol Methods: These three kinds of pathways constitute three pathway subclasses, Smpl-Pathway, Das-Pathway and Dm-Pathway, where Smpl-Pathway and Das-Pathway are themselves subclasses of Sm-Pathway. As we shall later see, protocols for these pathway subclasses are parameterized using components (ndFSMs) embedded in the pathway subclasses. Thus for example, the protocol for C.g.pathway=[C.g, D.f] in FIG. 1 will be C.g.protocol=C.g.pathway:protocol(C.g, D.f). The protocol for C.g.pathway=[C.g, a0, [$D_1.f,D_2.f$]] in FIG. 3 will be C.g.protocol=C.g.pathway:protocol(C.g, a0, [$D_1.f,D_2.f$]). The protocol for $D_1.f$.pathway=[$D_1.f$, a0, C.g] will be $D_1.f$.protocol=$D_1.f$.pathway:protocol($D_1.f$, a0, C.g). These pathway protocols would be defined in the Smpl-Pathway subclass, as Smpl-Pathway::protocol(Port, Port), Smpl-Pathway::protocol(Port, Agent, PortGroup) and Smpl-Pathway::protocol(Port, Agent, Port), respectively.

Compiled codes for all parameterized protocols are built into TICC™-Ppde by being defined in the various pathway subclasses. For any port p, when p is connected to an instance of a pathway subclass, p.protocol is set equal to p.pathway: protocol( . . . ), substituting appropriate parameters in the appropriate protocol defined in that pathway subclass. Executing eval(p.protocol) executes p.pathway:protocol ( . . . ) in the signalMemory associated with that pathway instance. Thus, protocols are invoked and executed as methods. Eval(p.protocol) is automatically invoked and executed when implementers use "p:s( )" ('s' for send) or "p:f( )" ('f' for forward) commands in TIPs they define at ports p. Implementation of eval operator in TICC™-Ppde using TICC™-CPU is discussed in Section 10.2. Implementers do not have to define protocols. Thus, implementers do not have write any synchronization and coordination programs. Therefore, TICC™-Ppde is self-synchronizing and self-coordinating.

Properties that sm-pathways and dm-pathways share in common are listed below in three categories. Some of the properties have been already mentioned.

TIP formats are Independent of Pathway Structure: (i) The communication primitives are p:s( ) ('s( )' for 'send') and p:f( ) ('f( )' for forward'), where p is a port: f( ) forwards a received message to a port of another cell, may be after some modifications; s( ) sends a newly formed message. The primitives p:s( ) and p:f( ) are used to invoke and evaluate the unique protocol, p.protocol=p.pathway:protocol( . . . ), associated with p.pathway. (ii) p.protocol is dependent of the nature of p.pathway. The protocol is different for different pathways. (iii) The same communication primitives, p:s( ) and p:f( ) are used to invoke and evaluate p.protocol no matter which kind of pathway is connected to p. (iv) Communication primitive p:s( ) or p:f( ) is evaluated immediately after message to be sent or forwarded becomes ready. (v) Invoking and evaluating p.protocol causes signals to be transmitted over p.pathway, which in turn causes a message, if any, to be delivered or transmitted to its recipient ports, also connected to p.pathway. (vi) Only the parent-cell of p may invoke and execute the communication primitives, p:s( ) and p:f( ) (vii) TIP formats at ports p are independent of the kinds of pathways connected to p. (viii) Finally, all components in any pathway that exchange signals remain always tuned to each other at all times. These properties eliminate the distinction in software systems between shared memory and distributed memory communications and totally eliminate the need for scheduling and synchronization sessions in communications, and thus significantly speed up message transfers.

Simultaneous Parallel Execution of Group-to-group Message Exchanges: Distinct parent-cells $C_i$ of distinct ports $C_i.p$ belonging to a port-group $G=[C_1.p, C_2.p, \ldots, C_n.p]$, $n \geq 1$, (Sections 2.3 and 8) constitute a cell-group. (i) Cells $C_i$ in the cell-group simultaneously evaluate in parallel their designated segments of $C_i.p.protocol$, distinct segments being specialized to distinct cells in the cell-group. Each such segment being a component of G.pathway.protocol, where G.pathway is the pathway connected to ports in the port-group G. Parallel execution of all segments together implements the group-to-group asynchronous message exchange over G.pathway (FIG. 19). Agents embedded in G.pathway coordinate such simultaneous parallel protocol segment evaluations (Sections 2.3 and 8). Agents also signal specialized cells, called eb (Event Builder) cells which install message dispatch and message delivery events that occur while a message is being sent or forwarded over G.pathway. (ii) In a distributed memory environment a generalPort group in one shared memory multiprocessor (SMP) may broadcast through a dm-pathway in TICCNET™ a joint message to several functionPort groups $[F_1, F_2, \ldots, F_m]$, $m \geq 1$, each $F_j$ residing in a distinct SMP (FIG. 24). The broadcast message is transmitted in parallel to all the destination functionPort groups, and delivered synchronously to all recipient functionPort groups. The functionPort groups send their replies back to the source generalPort group in multiplexed mode, one after the other through the same pathway. This maintains mutual tuning of components in dm-pathways.

High-speed Parallel Message Exchanges: (i) In all pathways, all messages are sent immediately as soon as they are ready. There is no message scheduling. (ii) All agents and ports in a pathway that exchange signals are always tuned to each other so that the signal sent by one to another, is immediately received by the recipient and responded to at the appropriate time, no matter how complicated the pathway might be. This eliminates the need for scheduling and synchronization sessions. (iii) No two pathways share components, or any process or thread in common and thus no two parallel executions of distinct protocols will ever interfere with each other. No protocol uses any process or thread not defined in the protocol itself. This holds true both for software sm-pathways in SMPs and hardware dm-pathways in TIC-CNET™. Therefore, (iv) the number of messages that may be exchanged in parallel is limited only by the number of distinct pathways and the number of distinct cells.

Mobility: Dynamic changes of connections to sm-pathway destination ports may occur in the middle of a transaction in sm-pathways. Consider a destination functionPort q to which q.pathway is connected, with virtualMemory q.vM. When the parent cell of port q transfers pathway connection from the destination port q, to a new destination functionPort p, while computing the response to message received at port q, q.pathway becomes the new pathway, p.pathway that is now connected to p, and q.vM becomes p.vM. Parent-cell of p may then read messages in p.vM and execute pthreads and methods in p.vM to process and respond to messages in p.vM. Once the parent-cell of p completes processing the messages and completes writing a response message in p.vM, the pathway connection is returned to port q by the parent cell of port p, when p.vM becomes q.vM again. Parent-cell of q may then modify the response message in q.vM and send it back to ports that sent the service request. This enables program mobility in shared memory environments.

Pathway connections to generalPorts that sent the message cannot be changed in this manner. Also, such dynamic changes of pathway connections cannot be made in dm-pathways. However, new pathways may be installed dynamically at any time, between dynamically formed port-groups both in sm-pathways and dm-pathways before messages are sent. By transporting the contents of an entire virtualMemory over a dm-pathway from one virtualMemory to another, one may obtain program mobility across dm-pathways.

2.5. TICC-Classes and Objects

Top Level Classes: TICC™ defines the following top level classes: Cell, Port, Pathway, Agent, VirtualMemory, Branch and Message. We use the notation, cell, port, agent, pathway, virtualMemory, branch and message to refer to objects, which are instances of these classes, all software components. As with Actors [Hewitt, 5,6] and π-calculus-Agents [7,8,9], each cell is an inherently parallel software component that runs in its own assigned ComPuting Unit (CPU). There are several differences between cells, Actors and π-calculus-Agents. We will describe them later.

Restrictions on Pathway Structure: No two ports belonging to the same cell may be connected by a branch and no two branches may connect two ports belonging to the same cell to agents in the same pathway unless the ports belonged to a port-vector (Section 5.2). For example see pathway in FIG. 19. Here the ports $eb.f_1$ and $eb.f_2$ are, respectively, connected to agents, a2 and a3 that belong to the same pathway. Here, $[eb.f_1, eb.f_2]$ is a port-vector of the cell eb. In all cases a cell cannot send messages from one of its ports to another one of its ports; this prevents possible deadlocks. However, distinct ports belonging to distinct cells may be connected by branches to the same agent. As mentioned earlier, such ports form ordered port-groups; $[D_1.f, D_2.f]$ in FIGS. 3 and 4 is an example. No two distinct port-groups may intersect with each other and no two ports belonging to the same cell may ever be in the same port-group. All cells in any cell-645 group will always reside in the same SMP. As we shall see in Section 8, these restrictions make it possible to exchange messages between port-groups through group-to-group pathways.

2.6. Cell Operations, CIP and Polling

Cell Operations: Each cell C polls its ports, $C.p_i$, for $0 \leq i < n \geq 3$ in some order, and sorts all ports with pending messages in to a sortedPortsList, based on a sorting criterion selected by the cell itself. For each port C.q in the sortedPortsList, the TIP-body, C.q:tip( ), is then executed one by one in the order ports appear in the sortedPortsList. Cells may attend to interrupt processing only between successive C.q:tip( ) executions. Interrupt messages may change the order of ports in the sortedPortsList, or change port priorities, or perform suspension/termination of CIP executions in an orderly manner, without violating any of the TICC™-Ppde requirements. A suspended CIP will automatically resume execution of the next C.q:tip( ) when interrupt message is delivered again to the same interruptPort. Operating system cannot interrupt activities of a cell; only other cells in an application may do so. Dynamic processor assignments to cells in a shared memory multiprocessor (SMP) are managed by TICC™-Ppde. Assignment of cells to SMPs in a distributed computing system is done by users. The C:CIP( ) (Cell Interaction Process) defined below is a process associated with a cell C that is run by the CPU assigned to C.CIP( )s are the only processes in TICC™-Ppde.

Cell Interaction Process: Each C:CIP( ) contains the collection of all TIPs defined at the ports of cell, C, one for each port, together with a cell initialization method. Initialization and interrupt message handling described below illustrate the general control structure for CIP operations. These will vary from cell to cell depending upon when interrupt message at interruptPorts are recognized in a cell's polling cycle, the nature of interrupt messages and the order in which ports are polled. A CIP has the form,

```
void Cell::CIP( ){
    initialize?( ){stopPolling=initialize=false; init( ); i:pR?( ) {i:s;( );};}}
    while (¬ stopPolling){
        i:mR?( ){ i:s( ) .r( );}//i:r( ) is defined below in 2). Notice, reply is sent first
        sortedPortsList:clear( );
        //puts polled ports with message delivery signals into sortedPortsList
        poll&SortPorts( );
        //executes p:tip( ) in the order ports p appear in sortedPortsList.
        for (int j=0; j < sortedPortsList:size( ); j++){
            sortedPortsList[j]:tip( );}}
    prepareToTerminate( );}                                          (2.1)
```

The pthread i:r( )=i:msg( ):r(i) is defined in message subclass of the message in virtualMemory i.vM of the interruptPort i. Let InterruptMsg refer to this message subclass. The definition of InterruptMsg::r(i) is shown below and discussed in the second paragraph following the definition.

```
void InterruptMsg::r(i){ Cell cell = i.parent;//parent of port i.
    //selectOne below selects the first true alternate in top down scanning.
    selectOne{ cell:suspended?( ){ cell.suspended=false}
        i :msg( ) :suspend?( ){ cell.suspended=true};
                                cell :prepareToSuspend( );}
        i :msg( ) :terminate?( ){cell.stopPolling=true;}
                    true{cell :setPortPriorities( );}}}            (2.2)
```

CIP Initialization: In the CIP in (2.1), initialize?( ) is the truth value of the local variable, cell.initialize, of the cell and 'i' is the interruptPort of the cell. A dormant cell C is activated in a processor selected by TICC™-Ppde by the first interrupt message delivered to C.i. In general, a dormant cell may be activated by the first message delivered to any of its ports. The protocol that delivers message performs this activation (Section 8) before message delivery. Upon activation, if initialize?( ) is true then the cell sets initialize=stopPolling=false, performs init( ), which may install other cells and pathways in a network and send messages to other cells and other cell variables defined in the cell subclass, sends an acknowledgement back to the cell that started it by executing i:s( ), if indeed it was activated by an interrupt message at port and then proceeds to the while-loop. The order in which these operations are done may vary from cell to cell. CIPs of different cells differ only in their initialization routines.

InterruptPort Servicing: In the while-loop, the cell first polls its interruptPort. If there is no interrupt message, it skips the port. If there is, then it executes i:r( )=i:msg( ):r(i) shown in (2.2), where i:msg( ) is the interrupt message in the virtualMemory i.vM. There are four cases to consider in selectOne in (2.2). (i) If cell:suspended?( ) is true then it means, the cell had been previously suspended. In this case, cell.suspended is set to false and the cell immediately proceeds to execute the rest of the while-loop. (ii) If i:msg( ):suspend?( ) is true then cell.suspended is set to true and the cell prepares to suspend itself and immediately release its assigned processor; after doing these, the cell becomes dormant. The next interruptMsg delivered to the cell will activate the cell in an available processor. When so reactivated, the cell will skip initializations and proceed directly to the while-loop, since initialize?( ) will then be false. (iii) If i:msg( ):terminate?( ) is true then the cell terminates operations at the end of the current cycle of the while-loop and releases its processor, since cell.stopPolling is set to true. (iv) The default case of selectOne in (2.2) is to assign priorities to the ports of the cell as specified in i:msg( ). These priorities are used by the ensuing poll&SortPorts( ) in (2.1). The suspend/resume operations here are managed by TICC™-Ppde without having to invoke the operating system (Section 10).

Polling: After polling its interruptPort, the cell begins to poll its other ports in the order specified in C.pollingOrder, sorts ports that are ready to be serviced into C.sortedPortsList. A port is ready to be serviced if it is ready to send out a message, or if it has received a service request message. Polling a port determines whether it is ready or not. Sorting is done based on the times at which messages were delivered to ports, and attribute C.priorityList associated with a port p, which is a list of lists of ports attached to C having the structure, ((priority 1 ports)(priority 2 ports) . . . (priority n ports)),$n \geq 1$, All ports with the same priority are sorted according to message delivery times associated with them. GeneralPorts with no messages are sorted only based on their sorting priority. For $1 \leq i, i+1 \leq n$, ports with priority i are sorted before ports with priority i+1. Sorting is done by executing poll&SortPorts( ).

After sorting the cell executes p:tip( ) for each p in that list in the order they appear in the list. The while-loop is repeated until stopPolling becomes true. The while-loop in (2.1) is called the polling cycle. Polling cycles are not synchronized with message deliveries. While polling its ports in a polling cycle, if a port is not ready for service, then the cell skips that port and polls its next port. Ports that are skipped may receive new messages, while polling other ports or during execution cycle in the while-loop. Ports whose pending messages were missed in one polling cycle will be sensed and included in the sortedPortsList in the next polling cycle. Ports may not be serviced in the same order in which messages were delivered to them. However, no input message would ever be missed by the cell, unless the cell was prematurely terminated or there were deadlocks in the application system. Thus, every transaction is completed under normal operating conditions; i.e.

when there are no deadlocks and livelocks in the system. This is an important requirement in TICC™-Ppde.

CIP (2.1) is the default CIP defined in the top level Cell class, All cells instances inherit this default CIP, unless designers defined a different CIP for the subclasses to which the cells belong. Cells are classified into subclasses according to numbers of ports of different kinds they have and according to their CIPs. Implementers need not define CIPs for cells, unless cells in an application require special CIPs that are different from the default CIP. Implementers may have to define the init( ) routine for each cell subclass. Compiled codes for the CIPs are moved into private memories of every CPU that has been assigned to each cell instance.

Other Modalities of Port Servicing: It is possible that sorting cycle is dispensed with and cells are serviced in the order ports are polled, as it happens in the Dining Philosophers example in Section 7.4. It is possible to have synchronous computations of the following kind: a cell waits at its port until a message is received (or until the port is ready); and sorts the port when it arrives according to its priority, and then only proceeds to poll its next port. Such synchronous computations are specified by using guards of the form, C.p: <guard>?( )* in TIPs. The '*' indicates the need to repeatedly evaluate the guard until it becomes true. Starred guards are called synchronous guards and TIPs with starred guards are called synchronous TIPs.

Simple examples of TICC™-Ppde implementations are presented in Section 3. An outline of computational facilities in TICC™-Ppde that support general parallel computations is presented in Sections and 4 and 5. More details are presented in Section 6. Examples with ALLEOP-proofs are presented in Section 7. Examples in Section 3, use networks similar to those in FIGS. 1 through 4. The examples are taken from [13]. The first example in Section 3 is used to introduce ALLEOPs generated by the system from implementation specifications, traces and causalnet derived from ALLEOPs and the role played by SMS at run time. This example also illustrates concurrency, automatic coordination and temporal synchronization performed by TICC™-Networks, with no need to use monitors [Hoare, 12], semaphores [Dijkshtra, 23,24] or rendezvous. The second example in Section 3 introduces the concept of encapsulation in TICC™-Ppde and illustrates use of non-deterministic guards.

3. Simple Examples

Implementation specification in each example consists of the TICC™-network, TIPs for the various ports, CIPs for cells, and a polling cycle for each cell. The polling cycle specifies the order in which ports are polled in a cell. The TICC™-network is an abstraction of message exchanges, forks and joins, and synchronization and coordination that occur in parallel computations. It specifies the control structure of parallel computations. No proofs are presented for the examples in this section; examples with ALLEOP-proofs are presented in section 7.

3.1. Bill and Ben Example: ALLEOPs, Traces and Causalnets

We begin with a simple game from [Magee & Kramer, 13]. FSP model of the game, as it is given in [Magee & Kramer, 13] is:

||BILL_BEN = BILL || BEN;
BILL= play→ meet→ BILL; BEN= work→ meet→ BEN;       (3.1)

Synchronization in the conventional sense [12,13] is supposed to occur on the action term 'meet'. TICC™-Ppde implementation of the game is presented here. We show the ALLEOPs models derived from implementation specifications, traces derived from ALLEOPs and the causalnet that SMS produces. All derivations are done automatically by the system. ALLEOP models are models of implementations derived from implementation specifications. They are not models of intended designs of a system as FSP models are in [Magee & Kramer, 13]. Thus, ALLEOP models are more complicated than FSP models, but in a sense their structures are similar to FSP structures.

The TICC™-network is shown in FIG. 5. Every TICC™-network has at least one environment cell, E; also at times called the confiqurator cell. It is used to configure the network and start operations. When TICC™-GUI (Graphical User Interface) screen is opened it comes with E installed in it. Application programmer should have already defined the cell subclass, E, and other cell subclasses needed for the application before opening TICC™-GUI. E is activated by user by clicking on its image on GUI screen, and sending an interrupt signal to its interruptPort, E.i. E is used to install all other cells and all pathways in the TICC™-network. All the installed cells and pathways appear on the TICC™-GUI screen, and the resultant picture, after user performed repositioning of images, looks like the one shown in FIG. 5, except that TICC™-GUI figures are in color. Once this is done, application is started by clicking on E and selecting the 'start' command from a drop down menu. In response, E broadcasts an interrupt signal to the interruptPorts of other cells in the network, via its port E.g1. This activates the cells.

In the following we use abbreviations, 'Be' for 'Ben', 'Bi' for 'Bill', 'Me' for 'Meeting', and 'B' for 'Ben and Bill'. [Be.f, Bi.f]=B.f and [Be.g, Bi.g]=B.g are port-groups. Ben and Bill both receive synchronized signals and send out coordinated signals through these port-groups: Agents a1 and a2 in FIG. 5 perform synchronization and coordination, as discussed in Section 2.3.3. The CIP of cell E is shown below:

E:CIP( ) Definition:

```
void E::CIP( ){
    initialize?( ){ init( ); E.g1:s( ); E.i:s( );
            stopPolling=initialize = false;}
    while (¬ stopPolling){
    (E.g:pR?( ) & E:readyToStart?( )*){ g:s( ); g:mR?( )*{ } }
    E.i:mR?( ){ E.g1:s( ); E.g1:mR?( )*{ E.i:s( );
        stopPolling=true; }}
    prepareToTerminate( ); }                                    (3.2)
```

The above CIP specifies the following operations: The first interrupt signal sent by user to the interruptPort E.i activates E and causes it to perform initialization defined in init( ), which installs all cells and pathways needed for the application. After this, E sends an interrupt signal to the interruptPorts of cells in the game via its port g1. This activates the cells in the network in FIG. 5. Once activated, E replies to the interrupt signal that started it, initializes its variables, and then proceeds to execute its while-loop. In the while-loop it first polls its generalPort E.g. If port E.g is ready to send out a signal and E is ready to start the game, E.g sends a signal to [Be.f, Bi.f]=B.f. This starts the game. Having started the game, E waits at its port E.g to receive end of game signal.

After receiving end of game signal, E polls its interruptPort E.i. If E senses an interrupt signal then it begins to terminate its operations. This will be the second interrupt signal received by E from user. The first one started it. Before terminating, E broadcasts an interrupt signal to all other cells, via its port g1. This would be the second interrupt signal broadcast by E. The first one started the cells. Each cell that receives the second interrupt signal sends back a response and then terminates itself. E terminates only after receiving the coordinated response to the interrupt signal it broadcast to them, from all the cells. This coordinated response is forwarded to E by agent a3 in FIG. 5. This, with minor variations, is the general start/stop process used in all applications.

If there is no interrupt signal at E.i then E may repeat its polling cycle, as shown in (3.2) and (3.7). Other cells in FIG. 5 have similar CIPs. Notice, the TIP at port E.g in (3.2) has another TIP, g:mR?( )*{ }, embedded in it whose tip-body is empty. But, in general tip-bodies of embedded TIPs need not be empty. For example, in TIPs (3.4) and (3.5) below, TIP-bodies of embedded TIPs are not empty. Multiple such embeddings may occur in a TIP. We have omitted the start/stop processes and interruptPort polling and servicing in the following discussions.

---

TIPs: All TIPs have the general structure, <TIP-guard>{<TIP-body>}.
E.g:TIP( ) :(E.g:pR?( )& E:readyToStart?( )*)
                {E.g:s( );E.g:mR( )*{ }}     (3.3)
Bi.f:TIP( ): Bi.f:mR?( ){Bi.f:play( ); Bi.g:s( );
                Bi.g:mR?( )* {Bi.f:s( );}}     (3.4)
Be.f:TIP( ): Be.f:mR?( ){Be.f:work( ); Be.g:s( );
                Be.g:mR?( )*{Be.f:s( );}}     (3.5)
Me.f:TIP( ): Me.f:mR?( )*{Me.f:meet( ).s( );}     (3.6)

---

When Bill and Ben sense the signal sent by E they begin to do their respective things, play and work, as shown in (3.4) and (3.5). After finishing whatever they did, each of them sends a signal to Me.f via their respective ports Bi.g and Be.g. Of course, they do not synchronize the time at which they send signals. Agent a2 waits until it has received signals from both Bi.g and Be.g and then sends a coordinated signal to Me.f. Thus meeting always begins only when both Bill and Ben are ready for it. When meeting is over, Me.f sends synchronized signals to [Bi.g, Be.g]=B.g via agent a2 (see FIG. 5). When Bill and Ben receive this signal they both send a coordinated end of game signal back to E.g via a1. At this point, E may start the next iteration of the game, if gaming is not terminated by an interrupt signal at its port E.i.

What is called synchronization in the FSP framework of [Magee & Kramer, 13] is called coordination in TICC™-Ppde. Here, agent performs coordination through a kind of rendezvous operation on received signals. The difference between conventional programming using rendezvous and TICC™-Ppde is that implementers do not have to ever write programs to perform rendezvous in applications they implement. Agents in pathways perform this coordination and coordination is built into pathway protocols.

Synchronization in TICC™-Ppde always refers to temporal synchronization of events that occur in parallel. In this example, temporal synchronization occurs when signal from E.g is delivered to [Bi.f, Be.f]=B.f by agent a1, and when signal from Me.f is delivered to [Bi.g, Be.g]=B.g by agent a2.

POLLING CYCLES: //InterruptPort pollings have been ignored here.

$$E\text{:Polling}(\ )=[E.g\text{:}pR?(\ )\rightarrow E\text{:Polling}(\ )] \quad (3.7)$$

$$Be\text{:Polling}(\ )=[Be.f\text{:}mR?(\ )\rightarrow Be\text{:Polling}(\ )] \quad (3.8)$$

$$Bi\text{:Polling}(\ )=[Bi.f\text{:}mR?(\ )\rightarrow Bi\text{:Polling}(\ )] \quad (3.9)$$

$$Me\text{:Polling}(\ )=[Me.f\text{:}mR?(\ )\rightarrow Me\text{:Polling}(\ )] \quad (3.10)$$

Polling is recursive because of the while-loop in CIPs (see (3.2)). This completes the design of the Bill-Ben game. When refinements for E:readyToStart( ), Bi.f:play( ), Be.f:work( ) and Me.f:meet( ) are completed the implementation of the Bill-Ben game will be complete. Computations performed by specifications given so far, are characterized by the following ALLEOPs.

3.1.1. ALLEOPs of BILL-BEN Game

Read '→' in the following as 'causes' and '•→' as 'immediately causes'. These are called causal connectives. They are defined in Section 6. ALLEOPs combine information in TIPs, TICC™-network and polling cycles. All ALLEOPs begin with "□[", but we often omit the "□" symbol, but it should always be assumed to be present; the symbol "□" is read as "always". Five simple transformations occur when ALLEOPs are derived from TIPs:

(i) ";" is replaced by "•→"; (ii) ";} ... }" is replaced by "} ... }•→" if ALLEOPs continue after the last right chain bracket, else it is replaced by ";} ... }]". Similarly, "] ... ]" and ") ... )" are replaced by "] ... ]•→" and ") ... )•→", respectively, if ALLEOPs continue, else by "] ... ]" and ") ... )]". (iii) signal sending actions caused by evaluation of p:s( ), at ports p that appear in TIPs are replaced by their expansions in terms of signal sending and delivering events with associated time-maps, as described below; (iv) also parallel activations caused by signal deliveries are specified, as described below; and (v) each signal sensing action, p:mR?( ) (or p:mR?( )*) is given the signal delivery event that is sensed by it, as its argument.

The port-ALLEOPs described below illustrate these transformations. Each port-ALLEOP has two components: ALLEOP-guard( ) and ALLEOP-body( ), with the structure, ALLEOP-guard( ){ALLEOP-body( )}: ALLEOP-body( ) is invoked only if ALLEOP-guard( ) is true, else the body is skipped. Let us first consider the port-ALLEOP for port E.g. This is derived from E.g:TIP( ) in (3.3), the TICC™-network in FIG. 5 and the polling cycle in (3.7). It is shown in (3.11) and its interpretation follows thereafter.

---

E.g:ALLEOP( ) = □[E.g:ALLEOP-guard( ){E.g:ALLEOP-body}]
E.g:ALLEOP-guard( )= [E.g:pR?( ) & E:readyToStart?( )*]
E.g:ALLEOP-body( ) =

[E.g$^S$[T(E.g,0)] →((⟨Be.f$^D$⟩[T(E.g,1)] ∥ →...→ Be.f:ALLEOP( ))
              ⟨Bi.f$^D$⟩[T(E.g,1)] ∥ →...→ Bi.f:ALLEOP( )))
  •→ E.g:mR?(⟨E.g$^D$⟩[T(B.f,1)])*{ } •→ E.g:ALLEOP( ))}]   (3.11)

---

Here, E.g:ALLEOP-guard( ) is identical to E.g:TIP-guard( ) appearing in (3.3). Communication statement, E.g:s( ), appearing in TIP-body in (3.3) has been transformed to signal sending/delivering events that occur when E.g:s( ) is executed: signal sending event is, E.g$^S$[T(E.g,0)] ($^S$ for Send), and signal delivery events are, ⟨Be.f$^D$⟩[T(E.g,1)] and ⟨Bi.f$^D$⟩[T(E.g,1)] ($^D$ for Delivery). The suffixes, T(E.g,0) and T(E.g, 1) appearing in the signal sending and delivering events are the time-maps. Each time-map maps to an increasing sequence of time-points. The angle brackets, '⟨ ... ⟩', appearing around the delivery events in (3.11) specify that the event occurrences were completed at time-points specified in the time-maps. Absence of such angle brackets around the sending event E.g$^S$ indicates, the event started occurring at a time-point specified in the time-map. Thus, the presence and absence of angle brackets around events distinguish between starting and ending times of those events.

The two signal delivery events in (3.11), Be.f$^D$ and Bi.f$^D$, have identical time-maps T(E.g,1). This specifies that signal is delivered synchronously to both the ports [Be.f,Bi.f] at the same time-point in T(E.g,1). Different values of # in the time-maps, T(E.g,#) for #=0 and 1, uniquely identify the two different sequences of time-points associated with the same port E.g. Distinct communication events at the same port, appearing in a CIP or TIP have distinct values of # associated with them. The, events E.g$^S$, Be.f$^D$ and Bi.f$^D$ are all caused by evaluation of the protocol at port E.g. Details of protocol evaluations are not shown in ALLEOPs.

Sequences of time points associated with time-maps are interpreted as follows: The sequence, $T(E.g,0)=(t_0, t_1, \ldots, t_{n-1})$, $[t_0 < t_1 < \ldots < t_{n-1}]$ represents the time points at which E started the $i^{th}$ iteration of the game for $0 \leq i < n$, by sending out a signal via E.g to the port-group B.f=[Be.f, Bi.f], and the sequence, $T(E.g,1)=(t_0', t_1', \ldots, t_{n-1}')$, $t_1 < t_i' < t_{i+1}$, $0 \leq i < n-1$, represents the corresponding time points at which signal deliveries to the ports in B.f occurred. For ($0 \leq i < n$) the time point $t_i$ in T(E.g,0) corresponds to the time point in T(E.g,1), in the sense that signal sending that started at time $t_i$ ended with the completion of the delivery event at time t and the two sequences mesh into a totally ordered chain, $[t_0 < t_0' < t_1 < t_1' < t_2 < t_2' < \ldots < t_{n-1} < t_{n-1}']$. For every sending event, there is a corresponding delivery event.

The delivery events cause parallel activations of other ALLEOPs in the cells to which signals are delivered. The symbol, '||', appearing in the delivery events in (3.11) specifies that signals activate the ALLEOPs Be.f:ALLEOP( ) and Bi.f:ALLEOP( ) in parallel. System gets this information from the TICC™-network for the game. We refer to this as "parallel activation", even if only one other ALLEOP is activated by signal transmission, because all the activated cells always work in parallel with the activating cell. The ellipse, →...→, accompanying '||' in (3.11) indicates that activation may not happen immediately after signal delivery. Ben and Bill might have been doing something else at the time of signal delivery, instead of listening to the delivered signal. However, eventually they come around to sense the signal and respond to it.

Finally, the argument "⟨E.g$^D$⟩[T(B.f,1)]" appearing in "E.g:mR?(⟨E.g$^D$⟩[T(B.f,1)])*", in (3.11) identifies the signal delivery event that is sensed by E.g:mR?( )*. It is the signal delivered back to E.g by the ports [Be.f, Bi.f]=B.f. Receipt of this signal indicates to E that the game started by E by sending a signal via E.g had terminated. The synchronous signal sensing operation E.g:mR?( ) in (3.11) specifies, cell E should wait at port E.g to receive this termination signal. The sensing action, E.g:pR?( ) at the beginning of (3.11), is not given any argument, since in this case it only tests the state of port E.g for readiness to send out a signal; it does not test for a delivered signal. The delivered signal was already tested by E.g:mR?( )* in (3.11). If p:pR?( ) is used in a TIP to sense a delivered signal, then an argument will be provided for it.

System supplies arguments to signal sensing operations in ALLEOP-guards, at the time parallel activations are specified. There are no parallel activations associated with E.g:pR?( ) in any of the ALLEOPs (3.11) through (3.14). Thus E.g:pR?( ) in (3.11) does not have an argument. However, (3.12) and (3.13) specify parallel activations for E.g:mR( )* { } and thus E.g:mR(...)* in (3.11) has an argument. Other ALLEOPs given below are similarly derived from their respective TIPs, TICC™-network and polling cycles:

//Derived from Be.f:TIP( ) in (3.4), the network in Figure 5 and polling cycle (3.8).
Be.f:ALLEOP( )= □[Be.f:ALLEOP-guard( ){Be.f:ALLEOP-body( )}]
Be.f:ALLEOP-guard( )= [Be.f:mR?(⟨Be.f$^D$⟩[T(E.g,1)])]
Be.f:ALLEOP-body( ) =

-continued

[Be.f:work( )•→ Be.g$^S$[T(Be.g,0)]
→(⟨Me.f$^D$⟩[t(B.g,1)] || Me.f:ALLEOP(...))
•→ Be.g:mR?(⟨Be.g$^D$⟩[T(Me.f,1)])*{Be.f$^S$[t(Be.f,0)]}
→ (⟨E.g$^D$⟩[T(B.f,1)] || E.g:mR(⟨E.g$^D$⟩[T(B.f,1)])*{ })}
→ Be.f:ALLEOP( )]
(3.12)

Notice in (3.12), the time-map in signal sending event Be.g$^s$[T(Be.g,0)] does not refer to the port-group B=[Be.g, Bi g], however the time-map in the signal delivery event ⟨Me.f$_D$⟩(T[B.g,1)] does refer to B. This is because Ben does not coordinate with Bill the time he sends out the signal via Be.g, but agent a2 (see FIG. 5) sends a coordinated signal causing the delivery event ⟨Me.f$^D$⟩(T[B.g,1]) to occur. Similar timing specifications appear in events Be.f$^S$[T(Be.f,0)] and ⟨E.g$^D$⟩[T(B.f,1)].

//Derived from Bi.f:TIP( ) in (3.5), the network in Figure 5 and polling cycle (3.9)
Bi.f:ALLEOP( ) = □[Bi.f:ALLEOP-guard( ){Bi.f:ALLEOP-body( )}]
Bi.f:ALLEOP-guard( )= [Bi.f:mR?([⟨Bi.f$^D$⟩[T(E.g,1)])]
Bi.f:ALLEOP-body( ) =
[Bi.f:play( )•→ Bi.g$^S$[T(Bi.g,0)]
→ (⟨Me.f$^D$⟩(T(B.g,1)] || Me.f:ALLEOP(...))
•→ Bi.g:mR?(Bi.g$^D$[T(Me.f,1)])*{Bi.f$^S$[T(Be.f,0)]}
→ (⟨E.g$^D$⟩[T(B.f,1)] || E.g:mR(⟨E.g$^D$⟩[T(B.f,1)])*{ })}
→ Bi.f:ALLEOP( )]
(3.13)

Identical time-maps appearing in distinct port-ALLEOPs indicate that events associated with those time-maps occur at the same time in the different ALLEOPs. Thus ⟨Me.f$^D$⟩[T(B.g,1)] in ALLEOPs (3.12), (3.13) and (3.14) indicate that the same delivery event is being referred to in the three ALLEOPs. Similarly, ⟨E.g$^D$⟩[T(B.f,1)] in ALLEOPs (3.11), (3.12) and (3.13) refer to the same delivery event. Notice, there are no ellipses, '→ . . . →', following parallel activations in (3.12), (3.13) and (3.14). This is because the signal receiving cells are waiting at their respective ports for the signals; so they sense the delivered signals immediately.

//Derived from Me.f:TIP( ) in (3.6), the network in Figure 5 and polling cycle (3.10)
Me.f:ALLEOP( ) = □[Me.f:ALLEOP-guard( ){Me.f:ALLEOP-body( )}]
Me.f:ALLEOP-guard( )= [Me.f:mR?( ⟨Me.f$^D$⟩[T(B.g,1)])*]
Me.f:ALLEOP-body( ) =
[Me.f:meet( ) •→ Me.f$^S$[T(Me.f,0)]
→ ((⟨Be.g$^D$⟩[T(Me.f,1)]||Be.g:mR(Be.g$^D$[T(Me.f,1)])*{•→...•→})
→ (⟨Bi.g$^D$⟩[T(Me.f,1)]||Bi.g:mR(Bi.g$^D$[T(Me.f,1){•→...•→})*))
•→ Me.f:ALLEOP( )]
(3.14)

Rules for deriving ALLEOPs from TIPs are simple. ALLEOP structures look similar to FSP structures. But, as the reader can see, there are several differences. ALLEOPs represent events and causal links. FSPs represent states and transitions. We will later see a possible relationship between ALLEOPs and FSPs. It should be pointed out, actions specified in ALLEOPs, like the actions Be.f:work( ), Bi.f:play( ) and Me.f:meet( ), may in general cause branching causal sequences to occur in the ALLEOP. There are two kinds of branchings: One is choice branching, where one alternative from a finite set of causal sequences is chosen to run at run-time by evaluating choice conditions associated with the causal sequences and selecting the first one that evaluated to true. We use symbol, '|', to separate out the choice alternates (see (5.14)). No choice branches occur in the above ALLE-OPs. The other kind of branching, is multiple parallel activations (forks), like the ones in ALLEOPs (3.11) and (3.14) that occur as a result of communications.

Partial Ordering of Time-Maps: Various time-maps and their partial ordering in this example are, $T(E.g,0)$, signal is sent to $Bi.f$ and $Be.f$ start game$<T$
$(E.g,1)$, signal is delivered to $Bi.f$ and $Be.f<T$
$(Be.g,0)$, $T(Bi.g,0))$ $Bi.g$ and $Be.g$ send start meeting signals to $Me.f<T(B.g,1)$, start meeting signal is delivered to $Me.f$ by agent $a2<T(Me.f,0)$, end of meeting signal is sent to $Bi.g$ and $Be.g<T$ $(Me.f,1)$, end of meeting signal is delivered to $Bi.g$ and $Be.g<(T(Be.f,0),T(Bi.f,0))$, end of game signal to $E.g<T(B.f,1)$], end of game signal is delivered to $E.g$ by agent $a1$ (3.15)

Incomparable Pairs of Time-Maps:

$(T(Be.g,0),T(Bi.g,0) \leq T(B.g,0),a2$ sends coordinated signal to $Me.f$ $(T(Be.f,0),T(Bi.f,0) \leq T(B.f,0),a1$ sends coordinated signal to $E.g$ (3.16)

It is possible that pairs of incomparable time-maps in (3.16) intersect with each other, i.e., $T(Be.g,0) \cap T(Bi.g,0) \neq \phi$ and $T(Be.f,0) \cap T(Bi.f,0) \neq \phi$. This implies that at times both Ben and Bill could send out signals simultaneously, just by chance. The combined ALLEOP is, BILL_BEN:ALLEOP( )= □(∃(<partial-ordering-of-time-maps>)
(E.g:ALLEOP( )||Be.f:ALLEOP(...)||Bi.f:ALLEOP(...)||Me.f:ALLEOP
(...))
•→ BILL_BEN:ALLEOP( )] (3.17)

Here, parallel operations of cells are constrained by the partial ordering in (3.15) and (3.16). This restriction is automatically imposed by the TICC™-network and signal exchange timings. No scheduling is involved. Port-ALLE-OPs defined in statements (3.11) through (3.14) define the model of event patterns that occur in computations performed by the application. TICC™-Ppde can generate series/parallel combinations of port-ALLEOPs that are consistent with TICC™-network and polling specifications, in order to generate the complete ALLEOPs model of an implementation. Any property we prove using the ALLEOPs models will be a valid property of the implementation, not just a property of an intended design. All ALLEOPs begin with the universal temporal operator, □. We will omit this operator in ALLEOP descriptions. It should always be assumed to be present.

3.1.2. ALLEOP of a CIP

Let us now write the ALLEOP for the CIP in (3.2): Here we have postulated a port called User.g, which sends interrupt signals to E.i. User is not shown in FIG. 5.

E:CIP-ALLEOP( ) = [E:CIP-ALLEOP-init( )•→ E:CIP-ALLEOP-body]
E:CIP-ALLEOP-init( ) =
    [E:initialize?( ){ init( ) •→ E.i$^S$[T(E.g,2)]
        → (⟨User.g$^D$⟩[T(E.g,3) || →...→ User.g:ALLEOP( ))
        •→ stopPolling = false •→ initialize = false]
E:CIP-ALLEOP-body( ) =
    [(¬E:stopPolling?( ){(E.g:ALLEOP( ) •→ E.i:ALLEOP( )
                    •→ E:CIP-ALLEOP-body( )} |
        E:stopPolling?( ){prepareToTerminate( )})] (3.18)

Notice, time-maps $T(E.g,2)$ and $T(E.g,3)$ are used in (3.18). This is because $T(E.g,0)$ and $T(E.g,1)$ have been already used in E.g:ALLEOP( ) (see (3.11)), and E.g:AL-LEOP( ) appears in E:CIP-ALLEOP-body( ) in (3.18). Here, E:initialize?( )=E.initialize; similarly, ¬E:stopPolling?( )= ¬E.stopPolling. Every Boolean attribute of an object has a predicate of this kind. In (3.18), ports of cell E are not sorted before their TIP-bodies are executed.

In CIPs of the kind shown in (2.1) ports are sorted before their TIP-bodies are executed. The CIP=ALLEOP for (2.1) is shown below In (3.19). Following assumptions have been made in (3.19): port X.g sends the interrupt signal that activates the Cell in (3.19); and poll&SortPorts method appearing in (2.1) has been split into two components; polling and sorting: Cell.ports[j]:mR?( ) does the polling Cell:sort Into( . . . ) does the sorting The latter has three arguments: (i), Cell.ports[j] is the jth sorted port attached to Cell, (ii) Cell.spL is Cell.sortedPortsList, which is a vector of sorted ports with pending messages, and (iii) sortR is the sorting relation. All are defined in the Cell class.

Cell:CIP-ALLEOP( ) = [Cell:CIP-ALLEOP-init( ) •→
Cell:CIP-ALLEOP-body]
Cell:CIP-ALLEOP-init( )=[Cell:init-ALLEOP( ) •→ stopPolling=false
        •→ initialize=false
        •→ Cell.i:pR?( ){Cell.i$^S$[T(Cell.i,0)]
            →(⟨X.g$^D$⟩[T(Cell.i,1)]
                || →...→ X.g:ALLEOP( ))}]
Cell:CIP-ALLEOP-body( ) = //in the following read "spL" as "sortedPortsList".
    [(¬Cell:stopPolling?( ){ Cell.i:ALLEOP( ) •→ Cell.spL:clear( )
        •→ ∀(j) (0≦j<Cell.ports:size( )){
            Cell.ports[j]:mR?( ){
                Cell:sortInto(Cell.ports[j],Cell.spL,sortR)}}
        •→ ∀(j) (0≦j<Cell.spL:size( )){Cell.spL[j]:ALLEOP-body( )}
        •→ Cell:CIP-ALLEOP-body( )} |
        Cell:stopPolling?( ){prepareToTerminate( )})] (3.19)

Here, "∀V(j)(0≦j<Cell.ports:size( ))" and "∀(j) (0≦j<Cell.spL:size( ))" are used as enumerators of indices in the specified range; actions in their, respective, scopes are applied to each enumerated index.

3.1.3. Traces

Differences between traces and ALLEOPs are the following: (i) Traces postulate virtual time points (hereafter simply referred to as time-points), at which events and evaluations begin and/or end. (ii) Traces associate precondition and postcondition with actions when they are known. Characterization of an action, A( ), has the form □[∃(t$_0$ < t$_1$){⟨precondition?( )⟩(t$_0$)}[•→ A( ) (t$_0$)]
    {⟨A.output:C?( ) & postcondition?( )⟩(t$_1$) & (t$_1$-t$_0$ ≦ τ$_{max}$(A)}] (3.20)

where A is either a pthread, a protocol or a program statement; $\tau_{max}(A)$ is the maximum time it might take to complete execution of A( ), •→ is the action evaluation symbol, A( ) begins execution at the same time $t_0$ when the precondition?( ) becomes true and execution of A( ) is completed at time $t_1$ when (A.output:C?( ) & postcondition?( )) becomes true. Such action characterizations are developed interactively by users with assistance from the system. (iii) Traces also specify characterizations of input messages, if any, in the precondition. A.output:C?( ) may characterize the output message, if any. Traces may contain branches specifying alternates and parallel forks if their corresponding ALLEOPs contain them. We omit the '□' symbol in trace statements; it is assumed to be present.

When system derives the trace for a port-ALLEOP it simply postulates distinct virtual-time points for distinct events in port-ALLEOPs, taking care identical virtual time points are associated with identical time-maps in the port-ALLEOPs. This captures synchronization and coordination of events occurring in different port-ALLEOPs. Ordering of time points with in a trace is dictated by the order in which events occur in the port-ALLEOP. Three assumptions are made in this ordering: (i) Successive actions linked by •→ will occur immediately one after the other, the action at the end of the link starting at the same time as the action at the beginning of the link terminates. (ii) Every action takes a finite amount of non-zero time to complete execution with a known upper bound, (iii) If a cell is waiting for a signal at a port at the time signal is delivered to that port, then the delivered signal is sensed immediately at the same time as the signal delivery time, otherwise signal sensing may occur sometime after signal delivery. (iv) When a cell sends out a signal through a port C.p at virtual-time, say Cp.t, if C.p belonged to a port-group, pG, then the system knows that the agent that receives signals sent by the ports in pG would dispatch a coordinated signal only after receiving signals from all the ports in pG. Let us say, this dispatch occurs at time pG.t. In this case, the system introduces the ordering, Cp.t≦pG.t, into the port-trace for every port C.p in pG.

Traces for the port-ALLEOPs in (3.11) through (3.14) are presented below, together with their interpretations. Traces for the Ben-Bill solution contain parallel forks. Trace (3.21) below corresponds to ALLEOP (3.11). The expression '(...∥...∥...)' in (3.11) describes the parallel forks. There are no actions appearing in this trace. Actions, play( ), work( ) and meet( ) appear in traces (3.22) through (3.24). These actions do not have pre/post-conditions defined for them. Therefore, none appear in traces. An example of a trace with pre/post-conditions and message conditions appears in (3.26).

In each trace the trace-body is invoked for analysis during a proof construction process only if the trace-guard is to true, else it is skipped. The trace E.g:trace(Eg.t$_0$) at port E.g, corresponding to ALLEOP, E.g:ALLEOP( ) in (3.11), is shown below:

---

□[∃(Eg.t$_0$ < Eg.t$_1$ = Bf.t$_0$ < Eg.t$_2$ < Eg.t$_3$ = Bf.t$_1$)]
 E.g:trace(Eg.t$_0$) = {•→ E.g:trace-guard(Eg.t$_0$)}[•→ E.g:trace-body(Eg.t$_1$)]
 E.g:trace-guard(Eg.t$_0$) = [⟨(E.g:pR( ) &
 E:readyToStart( )*⟩(Eg.t$_0$)⟩(Eg.t$_1$)]
 E.g:trace-body(Eg.t$_1$) =
  [[•→ E.g$^S$(Eg.t$_1$∈t(E.g,0))]
   (([⟨→ Be.f$^D$⟩(Eg.t$_2$∈T(E.g,1))] ∥ [→ Be.f:trace(Eg.t$_1$)])
    ([⟨→ Bi.f$^D$⟩(Eg.t$_2$∈T(E.g,1))] ∥ [→ Bi.f:trace(Eg.t$_1$)]))
   {⟨E.g:mR⟨E.g$^D$⟩(Eg.t$_3$ ∈ T(B.f,1))⟩*⟩(Eg.t$_3$)}
    [•→ E.g:trace(Eg.t$_3$)]]                                  (3.21)

---

Expression on the right side in E.g:trace-guard(Eg.t$_0$) in (3.21) asserts that evaluation of the condition, (E.g:pR( ) & E:readyToStart( )*), begins at time Eg.t$_0$ and terminates at time Eg.t$_1$. Assignment of the same virtual time-point, Eg.t$_2$, to the two events, ⟨→Be.f$^D$⟩ and ⟨→Bi.f$^D$⟩ in (3.21) indicates that signal deliveries to ports Be.f and Bi.f were made simultaneously at the same time. Specification, "[•→E.g$^S$(Eg.t$_1$∈T(E.g,0))]" in E.g:trace-body, without angle brackets around, "•→E.g$^S$", asserts that evaluation of action that caused event E.g$^S$ to occur, started at time Eg.t$_1$∈T(E.g,0). Notice, the starting time of "•→E.g$^S$" is the same as the ending time of "⟨(E.g:pR( )&E:readyToStart( )*⟩(Eg t$_0$)⟩ (Eg.t$_1$)". Ending time of "•→E.g$^S$" is not specified. Interpretations of timings associated with other statements in (3.21) are the same as in ALLEOPs, with the difference that virtual time-points are postulated in each case. Just as time-maps represent sequences of time points, each virtual-time point also represents a sequence of time points. Thus in (3.21), Eg.t$_1$∈T(E.g, 0) is a sequence of time points at which E started the Bill-Ben game. Other port-traces associated with the ALLEOPs in the Bill-Ben game are shown below.

---

Bi.f:trace (Bif.t$_0$)={Bi.f:trace-guard(Bif.t$_0$)}[•→ Bi.f:trace-body(Bif.t$_1$)]
[∃(Eg.t$_1$ = Big.t$_0$ ≦ Bif.t$_1$ < Big.t$_0$ ≦ Bg.t$_0$ < Bg.t$_1$ = Mef.t$_0$ <
  Big.t$_1$ = Mef.t$_3$ = Big.t$_1$ < Bif.t$_2$ ≦ Bf.t$_0$ < Bf.t$_1$ = Eg.t$_3$)
Bi.f:trace-guard (Bif.t$_0$) = {⟨Bi.f:mR?(⟨Bi.f$^D$⟩(Bif.t$_0$∈T(E.g,1)))⟩(Bif.t$_1$)}
Bi.f:trace-body(Bif.t$_1$) =
  [[•→ Bi.f:play( ) (Bif.t$_1$)]
   [•→ Bi.g$^S$(Big.t$_0$∈T(Bi.g,0) ≦ Bg.t$_0$∈T(B.g,0))]
    ([⟨→ Me.f$^D$⟩(Bg.t$_1$∈T(B.g,1))] ∥ [•→ Me.f:trace(Bg.t$_1$)])
   [⟨Bi.g:mR?(⟨Bi.g$^D$⟩(Big.t$_1$∈T(Me.f,1)))*⟩ (Big.t$_1$)}
    ([•→ Bi.f$^S$(Bif.t$_2$ ≦ Bf.t$_0$∈T(B.f,0))]
      ([⟨•→ E.g$^D$⟩(Bf.t$_1$∈T(B.f,1))]
       ∥{E:g:mR(⟨•→E.g$^D$⟩(Bf.t$_1$))*}[ ][•→ E.g:trace(Bf.t$_1$)]))
    [•→ Bi.f:trace(Bf.t$_1$)]]]                                (3.22)
Be.f:trace(Bef.t$_0$) ={Be.f:trace-guard(Bef.t$_0$)}
          [•→ Bi.f:trace-body(Bef.t$_1$)]
[∃(Eg.t$_1$ = Bef.t$_0$ ≦ Bef.t$_1$ < Beg.t$_0$ ≦ Bg.t$_0$ < Bg.t$_1$ = Mef.t$_0$ <
  Beg.t$_1$ = Mef.t$_3$ = Beg.t$_1$ < Bef.t$_2$ ≦ Bf.t$_0$ < Bf.t$_1$ = Eg.t$_3$)
Be.f:trace-guard(Bef.t$_0$) = {⟨Be.f:mR?(⟨Be.f$^D$⟩(Bef.t$_0$∈T(E.g,1)))⟩(Bef.t$_1$)}
Be.f:trace-body(Bef.t$_1$) =
  [([•→ Be.f:work( )(Bef.t$_1$)]
   [•→ Be.g$^S$(Beg.t$_0$∈T(Be.g,0) ≦ Bg.t$_0$∈T(B.g,0))]
    ([⟨→ Me.f$^D$⟩(Bg.t$_1$∈T(B.g,1))] ∥ [•→ Me.f:trace(Bg.t$_1$)])
   {⟨Be.g:mR?(⟨Be.g$^D$⟩(Beg.t$_1$∈T(Me.f,1)))*⟩(Beg.t$_1$)}
    ([•→ Be.f$^S$(Bef.t$_2$ ≦ Bf.t$_0$∈t(B.f,0))]
      ([⟨•→ E.g$^D$⟩(Bf.t$_1$∈T(B.f,1))]
       ∥{E.g:mR(⟨•→E.g$^D$⟩(Bf.t$_1$))*}[•→ E.g:trace(Bf.t$_1$)]))
   [•→ Be.f:trace(Bf.t$_1$)]]]                                (3.23)
Me.f:trace(Mef.t$_0$) ={Me.f:trace-guard(Mef.t$_0$)}[•→ Me.f:trace-body(Mef.t$_1$)]
[∃(Mef.t$_0$ = Bg.t$_3$ = Mef.t$_1$ < Mef.t$_2$ < Mef.t$_3$ = Beg.t$_1$ = Big.t$_1$)
 Me.f:trace-guard(Mef.t$_0$) =
 {⟨Me.f:mR?( )(⟨Me.f$^D$⟩(Mef.t$_0$∈T(B.g,1)))*⟩(Mef.t$_1$)}
 Me.f:trace-body(Mef.t$_1$) =
  [([•→ Me.f:meet( )(Mef.t$_1$)]
   [•→ Me.f$^S$(Mef.t$_2$∈T(Me.f,0))]

-continued $$((([\looparrowright Be.g^D\rangle(Mef.t_3 \in T(Me.f,1))]$$
$$\| \{\langle Be.g:mR?(\langle Be.g^D\rangle(Mef.t_3))^*\rangle(Mef.t_3))\} \bullet\rightarrow...\bullet\rightarrow)$$
$$([\looparrowright Bi.g^D\rangle(Mef.t_3 \in T(Me.f,1))]$$
$$\| \{\langle Bi.g:mR?(\langle Bi.g^D\rangle(Mef.t_3))^*\rangle(Mef.t_3))\} \bullet\rightarrow...\bullet\rightarrow)))$$
$$[\bullet\rightarrow Me.f:trace(Mef.t_3)]]] \qquad (3.24)$$

Incomparable Pairs of Time Points:

$$(Bif.t_1, Bef.t_1)(Bif.t_2, Bef.t_2)(Beg.t_0, Big.t_0) \qquad (3.25)$$

The existential declarations in the first lines of (3.22) and (3.23) specify that $Bif.t_0 = Eg.t_1 < Bift_1$ and $Bef.t_0 = Eg.t_1 < Bef t_1$ indicating that signals are delivered to ports Bi.f and Be.f synchronously at virtual time $Eg.t_1$ but the delivered signals are not sensed synchronously. They are sensed at the incomparable time points, $Bif.t_1$ and $Bef.t_1$. Similarly, when Bill and Ben send out signals to E.g at virtual times, $Bif.t_2$ and $Bef.t_2$, respectively, they do not coordinate the times at which they send the signals out. However, when both signals are received by agent a1 at time $Bf.t_0$, a1 dispatches a coordinated signal to E.g. This signal dispatch time is always • the signal sending times. Hence the declarations, $Bif.t_2 \leq Bf.t_0$ and $Bef.t_2 \leq Bf.t_0$ appear in (3.22) and (3.23). Similarly, $(Beg.t_0, Big.t_0) \leq Bg.t_0$, is coordinated by agent a2 at time $Bg.t_0$. Bill and Ben sense signals delivered to their ports Bi.g and Be.g immediately after signal delivery at time $Bg.t_1$, since they are both waiting for the signals at the time signal is delivered.

Reader should be able to follow how time points that are identical to each other in different port-traces are identified through their membership in time-maps. Equalities between virtual time points so identified are introduced into the existential declarations on top of each trace. All time-points that occur in traces of ports in different cells, that are not related to each other by equality or inequality relations are incomparable time points.

Once all traces have been generated, the system knows the virtual time points that appear in the time-maps specified in ALLEOPs and all virtual time points that do not appear in any time-maps. The system then sets time points, appearing in identical time-maps in different port-traces, equal to each other. This identifies all coordinated and synchronized signal dispatches and deliveries. In the case of the trace in (3.21) the existential declaration of time points at the top of the trace thus declares, $Eg.t_3 = Bf.t_1$ where $Eg.t_3$ is the virtual time at which port E.g receives the signal delivered to it and $Bf.t_1$ is the time point at which agent a1 delivered that signal (see FIG. 5). The delivered signal is here sensed immediately, since E.g is waiting for the signal. This identifies coordinated signal delivery to port E.g specified by the time-map T(B,f,1) in the ALLEOPs (3.11), (3.12) and (3.13). Similarly in (3.22) and (3.23), $Bef.t_0 = Eg.t_1 = Bif.t_0$. This specifies synchronized signal deliveries to ports [Be.f, Bi.f]=B.f. These identifications of virtual time points are consistent with the partial ordering shown in (3.15). After setting up the relationships among virtual time points, the system assigns the delivery event arguments to all signal sensing operations in the traces, in a manner that is consistent with traces that are activated by those events. Translating ALLEOPs to traces is not complicated if message characterizations and pre/post-conditions associated with actions are known; user assistance may be needed to acquire these.

Port-traces in this application use only signal sensing conditions. In section 7.4 and Appendix III, traces contain a variety of conditions and branching actions, with pre/post-conditions associated with actions. Each trace gives rise to its Event Characterization Table (ECT), which is simply a reorganization of information in the trace in a tabular form that is convenient for proof generation. We will see examples in Section 7.

3.1.4. Trace of a CIP

Trace fragments of the CIP-ALLEOP (3.19) are presented below in (3.26), to illustrate how statements with V-enumerators are handled. The phrase, $(p[i] \leftrightarrow q[i])$ appearing in (3.26) asserts that there is a pathway between the ports p[i] and q[i]. Indices or items are enumerated by V-enumerators in an order. In the following, it is assumed, enumeration of an index i is followed by the enumeration of the index i+1, for $0 \leq i < n-1$. The ALLEOP-statements with V-enumerators appearing in (3.19) are reproduced below, for convenience (read spL as sortedPortsList):

$\bullet\rightarrow \forall(i)(0 \leq i < Cell.ports:size(\ ))\{$
  $Cell.ports[i]:mR?(\ )\{Cell:sortInto(Cell.ports[i],spL,sortR)\}$
$\bullet\rightarrow \forall(j)(0 \leq j < Cell.spL:size(\ ))\{spL[j]:ALLEOP-body(\ )\} \qquad (3.19a)$ The trace of above enumerator statements is given below:

$[\forall(i)((0 \leq i < (Cell.ports:size(\ ) -1)(\exists(Cp[i].t_i < Cp[i].t_{i+1} = Cp[i+1]t_{i+1})$
$\exists(q[i].t_0 < Cp[i].t_i < q[i+1].t_0))$//declarations of virtual time points used in the trace.
$\forall(i)(0 \leq i < (Cell.spL:size(\ )-1)$
$\exists(i)(k)(sPL[i].t_k < sPL[i].t_{k+1} = sPL[i+1]t_{i+1}))$//virtual time points declarations.
  $[\forall(k)(0 \leq k < Cell.ports(\ ):size(\ ))$//Here $\forall(k)$ is an enumerator for actions that follow.
    $\exists(Ports \ p[k],q[k])(p[k]=Cell.ports[k] \ \& \ (q[k] \leftrightarrow p[k]))$
    /* in the following q[k] is the port that delivers signal to p[k]. Signal is delivered at time q[k] .$t_0$
       and sensing is completed at time Cp[k] .$t_k$ */
    $\{\langle p[k]:mR?(\langle p[k]^D\rangle(q[k].t_0))\rangle(Cp[k].t_k)\}$
      /*the following sorting action starts at the time signal sensing is completed, namely Cp[k] .$t_k$,
        and ends at time, Cp[k] .$t_{k+1}$; sortR is the sorting relation.*/
      $[\langle \bullet\rightarrow Cell:sortInto(p[k],spL,sortR)(Cp[k].t_k)\rangle(Cp[k].t_{k+1})]$
      $\{((k=0)\& \ spL[0] = p[0])$
        $(k>0 \ \& \ spL[0] = p[k] \ \& \ (p[k] \ sortR \ sortedPortsList[1])) \lor$
        $(k>0 \ \& \ \exists(j>0)(spL[j]=p[k] \ \& \ (spL[j-1] \ sortR \ p[k]))\}]$
    //spL[j]:trace-body( ) starts at time sPL[j] .$t_j$ and ends at time sPL[j] .$t_{j+1}$
    $[\{\forall(j)(0 \leq j < Cell.spL:size(\ ))$//Here also $\forall$ (j) is being used as an enumerator
      $[\langle \bullet\rightarrow spL[j]:trace-body(\ )(spL[j].t_j)\rangle(spL[j].t_{j+1})]]] \qquad (3.26)$ Features to be noticed in (3.26) are the following: (i) signal is delivered to port p[k] at time q[k].$t_0$ and the delivered signal is sensed at time cp[k].$t_k$. The sorting action, Cell:sortInto ( . . . ), for index, k, starts immediately at the same time, Cp[k].$t_k$. This sorting action for index k terminates at Cp[k].$t_{k+1}$, when sorting action for the index (k+1) begins. This is declared in the timing specifications on top, where the declaration, Cp[k]. $t_{k+1}$=Cp[k+1].$t_{k+1}$, appears. A similar timing structure appears for the other enumerator statement. (ii) Pre/post-conditions are presented for the [(⟨•→Cell: sortInto(p[k],spL,sortR)(Cp[k].$t_k$)⟩(Cp[k].$t_{k+1}$)] action. Generating traces for the CIP-ALLEOP (3.19), using the above trace fragments should be quite straight forward.

3.1.5. Graphical Representations of ALLEOPs and Causalnets

Graphical representation of ALLEOPs for this application is shown in FIG. 6A. It represents the series parallel composition of the port-ALLEOPs described in (3.11) through (3.14). Nodes that appear in the ALLEOP graph in FIG. 6A are called event classes, since many instances of each node may occur when the application runs iteratively. Directed links between pairs of event classes represent causal relationship between the event classes. Labels on the links in FIG. 6A mark conditions, which should hold true for those links to occur. Only signal sensing conditions appear here.

The causalnet produced by the SMS in a single run of the game, for the ALLEOPs-graph in FIG. 6A, is shown in FIG. 6B. Each node in FIG. 6B is an instance of its corresponding ALLEOP node. Where as ALLEOPs show action events for play( ), work( ) and meet( ), causalnets show only the communication events, which are instances of communication event classes that appear in ALLEOPs and traces. Instead of the virtual time points postulated in traces the time instances associated with causalnet events are the time points in a global clock associated with the application. It is the time at which the events occurred in a run of that application. FIG. 6C shows the causalnet when the game is repeated several times. The causalnet preserves the temporal ordering shown in FIG. 6A, with the difference that the looping link in FIG. 6A is replaced by iterations, as shown in FIG. 6C. It should be clear, just like time-maps, virtual time points in traces also have sequences of time instances associated with them.

The set of event nodes that appear in a causalnet is simply the set of all communication events that occur in a run of an application and appear in the traces of the application, together with their respective times of occurrence. If traces contained choice points, then not all events that appear in traces will have corresponding events in the causalnet; only the events selected at choice points will have corresponding events in the causalnet. All pre/post-conditions, sensing of events and action events that appear in traces do not appear in causalnets. Thus causalnets are abstractions of trace fragments that correspond to communication events that occur in a run of an application. Nodes that receive synchronous input signals have identical global time instances associated with them. Similarly nodes that dispatch coordinated output signals through agents also have identical global dispatch time instances associated with them. Each distinct virtual time point associated with an event class in a trace corresponds to a distinct sequence of time instances associated with the instances of that event class in the causalnet generated from that trace. Thus, the virtual time-point Eg.$t_1$ appearing in the phrase E.$g^S$(Eg.$t_1 \in$T(E.g,0)) in (3.21) represents the sequence of time points, T(E.g,0)=[$t_0$, $t_8$, $t_{16}$, . . . , $t_{8n}$] shown in FIG. 6C.

If the causal link, x→Y or x•→Y, occurs in a port-ALLEOP and event instance, x(t) of x, occurs in the causalnet, then event instance Y (t+τ) of Y is bound to occur in the causalnet after a certain delay τ,$\tau_{max}$(X,Y)≧τ>0, as per definition (6.27)(a) in Section 6.4. If the causal link, $X^{C(X,Y)}$→Y or $X^{C(X,Y)}$•→Y occurs in the graph of a port-ALLEOP with condition C(X,Y) associated with causal link, or the phrases, C(X,Y)?( ){X→Y} or C(X,Y)?( ){X•→Y} in the textual description of the port-ALLEOP, then event instance Y(t+τ) of Y is bound to occur in the causalnet after a certain delay τ,$\tau_{max}$(X,Y)≧τ>0, only if the condition C(X,Y) is true at time (t+τ). This is guaranteed because, as explained in Section 6.5, (i) any pthread or protocol that is executed by a cell is uninterruptible, (ii) activation of the pthread and protocol is automatic (not scheduled by any program that is external to the cell) and (iii) progress is guaranteed unless, of course, there is a system failure, deadlock or livelock (part of the system is deadlocked). In the general case, one has to prove freedom from deadlocks and livelocks.

Nodes are linked to each other in causalnet by directed links as shown in FIGS. 6B and 6C. The links specify partial ordering of the nodes. There are two kinds of links: (i) causal links, which specify ordering of events that occur during the execution of a TIP, and (ii) execution links, which specify ordering of different TIP executions, as they occur in cells during a run of the application. Partial ordering of event instances in a causalnet is the union of causal links and execution links. In FIG. 6C the links between successive iterations of the game are execution links. All other links are causal links. In this case, each cell has only one TIP, since we have ignored interruptPort activities. More execution links will appear in a causalnet if cells have multiple generalPorts and functionPorts.

The Self-Monitoring System, SMS, may be set up to issue alerts any time the causalnet of an application deviates from ALLEOPs. Also, one may specify alert situations by defining event patterns as regular expressions of ALLEOP nodes. Thus, if event Y does not occur after a specified upper bound, $\tau_{max}$(X,Y), in X→Y and X•→Y, then SMS will issue an error alert. If the event Y occurs after the specified upper bound for the delay, then SMS will issue an impending error alert. Under normal operating conditions, every event in the ALLEOP in FIG. 6A is bound to occur, if its pre-conditions are satisfied, once the event corresponding to the bottom node occurs, else an alert will be generated. Thus, in this case progress is guaranteed.

As discussed in Section 8, events in a causalnet are dynamically installed by specialized cells, called Event Builder cells (eb cells), in parallel with an application's operations, while the application is running and events are occurring in the application. Event patterns that appear in a growing causalnet are recognized by Event Analyzer cells (ea cells). If a pattern in an a priori specified alert condition occurs in a growing causalnet, then the ea cell associated with that pattern will generate an alert. SMS may be set up to notice any departure from progress specified in ALLEOPs and issue alerts. SMS may also be set up to influence ongoing computations in an application, based on patterns recognized dynamically in a growing causalnet, by setting up pathways between selected generalPorts of ea cells and interruptPorts of appropriate cells in an application, and defining TIPs for those ports.

3.1.6. Comments

Non-Determinism in TIP executions: TIP executions in distinct cells are not synchronized with each other. Neither are they synchronized with signal delivery events. A TIP at a port is executed only if there is a delivery signal at that port at the time the parent-cell of the port polls that port; else the port is skipped. One cannot predict the order in which signals arrive at different ports of a cell. Thus, the order in which a cell executes TIPs at its ports cannot be predicted. Therefore, one cannot predict when a cell will sense a signal delivered to one of its ports and respond to it. Since a signal missed at a port in one polling cycle is always caught in the next polling cycle, one can set a bound on when a cell may respond to a signal, after the signal has been delivered to a port: If $\Delta^C_{max}$ is the maximum time needed in a polling cycle of cell C to service all ports with pending messages, then this bound is $<2\Delta^C_{max}$. This is a source of non-determinism that is intrinsic to TICC™-Ppde.

Sharing CPUs: The network shown in FIG. 5 requires at least three CPUs to run it. The environment E may suspend its operations and release its CPU after sending signals to Bill and Ben. When Meeting receives signal from Bill and Ben it may get activated automatically in an available free CPU, and later when E receives signal from Bill and Ben it may similarly resume suspended operations in any available free CPU. In general, the number of CPUs needed to run a network is at least one plus the maximum number of cells that run in parallel. The CPUs are switched around the cells that run intermittently, if cells have been programmed to suspend/resume their operations. It is not, however, desirable to switch CPUs dynamically in TICC™-Ppde since CPU assignment to cells and activation of assigned CPU are relatively expensive operations taking anywhere from 2.5 to 5 microseconds. This is done in TICC™-Ppde only when dynamically growing TICC™-networks are encountered (Section 7.7, FIG. 18).

Progress: In the diagrams in FIGS. 6A through 6C, there is an implicit assumption that the pthreads, play( ), work( ) and meet( ) are unconditional and are assumed to always terminate. With this assumption, the application does not have deadlocks or livelocks, and meeting synchronization occurs in all iterations of the game. We introduce formal proof methods in Section 7. We will see situations in the Dining Philosophers example, where precautions are taken to guarantee that the implementation is free of deadlocks and livelocks, and the refinement structure of computations plays a role in being able to prove this guarantee.

ALLEOPs and FSPs: As mentioned earlier, nodes in ALLEOPs and traces of TIPs are event classes and links specify partial ordering, if loops in ALLEOPs are removed. It may be noticed, if the looping link is removed in FIG. 6A, then the ALLEOPs graph is a lattice. This is a special case. As mentioned earlier, nodes and links in ALLEOPs graphs do not represent states and transitions. However, if the number of states in the state diagram of an application that is modeled by ALLEOPs is finite then the ALLEOPs should be in some sense equivalent to an FSP. We refer to such ALLEOPs as finite-ALLEOPs. The set of all possible causal chains in a finite-ALLEOP should then be a regular set.

FSPs Viewed as Abstractions of Finite-ALLEOPs: Suppose in the ALLEOPs (3.11) through (3.14) we focused only on the cells, and actions like play( ), work( ) and meet( ), performed in the cells, and ignored signal exchange events and signal sensing operations. Then the ALLEOPs (3.11) through (3.14) yield the following FSP description of the implementation:

E = [(readyToStart → [BILL || BEN]) | (interrupt → STOP)];
BILL = play → meet → E;    BEN = work→ meet → E   ;    (3.27)

Here, E stops after an interrupt. This is not shown in the ALLEOPs but specified in CIPs. We have here taken the liberty to include it here. As per FSP conventions, FSP-synchronization occurs on meet and E. This is called coordination in TICC™. FSP does not distinguish between synchronization and coordination, and FSP does not have a simple framework to specify temporal synchronization of distinct actions (i.e. actions with different names), unless actions are renamed based on their synchronization characteristics.

When cells contain multiple functionPorts, generalPorts and interruptPorts, actions are conditional, and messages are exchanged, then TIPs get complicated, as discussed in Section 5. FSP descriptions that correspond to ALLEOPs will also get complicated. Nevertheless, it seems, ALLEOPs of any application with a fixed finite number of ports may be abstracted to obtain its equivalent FSP specification. Thus, it seems, ALLEOPs of every application with a fixed finite number of ports is a finite-ALLEOP.

Reverse translations of FSPs to their corresponding finite-ALLEOPs and implementations will be hard, since (i) FSP does not distinguish between synchronization and coordination, (ii) identify states of communication links or (iii) introduce the concept of transactions. For example, the FSP in (3.27) does not specify that after meet, E is informed about the end of the game, by synchronized and coordinated communications via Ben and Bill. There are hidden states here (states of ports and agents) which do not appear in FSP. This happens because, FSP has no concept of ports, agents, transactions, pathways and protocols. We have not investigated adequately ALLEOP abstractions to FSP and FSP refinements to ALLEOP, to comment further on these. The relationship between ALLEOPs and FSPs suggested by this discussion is significant, and should be pursued further.

All proofs that depend only on the structure of a finite-ALLEOP will have the simplicity of FSP proofs. User defines CTL-assertions to be proven, and may also provide assertions to guide proof search. System verifies that every assertion provided by user is valid for the given implementation, before accepting it.

NFSP Proofs: ALLEOP-proofs that depend on values of variables used in computations may require NFSP (Non-FSP) proof methods. Such NFSP proofs may require induction over the structure of the ALLEOP. We will see simple examples of both FSP and NFSP proofs in Section 7. For an application, in which the network grows dynamically during computations, its ALLEOP may be an NFSP ALLEOP containing context dependent and general recursive structures with potentially infinite number of ALLEOP-nodes. An example is presented in Section 7.7.

The next example is an augmented version of the "Talking and Itching" example described in [Magee & Kramer, 13]. Here, it is intended to illustrate use of non-deterministic guard, concurrency, encapsulation, hiding and coordination.

3.2. Talking & Itching: Encapsulation, Concurrency and Coordination

A person talks and itches simultaneously. In [13] there is only one person and the person talks and itches with time sliced concurrency. We consider a generalized version of that example with two persons, where conversation takes place between them, and each person scratches intermittently while he/she is talking. The scheme could be generalized to more than two people. An orderly conversation is maintained with no more than one person talking at any one time. This example uses a Das-pathway with a virtualMemory, which was introduced in FIG. 4.

The network is shown in FIG. 7. P0 and P1 are the two Persons. They are compound (also referred to as composite) cells because they encapsulate a network inside them. Each person Pj, for j=0, 1, is a composite cell, containing of one Converse cell Cj and one Itch cell Ij. These two cells run in parallel in distinct CPUs in each person. Each composite cell has hidden internal connections and some have connections to external ports. Decomposition of a composite cell to define the network it encapsulates is called refinement. Let us first review the connections that are internal and external to the two encapsulated cells and the network activities they support.

External Connections: For j=0, 1, there is a pathway, [Cj.f0, Pj.f0, a1, a0, E.g1] (see FIG. 7). Here, ports [P0.f0, P1.f0] form a port-group; agent a1 delivers synchronized signals to [P0.f0, P1.f0] and delivers back to E.g1 coordinated signals from [P0.f0, P1.f0] via agent a0. Similarly, E.g0 is connected through an agent to the external interruptPorts in the port-group [P0.i, P1.i], which in turn are connected to the internal interruptPorts, (C0.i, C1.i), respectively. E uses this pathway to activate cells Cj for j=0, 1. There is a pathway [Cj.f2, Pj.f2, Pk,g2, Ck,g2] for i,k=0, 1, and 1≠k, which allows communications between Cj.f2 and Ck,g2. Similarly, pathway [Cj.f3, Pj.f3, Pk,g3, Ck.g3] enables communicates between Cj.f3 and Ck.g3.

Internal Connections: Pj.g has an internal connection to the interruptPort, Ij.i. When Pj is activated it uses this connection to activate Ij. Other two internal connections are, Pj.g0↔Ij.f0 and Pj.g1↔Ij.f1. Cj and Ij use these two connections to coordinate their activities.

Hiding: Only ports and agents linked to the external ports of the encapsulated cell, may be accessed from the outside world. Pathways internal to an encapsulation are hidden from the outside world; we refer to this as hiding.

Network Activities: The environment E activates the Converse cells Cj for j=0, 1, by broadcasting an interrupt signal to ports in the port-group [P0.i, P1.i]. Once activated, the cells initialize, acknowledge receipt of interrupt signals, and then begin to poll their ports. During initialization each cell Cj for j=0, 1 activates the Itch cell Ij by sending an interrupt signal to Ij.i through Cj.g (see FIG. 7). This causes both the Itch cells Ij for j=0, 1 to begin polling after performing their own respective initializations. After activating the Converse cells, E broadcasts a randomly chosen 2-bit signal, [$b_0$, $b_1$], to ports in the port-group [P0.f0, P1.f0]. Restriction on these bits is that they cannot both be 0's, or both be 1's. The agent a1 (see FIG. 7) sends delivery signal to P0.f0 (P1.f0) only if bit $b_0$=1 ($b_1$=1), else it does not.

When a person receives a signal at port Pj.f0 the signal goes to Cj.f0 through the internal connection. When Cj senses this signal it begins to talk. Since $b_0$ and $b_1$ cannot both be 1, the two persons cannot both begin to talk simultaneously. While one person is talking the cells in the other person will be polling their ports and just spinning, and presumably listening to the talk. Before beginning to talk Cj sends a signal to Ij.f0 through Cj.g0 (see FIG. 7). When Ij senses this signal it begins to scratch intermittently, and continues to scratch intermittently while Cj is talking. Intermittent scratching is controlled by the Boolean variables, Ij.itching and Ij.continue. Scratching occurs only when both true. The truth values of Ij.itching and Ij.continue are set in each scratching cycle, by a random truth value generator, Ij:random( ). Thus, a person may not scratch throughout a talking session. There is an assumption here that scratching intervals will always be much shorter than the talking intervals. Since the Itch and Converse cells operate in parallel, actions performed by them occur in parallel, even though the time-points at which a person begins to talk and begins to scratch are not synchronized to each other.

After talking, Cj first sends a signal through the pathway Cj.g1↔Ij.f1. This informs Ij to stop scratching. Cj then does one of two things: either (i) it signals Ck.f2 for k≠j through ports in the pathway, [Cj.g2, Pj.g2, Pk.f2, Ck.f2] (see FIG. 7) to advise Pk to begin talking in order to continue the conversation, or (ii) it signals Ck.f3 through ports in the pathway [Cj.g3, Pj.g3, Pk.f3, Ck.f3] to terminate the conversation. The way these mutually exclusive signals at the two function-Ports, Ck.f2 and Ck.f3, are used to continue or to stop a conversation is described below.

One of the TIPs below uses a non-deterministic guard of the form $(\exists(f)(f=(Ck.f2|Ck.f3))f:mR?(\ ))$. The symbol '|' specifies alternates. Here, each cell Ck evaluates this guard in every one of its polling cycles. The guard evaluates to true only if one of the ports among the alternates specified in the guard has a signal delivered to it. Signal deliveries to ports in the guard should be mutually exclusive, in order for a non-deterministic guard to operate successfully. If a signal is sensed at Ck.f2 then conversation continues, if it is sensed at Ck.f3 then conversation terminates. If the conversation terminates, then a signal is sent back to E.g1 via port Ck.f0, if this port is ready to send that signal. Ck.f0 will be ready to send that signal only if it had received earlier a signal from E.g1 via agent a1 (see FIG. 7). Thus, only the cell that received a signal from E responds to it. Coordination occurs here, because at this point, agent a1 will be expecting to receive a signal only from the port to which it had earlier delivered a signal. When a1 forwards this signal to E.g1, it will inform E that conversation has terminated. At that point, E may start another conversation session, or terminate the game by sending the second interrupt signal to the interruptPort Cj for j=0, 1. Cj will terminate Ij by sending an interrupt signal to Ij (see FIG. 7) before terminating itself. Starting and termination processes are not shown in the TIPs below.

Cells in each person Pj for j=0, 1 has the following polling cycles (interruptPort pollings are not shown):

Cj:polling( ) = [Cj.f0:mR?( ) → ($\exists$(f)(f = (Cj.f2 | Cj.f3))f:mR?( )
    → Cj:polling( )]
Ij:polling( ) = [Ij.f0:mR?( ) → Ij:polling( )]

Let us suppose Cj started the conversation and sent signal to Ck to continue the conversation. After sending this signal, Cj will begin polling its ports, as per polling cycles above, presumably at the same time listening to the other person talk (listening processes are not included in this implementation; one may introduce a Listen cell for listening.). Cj may go through multiple polling cycles, while conversation is continuing. This will cause the delivery signal received at Cj.f0 to be repeatedly sensed, since delivery signal is changed only when a response is sent and no response is sent as long as the conversation continues. Thus, sensing of signal at Cj.f0 will succeed every time sensing is done. Thus, while Ck is talking Cj may also begin to talk. To prevent this, Cj sets Cj.f0.input=φ immediately after sensing the delivery signal at Cj.f0. This prevents repeated sensing of the signal at Cj.f0. We use the statement, Cj.f0:suspend( ), to do this. Since suspension does not change the state of a port, response may still be sent through a suspended port, when it is appropriate to do so.

With this preamble and the comments given below reader should now be able to follow the TIPs described below.

```
For Person Pj, j = 0,1: TIPs for the talking part.
Cj.f0:mR?( ){Cj.f0:suspend( );//This prevents the signal at Cj.f0 from being sensed again.
        Cj.g0:pR?( )*{ Cj.g0:s( );}//Sends signal to Ij.f0 to begin scratching.
            Cj:think( ) .talk( );
                Cj:g1:pR?( )*{Cj.g1:s( );}//Sends signal to Ij.f1 to stop scratching.
/*signals Ck via Cj.g2 to continue conversation, or signals via Cj.g3 to terminate conversation. When
conversation is terminated, informs E about it by signaling via Cj.f0, if it is ready to send the signal.*/
            Cj:continue?( ){ Cj.g2:s( );}
                    else { Cj.g3:s( ); Cj.f0:pR?( ){ Cj.f0:s( );}}}
    (∃(f)(f = Cj.f2|Cj.f3)f:mR?( ){//at this point this guard fails at both Cj.f2 and Cj.f3.
        //the guard will succeed only at Ck.f2 or Ck.f3 for k≠j.
        selectOne{//selectOne selects the first true condition in a top down scan.
            (f=Cj.f2)?( ){ Cj.f2:s( );//Responds to Ck.g2 for k≠j.
                Cj.g0:pR?( )*{ Cj.g0:s( );}//signals to Ij.f0 to begin scratching.
                Cj:think( ).talk( );
                Cj:g1:pR?( )*{ Cj.g1:s( );}//signals to Ij.f1 to stop scratching.
                Cj:continue?( ){ Cj.g2:s( );}
                        else { Cj.g3:s( );
                            Cj.f0:pR?( ){ Cj.f0:s( );}}}
            (f=Cj.f3)?( ){ Cj.f3:s( ); Cj.f0:pR?( ){Cj.f0:s( );}}}}     (3.28)
For Person Pj. j = 0,1. TIPS for the Itching part.
    Ij.f0:mR?( ){
        /*In the following, Ij.itching and Ij.continue are initialized to true. Thus, when a signal is
sensed at Ij.f0, Ij begins to scratch and continues scratching while in the while-loop, as long as
Ij.itching is true. However, inside the while-loop, Ij.random( ) assigns random truth values to
Ij.itching and Ij.continue, in every iteration. Thus, scratching may not occur throughout the time Cj
    is talking, and even when it occurs it will be intermittent. It is assumed here that scratching intervals will
be much shorter than talking intervals. It is a requirement for this implementation to succeed.*/
        while (Ij.continue?( )){ Ij:itching?( ){ Ij:scratch( );}
                    Ij.itching = Ij.random( );//This may stop the
scratching.
            Ij.continue = Ij.random( );//This may stop the while-loop
            Ij.f1:mR?( ){Ij.continue=false;}}//This stops the loop.
    /* There are two cases here: (i) Ij.random?( ) made Ij.continue false or (ii) sensing signal at Ij.f1
    with in the while-loop made it false. Sensing Ij.f1:mR?( )* below would succeed in both cases, since
    response signal has not been sent yet via Ij.f1. In the following, Ij will thus wait for signal at Ij.f1 only
in case (i).*/
        Ij.f1:mR?( )*{ Ij.f0:s( );//responds to cj.g0.
                Ij.f1:s( );//responds to cj.g1.
    //the following allows scratching to start again when signal is sensed again at Ij.f0.
        Ij.itching=Ij.continue=true; }}                                 (3.29)
```

Conversation begins every time a signal is received either at P0.f0 or P1.f0. Scratching begins every time conversation begins or continues intermittently. We leave it to the reader to figure out how correct coordination occurs. The network does not provide for listening. To provide for this a third Listen cell should be introduced inside the encapsulation with proper coordination with Converse cell.

3.3. Perspectives

TICC™-network: TICC™-network together with CIPs (Cell Interaction Process), TIPs (Thread Interaction Protocols), and polling cycles controls all pthread scheduling, synchronization and coordination. Cells enforce mutual exclusion of TIP executions at their respective ports, communications prevent interference between message senders and message receivers during message exchanges. Ports prevent interference between any two communicating cells during message processing and message building operations, since ports allow their parent cells to use virtualMemories only when their state is S, and the state of message receivers is always R when the state of senders is S. Thus TICC™-network specifies the complete control structure for executing a collection of pthreads in parallel, without mutual interference, enforcing all of their synchronization, coordination, scheduling and fork/join operations. There being just one exception to this.

This exception occurs when cells in a cell-group*** (parent cells of ports in a port-group) use the same virtualMemory simultaneously in parallel for executing pthreads. VirtualMemories provide special facilities to coordinate such parallel simultaneous activities, through its scratchpad (Section 7.2), which may be used by cells in a cell-group to coordinate their activities. Cells in cell groups may use locks to protect commonly shared data in the virtualMemory from each other and communicate with each other via the scratchpad, possibly using simple and efficient methods of CSP [10]. Pthreads which are thus simultaneously executed by cells in cell-groups should therefore be jointly developed with some care, since there may be a need to use locks and exchange data via scratchpad.

Communication latencies in TICC™-Ppde are only in tens to hundreds of nanoseconds scale. Grain size (time spent by a cell between successive message sending sessions) can therefore be small too, of the order of only 10 to 25 microseconds. Thus, pthreads will be short sequential programs. It should, therefore, be easy to implement them, even if some of them may have to be jointly implemented with locks and dynamic data exchange via scratchpad. As we shall see, there are only six different kinds of TIPs, each kind of TIP coming in two versions, either synchronous or asynchronous.

TICC™-Ppde provides compiled codes for all protocols likely to be used in any parallel program. Thus implementers do not have to define them. There is a standard CIP (Cell Interaction Process) used by all cells, shown in statement (2.1) and abstract TIPs are easily defined, but it may require some experience to do so. Thus after abstract specifications of parallel programs using TICC™-network, CIPs and TIPs, sequential programs for pthreads, and defining needed message subclasses used by those pthreads, and CIP initializations would be the only ones left, for programmers to implement in order to complete the implementation. These sequential programs are easily defined. We refer to the process of defining pthreads and CIP initialization as TIP and CIP refinement. TICC™-Ppde separates out the system design phase of building software systems from the refinement phase. The hard part of building parallel programs for applications in TICC™-Ppde is not programming but it is system decomposition, defining the TICC™-network, developing logical characterizations for pthreads, and validating designs and implementations.

As we shall see in Section 9, TICC™-Ppde simplifies the task of system decomposition by using a process called network-refinement, in which one begins a design with a top level compound cell, say CC, decomposes CC to a network of component compound cells, say $CC_i$ for $1 \leq i \leq k$, for some $k > 1$, define a network interconnecting $CC_i$ through pathways as needed, unwraps the encapsulation of CC exposing the resultant network, and iteratively applies this process to every $CC_i$. In this iterative process one keeps the encapsulation for a compound cell only if that cell is used more than once in an application, or a compound cell designed in one application is likely to be used in other applications.

ALLEOPs: ALLEOPs integrate structural information provided by the TICC™-network with computations specified by TIPs. They make explicit the control structure of parallel computations, synchronization and coordination that are implicit in the TICC™-network, the TIPs and Polling Cycles, and define partial ordering of time points postulated by time-maps. They present the integrated information in a form that is accessible to machine processing. For a human, they answer questions like the following: What does a pathway do? What is a TIP? What are polling cycles? What are communication patterns? The answers to these questions may go as follows: Pathway enables communication of signals between ports, performs synchronization/coordination of communications, provides access to exchanged messages, and activates parallel computations in the signal receiving cells. TIPs process/create messages, send/receive signals, and isolate methods used for message processing/creation from communications. Polling cycles, specify the order in which cells attend to TIP executions at their ports. Communication patterns arise because of choices made among alternate causal chains based on associated conditions, and activations of parallel tasks (forks) through parallel signal deliveries. Event patterns thus define patterns of branchings, forks and joins in control structures of parallel computations. Such patterns may be described using a regular grammar or other kinds of grammars that use ALLEOPs nodes as terminal symbols. ALLEOPs do not specify details of computations performed by cells. Each ALLEOP node represents an event class. Multiple instances of an ALLEOP node may occur in a causalnet.

Just as the same sequential program may be run with different data-structure definitions, the same collection of pthreads defined for an application may be run in parallel in different TICC™-networks for the same application. Thus, one may view TICC™-networks as abstractions of control structures of parallel computations, just as data-structures are abstractions of data manipulations in a sequential program.

Traces: Traces add information to ALLEOPs. They postulate virtual time points, associate them with event classes and time-maps that occur in ALLEOPs in a manner that is consistent with ALLEOP specifications. Thus they make explicit, timings that are implicit in ALLEOPs. Traces also define the semantics of computations performed by TIPs, by associating pre/post-conditions with actions and by characterizing exchanged messages, if any. For a human, they answer questions like the following: What does an action compute? Is an action being correctly executed? What events occur synchronously? What events are coordinated? The answers to these questions may go as follows: An action is defined by pre-conditions that characterize what should hold true before its execution in order for the action to succeed, and post-conditions that characterize what should hold true after the execution terminates. These pre-conditions and post-conditions may include in them characterizations of messages processed/created by the action. An action implementation is correct if it's pre-condition and post-condition are both satisfied at appropriate moments, every time the action is executed. Events with identical virtual time points are interpreted as occurring synchronously. Message dispatching events with identical virtual time points are coordinated events.

Causalnets: Causalnets are abstractions of traces that focus only on communication event occurrences in traces and their synchronization/coordination characteristics, ignoring all conditions and actions. They are generated by the SMS while an application is running. As explained in Section 8, Event Analyzer cells (ea cells) may analyze growing causalnets of applications in parallel with applications, while causalnets are being created by Event Builder cells (eb cells), with little or no interference with timings of on going operations in applications. Analysis performed by ea cells may be based on a priori defined event patterns, or event patterns that are dynamically learnt by the ea cells. It is even possible that patterns recognized by ea cells are used to direct computations performed in an application.

The partially ordered domain for an application is simply a representation of all possible causalnets that SMS may generate for all possible ways in which that application may run. It so happens, this domain together with a monotonic continuous mapping from the domain to itself, is sufficient to define the denotational semantics of TICC™-Ppde. This is consistent with π-calculus view: Logic is not needed for computations; communications with suitable hiding and substitution rules are sufficient. Logic is needed only to define and prove correctness of computations. That is why information provided by traces is needed in order to prove CTL-assertions. ECTs reorganize information in traces, and polling cycles and ECT-networks provide series/parallel combinations of port-ECTs in an implementation. They are used for proving CTL-assertions. We will see some examples in Section 7.

Implementations presented in Appendices I through III and proofs presented in Section 7 illustrate the perspectives outlined above. What is significant is that ALLEOPs are easily automatically derived by the system from implementation specifications. Traces are easily and automatically derived from ALLEOPs if pre/post conditions for actions are made known to the system. TICC™-Ppde provides tools for interactive development of pre/post-conditions for actions. Four features of TICC™-Ppde make this possible: (i) Organization of TICC™-network in terms of cells with attached ports, pathways with agents and optionally virtualMemories; (ii) Organization of computations in terms of TIPs, polling cycles, pthreads and protocols; (iii) Integration of computation and communication: each cell that performs computations also performs all of its communications, using protocols that use CCPs; and (iv) Mutual isolation of cells (discussed in Section 4.2).

4. More on Cells and Pathways 4.1. Attachments and Tuning

Attachments and tunings have a special significance in TICC™. Only attached or tuned components may freely share each others data and methods. Thus, attached and mutually tuned ports, cells, agents and virtualMemories may freely share each others methods and data.

Attachments: Only components connected to each other by branches or h-branches (hidden branches), or components attached to each other, may send signals to each other in the pathway. In FIGS. 1 through 5, ports are attached to their parent-cells, connected to agents and/or other ports by branches, and agents are connected to each other by h-branches (they are h-branches because agent interconnections cannot be dynamically changed, when pathways are dynamically modified). Thus, agents and ports, and pairs of agents, in a pathway may exchange signals and cells may send signals to their ports. As mentioned earlier, pathways allow signal transfers only in one direction at any given time, and components that exchange signals are always tuned to each other.

Tuning: Connecting a port, p, to an agent, a through a branch b, tunes p to a, by setting (i) the initial states of p and a, which enables them to exchange signals between each other, and (ii) transfers to p addresses of data and methods in virtualMemory a.vM attached to a, which is the same as the virtualMemory p.vM tuned to p. This enables the parent-cell of p to access data and pthreads in p.vM when the state of p is S. Tuning p to a also tunes its parent-cell to p.vM=a.vM. Since a cell may have several ports, the cell may have several virtualMemories tuned to it, distinct ones for distinct ports of the cell. Two agents are tuned to each other by connecting them with an h-branch, which sets their initial states. Application programmers do not have to rite any code to tune components on a pathway to each other.

Transaction Completion: As mentioned earlier, cyclic polling of ports in every cell guarantees that every service request sent to a port of a cell is sensed and responded to. No cell may be interrupted while it is responding to a service request. Cell senses and responds to interrupts only between successive TIP executions. These features, together with cell isolation described in the next subsection, guarantee transaction completion for every transaction, and guaranteed transaction completions maintain tunings between pathway components.

4.2. Cell Isolation

Cells perform computations by polling their ports and executing TIP-bodies defined at the ports. Since cells operate in parallel in distinct computing units, they provide a parallel pthread execution mechanism and do not use time sliced interrupt driven pthread executions. Pthreads and protocols are uniquely associated with cells and their ports. Each port of a cell may have pthreads and will have a unique protocol associated with it. Cell isolation is defined by the following two properties.

Private & Local Pthreads: While executing a pthread, a cell may only use data and methods defined in the cell, or components attached to or tuned to the cell. No other data or method may be used during TIP executions. In particular, operating system cannot interfere with TIP executions. Operating system is not used in TICC™-Ppde to either schedule or activate pthreads, or to synchronize or coordinate their executions, or to recognize and process interrupts. A pthread associated with a cell may not be executed by any other cell, even though copies of the same pthread may be executed in parallel by different cells, each in its own private memory or associated virtualMemory. A pthread execution can only change the state of the cell that executes it. These characteristics of cells are similar to those of Actors and π-calculus-Agents.

Parent-cells of ports in a port-group (see FIG. 19) may simultaneously execute the same pthread in the same shared virtualMemory of ports in the port-group. During such executions they may use common shared variables. We will see in Section 7.2 how pthreads are organized to block memory interference during such executions.

Using dedicated virtualMemories to execute pthreads and methods is unique to TICC™-Ppde. This is exploited in Section 10.2 to propose a new shared memory organization for multi-core chips.

Private & Local Protocols: Distinct ports have distinct protocols defined for them. A protocol defined at a port of a cell may not be executed by any cell other than the parent-cell of the port. While executing a protocol at its port, a cell executes CCPs and other action statements in the protocol over the pathway connected to that port (Section 8). Protocol execution does not cause the cell to execute any other thread or process, not defined in the protocol itself. Nor does it use data not already defined in the components of the pathway. Protocols do not use declarations. Distinct cells may execute in parallel only distinct protocols. As mentioned earlier, segments of protocols defined at the ports of a port-group are executed in parallel by parent-cells of the ports over the same group-to-group pathway (FIG. 19), as described in Section 8.

Protocols are methods defined at port instances, not port subclasses. In our prototype C++ implementation, this forced us to execute protocols interpretively, chasing through the components of a pathway. This contributed to considerable inefficiency due to repeated cache replenishments that occurred during protocol executions. Thus, even though it takes only 25 to 50 nanoseconds to execute a CCP in a 2 giga-Hertz machine, it took 350 to 500 nanoseconds to execute a protocol with four CCPs. This may be avoided by providing an Eval operator as defined in Section 10.2, which may be used to evaluate compiled protocols associated with a port, and eliminating use of cache memories.

4.3. Parallel Buffering, Parallel Messaging and Mobility

No Sequential Buffers Ever Needed: No generalPort C.g could send a second service request message to a functionPort D.f, as in FIGS. 1 and 2 for example, before C.g has received the response to the first service request sent by C.g. This holds true for all generalPorts and functionPorts in a TICC™ network. Therefore, no virtualMemory will ever hold more than one pending service request message at any time. Every pending service request message is preserved in its virtualMemory until the request has been sensed and responded to.

Similarly, every reply message is preserved in its virtualMemory until it is sensed and used by the message receiving cell. No virtualMemory will ever hold more than one reply message at any time. Each virtualMemory may hold at most one service request and one reply at any given time. Distinct ports connected to distinct pathways will have distinct virtualMemories associated with them. Thus, virtualMemories in a TICC™ network provide a parallel buffering mechanism for service requests and replies. This eliminates the need for sequential buffers. Unlike Actor systems, there are no buffer contentions to resolve, and serializers are not needed.

Parallel Message Transfers: We have already mentioned some of these. We will mention them again: (i) Each cell itself executes protocols needed for message exchanges, in parallel with other cells. (ii) No two distinct pathways share components in common. (iii) Each port is connected to only one pathway. (iv) It is never possible that both message sending and message receiving cells connected to a pathway simultaneously execute protocols associated with that pathway. (v) Finally, no protocol executes any thread or process not defined in the components of a pathway. Therefore, distinct protocols may be executed in parallel by distinct cells without mutual interference, whether they are over point-to-point or group-to-group pathways. Thus, the number of messages that may be simultaneously exchanged in parallel among cells in a TICC™-network is limited only by the number of active cells and number of distinct pathways in the network. CCPs keep pathway components isolated from cells and from each other.

Mobility: A sm-pathway connected to a port may be dynamically changed in order to introduce mobility, as long as the following pathway requirements are not violated: (i) No port may be connected to more than one pathway; (ii) no two ports of the same cell may be connected to the same pathway, unless the ports are in a port-vector (Section 5.2 and Section 8); and (iii) no two distinct pathways may share components. The message destination functionPorts of a sm-pathway may be disconnected from the sm-pathway and routed to different destination functionPorts, in the middle of a transaction. Parent-cells of the new destination ports may then process the service request message in the virtualMemory of the sm-pathway, write a reply message in that virtualMemory, and reconnect the sm-pathway back to its original destination ports, whose parent-cells may then modify the reply, if necessary, and send it to the generalPorts that requested the service. Thus, reply is always sent back through the same pathway that delivered the service request. GeneralPorts connected to a pathway cannot be changed dynamically in the middle of a transaction, but may be changed before a transaction begins. Neither generalPorts nor functionPorts connected to a dm-pathway may be dynamically changed in the middle of a transaction.

By transferring the entire contents of a virtualMemory, M, tuned to a port C.p of cell C, to a different virtualMemory, M', tuned to another port C'.p of another cell C', one may transfer to port C'.p the functions performed at port C.p. This feature is useful in computations distributed over several SMPs interconnected by TICCNET™, in which contents of virtualMemories are transferred through dm-pathways.

4.4. TICC™, H-calculus, Actors and CSP

TICC™ and Actors: In Actor systems, communication protocols invoke OS-methods and other processes that are external to Actors. Asynchronous communications require the use of sequential buffers. Serializers are needed to resolve buffer contentions. One cannot predict when a message sent by one Actor will arrive at a recipient Actor. Communications are not order preserving: messages may not arrive at destinations in the same order they were sent. Also, message transfer latencies are several orders of magnitude higher than in TICC™'

In TICC™, unlike Actor systems, communication is connection oriented. Communication may occur between two cells only if a pathway between the two had been already established. Cells execute protocols by themselves in order to exchange messages. Message sending and delivery times are in the hundreds of nanoseconds range, which may be precisely predicted with in given bounds. The only distinction between protocol executions and pthread executions in TICC™ is that protocols do not contain declarations, but contain CCPs. Protocols thus define a restricted form of computation performed by cells.

Besides transferring messages, protocols also transfer access rights to delivered messages and methods used to process delivered messages, enforce a priori defined security restrictions on message deliveries, and drive the SMS (Section 8). All of these take place with no operating system involvement. Communications are integrated with computations performed by cells; hence the name, TICC™, "Technology for Integrated Computation and Communication". Also unlike Actor systems, TICC™ supports group-to-group communications, automatic synchronization and coordination, and dynamic SMS (Self-Monitoring System). TICC™ eliminates the need for sequential buffers in asynchronous communications by using a parallel buffering mechanism. It is not possible to define an SMS in Actor systems like the one in TICC™-Ppde. TICC™ provides unique synchronization and coordination features not provided by Actor systems. Support for transactions is not intrinsic to Actor systems.

All but two of the above mentioned differences also hold between TICC™-paradigm and π-calculus.

TICC™ and π-calculus: Both in π-calculus and in TICC™-Ppde, parallel computations are specified as interactions among parallel computing units. Also, as in TICC™, communication in π-calculus is connection oriented. Names are exchanged between π-calculus-Agents through already established links, and just as pathways, links may be dynamically established. These are the only common features between π-calculus and TICC™-Ppde. Nothing else in the operation of TICC™-Ppde is similar to operations in π-calculus. Dynamic changes to pathway connections in TICC™ and dynamic changes to link connections in π-calculus seem to achieve different computational objectives, since changes made to a pathway in the middle of a transaction have to be reset to their original configuration before the transaction is completed. There is no concept of transactions in π-calculus.

The most important difference between TICC™ and π-calculus is the following: pathway protocols define communication as a Turing computation [Turing, 20] performed by interacting ndFSMs and executed by the same cells that process, build and send out messages. π-calculus does not specify a computational mechanism for communications. Indeed, it is impossible to specify the needed computational mechanisms using the π-calculus formalism. In this sense, π-calculus does not specify all of parallel computations. It specifies parallel computations only if communication is assumed as a given primitive.

TICC™ and CSP: We have already mentioned the differences. We will state them again. Pthreads in TICC™-Ppde correspond to Communicating Sequential Processes (Csps) in CSP. Unlike Csps, pthreads do not contain communication primitives. Only TIPs contain communication primitives. TIPs isolate communications from interacting pthreads. Also unlike CSP, where channels block interacting Csps, pathways do not block interacting pthreads. In addition, unlike CSP channels, pathways support both point-to-point and group-to-group asynchronous communications with automatic synchronization, coordination and data security enforcement. Concept of transaction is not built into CSP. Finally, it is not possible to define SMS (Section 8) in CSP.

Pair wise Independence of Pthreads: No method defined in one cell subclass may ever invoke and execute another pthread defined in another subclass, unless the subclass instances are attached to or tuned to the cell. Two cells running in parallel may, however, execute copies of the same method each in its own distinct execution environment. No method/pthread executed by one cell may change the state of another cell. Pairs of pthreads executed by different cells remain mutually independent of each other, except when pthreads are simultaneously executed in the same virtualMemory by different cells in a cell-group. Such pthreads coordinate their parallel activities using the scratchpad memory provided by the virtualMemory (Section 7.2); they have to be jointly developed and verified. All other pthreads may be independently and separately verified; majority of pthreads in a system are likely to be mutually independent.

5. More on TIPs and TICC™-Ppde 5.1. Spawning New Computations

It is common that a cell, C, with a service request at one of its functionPorts, C.f, could not by itself compute the response to a received service request. In this case C may have to spawn new computations in one or more other cells in order to compute the response. TIP with the following format is used for this purpose:

C.f:mR?( ){C.f:r(C.g); C.f:spwn?( ){ C.g:s( ); C.f:suspend( );}
 else { C.f:s( );}} (5.1)
C.f:suspend( ) is defined as,
{⟨C.f.state=S⟩($t_0$)}[•→ C.f:suspend( )($t_0$)]
{⟨C.f. input=φ⟩($t_1$)} (5.2)

where φ is the empty symbol. This prevents C from sensing the delivery signal at port C.f in its ensuing polling cycles. We saw this used in a different context, in the Talking & Itching example in Section 3.2. In (5.1) the pthread C.f:r(C.g)=C.f: msg:r(C.f,C.g) is defined in the subclass of message in the virtualMemory C.f.vM tuned to port C.f. C.f:spwn?( )=C.f. spwn, where C.f.spwn is a local Boolean variable associated with C.f. The truth value of C.f.spwn is set in C.f:r(C.g).

TIP (5.1) does one of two things: After executing the pthread, C.f:r (C.g), the TIP sends out message either via port C.g or via port C.f, depending upon the value of C.f:spwn?( ). The pthread, C.f:r(C.g) either writes a response message in C.f.vM and sets the Boolean variable, C.f.spwn=false, or writes a new service request message in C.g.vM and sets C.f.spwn=true. In latter case, C spawns a new computation in the cell that receives the service request sent via C.g and suspends its activities at port C.f. Suspending C.f resets the delivery signal at C.f.input=φ. Thus, polling will fail at C.f in ensuing polling cycles. After suspending C.f, C immediately proceeds to service its next port. Data and execution states in C.f.vM are preserved. C continues its activities at ports C.g and C.f only when it later senses a reply message at port C.g.

Notice, in (5.2), suspension at C.f does not change C.f.state. Thus, when a response is received at C.g and computations are resumed, C.f will be ready to send back a response.

Conditional statement with else-clause in (5.1), "C.f: spwn?( ){C.g:s( ); C.f:suspend( );} else {C.f:s( );}", is interpreted as follows:

selectOne{ C.f:spwn?( ){ C.g:s( ); C.f:suspend( );}
 ¬C.f:spwn?( ){ C.f:s( );}
 true{ }/*In this case C.f.spwn=φ*/}, where selectOne scans its conditions top to bottom and selects the one that evaluates to true. The last clause in selectOne is an unconditional escape clause. Thus, if C.f.spwn=φ then no message is sent out. This case will occur when the cell does not satisfy conditions required for sending a message. In this case, the pthread that set C.f.spwn=φ will reset C.f.input=s, if computations are to be resumed using the message received at port C.f, or C.g.input=s, if computations are to be resumed using the message received at port C.g. This will enable C to sense message at C.f or C.g in an ensuing polling cycle, and send message via C.f, or C.g after the cell satisfies required conditions (see Section 5.1.1).

When a message receipt is sensed at port C.g, in an ensuing polling cycle, C executes a TIP with a similar body as the TIP in (5.1), with the difference it now executes C.g:r(C.f) instead of C.f:r (C.g), using the message received at C.g, and the TIP repeats the same pattern of message transmission.

C.g:mR?( ){ C.g:r(C.f); C.g:spwn?( ){ C.g:s( ); C.f:suspend( );}
 else { C.f:s( );}} (5.3)

Spawning may thus be repeated as many times as needed, before a response is sent back via port C.f and the transaction is completed. Completion of transaction is mandatory in every such computation. Here, C.g:r(C.f)=C.f:msg( ):r(C.f, C.g) is defined in the subclass of message received at port C.g.

For each functionPort C.f the generalPort C.g, through which it may spawn new computations, is unique. No other functionPort of C, may use C.g. This is intended to prevent possible deadlocks which may otherwise occur. One may also note, any time C sends out a service request via C.g, the port C.g will be ready to send that message.

The cell to which C.g sends its service request may itself similarly spawn new computations. Also, C.g may broadcast its service request to a functionPort group. This may cause computations to spread over the network. Every cell, to which service request is so sent is mandated to respond to it and will always do so. Eventually all spawned transactions terminate and the response message is received by C.g. This response message at C.g will then be used by C to respond to the service request it received at C.f (or may be to spawn again).

5.1.1. ALLEOP and Trace with Alternates

We illustrate below occurrence of alternates in ALLEOP and trace due to branchings caused by choice points. We choose spawning computations specified by TIPs (5.1) and (5.3) as examples. Let us assume that port C.f in TIP (5.1) receives its message from port B.g at a time-point in T(B.g,1) and port C.g in TIP (5.1) communicates with the port D.f. ALLEOP for TIP (5.1) will then have the form, C.f:ALLEOP( ) = [C.f:ALLEOP-guard( ){C.f:ALLEOP-body( )}]
C.f:ALLEOP-guard( ) = [C.f:mR?(⟨C.f$^D$⟩[T(B.g,1)])]
C.f:ALLEOP-body( ) = [C.f:r(C.g) •→ //This sets C.f.spwn to true, false or φ.
 (C.f:spwn?( ){ C.g$^S$[T(C.g,0)]
  (⟨D.f$^D$⟩[T(C.g,1)]
   || •→...•→ D.f:ALLEOP( ))
  •→ C.f:suspend( )}      |
 ¬C.f:spwn?( ){ C.f$^S$[T(C.f,0)]
  →(⟨B.g$^D$⟩[T(C.f,1)]
   || •→...•→ B.g:ALLEOP( ))  |
 true{ })] (5.4)

In (5.4) the ALLEOP specifies alternates enclosed between parenthesis '( . . . | . . . | . . . )', separated by '|'. The pthread C.f:r(C.g) in (5.1) will also have alternates specified by choice points corresponding to the alternates in (5.4), as shown in (5.5) below:

C.f:r(C.g) = C.f:msg( ):r(C.g,C.f) =
 [<computations-1> //this sets up truth values for condn1 and condn2.
 selectOne{<C.f:condn1>?( ){ C.f.spwn=true;
   <write-msg-in-C.g.vM>}
  <C.f:condn2>?( ){ C.f.spwn=false;
   <write-msg-in-C.f.vM>}
  true{ C.f.spwn = φ; C.f.input = s;}}] (5.5)

Notice, when C.f.spwn=φ is set in (5.5), C.f.input is reset to s so that C may sense again the message received at port C.f in its next polling cycle. In (5.5) when message is sensed again, the entire C.f:tip( ) in (5.1) will be executed all over again. It is possible to resume execution of C.f:tip( ) from a specified address in the compiled code of C.f:tip( ). This is done by replacing 'C.f.input=s;' in (5.5) by 'C.f.suspendTip (resume);', which sets 'C.f.input=s;' and sets the address of instruction in the compiled code of C.f:tip( ) at which C.f: tip( ) should resume operations to resume (details in Section 10.2). The form of pthread C.g:r(C.f)=C.g:msg( ):r(C.f,C.g) is shown below The only difference is in the roles played by C.f and C.g:

$$
\begin{aligned}
&C.g\!:\!r(C.f) = C.g\!:\!msg(\ )\!:\!r(C.f,C.g) = \\
&\quad [\text{<computations-2> //this sets up truth values of condn1 and condn2.} \\
&\quad\text{selectOne}\{<C.g\!:\!condn1>?(\ )\{\ C.g.spwn=true; \\
&\qquad\qquad\qquad\qquad\qquad\text{<write-msg-in-C.g.vM>}\} \\
&\qquad\quad<C.g\!:\!condn2>?(\ )\{\ C.g.spwn=false; \\
&\qquad\qquad\qquad\qquad\qquad\text{<write-msg-in-C.f.vM>}\} \\
&\qquad\qquad\qquad\text{true}\{\ C.g.spwn = \phi;\ C.g.input = s;\}\}] \qquad (5.6)
\end{aligned}
$$

ALLEOP for (5.5) has the structure shown below with alternate specification:

$$
\begin{aligned}
&C.f\!:\!r.ALLEOP(C.g) = \\
&\quad [\bullet\!\to\!\ldots\bullet\!\to \text{ //this stands for <computations-1> in (5.5) that sets values for condn1 and condn2..} \\
&\quad \bullet\!\to (<C\!:\!condn1>?(\ )\{C.f.spwn=true \bullet\!\to \text{<write-msg-in-C.g.vM>}\}\ |\\
&\quad\ <C\!:\!condn2>?(\ )\{C.f.spwn=false \bullet\!\to \text{<write-msg-in-C.f.vM>}\}| \\
&\qquad\qquad\text{true}\{C.f.spwn = \phi \bullet\!\to C.f.input = s;\}\})] \\
&\qquad (5.7)
\end{aligned}
$$

The ALLEOP for (5.6) is similar to this.

5.2. Port-Vectors

Forks and joins occur when port-vectors are used. A port-vector, $C.\underline{p}=[C.p_1, C.p_2, \ldots, C.p_n]$, is a vector of ports of the same kind attached to the same cell c, either all functionPorts, or all generalPorts or all interruptPorts. In the TIP associated with this port-vector, the parent-cell of the ports in the vector will use a guard having the form, $C.\underline{p}\!:\!mR?(\ )$ (or $C.\underline{p}\!:\!pR?(\ )$) to check for messages (or to check port readiness), where $$C.\underline{p}\!:\!guard?(\ )=[C.p_1\!:\!guard?(\ )\&C.p_2\!:\!guard?(\ )\&\ldots\&\ C.p_n\!:\!guard?(\ )]\ or \qquad (5.8)$$

In the asynchronous case and in the synchronous case, $$C.\underline{p}\!:\!guard?(\ )^*=[C.p_1\!:\!guard?(\ )\&C.p_2\!:\!guard?(\ )\&\ldots\&\ C.p_n\!:\!guard?(\ )]^*. \qquad (5.9)$$

Thus, the cell begins to respond to signals at its port-vector only when the guard evaluates to true at all ports in the port-vector. If guard is not true for all the ports in the port-vector then the port-vector is skipped and the parent-cell begins to poll its next port in the asynchronous case, or in the synchronous case the parent cell repeatedly evaluates the guards until they become true.

In Tables 1 and 2, when g:mR?( ) or g:pR?( ) test is performed at a generalPort g the input signal g.input is reset to $\phi$. This resetting of input signal does not happen for the subclass of generalPorts $g_i$ that belong to a port-vector, $\underline{g}$. This specialization enables g:mR?( ) tests to be repeated in successive polling cycles before the test succeeds for all the ports in g in one of the ensuing polling cycles TIPs here have one of the forms:

$$
\begin{aligned}
&C.\underline{p}\!:\!guard?(\ )\{\ C\!:\!r(\underline{p});\ C.\underline{p}\!:\!s(\ );\}\ or \qquad &(5.10)\\
&C.\underline{p}\!:\!guard?(\ )\{\ C\!:\!r1(\underline{g},\underline{p});\ C\!:\!spwn?(\ )\{\ C.\underline{g}\!:\!s(\ );\ C\!:\!suspend(\underline{p});\} \\
&\qquad\qquad\qquad\text{else }\{\ C.\underline{p}\!:\!s(\ )\} \qquad &(5.11)
\end{aligned}
$$

$$
\begin{aligned}
&C.\underline{g}\!:\!mR?(\ )\{\ C\!:\!r2(\underline{p},\underline{g});\ C\!:\!spwn?\{\ C.\underline{g}\!:\!s(\ );\ C\!:\!suspend(\underline{p});\} \\
&\qquad\qquad\qquad\text{else}\{\ C.\underline{p}\!:\!s(\ );\ C\!:\!suspend(\underline{g});\}\}, \qquad &(5.12)\\
&C.\underline{p}\!:\!s(\ ) = C.p_1\!:\!s(\ );\ C.p_2\!:\!s(\ );C.p_2\!:\!s(\ );\ldots C.p_n\!:\!s(\ );\ p=f|g|i. \qquad &(5.13)
\end{aligned}
$$

response $C.p_i\!:\!s(\ )$ being mandatory only at functionPorts and interruptPorts $p_i$. The vector $\underline{g}$ in (5.11) and (5.12) is the vector of generalPorts through which the TIPs may spawn new computations in other ports, when needed. Ports in $\underline{g}$ do not overlap with the generalPorts that may exist in $\underline{p}$. In (5.11) ports in $\underline{g}$ did not have messages delivered to them. In (5.12), ports in $\underline{g}$ have messages delivered to them. In this case, when reply is sent back via $\underline{p}$, setting g.input=$\phi$ for every g in $\underline{g}$, would signify that the message received through $\underline{g}$ had been listened to and used. C:suspend($\underline{g}$) in (5.12) performs this task. The pthreads, C:r($\underline{p}$), C:r1 ($\underline{g},\underline{p}$) in (5.10) and (5.11), and C:r2 ($\underline{p},\underline{g}$) in (5.12) are here defined in the parent-cell of the ports in the port-vector. The port-vector C.$\underline{g}$ is reserved for the excusive use of ports in C.$\underline{p}$. Only the TIPs at $\underline{p}$ and $\underline{g}$ may use these ports.

Cell C may use messages from only a subset of C.p depending on computations defined in C:r($\underline{g},\underline{p}$) (or C:r($\underline{p}$)). Similarly, it may send out messages that spawn computations only through a subset of the ports in $\underline{g}$. In this case C will remember the generalPorts through which messages are sent out, so that it can later listen for responses only at those ports. C always responds to every functionPort and interruptPort in $\underline{p}$. It may be noticed, all the ports in C.$\underline{g}$ are always ready to send out messages whenever C sends them out.

Disjunctions are not allowed in guard expressions, except in the context of non-deterministic existential guards described in Section 5.4 below. We saw an example using a non-deterministic guard in Section 3.2. However, a disjunctive response to received messages is possible depending upon how C:r($\underline{g},\underline{p}$) (or C:r($\underline{p}$)) uses messages received at the ports in C.$\underline{p}$. Thus, it is possible that when a message is sensed at one of the ports of a port-vector, depending on the nature of that message, message received at another port of the same vector is ignored. An important difference between specifying a guard with disjunctions, and the port-vector method is that in the latter case response occurs only after all ports in the port-vector have received messages and are ready to send responses, and anticipated computational contingencies for disjunctive use are coded into the pthread. A reply is always sent back through every functionPort and interruptPort in the port-vector. An acknowledgement for message receipt would be sent even if that message was ignored. Thus transactions are always completed.

A consequence of this convention is that to introduce certain patterns of interactions among ports in a port-vector of a cell, like for example, where message at one port inhibits message at another port, it may be necessary to change an already coded pthread that is used by the cell to respond to messages received through that port-vector. We opted for this option, because avoiding disjunctions simplifies interaction specifications and analysis of implementations, and guarantees transaction completions.

5.3. Cycle Synchronization

Two ports p and q in a network are said to be cycle synchronized if one of them, say q, services its $n^{th}$ input message only after the other, p, has completed servicing its $n^{th}$ input message, and p services its $(n+1)^{st}$ input message after q has completed servicing its $n^{th}$ message, always maintaining this order of cyclic servicing of input messages. Cycle synchronization of a collection of distinct ports in a network forces activities at those ports to always occur in a prescribed order;

it also synchronizes servicing of successive messages in the sense that ports in the collection service their $(n+1)^{st}$ message only after all the ports have completed servicing the $n^{th}$ message. We refer to imposition of a fixed order of execution as coordination.

Cycle synchronization should be contrasted with temporal synchronization, where activities at a collection of ports are always forced to begin simultaneously at the same time. Whereas a collection of ports belonging to the same cell may be cycle synchronized, no collection of ports belonging to the same cell may ever be temporally synchronized.

5.3.1. Types of Coordination and Synchronization

Coordination: As mentioned earlier, in (5.11) and (5.12) it is possible that the parent-cell of a functionPort vector, f, spawns service requests only through a subset of generalPorts in its associated generalPorts vector, q. However, reply messages are always sent through all functionPorts in f. Thus, $(n+1)^{st}$ messages at ports in f are serviced only after all of the $n^{th}$ messages have been serviced. Ports in f are here cycle synchronized, because responses are always sent through the ports in f in an a priori fixed order, even though messages at f may all be serviced together. In contrast, ports in g are not cycle synchronized. As described in Section 5.5, dependent ports in a cell will always be cycle synchronized. Both of these examples of cycle synchronization perform coordination.

In group-to-group communications (Section 8), ports in a generalPort group G are always cycle synchronized, but ports in a functionPort group F are not. This is because, it is possible that a joint service request message sent by ports in G is delivered only to a subset of functionPorts in F. The particular subset of functionPorts to which a given joint service request message was delivered may depend on the message that was sent and on security specifications (examples in Sections 3.2 and 8). Agent that broadcasts message delivery signals to functionPorts F keeps track of the functionPorts to which message is delivered, and will expect responses only from those functionPorts.

Synchronous Joins and Forks: In a group-to-group communication the dispatch and delivery of messages that cause forks and joins are, respectively, coordinated and synchronized by agents in the group-to-group pathway, as described in Sections 2.3.3 and 8. Different cells in a cell-group may begin responding to a synchronously delivered message at different times, since the times at which response computations begin are not synchronized. However, since dispatch and delivery of messages are synchronous, we refer to these as synchronous joins and forks.

Asynchronous Joins and Forks: Messages received by ports in a functionPort vector, f, constitute a join operation and messages sent out through the generalPort vector, g, constitute a fork operation. These messages may arrive (depart) at different times and come from (go to) different cells. Since dispatch and delivery of messages are here asynchronous we refer to these as asynchronous forks and joins. However, note that response computations to messages received at the ports in a port-vector begin synchronously, after all the ports in the port-vector have received messages. Here, synchronization is done by the message receiving parent-cell of the port-vector, in a manner that is similar to rendezvous.

Ad hoc Synchronization & Coordination: In Section 7.6 (FIGS. 17 & 18) combinations of spawning, port-group and port-vector organizations are introduced in order to perform at any stage of refinement of an implementation, (i) cycle synchronization of events occurring at any given collection of distinct ports in a TICC™-network, or (ii) temporal synchronization of events at distinct ports of distinct cells, such synchronizations being done without having to change any of the refinements done up to that stage of implementation, and with little or no change in the timings of other events in the implementation. We refer to these as ad hoc synchronization and coordination, since they are done as an after thought.

As mentioned earlier, TICC™-Ppde requires no monitors, semaphores and no rendezvous [10,12,23,24] to be coded into programs written by application programmers, in order to coordinate, synchronize or schedule activities in parallel computations. We saw in Section 3 two examples of synchronization and coordination without implementers having to code use monitors, semaphores and rendezvous into application programs, and will see more in Section 7. Application programmers have responsibility only to specify the TICC™-network. It implicitly specifies all needed synchronization, coordination and scheduling for all parallel programs run on that network. Thus, the network makes the implemented application program, self-synchronizing, self-coordinating and self-scheduling.

All synchronization and coordination methods used in TICC™-Ppde are unique to TICC™-Ppde and new to programming technology.

5.4. Non-Deterministic Guards

A non-deterministic guard chooses one alternative from a specified collection. TIP has the form, $$\exists(C.p)(C.p=(C.p_1 \mid C.p_2 \mid ... \mid C.p_n))C.p{:}mR?(\;)\{$$
$$\text{selectOne}\{(C.p=C.p_1)?(\;)\{\;C.p_1{:}tip(\;);\}$$
$$(C.p=C.p_2)?(\;)\{\;C.p_2{:}tip(\;);\}$$
$$...\;...\;...\;...\;...\;...\;...\;...\;...\;...$$
$$(C.p=C.p_n)?(\;)\{\;C.p_n{:}tip(\;);\}\} \qquad (5.14)$$

Here p stands for (f|g|i). The first port with a delivery signal is chosen in a left to right scan of alternates in the guard. The cases have to be mutually exclusive, if the alternates included a functionPort or an interruptPort. Otherwise, message received at a functionPort or an interruptPort may not be responded to. As we mentioned earlier, this is not allowed.

In the TIP (5.14) let us assume, $C.p=C.p_i$, which is one of the alternate ports in the guard, receives its input message from $B.g_i$. ALLEOP of (5.14) will then have the form, with alternate causal chains of activities:

$$\exists(C.p)(C.p=(C.p_1 \mid C.p_2 \mid ... \mid C.p_n))C.p_i{:}mR?({}^\zeta C.p^D)[T(B.q_i,\#)]\{$$
$$(\;(C.p=C.p_1)?(\;)\{\;C.p_1{:}\text{ALLEOP-body}(\;)\} \mid$$
$$(C.p=C.p_2)?(\;)\{\;C.p_2{:}\text{ALLEOP-body}(\;)\} \mid$$
$$...\;...\;...\;...\;...\;...\;...\;...\;...\;...\;...\;... \mid$$
$$(C.p=C.p_n)?(\;)\{\;C.p_n{:}\text{ALLEOP-body}(\;)\} \qquad (5.15)$$

One may also have a synchronous guard, $\exists(C.p)(C.p_i=(C.p_1 \mid C.p_2 \mid ... \mid C.p_n))\;C.p{:}mR?(\;))^*$. In this case scanning of the guard is repeated until one port with a delivery signal is found. It is possible for this to succeed, since messages are delivered to ports of a cell in parallel with cell operations. This type of synchronous guard is used in the Ornamental-Garden solution, OG-solution, in Section 7.1. Other existential guards have the form, $$\exists(i)(1 \le i \le n)g_i{:}mR?(\;)\{\;\text{selectOne}\{(C.g_i=C.g_1)?(\;)\{\;C.g_1{:}tip(\;);\}$$
$$(C.g_i=C.g_2)?(\;)\{\;C.g_2{:}tip(\;);\}$$
$$...\;...\;...\;...\;...\;...\;...\;...\;...\;...$$
$$(C.g_i=C.g_n)?(\;)\{\;C.g_n{:}tip(\;);\} \qquad (5.16)$$

containing only generalPorts. In this case, the different cases need not be mutually exclusive, since it is not required that messages delivered to generalPorts should be responded to. Here also the first port with a delivery signal, in a left to right scan of the guard expression, is chosen. ALLEOP is similar to (5.15). A synchronous guard of this kind, $\exists(i)(1 \leq i \leq n)g_i$: mR?( )*, is used in the producer/consumer solution, PC-Solution, in Section 7.3.

5.5. Port Dependencies

Function Computed at a Port: Every cell has its own internal memory. It is the memory of the CPU that is assigned to that cell. The cell uses this memory to execute pthreads defined in the cell and to store its local state. For every port, C.f, when C executes the TIP-body, C.f:tip( ) the pthread it executes may compute the function, $$\xi_f(m_n, S_C[f, n-1]) = (m_n', S_C[f, n]) \tag{5.17}$$

where $m_n$ is the $n^{th}$ message received by port C.f, residing in the virtualMemory C.f.vM; $S_C[f, n-1]$ is the state of C relative to its port C.f at the end of execution of the $(n-1)^{st}$ message at C.f, $m_n'$ is the $n^{th}$ response message sent via port C.f, and $S_C[f, n]$ is the state of C relative to C.f after processing the $n^{th}$ message. We will use $P_p$ to denote the set of predicates defined on port p, and $P_C$ to denote the set of predicates defined on cell C: $\forall p \forall q (p \neq q \Rightarrow P_p \cap P_q = \phi)$ & $\forall p(P_p \cap P_C = \phi)$. $S_C[f, n] \subset (P_f \cup P_C)$ will contain the true predicates in $(P_f \cup P_C)$. The values associated with these predicates are kept in the local memories of the cell and the virtualMemory, C.f.vM. In (5.17) C.p:tip( ) can change the values of only the predicates in $(P_f \cup P_C)$.

Independent Ports: Every port that computes a function of the form (5.17) is an independent port of cell C if $S_C[f, n] \subset P_f$ with the proviso, $\xi_f$ cannot change the predicates in $P_C$ and cannot change predicates defined on any other port of cell C. A cell in TICC™-Ppde may have more than one such independent port. If C.f is an independent port of C, then it is possible to move C.f together with the pathway connected to C.f to a new duplicate cell, C', where C'.f receives the same messages that C.f receives and C'.f has the same functionality as C.f. In this case, all ports that are dependent on C.f (see (5.18) below) should be moved to C'. One may assign multiple independent ports to a cell C in order to keep the CPU assigned to C from becoming idle.

InterruptPorts are always independent ports, but they cannot be moved to another cell, since computations in a cell are started/stopped, suspended/resumed, or the ordering of ports in the cell changed, based on messages received through its interruptPorts.

Dependent Ports: For a port $C.f_1$ the function computed by $C.f_1$:tip( ) may have the form, $$\xi_{f1}(m_n, S_C[f_1, n-1], S_C[f_2, n-1]) = (m_n', S_C[f_1, n]) \tag{5.18}$$

where $S_C[f_2, n-1]$ is the state of C relative to another port, $C.f_2$ of the same cell. In this case, the port $C.f_1$ is said to be dependent on port $C.f_2$. $\xi_{f1}$ may use the predicates in $P_{f2}$ but cannot change any of them. This kind of port dependency is enforced by the TIP at $C.f_2$ with the following nested form:

$$C.f_2:mR?(\ )\{C.f_2:r(\ ).s(\ );C.f_1:mR?(\ )*\{C.f_1:r(C.f_2).s(\ )\}\} \tag{5.19}$$

Here, immediately after responding to a message at $C.f_2$, the cell waits at $C.f_1$ to receive a message there and responds to it. One may have arbitrary number of such nesting in a TIP. It is possible that $C.f_1$ and $C.f_2$ are mutually dependent on each other. In this case the TIP has the form, $$C.f_2:mR?(\ )\{C.f_2:r(C.f_1).s(\ );C.f_1:mR?(\ )*\{C.f_1:r(C.f_2).s(\ )\}\} \tag{5.20}$$

Here, $C.f_2$ responds to its message first, using the initial states relative to $C.f_1$ and $C.f_2$, and then $C.f_1$ follows suit. Next time $C.f_2$ responds to its message it makes use of the updated states relative to both $C.f_2$ and $C.f_1$ and this cycle of interaction repeats itself in the polling cycles of cell C. Clearly, ports $C.f_1$ and $C.f_2$ in (5.19) and (5.20) are cycle synchronized. In both cases, $C.f_1$:tip( ) is executed only inside $C.f_2$:tip( ). Thus $C.f_1$ is not polled in polling cycles of cell C.

Moving Dependent Ports: In FIG. 8, in the cell marked 'original', $C.f_1$ is dependent on $C.f_2$ as in (5.18). In the 'modified' version, the pathway at $C.f_1$ has been moved to port $C'.f_1$ of another cell, c', which contains the port-vector $C'.f = [C'.f_1, C'.f_2]$. The original port C.f is converted to a generalPort C.g and a pathway is set up between C.g and $C'.f_2$. The following TIPs at $C.f_2$, and the port-vector, $[C'.f_1, C'.f_2]$ may be used to account for the dependency between $C.f_1$ and $C.f_2$:

$$(C.f_2:mR?(\ )\&C.g:pR?(\ ))\{C.f_2:r(C.g).s(\ );C.g:s(\ );\} \tag{5.21}$$

$$(C'.f_1:mR?(\ )\&C'.f_2mR?(\ ))\{(C'.f_1:r(C'.f_2).s(\ );C'.f_2: s(\ );\} \tag{5.22}$$

Here, $C.f_2$ writes a message in C.g.vM and sends it out to $C'.f_2$. Clearly, $C.f_2$ and $[C'.f_1, C'.f_2]$ are cycle synchronized. It does not pay to separate mutually dependent ports.

The possibility of moving dependent and independent ports to new cells in this manner gives rise to the concept of canonical networks, where each cell contains only one independent functionPort or functionPort vector, and all other functionPorts are dependent on it.

Computations Dependent on Cell State: The function computed by C.f:tip( ) may also have the form.

$$\xi_f(m_n, S_C[n-1], S_f[n-1]) = (m_n', (S_C'[n], S_f[n])) \tag{5.23}$$

where $S_C$ is the state of the cell C and $S_f$ is the state of port C.f. Here all the ports of C that share the state of the common parent-cell are dependent on each other but they are not cycle synchronized. As before, C.f:tip( ) may only change the predicates in $(P_C \cup P_f)$. In the Dining Philosophers solution in Section 7.4, all functionPorts of butler are dependent on the state of the butler. In this case, the output messages produced by a cell are dependent on the order in which the input messages are processed. Since in any one polling cycle of a cell, not all of its ports may have messages delivered to them, and message sensing is not synchronized with message deliveries; this is a source of non-determinism in TICC™-Ppde. As mentioned earlier, it is intrinsic to parallel computations in TICC™-Ppde.

A functionPort f and a generalPort g of a cell may be mutually dependent on each other, as in the spawning TIPs (5.2) and (5.3). Here, port f leads the dependency, since g can have a message delivered to it only after it has spawned a computation, which it may do only in f:tip( ). A cell may use the generalPort dedicated to one of its functionPorts to get data from a database, or from the internet. A cell may also use its generalPorts not dedicated to any functionPorts, to gather data for later use, as in the Produce/Consumer example in Section 7.3.

TIP forms introduced in Sections 2, 3 and 5 are the only forms of TIPs used in TICC™-Ppde. There are a total of 12 TIP-forms, five of them synchronous and five asynchronous. A TIP may have other TIPs embedded in its body and each TIP sends out zero or more messages. Let us refer to, TIPs at the ports of a cell that are polled by the cell in its polling cycles are the polled TIPs and polled ports, and the rest embedded TIPs and embedded ports. At any given time, in all cases, each cell executes only one polled TIP together with all its embedded TIPs. A cell executes its next polled TIP only after completing the execution of the current polled TIP, or after performing a programmed suspension of the current polled TIP.

Polled TIP executions are mutually exclusive, Each port-vector, C.$\underline{p}$, has one common TIP, C:tip ($\underline{p}$), defined for all the ports in the vector, and one common state, $S_C$ [$\underline{p}$,n] defined for all of them. C:tip($\underline{p}$) can change any of the predicates in $P_{\underline{p}}$ or $P_{\underline{p}} \cup P_C$, depending on its functionality.

In all cases, the number of TIPs simultaneously executed in parallel by cells in a TICC™-network, and the number of messages simultaneously exchanged in parallel, may be only as large as the number of active cells in the network.

5.6. System Architecture

It is instructive to contrast system organization in TICC™-Ppde with conventional system organization. FIG. 9A illustrates the conventional architecture for concurrent/parallel thread/process executions, in coarse grained parallel programming. Libraries provided by MPI [25,26], PVM [27] and networks provided by Ethernet [22] or Myrinet [28] are used for communications. Actor systems assume this architecture. There are significant overheads for scheduling, communication, synchronization, and coordination, and process and thread management in these systems, with attendant loss of efficiency. TICC™-Ppde does not waste time on scheduling, coordination, synchronization and pthread management.

Real-Time Performance: There are only three kinds of operations that any cell in TICC™-Ppde performs: (i) polling and ordering ports (ii) pthread execution and (iii) protocol execution. It takes only 15-50 nanoseconds to poll and sort a port in TICC™-Ppde, with a 2-gigahertz computer. Message exchanges are self-scheduling, self-coordinating and self-synchronizing. Pthreads and cell activations are self-scheduled as well. They are automatically activated when delivered messages are sensed, or when a p:tip( ) is executed in the order specified by sorted-ports-list (see (2.1)). As shown in FIG. 9B, no operating system is needed to perform these operations. All messages are sent as soon as they are ready to be sent. Every cell may send a message in parallel with every other cell, at any time it is ready.

We call this real-time performance, since all available real-time is used for performing computations in an application, and no time is wasted on scheduling, coordination and synchronization sessions, or any other kind of overhead. No sequential buffers are ever used. The virtualMemory organization minimizes memory interference in shared-memory operations (Sections 7.2 and 10.2). These allow for efficient execution of parallel programs in TICC™-Ppde. Conventional organizations shown in FIG. 9A do not provide this kind of real-time performance.

Predictability: Established speed up technologies like multiple instruction-stream executions [29], look-ahead scheduling [30], pipe-lined processing [31] and cached executions [32] 2199 make it impossible to predict thread activation and execution times, and message dispatch and delivery times [Lee et al, 33-36]. These techniques are not needed in TICC™-Ppde, in order to get high throughputs. High throughputs may be achieved in TICC™-Ppde through arbitrary scaling of low grain sized computations. We have predictable message exchange latencies and pthread execution times in TICC™-Ppde. Pthread activation times are predictable with in bounded time limits. Timing is built into the event based TICC™-Ppde models of computation.

Synchronization & Coordination: TICC™-Ppde provides novel methods for coordination and temporal synchronization of events in an application without need to use monitors, semaphores or rendezvous [10,12,23,24]. These are illustrated in the examples in Sections 3 and 7 and discussed in Section 7.6, and are unique to TICC™-Ppde.

Event Based Models: As we saw in Section 3, and shall see more in Sections 7, 8, the most important characteristic of TICC™-Ppde is that it automatically generates event based models of computations from implementation specifications, and these models are used for static verification of the system through symbolic evaluations, and also used for dynamic self-monitoring by SMS. These features are unique to TICC™-Ppde.

Event based semantics make TICC™-Ppde well suited for building real-time cyber physical systems and embedded systems using multi-core chips, with precisely timed operations, if cache memories and other speed-up ornamentations are avoided. These simplify CPU design in multicore-chips.

Before we proceed with examples that illustrate methods used to construct ALLEOP-proofs, it is useful to define the nature of computation and communication in TICC™-Ppde, events and causal relations, OO-organization and the notation. This we do in the next section.

6. Names, World States, Evaluators and Events 6.1. The OO-Structure

We begin with a finite set of names. Names are concatenations of symbols in a finite alphabet. Let <names> refer to this set of names. Each name in <names> denotes something unique. Items denoted by names are called containers and objects. There are three sets here: <names>, <containers> and <objects>. We use meta-symbols x, y, etc., to refer to names in <names>. We use meta-symbols $\Delta$x, $\Delta$y, etc., to refer to containers denoted by x, y, etc. In this case, we write x.denotes=$\Delta$x and $\Delta$x.denotedBy=x, and say x E<container-names>. We use meta-symbols b, c, etc., to refer to <object-names>, $\delta$b, $\delta$c, etc., to refer to objects denoted by b, c, etc. We write, b.denotes=$\delta$b=b.value, and $\delta$b.denotedBy={b}=$\delta$b.valueOf; '{b}' is used here, since in general there could be more than one name denoting the same object. <Objects>∩<containers>=$\phi$ and <container-names>∩<object-names>=$\phi$, (<object-names>∪<container-names>)=<names>. Denotation is defined by a many to 1 mapping: <names>→<objects>∪<containers>. It is possible that $\delta$b≡b or $\delta$b≡c; the value of an object-name may be identical to the name itself, or another object-name. Thus, (<Objects>∩<object-names>)={(<object-names>c|∃(<object-names>b)(b.value=$\delta$b≡c)}.

When several container-names denote the same container $\Delta$x, we will set one of those names, say name z, as the distinguished container-name of that container, and set $\Delta$x.denotedBy=z. When several object-names denote the same object, $\delta$b, then we set $\delta$b.denoteBy=$\delta$b.valueOf={c|c.value=$\delta$b}. We define the following predicates for names, x:name?( )⇔x∈<names>; x:container?( )⇔x.denotes∈<containers>, which is the same as saying x∈<container-names>; x:object?( ) ⇔x.denotes∈<objects>, which is the same as saying x∈<object-names>. We use three distinguished objects, respectively called true, false and $\phi$ with the property, $\delta$true=true, $\delta$false=false and $\delta\phi$=$\phi$; $\phi$ is the empty object. These are called constants, since the values of these object-names may never be changed: For any name, x, x:constant? ( )⇔x∈<constant-names>⊂<object-names>, and $\delta$x∈<constants>⊂<objects>.

We assert (x≡y) iff the two names are identical to each other and assert (x≅y) if ($\Delta$x≡$\Delta$y) or ($\delta$x≡$\delta$y), i.e., x.denotes≡y.denotes. One may read (x≅y) as 'x congruentTo y'. Two names x and y are distinct iff ¬(x≅y). For two sets of names $S_1$ and $S_2$, [$S_1 \subset S_2$⇔∀(x∈$S_1$)∃(y∈$S_2$)(x≅y)] & [$S_1 \cong S_2$⇔$S_1 \subset S_2$ & $S_2 \subset S_1$]. $S_1 \cap S_2$ and $S_1 \cup S_2$ are similarly defined. Notice use of congruent relation here.

Every container has the property that it can contain either an object or another container. We write $\Delta$x.contains=$\delta$b or $\Delta$x.contains=$\Delta$y, ¬($\Delta$x≡$\Delta$y). Objects cannot contain anything: $\forall(\delta x)\delta x.contains=\phi$. We say an object $\delta x$ resides in a container $\Delta y$ if $\Delta y.contains=\delta x$ and write $\delta x.residesIn=\Delta y$. Every object has to reside in some container; there are no free floating objects. Two objects that are identical to each other, but reside in distinct containers are called copies of each other.

For $z \in (<names> \cup <objects> \cup <containers>)$ we define method, z:eval( ):
z:eval( )= [(z∈<objects>?( ){Z} | z∈<containers>?( ){z.contains:eval( )} |
z:object?( ){δZ} | z:container?( ){Δz:eval( )}] (6.1)

Equality: Equality of names, objects and containers is defined as follows:

$((\delta x=\delta y) \Leftrightarrow (\delta x\equiv\delta y))$, $((\Delta x=\Delta y) \Leftrightarrow (\Delta x\equiv\Delta y))$, and
$((x=y) \Leftrightarrow ((x \equiv y) \vee (x:eval( ) \equiv y:eval( ) \neq \phi)))$ (6.2)

This definition of equality may be extended to define $(x \in X)$ for a set x, and $x=Y$, $X \subset Y$, $x \subset Y$, $X \supset Y$ and $X \supset Y$ for sets X and Y. Notice, $((x=y) \overline{\&} (x:eval( )=\phi))$ is possible in (6.2); $(x \equiv y) \Rightarrow (x=y)$ but the converse is not true.

One may think of containers $\Delta x$ as memory-cells and container-names x as pointers (addresses) of those memory-cells. One may think of each $\delta b$ as the encoding (bit-string) that represents the object, b, and resides in a memory-cell. A pointer points to an object only if the encoding of that object resides in the memory-cell pointed to by that pointer. Objects in containers (memory-cells) may be modified without having to change copies of those objects, which may exist in other memory-cells. We refer to the terms, "denotes", "valueOf" and "contains" as attribute-names, and "x:attribute-name" as an attribute. Terms "object?( )", "constant?( )" and "container?( )" as predicate-names and x:predicate-name?( ) as a predicate. For any x:attribute, (x:attribute-name)?( ), is a predicate, which is true iff x:attribute:eval( )=name:eval( ). Term "eval( )" is a method-name and the term x:eval( ) is a method. We will be introducing more attributes, predicates and methods defined for names as we encounter them, in our discussion below.

Orderings: For $S \subset <objects>$ with an ordering relation, $<$, defined on its elements, and names x and y, $(x<y) \Leftrightarrow [x:eval( ) \in S \& y:eval( ) \in S \& x:eval( )<y:eval( )]$ (6.3)

It is possible that $\phi \in S$. Usual definitions apply for $(x \leq y)$, $(x>y)$ and $(x \geq y)$.

Structures: If b has an indexed structure and for a name, x, $x:eval( )=\delta b$ then $x[i]=\delta b[i]=b[i]$ for i in the range of indices of b, else $x[i]=\phi$. However, $x[i]=\phi$ does not imply that i is out of the range of indices of b, since it is possible that the value of b[i] is $\phi$. An x[i] itself may have an indexed structure, x[i][j]. If b is a structure with attributes and b.atbt is defined for it, and $x:eval( )=\delta b$, then $x.atbt=b.atbt=\delta b.atbt$, and $x.atbt=\phi$ if b.atbt is not defined or $\delta b.atbt=\phi$. It is possible that b atbt itself has an attribute, $b.atbt.atbt_1$. Then, $x.atbt.atbt_1=b.atbt.atbt_1=\delta b.atbt.atbt_1$.

Groupings of Names: Every name, x, has a method, x:names( ), defined for it; x:names( ) is the set of all names associated with x. It will include x, all x attributes, x:predicate?( )s and x:method( )s defined for x, and may in addition contain other names as well. Since, $\{x\} \subset x:names( )$, it is never empty. For two distinct names x and y, it is possible that $x:names( ) \cap y:names( ) \neq \phi$; $\phi:names( )=\{ \}$. For any name x the closure of x:names( ), written as [x:names( )], is $[x:names( )]=\cup \{[y:names( )] | y \in x:names( ) \& \neg (y \equiv x)\}$
$\cup \{x\}$ (6.4)

Typing of Names: A name may have a type associated with it, such as integer, number, truthValue, string, set, structure, class, etc. <Type> is the set of all type names. The method, x:type( ) is used to refer to the type of name x: x:type( )= $\Delta x:type( )=x:eval( ):type( )$, and b:type( )= $\delta b:type( )$; $\phi:type( )=\phi$. Each type denotes a subset of names in <name>: type: names( )=$\{x | x:type( ) \equiv type\} \subset <names>$. Clearly, type:type ( )=$\Delta type:type( )=\Delta type.contains:type( )$=set. $Type_1$ is a subtype of $type_2$ iff $(type_1 \subset type_2) \Leftrightarrow (\Delta type_1.contains \subset \Delta type_2.contains)$. Thus, (integer $\subset$ number) holds. $Type_1$ and $type_2$ are distinct if $(type_1 \cap type_2)=\phi$. Two types neither of which is a subtype of the other, should be distinct. We use the usual conventions for inheritance within a type/subtype hierarchy, abstract types, etc. The OO-structures of names associated with a system S is outlined below.

The OO-Structure of a System S: Let $W_S(t)$ be the world-state of system S at time t.

$W_S(t) = (\{(x,\Delta x) | x:container?( ) \& x.denotes=\Delta x \& x \in S:names( )(t)\} \cup$
$\{(b,\delta b) | b:object?( ) \& b.value=\delta b \& b \in S:names( )(t)\} \cup$
$\{(\Delta x,\Delta x.contains) | \exists b \exists y [(x,\Delta x),(y,\Delta y),(b,\delta b) \in W_S(t)) \&$
$(x,y,b \in S:names( )(t)) \&$
$((\Delta x.contains=\delta b \vee$
$(\neg(\Delta x=\Delta y) \& \Delta x.contains=\Delta y)))]\})$ (6.5)

We use only discrete time: Each time point, t, is a positive integer. If $(t_1<t_2)$ then $W_S(t_1)$ is the immediate predecessor of $W_S(t_2)$, $W_S(t_1)<W_S(t_2)$ iff there are no other time points t' such that $W_S(t')$ exists and $(W_S(t_1)<W_S(t')<W_S(t_2))$. We use x(t) to assert that $(x,\Delta x) \in W_S(t)$ and $\exists(b) (b.denotes=x:eval( ))$ and refer to x(t) as the access predicate; $x(t)=[x, \Delta x, x:eval( )]$, if x is a container-name. For an object name, b, $b(t)=[b, \Delta x, \delta b]$ such that $\Delta x.contains=\delta b$. It is possible that $x:eval( )=\phi$. We say access predicate x(t) is true if an evaluator (subsection 6.3) has accessed the triplet $(x, \Delta x, x:eval( ))$ from world state $W_S(t)$. Other event predicates are, $(x=y)(t)$, which asserts that $(x=y)$ was found to be true in $W_S(t)$, and similarly for $(x<y)(t)$, $(x>y)(t)$, $(x \leq y)(t)$ and $(x \geq y)(t)$. Predicates relating sets, indexed names and structured names are also used: $(x \in Y)(t)$, $(X \subset Y)(t)$, etc. Predicates have an ordering: $x(t_1)<y(t_2)$ iff $(t_1<t_2)$. Notice, $(x<y)(t)$ is not the same as $x(t_1)<y(t_2)$; It is possible that $((x<y)(t_1)<(y<z)(t_2))$ for $(t_1<t_2)$. Time parameter is omitted if it is not important.

Let S:cells( ) denote the set of all cells in system S. For port C.p of cell C, C.p.a is the unique agent tuned to C.p; C.p.pathway is the unique pathway connected to C.p; C.p.pathway.vM=M=C.p.vM=C.p.a.vM∈C.p.a.vMs, since a cell C may have many virtualMemories tuned to it, one for each port attached to C. M is the unique virtualMemory of C.p.pathway that is tuned to C.p.M.a[i] is the $i^{th}$ agent attached to M. M.ports[i] is the $i^{th}$ port tuned to M; a.ports[i] is the $i^{th}$ port tuned to agent a; C.ports[i] is the $i^{th}$ port attached to cell C. C.p.ndFsm is the ndFSM embedded in C.p. C.p.a.ndFsm is the ndFSM embedded in C.p.a. C.vMs=$\{C.p.vM | (C.p \text{ attachedTo } C)\}$. If C.p is connected to a dm-pathway then C.p.pathway.vMs is the vector of all virtualMemories in the dm-pathway; C.q.vM∈C.q.pathway.vMs for every port C.q connected a dm-pathway. Finally, a.nxt[i] is the $i^{th}$ next agent tuned to agent a. The vector, M.ports=$\cup[M.a[i].ports | 0 \leq i<M.a:size( )]$. Agents, virtualMemories and ports are the pathway components. The following names are associated with C.p.pathway:

C.p.pathway:names( ) = C.p.vM:names( ) $\cup$
$\cup\{C.p.vM.a[i]:names( ) | 0 \leq i<C.p.vM.a:size( )\} \cup$
$\cup\{C.p.vM.ports[i].ndFsm:names( ) | 0 \leq i<C.p.vM.ports:size( )\}$ (6.6)

Here, C.p.vM:names( ) will contain all names defined in the messages, predicates, methods and attributes that reside in C.p.vM. Notice, not all C.p:names( ) are in C.p.pathway: names( ), only C.p.ndFsm:names( ) are included.

For every port C.p attached to cell C, $$C.p.ndFsm:names(\ ) \subset C.p.pathway:names(\ ), \quad (6.7)$$

$$C.p.ndFsm:names(\ ) \subset C.p:names(\ ) \subset C:names(\ ), \quad (6.8)$$

Thus, C:names( ) and C.p:names( ) do not contain all the names in C.p.pathway:names( ); they only contain C.p.ndFsm:names( ). At compile time the evaluator $E_C$ is given access to all names in [C:names( )]. For any two pathways and distinct cells, $C_1$, $C_2$, and any two ports, p and q, the following holds true:

$$[C_1:names(\ )] \cap [C_2:names(\ )] = \phi, \quad (6.9)$$
$$(p.pathway:names(\ ) \cong q.pathway:names(\ )) \Leftrightarrow (p \leftrightarrow q) \quad (6.10)$$
$$\neg(p \leftrightarrow q) \Leftrightarrow ((p.pathway:names(\ ) \cap q.pathway:names(\ ) = \phi), \quad (6.11)$$

where (p↔q) asserts that p and q are connected by a pathway. Notice the use of the congruent relation '≅' in (6.10). Thus for two names x, y x∈p.pathway:names and y∈q.pathway:names, when (p↔q) is true, it is possible that ¬(xy) but (x≅y), i.e. they both denote the same container. In the case of (6.11) the pathways are distinct. Similarly, (6.9) asserts that no two cells share any name that are congruent to each other. Distinct cells and distinct pathways never share containers. The invariant (i.e., compile time) OO-structure of names in S:names( ) of a system S, may now be defined as follows:

$$S:names(\ ) =$$
$$\cup\{C:names(\ )|C \in S:cells(\ )\} \cup$$
$$\cup\{C.p.pathway:names(\ )| C \in S:cells(\ ) \& (C.p\ attachedTo\ C)\} \quad (6.12)$$

World states are compartmentalized into C:names( ) and C.p.pathway:names( ), which overlap with each other only at C.p.ndFsm:names( ). This overlap together with access dynamically made available during protocol evaluation enables communication among ports connected by pathways (details in Section 10.2). A refinement of this structure is used to facilitate definition of methods. In the case of dm-pathways ndFSMs in the pathway are connected to each other by signal lines and virtualMemories are connected by data lines. Signals and data are exchanged among containers in a dm-pathway via these lines, coordinated by CCPs in dm-pathway protocols.

6.2. Conditions, CTL-Statements and Proofs

Conditions: We use the term 'guard' to refer to predicates and predicate expressions that test for signals or states of ports, use 'state' to refer to predicates and predicate expressions that describe states of ports, cells and agents, and use 'condition' as a generic term to refer to all predicates and predicate expressions. A condition is any well-defined first order expression containing predicates with logical connectives and quantifiers, or it is a Boolean expression of predicates. Only individual predicates may be negated, not entire predicate expressions. Quantifiers range over finite sets. All conditions end with the suffix '?( )'. A condition is always evaluated in a world defined by the names in [x:names( )], where x is a cell, port, agent, virtualMemory or message.

CTL-statements: A CTL-statement (Causal Temporal Logic statement) is a combination of conditions, evaluations (described later below), and event instances, with temporal modal operators, □ (always) and ◊ (eventually), and causal connectives, →, •→ (described below), using quantifiers, ∀ and ∃ with the usual syntax. ALLEOPs and traces we have seen so far are examples of simple CTL-statements. More examples appear in later sections. Negations may appear only on individual predicates, guards and event instances, and not on evaluations and expressions as a whole. A negated event instance is interpreted as "the event instance should not occur". Event instances have the status of both constants (two event instances are equal to each other if and only if they are identical to each other) and predicates. Quantified variables ∀ and ∃ may range over event instances, virtual time points, and other objects appearing in a CTL-statement. Quantifiers always range over a priori known finite sets. We will not describe here the syntax of CTL-statements.

Proofs: Proofs do not involve making logical deductions on CTL-statements, but only involve symbolic evaluation of CTL-statements over given ECT-networks. We will see examples of ECT-networks and proofs in Section 7.

6.3. Evaluators, Events & Causation

Evaluators: There is a structured constant called evaluator. A system may have arbitrary but finite number of evaluators, E[i], for 0≦i<N>0. We will never encounter a need to refer to evaluators explicitly in our discussions. But the concept is important. In TICC-Ppde there is an evaluator (CPU) associated with every cell and all evaluators operate in parallel, interacting with each other only through message exchanges. Let $E_C$ be the evaluator of cell C. Evaluators perform computations, by creating/destroying names, containers, objects and encodings, modifying encodings, placing encodings in containers, placing containers in other containers, moving objects/containers from one container to another, moving containers from one name to another, and setting access rights to containers, and accessing objects (their encodings) from world states. These are the action and access events. Computations performed by evaluators cause access and action events to occur. When evaluator $E_C$ accesses a name x from $W_s$, it will add the triplet, (x, Δx, x:eval( )) to $E_C$.accessedItems list. At the end of an evaluation it may use the elements in $E_C$.accessedItems to perform a consistent update of $W_S$ and then destroy its private $E_C$.accessedItemslist.

A name x, is created (destroyed) in a world-state $W_S(t)$ by an evaluator, if x(t) is true (false) but x(t') is false (true) in the immediate predecessor $W_S(t')$. The general convention is, a predicate is true in $W_S(t_2)$ if there is a $t_1 \leq t_2$ such that the predicate is true in $W_S(t_1)$, and there is no t', $t_1 < t' \leq t_2$ such that the predicate is false in $W_S(t')$. Thus, names exist in world states until they are destroyed, and predicates maintain their truth values until they are changed.

6.3.1. Access Rights, Data Protection and Communications

Protocols: The only difference between communication and computation is that communication protocols may not create/destroy containers. They can modify signals and states of ndFSMs in a pathway, as it happens in the protocols we have seen so far. As we shall see in Section 8, protocols may also modify certain a priori defined data associated with ports and agents in a pathway. These are the only data that protocols may modify. This is because, protocols do not contain declarations. Protocols cannot modify messages or other data in virtualMemories. Thus, communication is simply a restricted form of computation, with the difference that communication transfers besides signals, also access rights to evaluators.

Access Rights and Communications: Consider an evaluator $E_C$ of cell C, and a pathway C.p.pathway. Let $E_C$.hasAc cessTo(t), specify the set of all names $E_C$ can access at time t. $E_C$.hasAccessTo(t) at the time $E_C$ is executing C.p:tip( ) is:

$$E_c.hasAccessTo(t) = E_c:names(\ ) \cup C:names(\ ) \cup C.p.pathway:names(\ )(t) \cup$$
$$\cup \{C.q.pathway:names(\ )(t) | (C.q.state = S)(t)\} \cup$$
$$\cup \{C.q.pathway:names(\ )(t) | (C.p \leftrightarrow C.q)(t)\} \qquad (6.13)$$

Here, $E_C$.hasAccessTo(t) is a function of time because the virtualMemory of C.q.pathway may contain different messages at different times and also the pathway and messages may change dynamically. Access rights for the names in C.q.pathway:names 0 are transferred to $E_C$ only when C.q is in state S. For any two cells C1 and C2, if C1.p↔C2.q is true and a message is being exchanged between C1.p and C2.q, then exactly only one evaluator, either $E_{C1}$ or $E_{C2}$, will have access to C1.p.pathway:names( )≅C2.q.pathway:names( ), since only one of them will be in state S, and the evaluator of the cell that delivers message will have access to both C1.p.ndFsm:names( ) and C2.q.ndFsm:names( ). This enables communication between the ports C1.p and C2.q.

Transfer of Access Rights: As described in Tables 1 and 2 a port always changes its state to S when a signal is sensed and the port becomes ready to send out a message. Thus in TICC™, receipt of a message/signal by a cell C automatically transfers access rights to evaluator $E_C$. Cell C begins execution of C.p:tip( ) at one of its ports C.p only after acquiring this access right. Access is revoked only when $E_C$, completes execution of C.p:tip( ) Mechanisms for doing these are described in Section 10. Polling C.p accesses only the names defined in C.p.ndFsm:names( ) and access to these names are always made available to $E_C$. However, delivering a message from port p to port q accesses both C.p.ndFsm:names( ) and C.q:ndFsm:names( ). Access to both of these becomes available to an evaluator at message exchange time. We use this property in Section 10.2 to propose a new shared-memory organization that exploits virtualMemories.

Evaluations: Evaluators have the property that they can evaluate actions, events and names. Action is always a method, protocol or condition, or simply a statement in a programming language: a declaration, assignment, conditional (like if-then-else and selectOne) or a while-loop or a bit/string-manipulation statement. A declaration appearing in a method y:A( ) defined in a cell, message, port, agent or virtualMemory, y, introduces triplets (x,Δx,x:eval( )) into y.A:world( )(t) for the declared name, x. We use declarations also to destroy and remove names from y.A:world( )(t). In addition y.A:world( )(t) contains (x,Δx,x:eval( ))|∀(X) (X ⊂ (y:names ( )∪A:names( )) & (x∈X:names( ))); y.A:world( )(t) will also contain the compiled code for y:A( ) and will contain names that are dynamically created while y:A( ) is being executed. Protocols are actions with the difference that they do not contain declarations and string-manipulation statements but do contain CCPs. Thus, protocols do not dynamically create or destroy containers or manipulate strings. Methods usually do not contain CCPs.

We use $\rightarrow_a$ for access evaluation $\rightarrow_e$ for action evaluation, with the following notations:

| | | |
|---|---|---|
| Access Completed at time t: $[\langle\rightarrow_a x\rangle(t)]$ | and | |
| Access Started at time t: $[\rightarrow_a x(t)]$ | | (6.14) |
| Eval Completed at time t: $[\langle\rightarrow_e x:A(\ )\rangle(t)]$ | and | |
| Eval Started at time t: $[\rightarrow_e x:A(\ )(t)]$ | | (6.15) |
| Eval Completed at time t: $\langle x:C?(\ )\rangle(t)$ | and | |
| Eval Started at time t: $x:C?(\ )(t_1)$ | | (6.16) |

Applying an evaluator to a name x, action x:A( ), or condition x:C?( ) may cause new events (described below) to occur, which may in turn cause other evaluations and occurrences of other events. For this reason, we refer $\rightarrow_a$ and $\rightarrow_e$ as causal relations. They are irreflexive, asymmetric and transitive. Evaluators not only cause events to occur, but they may also evaluate communicationEvents as described later below.

Note on Time Instances: Every event has a time instance associated with it. It is possible that two time instances $t_1$ and $t_2$ are incomparable, because they are measured in local clocks of different evaluators, which are not synchronized to each other. But every clock time has a unique 1-1 mapping to a global time. We use, $x.t_1$, $y.t_2$ to refer to local time points associated with two different objects x and y. Inequality, $(x.t_1 < y.t_2)$ may hold in the local times of x and y, if x and y either belonged to the same cell, or are attached/tuned to the same cell. Otherwise, $(x.t_1 < y.t_2)$ may hold only relative to mappings of time points $x.t_1$ and $y.t_2$ to the global time in a designated global clock. Several local clock time points may map to the same global time point; thus several events may occur in different distinct cells at different local times, but all at the same global time. All time points are discrete time points that map to integers $\geq 0$.

Access Evaluation: As mentioned earlier, notation, x(t) is used to denote the event where an evaluator got hold of the triplet (x, Δx, x:eval( )) from the world $W_S(t)$. Clearly, an evaluator E may access x only if it had the access right for it, i.e, $x \in E_c$.hasAccessTo(t). When evaluator thus accesses x, it would then have access to all names in the closure, [x:names ( )]. In the following we define evaluators $\rightarrow_a$ and $\rightarrow_e$. When necessary, we write $^E\rightarrow_a$ and $^E\rightarrow_e$ to explicitly refer to the evaluator E that does the evaluations. Access evaluation may now be defined as follows:

$$\square \exists (\tau > 0)[\{(x,\Delta x) \in W_S(t) \ \& \ x \in E.hasAccessTo(t)\}$$
$$[^E\rightarrow_a x(t)] \ \{W_S(t) = W_S(t+\tau) \ \& \ x(t+\tau)\}] \text{ where}$$
$$x(t+\tau) = [\langle x, \Delta x, x:eval(\ )\rangle \in E.accessedItems\rangle(t+\tau) \ \&$$
$$\langle [x:names(\ )] \subset E.hasAccessTo\rangle(t+\tau)] \qquad (6.17)$$

It always takes some time, $\tau > 0$, to complete an access. If access is successful, then it causes the event $x(t+\tau)$ to become true. Access action does not change the world state $W_S$; only the local state of the evaluator E changes. Once x is accessed at time $(t+\tau)$, $(x, \Delta x, x:eval(\ ))$ gets into E.accessedItems at time $(t+\tau)$ and E gets access rights to all names in the closure, $\langle[x:names(\ )]\rangle(t+\tau)$. If the pre-condition in (6.17) is not satisfied then the access attempt will return φ. Since we use the convention that predicates in world states always maintain their truth values, unless changed, it is not necessary to specify the frame statement, $W_S(t) = W_S(t+\tau)$, in (6.17). We assume here, that local states of evaluators are distinct from world states; thus, the triplets appearing in E.accessedItems will never occur in world states, even though components in the triplets form relational structures in the world states, as described earlier.

Action Evaluation: Action evaluation, $^E\rightarrow^*_e$, is defined as follows: For a name x, $$[^E\rightarrow_e x(t)] = [^E\rightarrow_a x(t)] = x(t) \text{ and for an action or condition } x:A(...), \qquad (6.18)$$
$$\{\langle x.A:preC?(\ ) \ \& \ \exists(S)\forall(y\in S)[(S \subseteq x.A:world(\ )) \ \&$$
$$\langle((y,\Delta y, y:eval(\ )) \in E.accessedItems\rangle(t)]\}$$
$$[^E\rightarrow_e x:A(...)(t)]\{(x.A:output?(\ ) (t+\tau) \ \& \ x.A:pstC?(\ ) (t+\tau) \} \qquad (6.19)$$

Here, X.A:preC?( ) is one part of the pre-condition for x:A( ); it may include in it characterization of messages processed by x:A( ). The other part of the pre-condition is that it must have accessed all needed names in x.A:world( ). Similarly, x.A:pstC?( ) is one part of the post condition for the action. It specifies changes to the world state $W_S$, produced by the execution of x:A. The other part of the post condition is x.A:output?( ), which is the characterization of outputs produced by x:A( ). It could be φ or it could be an output message. The condition x.A:preC?( ) and all specified accesses in the pre-conditions should be true, in order for the evaluation of x:A( ) to succeed. Evaluation is correct if it succeeds and the post-conditions hold true in the world state $W_S(t+\tau)$. Since occurrences of access events and condition checking do not change the world, evaluation may be performed in the same world in which the pre-conditions are true. The context of evaluation for this action is the subset S of x.A:world( )(t).

Hereafter, we will omit the prefix superscript E and subscripts a and e in $^E\rightarrow_a$ and $^E\rightarrow_e$ and simply write the evaluation as →, assuming $\rightarrow_a$ is subsumed in →. For a constant, c, $(\rightarrow_e c)=(\rightarrow_a c)=(c, \Delta c, \delta c)$ at all times. We will not hereafter have occasion to refer to access evaluations $^E\rightarrow_a$.

Pthreads and Methods: Pthreads are methods, a subset of actions. Methods are defined using five kinds of programming statements: Declarations, Assignments, Conditionals (like if-then-else and SelectOne), While-loops and bit/string-manipulation statements. Declarations create/destroy containers and objects, may set contents of newly created containers, and cause triplets (x,Δx,x:eval( )) to be introduced into or removed from method:world( ) at compile/execution time. Other statements in a method definition may cause objects and containers to be modified, contents moved from one container to another, or denotations of names changed. During its execution, a method changes only the local state in method:world( ). At the end of its execution the evaluator may use this local state to perform a consistent update of the world state, $W_S(t)$. Since $W_S(t)$ is compartmentalized as defined in (6.11), cell isolation (Section 4.2) guarantees that multiple parallel updates to $W_S(t)$ may be done by different cells operating in parallel, without mutual interference. Semantics of program statements that appear in method definition may be easily defined. We use program statements informally here, assuming reader would know the intended meanings. Characterizations of CCPs used in protocols were presented in Tables 1 and 2. For most statements used in pthreads and protocols, TICC™-Ppde can automatically generate the associated pre and post conditions in given contexts, but user interaction may be necessary to define certain pre-conditions and loop invariants.

6.4. Notation and Definitions: Evaluation of ALLEOP Nodes

Events: We saw in Section 3 examples of action and communication events that occur in ALLEOPs and traces. In the following, we use symbols x, Y, Z, . . . for ActionEvent classes and symbols X[T( . . . )], Y[T( . . . )], Z[T( . . . )], . . . for CommunicationEvent classes. These event classes refer to ALLEOP nodes. They are subclasses of the top level class, Event. We use symbols, x(t), y (t), z (t), . . . to denote event instances; x(t) specifies that the instance, x, occurred at time t (see FIG. 6B). If x(t) is an instance of the CommunicationEvent subclass, X[T(<port>,#)], then t∈T(<port>,#); virtual time points, x(<port>.$t_\#$), refers to individual time instances at which instances of x [T(<port>,#)] occur in a trace; <port>.$t_\#$∈T(<port>,#), see for example, ALLEOP in (3.11) and its trace in (3.21). In a run of an application, multiple instances of the communicationEvent subclass, x(T[<port>, #)], may occur in a causalnet. The set of time-points at which those instances occur in that causalnet constitute the sequence of strictly increasing time-points <port>.$t_\#$∈T(<port>,#) for that run of the application (see FIG. 6C).

CommunicationEvents: We introduce below the 'forward' variation, p:f( ), of 'send' command p:s( ) for a port p, q=(f|g|i), p≠q.

$p^D$[T(q,#)]: A message is Delivered to port p by port q at a time in the time-map in T(q,#).

$p^S$[T(p,#)]: A message is Sent by p at a time in the time-map T(p,#).

$p^F$[T(p,#)]: A message is Forwarded by p at a time in the time-map T(p,#).

Forwarding transmits a received message (may be with some modifications), and sending transmits a newly created message. We will see the precise distinctions in Section 7.2. In the following [→$p^{S|F}(t_0)$] refers to start of an occurrence of an instance of $p^{S|F}$ in a message (sending|forwarding) process at port p at time $t_0$; [(→$p^{S|F}$)($t_1$)] refers to the ending of that event occurrence at time $t_1$, ($t_0$<$t_1$).

CommunicationEvent Evaluations-1: There are two kinds of communicationEvent evaluations. The first kind occurs during protocol evaluations. They are described below:

$\exists[(t_0 < t_1)$
1. {⟨p:pR?( )⟩($t_0$)}[→ $p^{S|F}(t_0)$]{⟨p.state=R & p.input=c|f⟩($t_1$)}, p = (g|f|i),
2. {⟨p:mR?( )⟩($t_0$)}[→ $p^{S|F}(t_0)$]{⟨p.state=R & p.input=c|f⟩($t_1$)}, p = (g|f|i),
3. {⟨p.state=R⟩($t_0$)}[→ $p^D(t_0)$]{⟨p.input=s & p.state=R⟩($t_1$)}, p = (g|f|i),
4. {⟨q.input=s⟩($t_0$)}[→ q:mR?( )($t_0$)]{⟨true & q.state=S⟩($t_1$)}, q = (f|i),
5. {⟨q.input=s ∨ q.state=S⟩($t_0$)}[→ q:pR?( )($t_0$)]
            {⟨true & q.state=S⟩($t_1$)}], q = (f|i),
6. {⟨g.input=s⟩($t_0$)}[→ g:mR?( )($t_0$)] {⟨true & g.input=φ & g.state=S⟩($t_1$)}
7. {⟨g.input=s ∨ g.state=S⟩($t_0$)}[→ g:pR?( )($t_0$)]
            {⟨true & g.input=φ & g.state=S⟩($t_1$)}]    (6.20)

The above statements describe what happens at the beginning and ending of a protocol execution, and what happens when delivery signals are sensed. Lines (1) and (2) specify that in the beginning, the completion signal C I f is sent to port g, f or i, if the ports are ready to, respectively, send|forward a message (i.e. p:mR?( ) or p:pR?( ) is true). As mentioned earlier, evaluation of p:mR?( ) or p:pR?( ) is called, sensing or polling. As shown in lines (4) through (7) port p moves to state S after successful sensing. Thus, always port p will be in state is S when it is ready to send out a signal. Immediately after the completion signal, c|f, is sent, the state of ports changes to R as shown in (1) and (2). Thus, after sending out a completion signal port p cannot immediately send out a second signal. Similarly, line (3) describes what happens at the time of message delivery in a protocol execution: Here, '→$p^D(t_0)$' is the delivery event at port p. It begins at time $t_0$ and ends at the time when p.input=s becomes true. Lines (4, 5, 6 & 7) describe what happens when an already delivered signal at port p is later sensed. Notice, lines (6 & 7) g.input is reset to φ. Thus, a delivered signal may be sensed only once at port g. As mentioned earlier, this resetting of g.input=φ will not occur for the subclass of generalPorts that belong to a generalPort vector.

In all cases, after sensing a signal, ports move to state S. A port p gives access to its parent cell, to the virtualMemory p.vM, only when p.state=S. No port will ever give access to p.vM to any cell other than its parent cell. Once a port is ready to send out a signal, it continues to be ready till a signal is sent out, as defined in lines (1) and (2).

CommunicationEvent Evaluations-2: The second kind of communicationEvent evaluations occur in SMS (Section 8), which uses event evaluations to install instances of ALLEOP nodes in a growing causalnet of an application, while the application is running. This is defined below in (6.21) and (6.22). FIG. 19 shows an Event Builder cell, eb. When eb applies the evaluator, →, to a communicationEvent, it produces an instance of that event at a specific time point and installs it into the causalnet. Every communicationEvent has two time points associated with it: One is the time when the event itself occurred (this is important) and the other is the time when its instance was installed in a causalnet (this is not important). Use of these two time points is explained below.

In (6.21) and (6.22) below, [eb.$f_1$, eb.$f_2$] is a port-vector of the Event Builder cell eb in FIG. 19; $C_i.g_i$ and $D_j.f_j$ are ports that exchange message, $0 \leq i < n > 0$ and $0 \leq j < m > 0$. Ports $D_j.f_j$ could be interruptPorts, $D_j.i_j$. We use symbol f here to denote both functionPorts and interruptPorts, since interruptPorts constitute a subclass of functionPorts. The cells $C_i$ evaluate $C_i.g_i$.protocol, respectively, in parallel to send message and deliver it to ports $D_j.f_j$. These protocol executions are coordinated by agents in the group-to-group pathway in FIG. 19, as explained in Section 8. Protocol executions trigger evaluation of the communicationEvents $C_i.g_i^{S|F}(t_s)$ and $\langle D_j.f_j^D \rangle(t_d)$, where $t_s$ is the time message sending|forwarding started, and $t_d$ is the time when message delivery completed. Evaluation of the above communicationEvents to install instances of these two events in the causalnet is defined as follows: For $0 \leq i < n$ and $0 \leq j < m$, $$\Box[\exists(t_1 < t_2)\exists(t_s < t_d) \{\langle eb.f_1:mR?() \& eb.f_2:mR?() \rangle(t_1)\}$$
$$[\to (C_i.g_i^{S|F}(t_s), \langle D_j.f_j^D \rangle(t_d))(t_1)] \{\langle c_i.g_i^{S|F}(t_s) \& \langle d_j.f_j^D \rangle(t_d) \rangle(t_2)\}] \quad (6.21)$$

During protocol execution, signals are sent to ports [eb.$f_1$, eb.$f_2$] to instruct the eb cell to create instances of the CommunicationEvents, $C_i.g_i^{S|F}(t_s)$ and $\langle D_j.f_j^D \rangle(t_d)$. Signal f is sent to port eb.$f_1$ if message is being forwarded, and signal c is sent if message is being sent out. Signal s is sent to port eb.$f_2$ in both cases. The way this happens is explained in Section 8. Here, the guard eb.$f_k$:mR?( ) for k=1, 2, will return true if eb.$f_k$.input=(c|f|s). In (6.21) eb completes sensing of the signals received by both ports in [eb.$f_1$, eb.$f_2$] at time $t_1$. This is also the time when eb begins its evaluation of $(C_i.g_i^{S|F}(t_s), \langle D_j.f_j^D \rangle(t_d))$. This results in the installation of event instances $(c_i.g_i^{S|F}(t_s), \langle d_j.f_j^D \rangle(t_d))$ in the causalnet at time $t_2$.

$$\Box[\exists(t_1 < t_2)\exists(t_s < t_d) \{\langle eb.f_1:mR?() \& eb.f_2:mR?() \rangle(t_1)\}$$
$$[\to (D_j.f_j^{S|F}(t_s), \langle C_i.g_i^D \rangle(t_d))(t_1)] \{\langle d_j.f_j^{S|F}(t_s) \& \langle c_i.g_i^D \rangle(t_d) \rangle(t_2)\}] \quad (6.22)$$

(6.22) describes events installed in the causalnet for reply message transmission. We will hereafter associate with communicationEvent instances only the time points at which the events occurred and not show the time points at which the instances were installed in the causalnet. This is consistent with the way we associate time points with action event instances.

Equality of Event Classes and Event Instances:

$$(X=Y) \Leftrightarrow (X \equiv Y) \text{ and } X[T_1(\ldots)]=Y[T_2(\ldots)] \Leftrightarrow (X \equiv Y) \& (T_1(\ldots) \equiv T_2(\ldots)) \quad (6.23)$$

$$(x=y) \Leftrightarrow (x \equiv y) \text{ and } x(t_1)=y(t_2) \Leftrightarrow (x \equiv y) \& (t_1=t_2) \quad (6.24)$$

Thus, Event classes and event instance have the status of constants; they are equal iff they are identical. However, evaluation of Event X is different from evaluation of a constant. Also, as mentioned earlier, events have the status of predicates as well. Thus, x(t) represents the fact that event x has occurred at time t.

Simultaneity and Parallelism: Parallel evaluations of communicationEvents occur when ever multiple evaluators are used. For communicationEvent evaluations the following holds:

$$([^{E1} \to X[T_1(\ldots)]] \parallel [^{E2} \to Y[T_2(\ldots)]]) \Leftrightarrow (E1 \neq E2) \quad (6.25)$$

$$([\langle^{E1} \to X(c_1.t_1)\rangle(c_1.t_2)] \parallel [\langle^{E2} \to Y(c_2.t_1)\rangle(c_2.t_2)]) \Leftrightarrow$$
$$[(E1 \neq E2) \& (X \neq Y) \& (x \neq y) \& x(c_1.t_2) \& y(c_2.t_2)$$
$$\& c_1.t_2 \in T_1(\ldots) \& c_2.t_2 \in T_2(\ldots)] \quad (6.26)$$

In (6.25), $T_1(\ldots)$ and $T_2(\ldots)$ are the two time-maps of communicationEvents in two different evaluators. The evaluations started at the local time points, $c_1.t_1$ and $c_2.t_1$, and were completed at $c_1.t_2$ and $c_2.t_2$, respectively, $c_1.t_1 < c_1.t_2$ and $c_2.t_1 < c_2.t_2$. CommunicationEvent instances $x(c_1.t_2)$ and $y(c_2.t_2)$ occur at time points at which evaluations were completed. It is possible that the semi open time intervals ($c_1.t_1$, $c_1.t_2$) and ($c_2.t_1$, $c_2.t_2$), during which the two evaluations occurred, overlap in global time. The local time points ($c_1.t_1$, $c_2.t_1$), at which the two evaluations started, and ($c_1.t_2$, $d_2.t_2$), at which evaluations terminated, would be incomparable; i.e., they may occur in any order. Parallel evaluation is then written as $(\langle \to x \rangle(c_1.t_2) \parallel \langle \to Y \rangle(c_2.t_2))$. If the two events are synchronized or coordinated, then $T_1(\ldots)=T_2(\ldots)$ and $c_1.t_2=c_2.t_2$ in global time. Parallel evaluation is then written as, $[\to \langle(X|Y)\rangle(c_1.t_2=c_2.t_2)]$.

Similar parallel evaluations may occur also for actionEvents. The only difference is, no time-maps are associated with actionEvents, but virtual time points are associated with actionEvent instances. Any Event class may have multiple instances occurring at different virtual time points, in strictly increasing order.

Causation: In the following, X and Y are Event subclasses. We use the evaluator symbol, →, as the causation symbol in the following sense: occurrence of an event instance may cause one or more other event instances to occur; read 'X→Y' as 'X causes Y', and $X^{C(X,Y)} \to Y$ as 'X causes Y' if condition C(X,Y) is true:

(a) $X \to Y \Leftrightarrow \Box[\forall(t)\exists(\tau > 0) (x(t) \Leftrightarrow y(t+\tau) \& \tau \leq \tau_{max}(X,Y))]$ (6.27a)

(b) $X^{C(X,Y)} \to Y \Leftrightarrow \Box[\forall(t)\exists(\tau > 0) (x(t) \Leftrightarrow$
$(y(t+\tau) \& \langle C(X,Y)\rangle(t+\tau) \& \tau \leq \tau_{max}(X,Y))]$ (6.27b)

(c) $X \to \phi \equiv$ STOP (nothing happens) (6.28)

where $\tau_{max}(X,Y)$ is the maximum permissible delay between occurrences of the two event instances.

Immediate Causation:

$$X \to Y \Leftrightarrow [(X \bullet \to Y) \vee \forall e(x \bullet \to e \to Y)] \quad (6.29)$$

$$X \bullet \to Y \Leftrightarrow \neg e(X \bullet \to e \to Y) \quad (6.30)$$

No event may occur between x and Y in $x \bullet \to Y$ in (6.30). Thus the evaluation $\bullet \to$ is indivisible; it cannot be interrupted.

5.5. Causal Chains and Refinements

Causal Chain:

$$\Box[X \to \ldots \to Y \Leftrightarrow ((X \to Y) \vee (Z)(X \to Z \to \ldots \to Y))] \quad (6.31)$$

$$\Box[(X \diamond Y) \Leftrightarrow (X \to Y) \vee (Z)((X \to Z) \Rightarrow (Z \diamond Y))] \quad (6.32)$$

Immediate-Causal Chain:

$$X \bullet \to \ldots \bullet \to Y \Leftrightarrow ((X \bullet \to Y) | \forall (Z)(X \bullet \to Z \bullet \to \ldots \bullet \to Y)) \quad (6.33)$$

$\Box$ operator should be assumed even if it is omitted, as in (6.33). It is possible that the causal chain (or immediate causal chain) of events in a pthread or protocol execution branches with alternates on either side of statements (6.31) and (6.33), leading to different terminal events, as shown in (5.5), (5.6), (5.14) and (5.16) and (8.4). When a fork occurs in a protocol execution, the causal chain will contain parallel branches which may eventually join at a single common communicationEvent, as illustrated in the diagrams in FIG. 6A. This holds true for all refinements introduced below. For simplicity we use linear immediate causal chains in our presentation below. It should be assumed that causal chains may contain branches with alternates and/or parallel forks in all cases.

Refinement of $\to$:

$$\text{RefinementOf}(X \to Y) = [(X \bullet \to Y) \vee \exists(e)(X \bullet \to \text{RefinementOf}(e \to Y))] \quad (6.34)$$

A refinement of $(X \to Y)$ is an immediate-causal chain, $e_1 \bullet \to e_2 \bullet \to \ldots \bullet \to e_n$, such that $(X \to Y) = (X \bullet \to e_1 \bullet \to e_2 \bullet \to \ldots \bullet \to e_n \bullet \to Y)$. If we use $\epsilon_i$ to refer to the immediate causal chain $\epsilon_i = e_{i1} \bullet \to e_{i2} \bullet \to \ldots \bullet \to e_{ik(i)}$ for then the general cases would be, for $n \geq 0$, $$\text{RefinementOf}[(X \to (Y_0|Y_1|\ldots|Y_n)] = [(X \in_0 Y_0)|(X \in_1 Y_1)|\ldots|(X \in_{n-1} Y_n)], \quad (6.34a)$$

$$\text{RefinementOf}[(X \to (Y_0 \| Y_1 \| \ldots \| Y_n)] = [(X \in_0 Y_0) \| (X \in_1 Y_1) \| \ldots \| (X \in_{n-1} Y_n)], \quad (6.34b)$$

where $\epsilon_i$ for are immediate causal chains, the symbol '|' specifies alternates and the symbol '||' separates parallel causal chains. Forms (6.34a) and (6.34b) may occur together in interleaved combinations.

Refinements of Pthreads and Protocols: The delivery events caused by a protocol are always uniquely determined by signals exchanged during protocol execution. A refinement of message transport from a port p to a port q has the form (linear refinements are assumed in all statements below, only for simplicity), $$p^S[T1(\ldots)] \to q^D[T2(\ldots)] = p^S[T1(\ldots)] \bullet \to \text{protocol} \bullet \to q^D[T2(\ldots)]$$
$$= p^S[T1(\ldots)] \bullet \to e_{c0} \bullet \to e_{c1} \bullet \to \ldots \bullet \to e_{ck} \bullet \to q^D[T2(\ldots)] \quad (6.35)$$

This is the uninterruptible sequence of CCP and other actionEvents in the protocol at port p. The refinement of a pthread that is executed after a delivered message is sensed and before a response message is sent out by a cell C will have the form, $$C.p:mR?(C.p^D[T_1(\ldots)]) \bullet \to \text{pthread} \bullet \to C.p^S[T_2(\ldots)]\} = C.p:mR?(C.p^D[T_1(\ldots)]) \bullet \to e_{p0} \bullet \to e_{p1} \bullet \to \ldots \bullet \to e_{pn} \bullet \to C.p^S[T_2(\ldots)]\} \quad (6.36)$$

This is also an uninterruptible sequence of actionEvents. It occurs during pthread execution. The refinement of $$C_1.p:mR?(C_1.p^D[T_1(\ldots)]) \bullet \to \text{pthread} \bullet \to C_1.p^S[T_2(\ldots)] \bullet \to \text{protocol} \bullet \to C_2.q^D[T_3(\ldots)]\} \quad (6.37)$$

has the form, $C_1.p:mR?(C_1.p^D[T_1(\ldots)]) \bullet \to e_{p0} \bullet \to e_{p1} \bullet \to \ldots \bullet \to e_{pn} \bullet \to C_1.p^S[T_2(\ldots)] \bullet \to e_{c0} \bullet \to e_{c1} \bullet \to \ldots \bullet \to e_{ck} \bullet \to C_2.q^D[T_3(\ldots)]\}$,
and
is written as, $$C_1.p:mR?(C_1.p^D[T_1(\ldots)]) \bullet \to e_{p0} \bullet \to e_{p1} \bullet \to \ldots \bullet \to e_{pn} \bullet \to C_1.p^S[T_2(\ldots)] \to (C_2.q^D[T_3(\ldots)] \| \ldots )]\}, \quad (6.38)$$

in ALLEOPs, because refinements of protocols are not shown in ALLEOPs.

Synchronization: Synchronized parallel forks occur in the following Instances of communicationEvents. Events $Z_1$ and $Z_2$ occur simultaneously in (6.39):

$$[(X \to Z_1[T_1(\ldots)] \| X \to Z_2[T_1(\ldots)])] = X \to (Z_1 \| Z_2)[T_1(\ldots)]$$
$$\Leftrightarrow \forall(t) \exists(\tau > 0)([X(t) \Leftrightarrow (Z_1(t+\tau) \| Z_2(t+\tau))), t_1 + \tau \in T_1(\ldots) \quad (6.39)$$

Generalization of Synchronous Forks:

$$X \to (Z_1 \| Z_2 \| \ldots \| Z_n)[T(\ldots)]. \quad (6.40)$$

Coordination: Parallel coordination occurs in, $$([(X[T_1(\ldots)] \| Y[T_2(\ldots)]) \to Z[T_3(\ldots)]) \Leftrightarrow$$
$$\forall(t_1, t_2, t_3) \exists(\tau > 0)(t_1 \in T_1(\ldots) \& t_2 \in T_2(\ldots) \& t_3 \in T_3(\ldots)) \&$$
$$[x(t_1) \& y(t_2) \Leftrightarrow z(t_3 = \max(t_1, t_2) + \tau) \quad (6.41)$$

Here, Events X and Y may occur at different incomparable times: $\max(t_1, t_2)$ is defined relative to mappings of local times to a global time. Z occurs only after both x and y have occurred.

Generalization of Coordination: Here, Event $Z[T(\ldots)]$ occurs iff all events $X_1, X_2, \ldots, X_n$ had already occurred.

$$(X_1[T_1(\ldots)] \| X_2[T_2(\ldots)] \| \ldots \| X_n[T_n(\ldots)]) \to Z[T(\ldots)] \quad (6.42)$$

Generalization of Coordination & Synchronization: Events $Z_1, Z_2, \ldots, Z_n$ all occur simultaneously after Events $X_1, X_2, \ldots, X_n$ have all occurred.

$$(X_1[T_2(\ldots)] \| X_2[T_2(\ldots)] \| \ldots \| X_n[T_n(\ldots)]) \to (Z_1 \| Z_2 \| \ldots \| Z_n)[T(\ldots)] \quad (6.43)$$

Event Alternates: $(X|Y)$, either X or Y occurs.

$$\text{Generalized Alternates: } (X_1|X_2|\ldots|X_n) \quad (6.44)$$

where each $x_i$ could be a causal chain. Choices in an Event alternate expressions should always be pair wise mutually exclusive.

Guards and Polling: Guards were defined in Tables 1 and 2 and in statements 4 through 7 in (6.20). Polling involves evaluation of guards, and evaluation of guards changes the state of a port. This is an exception to the general rule that condition evaluations do not change the state of the world. We have seen several examples of polling. The following restriction on TICC™-Ppde operation pertains to polling:

$$\Box[\forall(\text{Ports p})\forall(\text{Ports q})((p \neq q) \& (p:\text{parent}(\ )=q:\text{parent}(\ )))$$
$$\Rightarrow \neg(\exists(t)([\bullet \to p:mR?(\ )(t)] \& [\bullet \to q:mR?(\ )(t)])) \quad (6.45)$$

and similarly for other guards. Thus, no cell may start or finish polling two of its ports simultaneously. There is no parallelism or time sliced concurrency with in a cell. All interrupts are programmed interrupts that do not violate the requirement of transaction completion. Once polling of ports begin, ports are polled and sorted in the order of priority. In the polling cycle of a CIP, one of the following possible outcomes should occur at each port: (i) the port is skipped because it is not ready for service; or (ii) the cell waits for a message at the port and then sorts the port, below; (iii) In the case of a port-vector the cell treats the port-vector as single integrated item and sorts the port-vector only if all ports in the port-vector are ready for service, else skips the port-vector, (iv) In the case of port-alternates or existential ports guard the cell sorts only the selected port that is ready for service, else skips the ports; (v) after polling is completed the cell executes every p:tip or p:tip( ) in the sortedPortsList of the cell in the order they appear in the list; this will result in one of two outcomes: the cell sends back a response message or the cell suspends tip( ) execution, because of a programmed suspension and resumes service in an ensuing polling cycle, as described in Section 10.

Consistency of world state: Every world state W(t) represents the state of a computation at time t. At any time point, t, the world state W(t) is consistent. The proof system maintains and updates world states at postulated time points during ECT-evaluations. If it detects a contradiction between a CTL-assertion and the ECTs during ECT-evaluation (illustrated in Section 7) then the assertion is not valid. Such contradictions would indicate design or implementation errors. Contradictions with ALLEOPs encountered during causalnet generation by SMS indicate errors in system operation.

Condition Migration over •→: We refer to the format, '•C?( ){X}', where X is a Communication or Action Event, as ALLEOP format, and format $$\{\langle(\text{pre-}C?(\,)\&C?(\,)\rangle(t_0)[\to X(t_0)]\{\langle X:\text{output?}(\,)\&\text{pst-}C?(\,)\rangle(t_1)\}, t_1 \leq t_0 + \tau_{max}(X)$$

as the trace format. The latter describes the semantics of C?( ){X}. Execution is between the time points in the semi-closed interval $[t_0, t_1]$, and $\tau_{max}(X)$ is the maximum permissible delay. In the following it has been assumed that condition evaluation will not change the world (guards excepted), and action is evaluated in the same world at time $t_0$ in which the pre-conditions are true. The context x and y below in (6.46) are either a cell C or a port C.p. All condition checking and action evaluations take place in the context of [(x.A: names( ))(t) ⊂ (C:names( )(t)∪A:names( )] holds. This context will include in it local execution stacks of variables maintained by an evaluator during a method evaluation.

$$[\exists(t_1)\exists(t_2)\exists(\tau_1 > 0)\exists(\tau_2 > 0)$$
$$\{\langle x.A_1:\text{pre-}C_1?(\,) \& x:C?(\,)\rangle(t_1)\}$$
$$[\bullet \to x:A_1(\,)(t_1)] \{\langle A_1:\text{output}:C?(\,) \& x.A_1:\text{pst-}C_1?(\,)\rangle(t_1 + \tau_1)\}$$
$$\{\langle y.A_2:\text{pre-}C_2?(\,) \& y:C?(\,)\rangle(t_2)\}$$
$$[\bullet \to y:A_2(\,)(t_2)] \{\langle A_2:\text{output}:C?(\,) \& y.A_2:\text{pst-}C_2?(\,)\rangle(t_2 + \tau_2)\})$$
$$\Leftrightarrow ((t_2 = t_1 + \tau_1) \& (x.A_1:\text{pst-}C_1?(\,) \Rightarrow y.A_2:\text{pre-}C_2?(\,))(t_2))] \quad (6.46)$$

As mentioned earlier, an action evaluation is undefined if its x:pre-$C_1$?( ) is false and is skipped if x:C?( ) is false. While executing two successive actions x:$A_1$( ) and y:$A_2$( ) linked by •→, execution of y:$A_2$( ) begins at the same time as execution of x:$A_1$( ) terminates, and in addition, the world state in which the post-condition of x.$A_1$( ) is true, logically implies the pre-condition of y:$A_2$( ). There is usually a small delay between the time when $A_1$ terminates and the time when $A_2$ starts. But during this delay the world of cell C does not change, since no other action may occur in cell C between two such actions, and actions occurring in other cells cannot affect the state of cell C because of cell isolation (section 4.2). Thus, this delay is ignored.

Polling Cycles: In polling cycles we used specifications of the form, (C.f[i]:mR?( )→C.f[j]:mR?( )) for i≠j. This is interpreted as (C.f[i]:mR?( )•→ . . . •→C.f[j]:mR?( )) in the following sense:

$$\exists(t_0 < t_1 < t_2 < t_3 < t_4)$$
$$(\{C.f[i]:mR?(\,)\rangle(t_0) \text{ /*begins*/ } \& \langle C.f[i]:mR?(\,)\rangle(t_1)\text{/*ends*/}\}$$
$$[\bullet \to C.f[i]:tip(\,)\rangle(t_1) \text{ /*begins*/}][(\bullet \to C.f[i]:tip(\,))(t_2) \text{ /*ends*/ }$$
$$\{C.f[j]:mR?(\,)\rangle(t_2) \text{ /*begins*/ } \& \langle C.f[j]:mR?(\,)\rangle(t_3) \text{ /*ends*/}\}$$
$$[\bullet \to C.f[j]:tip(\,)\rangle(t_3)\text{/*begins*/}[(\bullet \to C.f[j]:tip(\,))(t_4)\text{/*ends*/}])$$
$$(6.47)$$

In other words, servicing of C.f[i] and C.f[j] occur in the semi-closed intervals, [$t_1, t_2$) and [$t_3, t_4$) such that ([$t_1, t_2$)∩[$t_3, t_4$)=φ, with the restriction, C.f[j]:mR?($t_2$), i.e. evaluation of C.f[j]:mR?( ) begins at time point $t_2$ when [(•→C.f[i]:tip( ))] ends. In (6.47), servicing of C.f[j] will occur only if C.f[i]:mR?( )($t_0$) evaluates to true, else the port will be skipped and polling will proceed immediately to C.f[j]. Here, we have assumed, p:tip( ) at port p is executed immediately if polling succeeds at p. Statement (6.47) may be suitably modified for the case where polled ports are sorted before their associated tip( )s are executed.

Thus, polling cycles specify only the order of polling, but not the order in which polled ports are serviced. Parallel triggering of TIPs that follow each other in different cells because of communications was described in the examples in Section 3; here, the only requirement is that conditions that characterize messages at the time they are sent remain invariant until they are delivered and the delivered messages are sensed and used.

Let us now proceed to consider examples that illustrate simple ALLEOP-proofs. In all proofs we assume that implementations of all pthreads and conditions would have been already individually verified. This is possible since pthreads are mutually independent, dependent pthreads are jointly verified, and all conditions are always local to a cell. We begin with a solution to a generalized version of the "Ornamental Garden Problem" introduced in [Magee & Kramer, 13]. Formal ALLEOP-proofs are presented for "mutual exclusion" and "condition synchronization" (terms used in [Magee & Kramer, 13]) in this example. The solution applies also for the "Car Park" problem in [Magee & Kramer, 13].

7. Examples with ALLEOP-Proofs 7.1. Ornamental Garden: Mutual Exclusion and Condition Synchronization Our objective here is to display the structure of ECT-networks and show how they are used by the system to generate proofs. See Maggie & Kramer, [13] for the FSP specification for the Ornamental Garden problem. The problem is the following: An ornamental garden park has several gates, each with a turnstile. As in Magee and Kramer we assume two entrance gates at two ends of the park, but unlike Magee and Kramer we also assume two exit gates. Gates are opened when the park is opened, and closed when the park is closed after all people who entered the park had left. At any time the park is open, people are allowed to enter through any entrance gate, and exit through any exit gate. It is necessary to keep an accurate count of number of people who are in the garden at any time, and never allow that number to exceed a preset max.

The TICC™-network is shown in FIG. 10. It has two entrance turnstiles, Et[0] and Et[1], 2842 and two exit turnstiles, Xt[0] and Xt[1]. There is one environment, E, which opens and closes the gates of the park based on external interrupts. There is one counter. We assume, when a person arrives at entrance or exit turnstiles, Et[j] or Xt[j], for j=0, 1, sensors Se[j] and Sx[j] detect persons at turnstiles. Each turnstile together with its sensor is an encapsulated cell. They are shown separately in FIG. 10 for convenience. On detecting a person, sensors signal ports Et[j].f$_t$ or Xt[j].f$_t$, (subscript '$_t$' for 'turnstile') for j=0, 1 via Se[j].g↔Et[i].f$_t$ or Sx[j].g ↔Xt[j].f$_t$, as the case may be. Pathways, Se[j].g↔Et[j].f$_t$ and Sx[j].g↔Xt[j].f$_t$ are internal to the encapsulation.

Predicates, Et[j]:personEntering?( ) and Xt[j]:personLeaving?( ) become true when Et[j] and Xt[j], respectively, detect signals at ports Et[j].f$_t$ and Xt[j].f$_t$. See Appendix I for definitions of these predicates. The following TIPs are executed by the sensors, internal to the encapsulation, when they detect persons:

Se[j].g:TIP( ) =
   Se[j].f:personAtGate?( ){Se[j].g:pR?( )*{Se.g[j]:s( );}}   (7.1a)
Sx[j].g:TIP( ) =
   Sx[j].f:personAtGate?( ){Sx[j].g:pR?( )*{Sx[j].g:s( );}}   (7.1b)

Here, Se[j].g:pR?( )* and Sx[j].g:pR?( )* wait for response at the generalPort for the previous sensor signal sent to the entrance and exist turnstiles, respectively. Thus a new person is recognized only after the previous person has been processed. The counter has five functionPorts, C.f[j], 0≦j<5. They are used as follows:

For j=0, 1: On sensing the signals at ports Et[j].f$_t$, the turnstiles signal the counter through pathways Et[j].g↔C.f[j] (see FIG. 10). When counter C senses the signal at C.f[j] for 0≦j≦1, it does the following: (i) C increments the count by one, if counter.count<max and signals back via C.f[j]↔Et[j].g to inform Et[j] that the person at the gate may enter. This response also acts as acknowledgement for the signal that C.f[j] received from Et[j].g and the transaction gets completed. On receipt of signal at Et[j].g, the turnstile unlocks and the person at Et[j].f$_t$ is let into the garden. (ii) If (counter.count≧max) then C signals via C.g[j]↔Et[j].f informing Et[j] that the garden is full; on receipt of signal at Et[j].f, the turnstile displays "PARK FULL" without unlocking the turnstile. The person then leaves the gate. In this case, C sends back an acknowledgement to the signal received from Et[j].g at its port C.f[j] after receiving acknowledgement back from Et[j].f, thereby completing transactions via both pathways Et[j].g↔C.f[j] and Et[j].f↔C.g[j].

In order to either allow or not allow a person to enter, Et[j] performs synchronous non-deterministic polling at its ports Et[j].g and Et[j].f by evaluating the guard, ∀(p)(p=(Et[j].g|Et [j].f))p:mR?( ))*. Et[j] thus waits for response from the counter at any one of these two ports, and takes appropriate action.

For j=2, 3: The exit turnstiles, Xt[j].g for j=0, 1, signal the counter via Xt[j].g↔C.f[j+2]. On sensing signal at C.f[j+2] the counter decrements the count by one and signals back via C.f[j+2]↔Xt[j].g, in order to unlock the turnstile and let the person at leave; Xt[j] waits at Xt[j].g for this response, by performing synchronous polling, Xt[j].g:mR?( )*.

For j=4, the port C.f[4] is used by the counter to receive and respond to requests from the display unit to send the current value of counter.count. The display unit sends the request for count based on an external interrupt from a user (see FIG. 10).

Multiple people may enter and leave simultaneously, in parallel, using multiple turnstiles. However, each turnstile will allow only one person to enter or leave at a time. The program is self-scheduling, self-coordinating and self-synchronizing. The TICC™-network and TIPs determine signal exchanges and execution control structure. It should be clear, the OG-solution in Appendix I applies also to the Car-Park example defined in [Magee & Kramer, 13], with multiple Car-Park entrances and exits, with the difference, parking fee has to be paid before a car leaves.

The time taken for signal exchanges and counting should be far less than a millisecond assuming 5 kilometers long 1 Gigabits/sec signal transmission lines and 2 gigahertz CPUs. Thus, one may have practically unlimited number of entrance and exit turnstiles. The CIPs, ALLEOPs and traces for the TICC™-Ppde implementation, based on this network, are presented in Appendix I. We refer to this as the OG-Solution.

To complete the implementation shown in Appendix I, one has to define the following: personAtGate, personEntering? ( ), personLeaving?( ), denyEntry( ), letPersonIn( ), letPersonLeave( ), personlnPark( ) and displayCount( ). With that the ALLEOPs and traces in Appendix I would model the completed implementation. The implementation does not require monitors, semaphores, rendezvous [10,12,23,24], locks, schedulers or any other synchronization or coordination control primitives.

It should be clear that in this organization no two counter activities invoked by the turnstiles will interfere with each other, since the counter services a second functionPort only after completing the service at the first one. It should also be clear that the number of people in the park could never exceed max, since permission to enter is granted only if (counter.count<max) before the counter is incremented. We want to formally prove these starting from implementation specifications, in order to show that the implementation satisfies the requirements. In particular, we want to prove the following:

Stmt 1) Every person entering the garden is added to the count exactly once;

Stmt 2) Every person leaving the garden is subtracted from the count exactly once;

Stmt 3) Total number of people in the garden never exceeds max.

User defines the following interpretations for Stmt 1 and Stmt 2 above, as CTL-statements: Events in CTL-statements are specified either by predicates or actions. Quantifications in CTL-statements (7.2) and (7.3) below range over postulated time-points and events that occur in the statements.

☐[∃(ctl.t$_0$ < ctl.t$_1$ < ctl.t$_2$ < ctl.t$_3$) & (ctl.t$_4$ < ctl.t$_5$ <
  ctl.t$_6$ < ctl.t$_7$)
  & ((ctl.t$_2$ < ctl.t$_5$ ) | (ctl.t$_6$ < ctl.t$_1$))
∃!(A1)(A1 instanceOf counter++)∃!(A2)(A2 instanceOf counter−−)
  EnteringGarden-CountedOnce =
    [{⟨personEntering?( )⟩(ctl.t$_0$)}
    →...→ [⟨•→ A1(ctl.t$_1$)/*begins*/⟩ (ctl.t$_2$)/*ends*/])
    →...→ {personInPark?( )(ctl.t$_3$)}]   &   (7.2)
  LeavingGarden-CountedOnce =
    [{⟨personLeaving?( )⟩(ctl.t$_4$)}
    →...→ [⟨•→ A$_2$(ctl.t$_5$) /*begins*/⟩(ctl.t$_6$)/*ends*/]
    →...→ { ¬personInpark?( ) (ctl.t$_7$)}]]   (7.3)

The following definitions are reproduced here from Appendix I, for convenience:

Et[j]:personEntering?( ) ⇔ Et[j].f$_t$:mR?(⟨Et[j].f$_t^P$⟩
[T(Se[j].g,1)])   (I.4)
Xt[j]:personLeaving?( ) ⇔ Xt[j].f$_t$:mR?(⟨Xt[j].f$_t^P$⟩
[T(Sx[j].g,1)])   (I.11)

In the CTL statement (7.2), ctl.t$_2$ is the time at which the invocation of counter instance A1 terminates and in (7.3), ctl.t$_5$ is the time when invocation of A2 begins. The restriction (ctl.t$_2$<ctl.t$_5$) appears as one of the alternates in the existential quantifications on top of the statements: it asserts that counter invocation in (7.3) should come only after the termination of counter invocation in (7.2). Similarly, the other alternative, $(ctl.t_6<ctl.t_1)$, asserts the other possibility, namely invocation in (7.2) should start after termination in (7.3). In both cases, the semi-closed intervals during which the counter instances are active in the two statements, namely $[ctl.t_1, ctl.t_2)$ and $[ctl.t_5, ctl.t_6)$, should be non-overlapping. Quantifications, $\forall !(A1)$ (A1 instanceOf counter++) $\forall !(A2)$ (A2 instanceOf counter--), assert that in each statement there is only one unique occurrence of counter instance.

We have here assumed that each invocation of counter++ increments the count by 1 and each invocation of counter-- decrements the count by 1. Thus, (7.2) and (7.3) assert, a person at gate should be allowed to enter the park only after the counter had been incremented by 1, exactly once, and allowed to leave the park only after the counter had been decremented by 1, exactly once and the two invocations of the counter should not overlap. The starting and ending events in (7.2) and (7.3) are:

|  | Starting Events | Ending Events |
|---|---|---|
| In (7.2): | ⟨personEntering?( )⟩(ctl.$t_0$) | personInPark?( ) (ctl.$t_3$) |
| In (7.3): | ⟨personLeaving?( )⟩(ctl.$t_4$) | ¬personInPark?( ) (ctl.$t_7$) |

Notice, the pair of time points (ctl.$t_0$, ctl.$t_4$) at which starting events terminate in (7.2) and (7.3) are incomparable. So also, the time points (ctl.$t_3$, ctl.$t_7$) at which ending events begin are incomparable. They occur in parallel. Thus, persons may enter and exit simultaneously or in any order. For this example, replacing the second ellipse, → . . . →, in (7.2) and (7.3) by 0 will not change the meaning of the statements, since in each case there is only one way of reaching the ending event from the starting event. The problem to prove is, Traces⊢EnteringGarden-CountedOnce & LeavingGarden-CountedOnce (7.4)

where Traces is the set of all traces for the implementation, and ⊢ is the logical consequence relation. At this point, the CTL assertions above do not state how many entrances and exits are in the garden. This is something to be discovered by analyzing the implementation.

7.1.1. ECT-Network for OG-solution

The network in Table 5 shows interactions between the various ECT-blocks Block(5a) through Block(5g) at the entrance turnstiles Et[j]. Contents of Block(5a) though Block (5g) are shown in Tables 5.1 though Table 5.3. The task performed by the events in each block is summarized inside the block in Table 5. Each block contains a list of events, numbered in the order they occur, with virtual time points associated with each event. Thus, the sensor block, Block (5a), in Table 5, whose details are shown in Table 5.1, has seven events. These are the events that occur in the port-trace, Se[j].f:port-Trace(Se[j].$t_0$), as indicated by the header of Block(5a) in Tables 5 and 5.1.

In all blocks, signal delivery event and signal sensing event are declared separately: thus in Table 5.1, the signal delivered to Se[j].f in (5b,1) (block 5b and line 1) is sensed in (5b,2) (block 5b and line 2). This is because delivery and sensing may not both happen synchronously, unless a port is waiting for the signal at the time signal was delivered. If the port is not waiting for the signal, sensing of delivered signal may not occur immediately. However, in (5a,6) and (5a,7) sensing occurs immediately, as indicated by the common virtual time point, Se[j].$t_3$, since port Se[j].g is waiting for the signal at the time signal is delivered, as indicated by the '*' in (5a,7).

Block(5a) activates Block(5b) through a signal sent to (5b, 1), shown by a solid directed branch marked "personEntering" in Table 5 that links the two blocks. Here, the sensor Se[j] (Block(5a)) sends a signal to entrance gate Et[j] via pathway Se[j].g ↔Et[j].$f_r$, as shown (5a,4) and (5a,5), indicating that a person is entering. When Et[j] senses the signal delivered to Et[j].$f_r$ by Se[j].g, it will activate response activities in Et[j]. We call this parallel activation because Se[j] and Et[j] run in parallel. Details of this parallel activation are shown in (5a,4), (5a,5) in Table 5.1 and (5b,1), (5b,2) in Table 5.2. The comment "to (5b,2)" in row (5a,5) in Table 5.1 indicates that the signal is being sent to (5b,2) in Table 5.2.

Always, signal sensing requires coincidence of two activations: (i) parallel activation through signal delivery and (ii) sequential activation through flow of execution control. A signal delivered to a port is sensed only when that port is polled by its parent cell. All parallel activations require coincidence of both activations. Reader may verify that this holds true in Table 5, where sequential activations between blocks are shown by directed branches with broken lines and parallel activations by solid directed branches. The ellipse "→ . . . →" occurs in a parallel activation branch, for example in the branch on the left going from Block(5b) (Et[j]) to Block(5e) (Counter) in Table 5 marked "ask counter, can enter?". This indicates, sensing may not occur at the time of signal delivery.

Here sequential activation of the port C[j].f[j] is controlled by the polling cycle of the counter, as indicated by branch with broken lines going into Block(5e) from bottom left of Table 5, marked (1) with annotation, "$\forall(i)$ ⟨C.f[i]:port-ECT(cf[i].$t_0$)⟩" and the branches with broken lines going out at the bottom center of Block(5e) in Table 5, marked (2) with annotation, "$\forall(i)$(C.f[i]:port-ECT(cf[i].$t_0$))". The angle brackets in (1) indicate that activation is at the end of ⟨C.f[i]:port-ECT(cf[i].$t_0$)⟩ execution, and absence of angle brackets in (2) indicate that activation begins the port-ECT. It is possible that index i in the existential quantifications in (1) and (2) is equal to the j appearing in the header of Block(5e) in Table 5, since it is possible that the counter services a second person entering through the same gate Et[j] in the polling cycle following the one in which the first person was serviced, with no intervening services at any other gate. In all other parallel activations in Table 5, there are no ellipses, because ports to which signals are being sent would be waiting for them. Inside each block, sequential activations occur in the order events occur in the block.

When the turnstile Et[j] senses personEntering by sensing delivery signal at its port Et[j].$f_r$, shown in (5b,2) of Table 5.2, Et[j] begins to respond to the received message. It asks the counter for entry permit and depending on the response received from the counter, either lets the person enter or displays sign, "PARK FULL". It is worth noticing the sequential branching at the bottom of Block(5b) in Table 5. This occurs as a result of non-deterministic polling shown in (5b,5) in Table 5.2. System picks out from the ETC-networks in Tables 5.1 through 5.3 and Tables 6.1 and 6.2 events needed to prove the CTL-assertions (7.2) and (7.3), as described in the subsection 7.1.2.

Summary: Sequential activations between ECT blocks in Tables 5 and 6 represent Execution orderings of events in the network. These are determined by polling cycles and order in which TIPs in cells are executed. We refer to sequential ordering caused by TIP executions as causal ordering. Thus orderings inside ECT-blocks are causal orderings. The network in Table 5 shows the series/parallel composition of port-ECTs that are consistent with port-ALLEOPs and polling cycle definitions in Appendix I. Let us now consider the structure of ALLEOP-proofs developed by the system.

7.1.2. Structure of ALLEOP-Proofs

The proof system searches the ECT-network (i) to identify matching correspondences between time points postulated in CTL-assertions and virtual time points in ECT-blocks; (ii) to find causal chains in ECT-networks from starting events in CTL-assertions to ending events; and (iii) analyze the causal chains to verify that claims in CTL-assertions are satisfied by the causal chains. In this example, searches are simple. They do not show complexities that may arise due to multiple choice points, multiple parallel activations (forks) and iterations. Some of the complexities that appear in such searches arise in the DP-Solution in Section 7.4.

The following matching time points between those specified in the CTL-statements and the virtual time points in the ECTs in Tables 5.1 through 5.3 and Tables 6.1 and 6.2, are displayed by the proof system:

---

Matching time points for statement (7.2),
for j = 0,1
   $ctl.t_0 = et[j].t_0$: $Et[j]$:personEntering?( );   (5b,3) Starting Events
   $ctl.t_1 = cf[j].t_2$: [•→ counter++] begins;   (5f,2)
   $ctl.t_2 = cf[j].t_3$: [•→ counter++] ends;   (5f,3)
   $ctl.t_3 = et[j].t_2$: $Et[j]$:personInPark?( );   (5c,4) ending Events   (7.5)
Matching time points for statement (7.3),
for j = 0,1
   $ctl.t_4 = xt[j].t_0$: $Xt[j]$:personLeaving?( );   (6b,3) starting Events
   $ctl.t_5 = cf[j+2].t_2$: [•→ counter--] begins; (6d,3)
   $ctl.t_6 = cf[j+2].t_3$: [•→ counter--] ends; (6d,4)
   $ctl.t_7 = xt[j].t_2$: ⌐$Xt[j]$:personInPark?( ); (6c,4) Ending Events   (7.6)

---

There are two possible starting/ending events, one for j=0 and the other for j=1, as shown in (7.5) and (7.6) that match with the events in (7.2) and (7.3), respectively. The system displays the following causal chains between starting and ending events in the ECTs that correspond to (7.5) and (7.6) for j=0, 1. Causal chains derived from ECT-tables are put in trace format.

---

For the Entrance Gate $Et[j]$:
  [{⟨$Se[j]$.personEntering⟩($se[j].t_1$)}[•→ $Se[j].g^s(se[j].t_1)$]
  ⟨$Et[j].f_r$:mR?(⟨$Et[j].f_r^D$⟩($e[j]ft.t_0=se[j].t_2$))⟩ ($e[j]ft.t_1$)}
  [•→ $Et[j].g^s(e[j]g.t_0)$] [→ ⟨$C.f[j]^D$⟩($e[j]g.t_1=cf[j].t_0$)]
  //parallel activation begins here
  || [•→...•→ {⟨$C.f[j]$:mR?(⟨$Et[j].f_r^D$⟩⟨$C.f[j]^D$⟩
  ($e[j]g.t_1$))}
        {⟨counter.count < max⟩($cf[j].t_2$)}
        [•→ counter++($cf[j].t_2$)]
        {⟨counter.count ≦ max⟩($cf[j].t_3$)}
        [•→ $C.f[j]^s(cf[j].t_3)$] •→
        [⟨→ $Et[j].g^D$⟩($cf[j].t_4 = e[j]g.t_2$)] •→...•→]
    // continues with the next port of the counter with a
    service request.
    //activity resumes in $Et[j]$,in response to signal from $c.f[j]$.
    {⟨$Et[j].g$:mR?(⟨→ $Et[j].g^D$⟩($cf[j].t_4 = e[j]g.t_2$))*⟩
    ($e[j]g.t_2$)}
      [•→ $Et[j].g$:letPersonIn( ) ($et[j].t_1$)]
    {$Et[j]$:personInPark?( ) ($et[j].t_2$)}
      [•→ $Et[j].f_r^s(et[j].t_1 < e[j]ft.t_2)$]
      [⟨→ $Se[j].g^D$⟩($e[j]ft.t_3$)]]   (7.7)

---

Here we ignore the case where entry is denied; the CTL-statement does not call for it.

---

For the Exit Gate $Xt[j]$:
  [{⟨$Sx[j]$:personLeaving⟩($sx[j].t_1$)}[•→ $Sx.g^s(sx[j]g.t_1)$]
  ⟨$Xt[j].f_r$:mR?(⟨$Xt[j].f_r^D$⟩($x[j]ft.t_0=sx[j].t_2$))⟩($x[j]ft.t_1$)}

[•→ $Xt[j].g^s(x[j]g.t_0)$][→ ⟨$C.f[j+2]^D$⟩($x[j]g.t_1=cf[j+2].t_0$)]
  || [•→...•→ {⟨$C.f[j+2]$:mR?( )⟩($cf[j+2].t_1$)}
      [•→ counter--($cf[j+2].t_2$)]
    {⟨counter.count < max⟩($cf[j+2].t_3$)}
    [•→ $C.f[j+2]^s(cf[j+2].t_3$)]
    [⟨→ $Xt[j].g^D$⟩($cf[j].t_4 = x[j]g.t_2$)]]
{⟨$Xt[j].g$:mR?(⟨→ $Xt[j].g^D$⟩($cf[j].t_4 =$
$x[j]g.t_2$))*⟩($x[j]g.t_2$)}
    [•→ $Xt[j].g$:letPersonOut( )($x[j]g.t_2$)]
{⟨⌐$Xt[j]$:personInPark?( )⟩($xt[j].t_1$)}
    [•→ $Xt[j].f_r^s(x[j]g.t_3 < x[j]ft.t_1)$]
    [⟨→ $Sx[j].g^D$⟩($x[j]ft.t_2$)]   (7.8)

---

As the system constructs traces it marks events in ECT-networks that occur in the traces, and keeps track of the events and their virtual time points. We refer to this process as symbolic evaluation of CTL-statements over ECT-networks. Reader may verify that traces (7.7) and (7.8) follow from Tables 5.1-5.3 and 6.1-6.2. During trace construction conditions are enclosed in chain brackets gathering together all conditions that occur at the same virtual time point into one conjunction. Action events are enclosed with in square brackets with the evaluation sign, →.

At this point, user notices that there is incomplete specification of requirements. In (7.7) the counter is active during the semi-closed intervals, [$cf[j].t_2$, $cf[j].t_3$) for j=0, 1. In (7.8) it is active during the intervals, [$cf[j+2].t_2$, $cf[j+2].t_3$). It has not been specified that non-intersection of time periods during which the counter is active should hold true for all intervals corresponding to all values of j=0, 1. User clarifies the situation here by specifying that it should hold for all j, at both entrance and exit turnstiles. System has to now analyze the traces in (7.7) and (7.8) to verify that the updated CTL-assertions (7.2) and (7.3) hold true for all j, j=0, 1 both for entrance and exit gates.

There are three general requirements that should be satisfied by all ECT-networks in order to guarantee progress:

General Requirements to be Satisfied by all ECT-Networks:

GR-1. Time points postulated in CTL-statements should have matching time points in traces.

GR-2. Every port receiving a delivery signal should have two activations: one is sequential activation and the other is parallel activation.

GR-3. Every port with synchronous polling, whether polled in a polling cycle or polled in an embedded TIP, should have a signal delivered to it eventually through parallel activation.

All the above three requirements are satisfied for the networks in Tables I and II. In this example, there are two additional requirements: (a) the counting event should occur only once in each causal chain and (b) no two counting invocations should overlap. Even when counter appears only once in each causal chain it is possible for two counter invocations to overlap because of parallel executions of causal chains. Immediate causal chains of events in (7.7) and (7.8) indicate that for ports $c.f[j]$, 0≦j<4, instances of either counter++ or counter-- occur only once in each causal chain. This satisfies requirement (a). System notices that requirement (b) is also satisfied. This follows from the sequential activations from (1) and to (2) at the bottom of Table 5. Thus, for $C.f[j]$, 0≦j<4, a second invocation of counting by the counter occurs only after the first invocation has terminated. Thus intervals during which counter is counting do not overlap. System easily verifies this. This completes the proof for Stmt 1 and Stmt 2, as updated by the user.

We validate Stmt 3 by proving that the total number of people in the park is always less than or equal to max. This corresponds to condition synchronization in Maggie & Kramer, [13]. This is a NFSP-proof and requires induction of the following kind:

---
Basis: counter.count = 0 ≦ max.
Induction Hypothesis: counter.count = N ≦ max.
Ind. Step: [(Et[0]:personInPark?( ) ∨ Et[1]:personInPark?( ))⇒
　　　　　counter.count ≦ max) &
　　(¬Xt[0]:personInPark? ( ) ∨ ¬Xt[1]:personInPark?( ))]))⇒
　　　　　counter.count ≦ max)]　　　　　　　　　　　(7.9)
---

User guides the system by providing the following CTL-assertions to prove the induction step:

---
[∀(i,j)(0≦j≦1)∃(e[j].t₀ < e[j].t₁)∃(x[j]t₀ < x[j].t₁)
[{⟨Et[j]:personEntering?( )⟩(e[j].t₀)} →...→
　　　　　[•⟨→ Et[j].g:letPersonIn( )⟩(e[j].t₁)]
　{⟨Et[j]:personInPark & counter.count≦ max⟩(e[j].t₁)}] &　　(7.10)
[{⟨Xt[j]:personLeaving?( )⟩(x[i].t₀)} →...→
　　　　　[•⟨→ Xt[j].g:letPersonOut( )⟩(x[i].t₁)]
　{⟨¬Xt[j]:personInPark & counter.count ≦ max⟩
(x[i].t₁)}]]　　　　　　　　　　　　　　　　　　　　(7.11)
---

System validates these by using definitions of personEntering?( ) and personLeaving?( ) given in Appendix I and evaluating (7.10) and (7.11) over the ECTs in Tables 5.1 through 5.3 and 6.1 through 6.2 for all possible orderings of pairs of turnstiles, since the starting and ending time points in each pair, (e[j].t₀<e[j].t₁) and (x[i].t₀<x[i].t₁) for 0≦j≦1, are incomparable. For example, after a person at gate Et[0].f, is let in, before the person enters the garden it is quite possible another person at gate Et[1].f, was also let in, and this second person may actually enter the garden before the first person, since the times at which persons enter and leave the garden are incomparable. In the mean time it is also possible that other persons left the garden. In which ever order the persons enter or leave the garden, counter.count≦max, holds true after persons at gates Et[j].f, and Xt[j].f, enter or leave the garden. This is confirmed by the causal chains (7.7) and (7.8). One may install as many entrance and exit gates as one wants; induction will still hold. Proofs by induction require user guidance.

It should be clear that the system organizes information in traces and polling cycles in to a network of ECT-blocks in a form that is convenient for finding time points that match with those in given CTL-statements, and build traces that match the starting and ending events in the CTL-statements. Causal chains identified in ECT-networks are easily transformed to trace formats.

7.1.3. Comments

The claims proven here are properties of the implementation since ALLEOPs and traces were automatically derived from the implementation. It may be noted, as parallel activations transfer control from one cell to another, symbolic evaluation of CTL-statements over the ECTs may be done in parallel, since we may have a CPU assigned to each cell. In this example the ECTs are simple, and parallel evaluation is not needed. Only sequential compositions occur here, since for each entry and exit, the turnstile waits until the counter has completed its task, and servicing of each entry and exit through any one gate is done sequentially by the counter. The only logical inferences needed here were for the incorporation of definitions in (I.4) and (I.11) given above. Since pthreads are pair wise independent and may be proven correct independently proving CTL-statements will only involve chasing causal sequences in ECT-networks of implementations, making propositional inferences to make selections at choice points, when needed, and analyzing causal chains to verity conditions in CTL-assertions.

Causal chains that satisfy CTL-assertions validate those assertions. If a CTL-assertion is not valid, this proof method may provide a counter example. If an ending event is not reachable, and the ALLEOP is a finite-ALLEOP then proof will terminate with a counter example. For non-finite-ALLEOPs, proofs may not terminate; user intervention may be necessary. After finding the needed causal chains, the system analyzes sequential and parallel activations to ascertain mutual exclusion properties and partial orderings of events. Proof method is interactive. At each stage of proof system presents its findings to users and gives opportunities for users either to modify given CTL-statements based on the findings, or provide new assertions that may guide proof search. In this example identification of matching time points and causal chains were simple. A more complicated proof, involving tracking of states of cells, occurs in the DP-solution in Section 7.4. In all cases, user has the responsibility to choose the set of CTL-statements whose validity verifies correctness of an implementation, as discussed in Section 7.5. For complex implementations, this may be a non-trivial problem.

This example used only point-to-point signal exchanges without virtualMemories. The remaining examples use virtualMemories in their pathways. So we introduce first the structure of virtualMemory and operations associated with it.

7.2. Structure of VirtualMemories

FIG. 11 shows a schematic diagram of a virtualMemory. It has five components: SP for scratchpad, E for executionMemory, W for writeMemory, R for readMemory and S for signalMemory. The executionMemory holds pthreads, data and provides execution environment for them. We assume that each item of data in the execution memory will be flagged with a key referring to its identity in a main memory or a database, if there is one. The signalMemory holds values of signals associated with ndFSMs embedded in the pathway that contains the virtualMemory. The readMemory holds the message delivered to a port and the writeMemory holds the message sent out from a port. When a message is sent out using the send command, s( ), the read/write memories are switched with each other before message is delivered. When a message is forwarded using the forward command, f( ), read/write memories are not switched. This guarantees that the parent cell of a message receiving port may always read delivered messages from the readMemory. The forward command f( ) is used in the DP-solution (Dining Philosophers) presented in Section 7.4. Protocol for distinguishing between send/forward commands is described in Section 8.

If cells in a cell-group use the same virtualMemory, M, then each cell in the group will have a port which belongs to a port-group, and all ports in that port-group will be tuned to the same agent attached to M, as shown in FIG. 19. Cells in such cell-groups will use the scratchpad SP of M to exchange data during parallel pthread executions in the environment provided by the executionMemory of M. Data from a database or a main memory may be shared by a cell-group only after they have been copied into virtualMemories.

As mentioned earlier, each port p is tuned to a virtualMemory, M, by being connected through a branch to an agent attached to M. "VirtualMemory of p" refers to the virtualMemory p.vM=M that has been so tuned to p. We write p.rd=p.vM.rd, p.wr=p.vM.wr, p.sp=p.vM.sp, p.ex=p.vM.ex and p.sm=p.vM.sm to, respectively, refer to the read, write, scratchpad, execution and signal memories of p.vM. We write p.wr:wR(msg) to write a blank instance of the message subclass, msg, (called the container for msg) into the writeMemory of M, may be with some default data values. We use p.rd:wR(msg) to similarly write a container for msg into the readMemory of p.vM; similarly for other components of M. We write p.rd:msg( )=p:msg( ), and p.wr:msg( ) to, respectively, refer to the messages in the read and write memories of M. We use p:make(msg, [<dataSpecifications>]) to write an instance of msg with the specified data into the writeMemory p.wr of p, if a container is not already present in p.wr. If a container is present in the virtualMemory, then the make command fills it with the specified data; p.rd:make(msg, [<dataSpecifications>]) does the same for the readMemory. Similar make and write methods are assumed to be defined in the Read/Write/Scratchpad/Execution/Signal memory components of VirtualMemories.

In most applications, containers for needed message subclasses are installed into virtualMemories at the time of initialization. Thus, normally only the make command is used. Compiled codes for message subclasses and methods defined in them, are held in the executionMemory of the virtualMemory. Thus, all methods and data defined in message subclasses and installed in virtualMemories will be available to parent-cells of ports tuned to those virtualMemories, when those ports are in state S and only when the ports are in state S. It is possible that more than one virtualMemory contains codes for the same message subclass.

We use p:msg( ):empty?( ) to check whether message in the readMemory of port p is empty, i.e. does not contain any data and use p.wr:msg( ):empty?( ) to check the same for message in the writeMemory of port p. Similarly, p:msg( ).attribute: empty?( ) and p.wr:msg( ).attribute:empty?( ) are used to check whether the specified attribute of messages is empty in read and write memories of p.vM. We use, p.rd:empty?( ) and p.wr:empty?( ) to check whether the indicated memories are empty; i.e. no containers are present. We use p.vM:clear( ) to clear the contents of all memories of p.vM. Similarly, p.rd:clear( ) and p.wr:clear( ) to clear the read or write memories of p.vM, respectively. Similar, assertions are defined for the scratchpad, execution and signal memories as well.

FIG. 19 describes the structure of a group-to-group pathway connecting ports in a generalPort group G to ports in the functionPort group F. All parent-cells of ports in a port-group in this figure, use the same virtualMemory, M, shown in the figure. Each cell in such a cell-group that uses the virtualMemory M, may read data in the memory, only when it has access to it. Access is controlled by the ports in the port-group. At any given time, either parent-cells of ports in group G of FIG. 19 may access M, or parent-cells of ports in group F may access M; both of them cannot access M simultaneously. Parent-cells of ports belonging to any port-group tuned to a virtualMemory, M, may simultaneously execute in parallel pthreads in the execution memory of M, accessing and using commonly shared data and pthreads.

Coordination of such simultaneous parallel executions of pthreads by parent-cells of ports in port-groups using the same virtualMemory M is facilitated by the following: (i) facilities for simultaneous read access to shared data in the virtualMemory, (ii) facilities to use pthread-locks where needed to coordinate data updates (when pthread-locks are used they would apply only to the cells in the cell-group that use M), and (iii) facilities to communicate through commonly shared scratchpad memory during parallel executions, in order to coordinate computations. Communications via the scratchpad may occur using the CSM [10-12] mode of message passing.

Possibility for memory contention is limited by limiting the number of cells in cell-groups. We estimate, in practice the number of cells in a cell-group is likely to range from 1 through 4 and never exceed 16. To prevent data overwriting and to protect data, the area of virtualMemory into which a cell in a cell-group may write is restricted. Ports in a port-group that are tuned to the same virtualMemory may hold addresses of non-overlapping memory areas into which parent-cells of those ports may write data. These facilities may be used to effectively minimize memory contention. We present in Section 10 a memory organization for shared-memory multiprocessors, using SMMs (Shared Memory Modules), which exploits the virtualMemory organization of software in TICC™-Ppde to dramatically reduce memory contention and increase data protection and security.

At this point, we introduce rules for condition migration over communication events: In the case of message sending using p:s( ) the message characterizing conditions get switched between read/write memories. In the case of message forwarding using p:f( ) the conditions do not get switched:

$$\Box[\{(p.rd:<C1>?(\,) \& p.wr:<C2>?(\,))(t_1)\}[p^s(t_1)] \to \langle q^D \rangle(t_2)] \\ \{(q.rd:<C2>?(\,) \& q.wr:<C1>?(\,))(t_2)\}] \quad (7.12)$$

$$\Box[\{(p.rd:<C1>?(\,) \& p.wr:<C2>?(\,))(t_1)\}[p^F(t_1)] \to \langle q^D \rangle(t_2)] \\ \{(q.rd:<C1>?(\,) \& q.wr:<C2>?(\,))(t_2)\}] \quad (7.13)$$

The superscript, $F$, in $p^F(t_1)$ in (7.13) indicates that the message is being forwarded.

Next two subsections present, PC-Solution (Produce/Consumer) and DP-Solution and ALLEOP-proofs associated with them. Solutions are implemented without having to use semaphores [Dijkstra, 23,24], monitors [12], rendezvous or sequential buffers. We have said this several times; but we believe it is worth repeating, since semaphores, rendezvous and monitors are well entrenched mechanisms in programming technology and are considered indispensable. They have been in use for more than four decades now!

7.3. The Producer/Consumer Solution: PC-Solution

Our objective here is to illustrate use of parallel buffers. The network for the PC-solution is shown in FIG. 12 and the solution is presented in Appendix II. It has n producers, P[i], $0 \leq i < n$, and m consumers, C[j], $0 \leq j < m$ connected to a distributor, D. The environment cell, E, is used to start/stop the application based on external interrupt signals. VirtualMemories P[j].f.vM=D.g[j].vM for $0 \leq j < m$ provide parallel buffering for products that produces P[j] send to distributor D. VirtualMemories C[j].g.vM=D.f[j].vM are used to send products to consumers C[j]. Please see Appendix II for the CIPs, TIPs, Polling cycles, and ALLEOPs of the implementation.

We want to prove the following:

(Stmt 1) Every manufactured product is delivered to the distributor.

(Stmt 2) Every consumer with a request for product, gets the product.

CTL-assertions for the above two statements are:

(Stmt 1): $\Box[\forall j \forall x [x=P[j]:produceProduct(\,) \Diamond (D.g_j: msg(\,).content=x)]$ (7.14)

(Stmt 2): $\Box[\forall j (C[j].g^S \Diamond C[j].hasProduct)]$ (7.15)

In (7.14), P[j] produces a product and distributor eventually receives it at its port $D.g_j$. In (7.15) consumer C[j] sends in a request for a product by executing $C[j].g^S$ and eventually gets the product.

The first task performed by the system is to transform (7.14) and (7.15) by eliminating modal operators, $\Box$ and $\Diamond$, using rule (6.32) in Section 6, ECT-Network in Table 7, and event characterizations in Tables 7.1 through 7.3. Universal instantiations of $\forall j$ to j and $\forall x$ to product, eliminates quantifiers, Finally virtual time points are postulated. The resultant CTL-statements are shown in (7.16) and (7.17). This task is simplified in this example, since there is only one unique causal chain for each j.

---

Transformed CTL-Statements:
(Stmt 1a): $\Box \exists (ctl.t_0 < ctl.t_1 < ctl.t_2)$
  $[\bullet \to product=P[j]:produceProduct(\ )(ctl.t_0)]$
  $[\bullet \to P[j].f.wr:msg(\ ).contents = product(ctl.t_1)]$
  $\to ... \to (\ D.g[j].rd:msg(\ ).content=product)(ctl.t_2)]$ (7.16)
(Stmt 2a): $[\forall (ctl.t_3) \exists (ctl.t_3 < ctl.t_4 < ctl.t_5)$ //C[j] sends out a request
  $C[j].g^s(ctl.t_3) \to (\exists (k)(0 \leq k<n)D.g[k]:mR?(\ ))^*(ctl.t_4)$
  $\to ... \to C[j].hasProduct(ctl.t_5)]$ (7.17)

---

The ECT-network for the PC-Solution is shown in Table 7 and the ECT-blocks are shown in Tables 7.1 through 7.3. Reader should be able to follow information provided in these tables through analogy with ECT-tables presented in OG-Solution. The system picks information it needs from these tables during proof construction. The general requirements GR-1 and GR-2 mentioned in Section 7.1 are satisfied for the ECT-networks in Tables 7 and Tables 7.1-7.3. However, satisfaction of GR-3 does not follow immediately. We have to prove that the search for a delivered product performed by, $(\forall (k)(0 \leq k<n)D.g[k]:mR?(\ ))^*$, in (7d,4) in Table 7.2 will succeed every time. Evaluation of the statements (7.16) and (7.17) over the ECTs in Tables 7.1 through 7.3 yields the following matching time points (references to events corresponding to the virtual time points in the blocks are given below:

---

For (7.16):  $ctl.t_0 = p[i]f.t_2$: P[i] produces product, (7e,4)
  $ctl.t_1 = p[i]f.t_3$; puts it into writeMemory, (7e,5)
  $ctl.t_2 = p[i]f.t_5$; delivers it to D.g[i]: (7e,7) (7.18)
For (7.17):  $ctl.t_3 = (c[j]I.t_2|c[j]g.t_3)$; requests product, ((7a,4)|(7b,8))
  $ctl.t_4 = dg[k]t.t_0$; D begins search: (7d,4)
  $ctl.t_5 = c[j]g.t_2$; consumer gets it: (7b,5) (7.19)

---

System identifies flow of events in the ECT-network in Tables 7.1 through 7.3 that correspond to the flow of events in the CTL-statements and puts them into trace formats. These are shown below: Trace (7.20) shows the flow of events from the time producer P[i] senses an order for a new product, to the time when the product is delivered to the distributor port D.g[i]. Trace (7.20) specifies the following: On sensing receipt of a message at its port P[i].f, P[i] produces a product, puts it into the writeMemory of P[j].f and sends it off to D.g[i], which uses it some time later from its readMemory. This validates (7.16). Notice, the two time points, $(dg[k]t.t_0, p[i] f.t_5)$, in (7.20) are incomparable. Thus, product deliveries and search for products are not synchronized.

---

$P[i].f:trace(p[i]f.t_0) =$
$\{ \langle P[i].f:mR?(\langle P[i].f^D \rangle (p[j]f.t_0) \rangle (p[i]f.t_1)\}$
  $[\bullet \to product=P[i]:produceProduct(\ )(p[i]f.t_2)]$
  $[\bullet \to P[i].wr:msg(\ ).contents = product(p[i]f.t_3)]$
  $[\bullet \to P[i].f^S(p[i]f.t_4)]$
  $([\to \langle D.g[i]^D \rangle (p[i]f.t_5)]$
    $\| \{ \langle D.g[i].rd:msg(\ ).contents=product \rangle (p[i]f.t_5) \}$
    $\to ... \to \{ (\exists (k)(0 \leq k<n)D.g[k]:mR?(\ ))^*(dg[k]t.t_0) \} )$
    $\to P[i].f:trace(p[i]f.t_5)]$ (7.20)

---

$C[j].g:trace(c[j]g.t_0) =$
$\{ \langle C[j].g:usedUp?(\ )^* \rangle (c[j]g.t_3) \} [\bullet \to C[j].g^S(c[j]g.t_3)]$
  $([\to D.f[j]^D \rangle (c[j]g.t_4)]$
    //activities in distributor started by the above parallel activation
    $\| [\to ... \to \{ \langle D.f[j]:mR?(\langle D.f[j]^D \rangle (c[j]g.t_4=df[j]t.t_0)) \rangle (df[j]t.t_1) \}$
    $\{ \langle (\exists (k) (0 \leq k<n)D.g[k]:mR?(\ ))^*(dg[k]t.t_0) \rangle (dg[k]t.t_1) \}$
    $\{ \langle \exists (product)D.g[k].rd.msg(\ ).contents =$
                                        $product \rangle (dg[k]t.t_0) \}$
      $[\bullet \to D.g[k]:moveProduct(D.f[j]) (dg[k]t.t_1)]$
    $\{ \langle D.g[k].rd:msg(\ ).contents = \phi \ \&$
      $D.f[j].wr:msg(\ ).contents=product \rangle (dg[k]t.t_2) \}$
      $[\bullet \to D.g[k]^S(dg[k]t.t_2)]$//sends in an order for a new product
    $([\to P[k].f^D \rangle (dg[k]t.t_3)]$//order is delivered to the producer.
      $\| \to ... \to P[k].f:trace(p[j]f.t_0 \geq dg[k]t.t_3)$
    $[\bullet \to D.f[j]^S(df[j]t.t_3)]$ //sends product to consumer
    $([\to C[j].g^D \rangle (df[j]t.t_4)]$ //delivers product to consumer
      //D proceeds to poll its next functionPort.
      $[\bullet \to \exists (i) (0 \leq i<m)D.f[i]:trace(df[i]t.t_0=df[j]t.t_4)])]$
    $\bullet \to ... \bullet \to )/*activities*/]$
//back to what happens at consumer C[j]. In the following, consumer senses delivery.
$\{ \langle C[j].g:mR?(\langle C.g[j]^D \rangle (c[j]g.t_0 = df[j]t.t_4)) \rangle (c[j]g.t_1) \}$
$\{ \langle C[j].g.rd:msg(\ ).contents = product \rangle (c[j]g.t_1) \}$
  $[\bullet \to C[j].g:pickUp(\ ) (c[j]g.t_1)]$
$\{ C[j].g.rd:msg(\ ).contents=\phi \ \& \ C[j].hasProduct \rangle (c[j]g.t_2) \}$ (7.21)

The trace (7.21) displays the causal chain of events from the time consumer C[j] puts in a request for a product to the time C[j] has the product. Flow of events in (7.21) is guaranteed only if the search, $\exists (k)(0 \leq k<n)D.g[k]:mR?(\ ))^*$ in (7d, 4) succeeds every time. D.g[k] receives its product delivery from P[k].f. The search, $\{(\exists (k)(0 \leq k<n)D.g[k]:mR?(\ ))^*(dg[k]t.t_0)(dg[k]t.t_1)\}$ in (7.21) begins at time $dg[k]t.t_0$ and ends at time $dg[k]t.t_1$ when the product is moved to D.f[j] (see (7d,6)). This search can succeed every time if and only if there is a producer P[k] that delivered a product to D.g[k] via P[k].f↔D.g[k] for $(0 \leq k<n)$ before the time point $dg[k]t.t_1$ and this product was not already used up before $dg[k]t.t_1$. This is guaranteed by line (7d,3). Yet, it requires induction to prove this.

The induction proof goes as follows: The search will succeed for the very first customer because of orders put in by the distributor D during its initialization (see (7c,5)). Suppose it succeeds in the $N^{th}$ attempt. It will succeed in the $(N+1)^{st}$ attempt, because after the product is used up in the $N^{th}$ attempt, say at a port D.g[k], a new order is put in to producer P[k] (see (7d,10)). Since, search continues till a product is found, it will certainly succeed when P[k] responds to that order. It is also possible that the search found an as yet unused product at some other port D.g[j]. System proves this interactively by validating assertions provided by the user. We will not present the details here. This satisfies requirement GR-3 in Section 7.1. Therefore, as per (7.21) every consumer receives the requested product. However, to guarantee progress it is necessary to assume the following:

Axiom: $\Box (\exists (i,t) [\bullet \to C[i].g^S(t)])$ (7.22)

i.e., there is always a customer with a request for product, which is the same as saying, there will always be new orders for products to be produced. Otherwise, business stops and the distributor will just keep spinning around its empty ports executing its polling cycles. Also, if there is not enough demand for products then it is possible that some producers just remain spinning. One may redefine the producer CIP to suspend the producer if it keeps spinning for more than a specified amount of time. It will automatically resume operations, if demand picks up and an order is later delivered to it.

Comments: One of the problems we face in proof construction is, we have to resort to proof by induction in situations, where a simple "Star Operation" in a regular expression of an FSP description could validate a requirement. This happens not only because we have no "states" but also because of essential asynchrony in parallel operations. In most cases, the induction proofs are quite trivial, and hopefully it would be possible to devise strategies for a system to construct the proofs automatically.

7.4. Dining Philosopher's Solution: DP-Solution

The DP-solution network is shown in FIG. 13. There is an environment cell, not shown in the figure, which starts and stops the game. There is a butler, btlr, (marked B in FIG. 13) who distributes forks on request and keeps the food supplied. There are five philosophers, P[0] through P[4]. A philosopher can start eating only after he/she gets two forks from the btlr. There are only 5 forks on the table, btlr.frk[j] for $0 \leq j < 5$. Every philosopher P[j] shares btlr.frk[j] with his/her left neighbor $P[j \oplus_5 4]$, and shares btlr.frk$[j \oplus_5 1]$ with his/her right neighbor $P[j \oplus_5 1]$. Thus, no two adjacent philosophers can eat at the same time.

Philosopher P[j] sends in a request for forks, by sending an empty message to the functionPort, btlr.f[j] via P[j].g↔btlr.f[j]. If both forks, btlr.frk[j] and btlr.frk$[j \oplus_5 1]$ are available, then btlr packs the forks into a container in the writeMemory of btlr.f[j] and sends them off. Once this is done, forks will not be available for $P[j \oplus_5 1]$ and $P[j \oplus_5 4]$, until P[j] has finished eating and returns the forks. If philosopher $P[j \oplus_5 4]$ was eating or $P[j \oplus_5 1]$ was eating at the time P[j] requested the forks, or $P[j \oplus_5 1]$ was waiting for forks having put his/her left fork btlr.frk$[j \oplus_5 1]$ on reserve, then forks will not be available for P[j]. In this case, btlr puts P[j]'s left fork, btlr.frk[j], on reserve and philosopher P[j] waits until both forks become available. Once btlr.frk[j] is put on reserve, $P[j \oplus_5 4]$ cannot start eating (again) before P[j] had eaten. Btlr.frk[j] is released from reserve only at the time forks are sent to P[j].

Every philosopher P[j] always returns forks after he/she finishes eating and goes into his/her thinking state, T[j]. After thinking for a while, he/she gets hungry again and puts in an order for forks. Btlr keeps serving the philosophers in cyclic order, P[0]→P[1]→P[2]→P[3]→P[4]→P[0]→ . . . →, until the game ends.

At any point in the game P[j] can be in one of three possible states: E[j] (eating), T[j] (thinking) or W[j] (waiting for forks). Game starts with all philosophers in state T[j], with all forks on the table and available to any philosopher, and food ready. Philosopher P[j] who has sent in a request for forks and whose request is sensed first by btlr, is served first by the btlr, and gets the forks first, even if all the philosophers had sent requests for forks at the same time. After P[j] gets the forks, $P[j \oplus_5 2]$ may get the forks next, if he/she had requested them. Then both may begin to eat and go to states E[j] and $E[j \oplus_5 2]$, respectively. Others, for k≠j and k≠$j \oplus_5 2$ will wait for forks, if they had ordered them, and thus go to state W[k], or just keep thinking if they had not ordered any forks.

The CIPs, TIPs, ALLEOPs are given in Appendix III. The ECT-networks and ECT-blocks are shown in Tables 8, 8.1, 9, 9.1 and 9.2. The game satisfies the following two axioms, which guarantee progress:

(Ax 1): $\forall(j)[\Box(E[j] \diamond (T[j]$ & btlr.frk[j].onTbl & btlr.frk$[j \oplus_5 1]$.onTbl & ¬btlr.frk[j].rsrvd)]$ (7.23)
(Ax 2): $\forall(j)[\Box(T[j] \diamond P[j]$:hungry?( ))] (7.24)

(7.23) says, every eating philosopher always eventually returns the forks and goes into thinking state. (7.24) says, every thinking philosopher eventually gets hungry. The states, E[j], T[j] and W[j] are defined as follows:

$\forall(t)\exists(t_0 \leq t < t_1) (T[j](t) \Leftrightarrow$
  $[\bullet\to P[j]$:thinking( )$(t_0)][\langle\bullet\to P[j]$:thinking( )$\rangle(t_1)])$ (7.25)
$\forall(t)\exists(t_0 \leq t < t_1) (E[j](t) \Leftrightarrow$
  $[\bullet\to P[j]$:eating( )$(t_0)][\langle\bullet\to P[j]$:eating( )$\rangle(t_1)])$ (7.26)
$\forall(t) \exists(t_0 < t_1 < t_2 < t_3) \& (t_1 \leq t < t_3) (W[j](t) \Leftrightarrow$
  $[P[j]$.g:mR( )*$(t_0)$ & btlr.f[j].rsrvd$(t_1)$ &
  $\langle$¬btlr.f[j].rsrvd$\rangle(t_2)$ & $\langle P[j]$.g:mR( )*
  ( )$\rangle(t_3)]$ (7.27)

Notice the starting and ending timings of actions in the above statements. W[j] is a composite state of P[j] and btlr.f[j]. The initial state for the game is, $[\exists(t_0)\forall(j) (\langle T(j)$ & btlr:frksAvlbl(j) &
  btlr.fdContainer:full?( )$\rangle(t_0))]$ (7.28)

$\forall(j)W(j)$ is the only deadlock state here, since for any j, $P[j \oplus_5 4]$ can start eating only after P[j] has finished eating for $0 \leq j < 5$, and for all j P[j] is waiting for forks. Thus, none of the philosophers will be able to start eating. In the following we give proofs for two claims: (i) If the game starts at the initial state in (7.28) then the game will never reach this deadlock state; and (ii) the solution is fair in the sense, every philosopher gets his/her turn to eat, every time he/she gets hungry. In order to simplify descriptions of possible states of the system let us follow the following conventions:

¬T[j] = (E[j] | W[j]); ¬E[j] = (T[j] | W[j]);
¬W[j] = (E[j] | T[j]); and ??[j] = (E[j] | T[j] | W[j]) (7.29)

One may think of states described below as being true at the end or beginning of a polling cycle of btlr. We refer to such states as configurations. Thus, $\forall(j)T(j)$ and $\forall(j)W(j)$ are configurations. User formulates the following CTL-statements in terms of the states, T [j], W[j] and E[j] using the notation in (7.29):

$\Box[\forall(j)W(j) \diamond \forall(k)W(k)]$//never gets out of the deadlock state (7.30)
$\Box[\forall(j)T(j) \diamond \exists(i)[¬E(i \oplus_5 4)\&E(i)\&¬E(i \oplus_5 1)$ &
  $((¬E(i \oplus_5 2)$ & $E(i \oplus_5 3))$ |
  $(E(i \oplus_5 2)\& ¬E(i \oplus_5 3)))] | \forall(k)T(k)]$ (7.31)
$\Box[\forall(j)(W[j] \diamond E[j])]$ (7.32)

Assertion (7.30) characterizes the deadlock configuration. In (7.31) eventually, either one or two philosophers are eating or all philosophers are thinking. In (7.32) every waiting philosopher eventually eats. As we shall see, searches here do not involve finding matching time points, but involve chasing the states of philosophers. The ECT-networks and ECT-blocks in Tables 8, 8.1, 9, 9.1 and 9.2 are used in the proofs below. They are obtained from the traces derived from the ALLEOPs in Appendix III. Here, each ECT-network has a block which defines the initial state of the network. This specifies truth values of predicates when symbolic evaluation begins. This will change as evaluations proceed from one port-TIP to another. If a predicate at a choice point in Table 9 is not specified in the initial state, or is not among the predicates evaluated earlier in ECT-evaluations or cannot be inferred from definitions, then all causal chains emanating from that choice point are included as possible alternates in ECT-evaluations. Before the start of ECT-evaluation corresponding to any polled TIP the system updates the initial state, using results of evaluation made up to that point, using definitions of distinguished predicates given in Appendix III, (III.35) and other definitions supplied by user in the appendix. The convention in ECT-evaluation is, predicates maintain their truth values until they are changed.

As shown in Table 9, butler ECTs have several choice points and parallel activations, but they do not have parallel activation forks. Since all philosophers and the butler run in parallel, symbolic evaluation of their ECTs may be conducted in parallel, when needed. Let us begin with assertion (7.30), which is the simplest one to prove.

Here the initial state is $$\forall(j)[W(j) \& \neg btlr:frksAvlbl?(j) \& \\ btlr.f[j]:mR?(\,) \& btlr.f[j].rd:empty?(\,)] \qquad (7.33)$$

instead of the one shown in Table 9. The predicates appearing in (7.33) have been declared as distinguished predicates; they are used to specify initial states, and to summarize configurations at the end of TIP evaluations. These initial conditions appear towards the end of the ECT Block(9n) in lines (9n, 3-5) in Table 9.1. This is the only ECT block in which W[j] occurs. If there is more than one ECT block with W[j] then the system should verify given assertions starting from each such W[j]. After setting the initial state to predicates in (7.33), evaluations of the ECT-blocks in Table 9 leads again to W[j], following the evaluation path containing blocks (9b)→(9d)→(9f)→(9k)→(9n)→(9r) in Table 9. Block (9n) goes to (9r) directly without sending any message.

As evaluation continues one gets the following sequence of ECT evaluations, as per polling cycle:

$$btlr.f[j]:ECT(...) \rightarrow btlr.f[j\oplus_5 1]:ECT(...) \rightarrow btlr.f[j\oplus_5 2]:ECT(...) \\ \rightarrow btlr.f[j\oplus_5 3]:ECT(...) \rightarrow btlr.f[j\oplus_5 4]:ECT(...) \rightarrow ... \rightarrow \qquad (7.34)$$

Thus, one gets $\forall(j)(W[j] \rightarrow ... \rightarrow W[j])$, since nothing changes. Thus, the configuration never changes. System recognizes this after going through evaluations corresponding to one complete polling cycle, starting at btlr.f[j] and ending at btlr.f[j$\oplus_5$4]. Notice, in state W[j] the btlr does not send any response message back to P[j] in the ECT-block (9n) and neither does P[j] sends message to btlr. As per definitions of guards given in Tables 1 and 2, btlr.f[j]:mR?( ) evaluates to true in every polling cycle since no response message is sent back. This proves (7.30).

Let us now consider the proof of (7.31). In the following we use z to refer to a configuration at the end of a polling cycle. Applying rule (7.32), CTL-assertion (7.31) is converted to, $$\forall(z)(\forall(j)T(j)\rightarrow ... \rightarrow Z) \Rightarrow (Z \diamond EZ) \qquad (7.35)$$

where EZ, is the end configuration defined by, $$EZ = [\forall(k)T(k) \mid \exists(i)[(\neg E(i\oplus_5 4) \& E(i) \& \neg E(i\oplus_5 1) \\ \& ((\neg E(i\oplus_5 2) \& E(i\oplus_5 3)) \mid (E[i\oplus_5 2]\& \neg E(i\oplus_5 3)))] \qquad (7.36)$$

where one or two philosophers are eating or all of them are thinking. The first task is to find out what the configuration z could be after one polling cycle of the butler, starting from the initial state, and updating the initial state of btlr.f[j]:port-ECT( ) for each j before its evaluation and following all alternate causal chains at each choice point in Table 9, where predicate values are not available. The system quickly finds out that Z=EZ, as follows: In Table 8.1 Block(8b), for $0 \leq j<5$, philosopher P[j] gets hungry and sends request to the butler for forks by executing P[j].g$^5$ at time p[j]g.$t_0$ in line (8b,5) and delivers it to btlr.f[j] at the time point p[j]g.$t_1$=bf[j].$t_0$ for $0\leq j<5$. These message delivery times for different values of j are incomparable, since philosophers run in parallel. Polling times at which butler polls btlr.f[j] to sense message delivery are bf[j].$t_1$, for $0\leq j<5$, where bf[j].$t_1$<bf[j$\oplus_5$1].$t_1$ as per polling cycle definition in Appendix III. These time points are also incomparable, since message sensing is not synchronized with message delivery.

The only requirement here is that message deliveries should occur before message sensing, in order for delivered messages to be sensed. If a philosopher P[j] happens to have sent in a request before btlr polls its port btlr.f[j], then btlr will sense the message receipt at that port, else it will not. It is possible that all philosophers send requests simultaneously, none of them send requests during a polling cycle of the butler, or some do and some do not. Since operations of the butler and philosophers are not synchronized, while btlr polls its functionPorts it may sense a message receipt at some of its ports some times, or may not sense any message in a polling cycle, or sense messages at all of the ports in a polling cycle. Thus, it makes sense to include all possible alternate causal chains that emanate from each choice point in Table 9. In the case of the predicate btlr.f[j]:msg( ):empty?( ) appearing in ECT-blocks (9f) and (9g) in Table 9, user supplies the following definition, $$\forall(j)[\Box(P[j]:hungry?(\,) \& btlr.f[j]:mR?(\,)) \Leftrightarrow \\ btlr.f[j].rd:msg(\,):empty?(\,)] \qquad (7.37)$$

System verifies this definition using the ECT blocks in Tables 8 and 9 and uses this definition to determine the branch to be taken at the choice point with the condition btlr.f[j]:msg( ):empty?( ). System uses distinguished predicates given by users to update initial states, where necessary. Typically, the need for making logical inferences arises in ECT-evaluations, only while evaluating predicates or while updating initial states.

Assertions (7.35) and (7.36) do not give any criteria for selecting causal chains at choice points in Table 9. Thus, the system analyzes all possible causal chains that are consistent with the predicates in the initial state and given definitions, at each choice point in Table 9, and finds out that z in (7.35) is equal to EZ in (7.36). This is summarized by the tree in FIG. 14, where a possible configuration after a polling cycle of butler is specified by the states in any one of the branches in the tree. Reader may notice that every branch in FIG. 14 satisfies the pattern in EZ: either all philosophers are thinking, or one or two of them are eating. Thus, the configuration after the first poling cycle, starting from the initial state satisfies $$\Box[\forall(j)T(j)\rightarrow ... \rightarrow EZ]. \qquad (7.38)$$

Therefore, in order to prove (7.35) the system attempts to find a configuration Z1 such that $$\Box[EZ \rightarrow ... \rightarrow Z1] \qquad (7.39)$$

holds true by doing the following: It firsts creates an existential instantiation of the variable i in (7.36) by setting i=j, and proceeds as follows: The possible initial configurations are $$[\neg E(j\oplus_5 4)E(j) \neg E(j\oplus_5 1)\neg E(j\oplus_5 2) \neg E(j\oplus_5 3)] \text{ or }$$
$$[\neg E(j\oplus_5 4)E(j) \neg E(j\oplus_5 1)E(j\oplus_5 2) \neg E(j\oplus_5 3)]. \quad (7.40)$$

The state $\forall(j)T(j)$ is discounted, since it has been already considered in (7.38). Substituting for the negated states in (7.40) as per definitions given in (7.29), results in $(2^4+2^3)$ possible initial configurations. For each initial configuration the system finds the initial conditions that should be true for that configuration from the ECTs and definition of distinguished predicates given by user and includes them in the block of initial conditions in Table 9, where appropriate. After doing this, for each initial state it evaluates the ECT-blocks following all possible causal chains that are consistent with given initial conditions, and finds that Z1=EZ holds true (for Z1 in (7.39) and EZ in (7.36)) for all initial conditions and $\neg EZ = \forall(j)W(j)$. This proves (7.35), (7.36) and (7.31).

Notice, by doing this the system effectively builds the state diagram for the dining philosophers' solution starting from its implementation. Here we did not have to search for matching time points, but only for possible configurations reached in polling cycles. Let us now state a Lemma which follows from the state diagram computed by the system. This lemma is useful to prove (7.32).

$$\text{Lemma 1: } \Box \forall(j)[W[j] \Rightarrow (??[j\oplus_5 4]W[j] \neg T[j\oplus_5 1]$$
$$\lor E[j\oplus_5 4]W[j]??[j\oplus_5 1]$$
$$\lor T[j\oplus_5 4]W[j]T[j\oplus_5 1])] \quad (7.41)$$

This specifies what the states of philosophers $P[j\oplus_5 4]$ and $P[j\oplus_5 1]$ could be, if $P[j]$ was in state $W[j]$. When states are substituted to expand the notation in (7.41) we get 8 possible distinct triplets. The triplets are:

$$T[j\oplus_5 4]W[j]E[j\oplus_5 1], T[j\oplus_5 4]W[j]W[j\oplus_5 1], W[j\oplus_5 4]W[j]E[j\oplus_5 1],$$
$$W[j\oplus_5 4]W[j]W[j\oplus_5 1], E[j\oplus_5 4]W[j]E[j\oplus_5 1], E[j\oplus_5 4]W[j]W[j\oplus_5 1],$$
$$E[j\oplus_5 4]W[j]T[j\oplus_5 1], T[j\oplus_5 4]W[j]T[j\oplus_5 1] \quad (7.42)$$

The system easily verifies that the specified triplets are consistent from the state diagram it has already constructed. If the state diagram has not been constructed, then the system can verify each triplet by setting up appropriate initial states for $W[j]$ and evaluating the ECT-blocks in Tables 8 and 9, for an arbitrarily chosen j. For each triplet in (7.42) the states not specified in (7.42) can be any state that is consistent with the specified triplet.

The proof of (7.32) follows from the fact that every eating philosopher returns the forks (from (7.24)), every thinking philosopher eventually gets hungry (from (7.25)), and when $P[j]$ is waiting $P[j\oplus_5 4]$ cannot start eating because btlr.frk[j] has been reserved by $P[j]$. If $P[j\oplus_5 4]$ was already eating while $P[j]$ was waiting, then after $P[j\oplus_5 4]$ finishes eating, in the first polling cycle that immediately follows the cycle in which $P[j\oplus_5 1]$ returns the forks, $P[j]$ will get his/her chance to eat. If $P[j]$ had to wait over several polling cycles of butler because $P[j\oplus_5 4]$ was eating for a long time, then by Ax 1 (7.24) it is possible that $P[j\oplus_5 1]$ may begin to eat again after returning the forks, This may happen several times before $P[j]$ gets his/her forks. But, eventually, $P[j]$ will get his/her forks, since $P[j\oplus_5 4]$ cannot start eating again until $P[j]$ has finished eating. This is illustrated in FIG. 15. Here, the argumentation is similar to FSP argumentation using regular expressions.

Let us consider the cases for $T[j\oplus_5 4]W[j]T[j\oplus_5 1]$ and $w[j\oplus_5 4]W[j]W[j\oplus_5 1]$ in (7.42). Assume, polling starts at btlr.f[j]. In the case of $T[j\oplus_5 4]W[j]T[j\oplus_5 1]$ the only possibility is that it changes to $\neg E[j\oplus_5 4]E[j] \neg E[j\oplus_5 1]$. Here $P[j]$ has begun to eat, and so the proof ends. In the case of $W[j\oplus_5 4]W[j]W[j\oplus_5 1]$ the following holds: it follows from (7.35) and (7.36) that there should always be at least one eating philosopher. User provides the assertion, $$\Box \forall(j)[W[j\oplus_5 4]W[j]W[j\oplus_5 1] \Rightarrow (W[j]W[j\oplus_5 1]E[j\oplus_5 2] \lor$$
$$W[j]W[j\oplus_5 1]\overline{\phantom{-}}E[j\oplus_5 2]E[j\oplus_5 3])] \quad (7.43)$$

This assertion is easily validated through evaluations, using (7.36), (7.39) and the configurations in FIG. 14. In the case of the first possibility on the right of in (7.43), namely $W[j]W[j\oplus_5 1]E[j\oplus_5 2]$, by Ax 2 (7.25), it has to lead to the following sequence of transitions: $W[j]W[j\oplus_5 1]E[j\oplus_5 2] \rightarrow W[j]W[j\oplus_5 1]T[j\oplus_5 2] \rightarrow W[j]E[j\oplus_5 1]T[j\oplus_5 2] \rightarrow E[j]T[j\oplus_5 1]??[j\oplus_5 2]$. A similar argument holds for the other possibility on the right of (7.43). Therefore, $P[j]$ eventually eats. The transitions above are all verified by the system.

For each case, the system evaluates ECTs going through successive polling cycles, starting with the appropriate initial states, until the state $E[j]$ is obtained in a polling cycle as the inevitable (only possible) state for $P[j]$. In each polling cycle the initial states are updated before btlr.f[j]:port-ECT( ) evaluation for each j. This is similar to state search in an FSP. In this particular problem, the system may stop repeating its polling cycles when configurations that were reached earlier occur again. This search succeeds in every case. But there are difficulties in this kind of search.

If $E[j]$ is not reachable then for non-finite ALLEOPs it is possible that the system may never terminate, unless user specifies appropriate termination conditions, or system encounters a contradiction, or user stops the system and examines the traces.

Remarks: ALLEOP-proofs are constructed by deriving ALLEOPs and ECT-networks from implementations and by evaluating given CTL-assertions over the ECT-networks and analyzing the resultant causal chains. The system presents the causal chains it finds in the ECT-network in the form of traces. Proof construction is interactive. In all cases, user provides CTL-assertions to be validated and assertions that may guide causal chain (trace) analysis. System validates each assertion provided by user and uses already validated assertions to find new traces, when appropriate. We have illustrated this proof process above for a few simple examples. To simplify the presentation, we did not present for the DP-solution the traces discovered by the system during its searches.

There are five kinds of inter-related activities in ECT-evaluations: (i) Setting up starting and ending configurations that are consistent with given CTL-assertions, (ii) finding matching time points between CTL-assertions and ECTs, when needed, (iii) finding truth values of conditions at choice points in an ECT-network, (iv) finding all traces that lead to ending configurations from starting configurations, and (v) analyzing the traces to validate claims in CTL-assertions. In the case of finite-ALLEOPs, user intervention may be needed only for item (v) above. In the case of non-finite-ALLEOPs it may be needed for both for (iv) and (v).

The proof theory for these proofs is not a complete proof theory, in the sense that the system cannot by itself conclusively proof all provable CTL-assertions. This is because of dependence on user interactions in items (iv) and (v) above. As we gain more experience, it should be possible to automate proof construction to progressively greater extents, by identifying ALLEOP-patterns that are typical, or by establishing correspondences between FSP structures and finite-ALLEOP structures, where possible. We could not state the proof theory independent of how TICC™-Ppde is organized, how it operates, and the computational significance of what is being proven. Before defining the proof theory, we define the denotational fixed point semantics for TICC™-Ppde programming system. This defines the computational significance of what is being proven.

The next subsection introduces criteria that should guide a user to generate CTL-assertions to be validated for a given Ap:implementation( ).

7.5. Correctness of Implementations

Let Ap:Requirements( ), Ap:Pthreads( ), Ap:ALLEOPs( ), Ap:ECTs( ) and Ap:CausalNet( ), respectively, denote the requirements, pthreads, ALLEOPs, ECTs, and causalnet of application Ap in an implementation of Ap. The causalnet is automatically generated by Ap:SMS( ), as described in Section 8. The pthreads in Ap:Pthreads( ) are defined by user. They are pair wise mutually independent, except when some pthreads are executed in parallel by cells belonging to a cell-group using the same virtualMemory. Also, each pthread is a short sequential program containing only the basic programming statements. These make it possible to prove correctness independently for the pthreads. Designers and implementers have the responsibility to provide pthread characterizations. The ALLEOPs and ECTs are generated automatically by the system from implementation specifications.

Let us write, (Ap:CausalNet( ) satisfies Ap:ALLEOPs( )), if the causalnet generated for Ap during its run does not violate the event patterns and partial ordering in Ap:ALLEOPs, and all events in Ap:CausalNet( ) occur within specified time limits. SMS described in Section 8 performs this monitoring constantly to check whether (Ap:CausalNet( ) satisfies Ap:ALLEOPs( )) holds true, while Ap is running.

Correctness of transactions and the concept of two ports connected by a pathway being well-matched were defined in Section 2.3.2. Ap:Correct is valid, iff and only if all pairs of ports in Ap that are connected by pathways in application Ap are well-matched. Ap:Requirements( ) are the design requirements for application Ap that were developed before design began and updated since then at every stage of refinement. Definitions of correctness of transactions in Ap, definitions of Ap:Requirements( ), and specifications of time limits for transaction completions may all be interactively developed by designers and implementers using TICC™-Ppde. It is, of course, possible that (Ap:CausalNet( ) satisfies Ap:ALLEOPs( )) holds for an implementation in a given run, but the implementation is not correct. To avoid this possibility, we would like the following validation criterion to hold true for an implementation:

$$[(\text{Ap:CausalNet}(\ ) \text{ satisfies Ap:ALLEOPs}(\ )) \ \& \ (\text{Ap:ECTs}(\ ) \text{ satisfies Ap:Requirements}(\ ))] \Leftrightarrow \text{Ap:Correct}(\ ) \quad (7.44)$$

Clearly, truth of (7.44) depends on the set of CTL-assertions in Ap:Requirements( ) that were validated for Ap:implementation( ). Thus, (7.44) and the concept of correctness defined above specify a validation criterion in the sense that it may be used to choose the set of CTL-assertions that should be validated for a given implementation. The CTL-assertions we validated for the simple examples we presented do satisfy (7.44) for those implementations. Identifying the set of CTL-assertions whose validity establishes the correctness of an implementation Ap is guided by (7.44) and definition of Ap:Correct( ). We have assumed here that designers will do this. Eventually, it may be possible to complete Ap:Requirements( ) at the end of an implementation from definitions of Ap:Correct( ) and (7.44). This is a significant topic for research.

Clearly, if validation of an implementation of a system is such that it satisfies (7.44), then it makes good sense to use SMS to verify correctness of performance of that system through dynamic monitoring. In this case, it may be possible to use validated assertions as guides to specify strategies to diagnose errors that may occur at run time, and may be also use the validated assertions to specify strategies for self correction. These are also significant topics for future research.

The unique feature of TICC-Ppde is that, it automatically provides the SMS that is needed to dynamically monitor system performance throughout its life time, and provides methods to validate system implementations through CTL-assertions. Since all validations and correctness checks ultimately depend on ALLEOPs, we refer to the proofs presented here as ALLEOP-proofs.

During the validation process, while finding matching time points, the system may identify events that are incomparable as per ALLEOPs, but should be either synchronized (occur at the same time) or coordinated (one of the events should always occur before another) as per CTL-assertions. A pair of events should be candidates for such synchronization or coordination, only if synchronization and coordination do not negate any of the validated CTL-assertions in which the events appear. We introduce in the next subsection ad hoc synchronization and coordination methods that may be used in TICC™-Ppde to introduce needed synchronization and coordination into an already completed implementation, when necessary, with no need for reprogramming.

The principal task of system implementation in TICC™-Ppde is not programming. Programming pthreads and conditions are relatively trivial mechanical tasks. The principal tasks that are difficult are, (i) setting up the TICC™-network, (ii) defining TIPs (iii) characterizing the needed pthreads and (iv) identifying the CTL-assertions that should be validated. The structure of TICC™-networks provides a medium in which alternate organizations may be tested and explored. The TICC™-paradigm shifts the nature of the art of system design and implementation from the art of programming to the art of system decomposition, i.e., identifying needed subsystems and specifying interactions among them, and the art of proving correctness.

7.6. Limit Testing, and Ad Hoc Coordination and Synchronization

Limit Testing: Branching trees of ECTs and partial orderings of time points may be used to validate varieties of useful system properties. One useful property to prove in real time systems is that the required partial orderings of time points is always preserved in spite of variations in TIP execution times. This is done through limit testing.

For the TIP at a port C.p, define time bounds, $(\tau^p_{min}, \tau^p_{max})$: $\tau^p_{min}$ is the minimum time interval needed to complete execution of the TIP at p starting from the time message was delivered to p, and $\tau^p_{max}$ is the maximum time interval that might be needed: $\tau^p_{max} < (\tau^p_{min} + 2\Delta^c_{max})$ where $\Delta^c_{max}$ is the maximum time needed for the parent-cell, C, of the port C.p to complete one polling cycle and service all ports with pending messages and get back to servicing port C.p, in case message at C.p was missed in the first polling cycle. $2\Delta^c_{max}$ is used here because C.p could be the last port serviced in the next polling cycle.

Suppose there were two traces, one leading to port C.p and another leading to port D.q, and cells C and D were not connected by any causal chain. Let it be required that occurrence of a pair of events, xP (tP) and xq(tq) at ports C.p and D.q, respectively, should always be such that ($t^p < t^q$). Let (p[0], p[r−1]=C.p) be the ports in the causal chain that leads to xP and (q[0], . . . , q[m−1]=D.q) be the ports in the causal chain that leads to $X^q$. Let $t_n$(p[0]) and $t_n$(q[0]) be the times at which the $n^{th}$ messages were, respectively, delivered to ports p[0] and q[0]; $\tau^{p[j]}_{max}$ is the maximum time needed to complete the execution of p[j]:tip( ); $\tau^{g[i]}_{min}$ is the minimum time needed to complete execution of q[j]:tip( ); and $t^p$ and $t^q$ are the times at which events $X^p$ and $X^q$ occur. Then following should hold true for the pair of port sequences:

$$t^p \leq (t_n(p[0]) + \Sigma\{\tau^{p[i]}_{max} | 0 \leq j < r\}) < (t_n(q[0]) + \Sigma\{\tau^{q[i]}_{min} | 0 \leq i < m\}) \leq t^q \quad (7.45)$$

Thus, we require that events $X^p$ and $X^q$ should be cycle synchronized.

Ad hoc Coordination: Let us now assume that condition (7.45) was not satisfied. How may it be enforced without having to do extensive reprogramming? To be specific, let us postulate two cells $C_1$ and $C_2$ that have ports $C_1.f_1$ and $C_2.f_1$ that are not connected to each other by a causal chain in the ALLEOPs of an implementation. Suppose, correct operation of the system required that the TIP at $C_2.f_1$ should be executed only after the TIP at $C_1.f_1$ had been executed. Let us write this requirement as $$\Box[([\bullet \to C_1.f_1:tip( )\rangle(t_1)/\text{*evaluation completed*}/] \& [\bullet \to C_2.f_1:tip( )\rangle(t_2)/\text{*evaluation begins*}/]) \Rightarrow (t_1 < t_2)].$$

This problem is easily solved by using spawning and port-vectors, as illustrated in FIG. 16.

Install two other ports, $C_1.g$ and $C_2.f_2$, define $[C_2.f_1, C_2.f_2]$ as a port-vector and install a branch connecting $C_1.g$ to $C_2.f_2$, as shown in FIG. 16. Now, $C_2$ may service a message at $C_2.f_1$ only after $C_2.f_2$ has received a signal from $C_1.g$. $C_1.g$ sends this signal after executing $C_1.f_1$:tip( ). The TIPs at $C_1.f_1$ and $C_2.f_1$ will have the forms, $$(C_1.f_1:mR?( ) \& C_1.g:pR?( )^*)\{C_1.f_1:r( ).s( ); C_1.g:s( )\}$$
$$(C_2.f_1:mR?( ) \& C_2.f_2:mR?( )^*)\{C_2.f_1:r( ).s( ); C_2.f_2:s( )\} \quad (7.46)$$

With this, $C_1:f_1$ and $C_2:f_1$ will be cycle synchronized and the requirement will be always satisfied. Indeed, this arrangement may be used to coordinate not just pairs of ports, but to cycle synchronize group-to-group interactions as well, as in $$\Box([(\bullet \to C_1.f:tip( )\rangle(c_1,t), (\bullet \to C_2.f:tip( )\rangle(c_2,t),..., (\bullet \to C_n.f:tip( )\rangle(c_n,t)/\text{*evals done*}/] \& [\bullet \to D_1.f:tip( )(d_1,t)], [\bullet \to D_2.f:tip( )(d_2,t)],..., [\bullet \to D_m.f:tip( )(d_m,t)]/\text{*evals begin*}/] \Rightarrow [\forall(t_1 \in \{c_1.t, c_2.t,..., c_n.t\}) \forall (t_2 \in \{d_1.t, d_2.t,..., d_n.t\}) (t_1 < t_2)]. \quad (7.47)$$

using group-to-group signal exchange described in Section 8. Here the only modifications needed in the implementation in order to incorporate cycle synchronization are (i) setting up the needed group-to-group pathway, and (ii) changing the TIP definitions. The rest of the implementation remains unchanged. Arrangement here is very similar to the way time signals are used in asynchronous hardware systems to coordinate subsystem activities.

Ad hoc Synchronization: In TICC™-Ppde, polling cycles of different cells are not synchronized to each other. Yet, at times it may be necessary to synchronize servicing of ports not connected to each other by pathway chains and not in a cell-group. We will call them isolated cells. Thus, one may wish to enforce the synchronization, $$[\bullet \to (C_0.f:tip( ), ..., C_{n-1}:tip( ))(t)] \quad (7.48)$$

for the isolated cells $C_j$, $0 \leq j < n$. This is done by installing the self-loop pathway shown in FIG. 17. Ports $C_j.g$ for $0 \leq j < n$ are attached to cells $C_j$ and each port $C_j.g$ is connected to the self-loop pathway as shown in FIG. 17. The TIP at each $C_j.f$ has the form, $$C_j.f:mR?( )\{C_j.g:s( ); C_j.g:mR?( )^*\{C_j.f:r( ).s( )\}\}. \quad (7.49)$$

Here, each cell $C_j.g$ transmits a signal to itself through the self-loop pathway as soon as it receives a message via $C_j.f$. A synchronized signal is delivered to all $C_j.g$ for $0 \leq j < n$, by agent a0, only after all cells $C_j$ have sent signals via their respective ports $C_j.g$ (the protocol for this is described in Section 8). Each $C_j$ responds to the received message at its port $C_j.f$ immediately after receiving this synchronized signal. It is possible that one of the cells connected to agent a0 in FIG. 17 is a global clock. In this case, all the cells would respond to their respective messages at ports $C_j.f$ synchronized to the global time, or any other event in the system. This is almost like using clocked rendezvous technique, but much more flexible: synchronization machinery does not have to be programmed into the pthreads, only the self-loop network has to be installed and the TIPs have to be modified.

Synchronization and coordination are done here as an after thought. These kinds of ad hoc synchronization and coordination cannot be done in π-calculus, in Actor systems, in CSP or any other currently available parallel programming paradigm, without having to do extensive reprogramming. We will conclude this section with some comments on NFSP ALLEOPs that may contain an arbitrary number of nodes.

7.7. An Example of a Dynamically Growing Non-Finite State ALLEOP

A simple network for this is shown in FIG. 18. It has n+3 cells. Each cell, C[i] for $0 \leq i \leq n$ is connected to a csm (Communications System Manager). When a cell is installed, a private pathway to its associated csm is automatically set up from a designated csmPort (subclass of generalPort) of the cell. Any cell that needs to dynamically install new cells or pathways will send service request messages to its associated csm, by invoking the appropriate cell:installCell( . . . ) and cell:installPathway( . . . ) methods. These methods are provided by the TICC™-Ppde system. A cell Y may also send a request to its csm to destroy Y or destroy a pathway. Cells use csm to install other cells and pathways because these are expensive operations, taking 100 to 250 microseconds. After sending a request to csm via its csmPort a cell may proceed to service its other ports and get back to csmPort in an ensuing polling cycle to receive the response from csm and take appropriate actions. The csm services a request only if the requesting cell has the appropriate privileges. In any case, the csm sends back to the requesting cell a response message.

When application starts, the network in FIG. 18 contains only the cells C[0], X and csm. X activates C[0] by sending a message to its functionPort, C[0].f. Initially, the csmPort of C[0] is tuned to agent a1 as shown in FIG. 18. When activated, as part of its initialization, C[0] requests its csm to install C[1], and connect its port C[0].g to C[1].f via a pathway. When C[0] gets a response from the csm that the task has been completed, it disconnects C[0].csmPort from agent a1, sends a message via C[0].g↔C[1].f (see FIG. 18) and then suspends itself, thereby releasing its assigned CPU. The message sent to C[1].f will contain a condition, which is used by C[1] as described below.

The message sent to C[1].f activates C[1] to run in one of the available CPUs. When activated, C[1] in turn does the same thing, tuning its csmPort to agent a1, installing and activating the next cell C[2], then disconnecting C[1].csm-Port from a1, and then suspending itself, unless the condition in the received message stops it from doing so. Thus, each newly installed cell continues to install and activate yet another cell and suspends itself, unless the received condition prevents it. This causes the network to grow until the condition stops it.

When the condition stops the growth, say at cell C[n] for some n≦1, instead of installing a new cell, C[n] responds to the message it received at its port C[n].f by sending a reply to C[n−1].g and then destroys itself, thus releasing its assigned CPU, and destroying the pathway C[n−1].g↔C[n].f. At the time the response message from C[n].f is sensed by C[n−1].g, C[n−1] resumes its suspended operation in one of the available CPUs, repeating what C[n] just did. Thus each newly installed cell completes its transaction and destroys itself one by one until C[0], X and csm are the only cells remaining in the network. At that point C[0] responds via C[0].g↔X.g to the service request it initially received from X.g and thus completes the transaction.

It is not important to show details of definitions in this example, namely, facilities for dynamic creation and destruction of cells and pathways, TIPs, ALLEOPs and traces. It is sufficient to note that the following causal sequence would occur in the trace. It starts with the message sent by X.g to C[0].f, continues up to C[n].f and then begins the reverse process. The causal chain is shown below:

---

/*communication events during progressive creation and activation of new cells.*/
X.$g^S$[ ] → C[0].$f^D$[ ] → C[0].$g^S$[ ] → C[1].$f^D$[ ] → C[1].$g^S$[ ] → C[2].$f^D$ → C[2].$g^S$[ ] → C[3].$f^D$[ ] →...→ C[n−1].$g^S$[ ] → C[n].$f^D$[ ], n > 0  (7.50a)

---

Communication events during progressive completion of transactions with new cells destroying themselves

---

C[n].$f^S$[ ] → C[n−1].$g^D$[ ] → C[n−1].$f^S$[ ] → C[n−2].$g^D$[ ] →...→ C[2].$f^S$[ ] → C[1].$g^D$[ ] → C[0].$f^S$[ ] → X.$g^D$[ ], n > 0  (7.50b)

Setting 'X.g'='g', 'C[i].f'='$f_i$' and 'C[i].g'='$g_i$' for 0≦i≦n, concatenation of (7.50a) and (7.50b) reduces to, for n > 0, $g^S f_0^D [(g_0{}^S f_1^D) (g_1{}^S f_2^D)...(g_{n-1}{}^S f_n^D)][(f_n{}^S g_{n-1}{}^D) (f_{n-1}{}^S g_{n-2}{}^D) \cdots (f_1{}^S g_0{}^D)] f_0{}^S g^D$  (7.51)

Now setting $g^S f_0^D = \alpha$, $g_i{}^S f_{i+1}^D = \beta_i$, $f_{i+1}{}^S g_i^D = \beta_i^{-1}$ for 0≦i≦n and $f_0{}^S g^D = \alpha^{-1}$ we get the context dependent sequence, $\alpha[\beta_0 \beta_1 ... \beta_n][\beta_n{}^{-1} ... \beta_1{}^{-1} \beta_0{}^{-1}]\alpha^{-1}$, n > 0,  (7.52)

---

Thus, ALLEOP for this would clearly not be a finite-ALLEOP, yet it would have a finite description. In general, the ALLEOP associated with a dynamic network can be general recursive.

We now proceed to present the group-to-group message transfer protocol that includes (i) SMS facilities for generating a dynamically growing causalnet for an application while running in parallel with the application, (ii) facilities for data dependent security checks, where a message is delivered only to ports that satisfy a priori specified security requirements, and (iii) facilities for automatic synchronization and coordination.

7.8. CTL-Assertions and ALLEOP-Proof Methods

CTL-assertions contain causal chains of events with quantifiers V (for all) and ∃ (there exists), which may range over event instances and virtual time points, contain modal operators □ (always) and ◇ (eventually), logical connectives, parallel operators, ∥, and alternate operators, |, and causal connectives → (causes), •→ (immediately causes), →...→ (causal chain) and •→...•→ (immediate causal chain). An event x(t) may be a condition (state) that became true (occurred) at time t, ¬x(t) being a condition (state) that became false (did not occur) at time t, or [(→a)(t)], signifying that execution of action a was completed at time t, or [→a(t)], signifying that execution of action a started at time t, or ¬[(→a)(t)] signifying that execution of action a was not completed at time t, or ¬[→a(t)] signifying that execution of action a did not start at time t, where action can be any condition, programming statement or any program, or a communication event of the form [→$p^S$(t)], signifying that port p started to send a message at time t, or [(→$p^s$)(t)], signifying that a message was delivered to port p at time t, it being possible for communication events also to appear with negations.

When a CTL-assertion is given to the ALLEOP-proof system it first determines the set of starting events and the set of ending events in the CTL-assertion. Then it specifies initial conditions for the appropriate ECT-network it should search for causal chains that match with the CTL-assertion. It searches the ECT-network with specified initial conditions to find all causal chains that match with the starting, intermediate and ending events in the CTL-assertions, setting up correspondences between the timings of the starting events as stated in the CTL-assertion and the virtual time points specified in the ECT-network, and displays the matching causal chains found in the ECT-network to users as trace statements, as illustrated in the examples discussed in this section. This search simply involves pattern matching between events specified in the CTL-assertion and events in the ECT-network. In the case of finite-ALLEOPs either the search will succeed or will fail. If it is fails it will be possible to find out why it failed.

At this point, it has to be verified whether the matching causal chains so found satisfy all conditions specified in the CTL-assertion. Here also user intervention may be necessary to guide the system in the verification process. The conditions in CTL-assertion may specify mutual exclusion, coordination (ordering of events), synchronization, timing, uniqueness and or guaranteed occurrence of events. These proofs are called FSP-proofs.

Non-FSP Proofs: These proofs are needed if the ALLEOP is not a finite-ALLOP or the proof pertains to values of variables occurring in a program. In the case of non-finite-ALLEOPs user intervention may be necessary to stop the search for matching causal chains, if it does not succeed after a sufficient amount of time. Also, non-FSP ALLEOP-proofs may require mathematical induction to be used to construct proofs. Some examples of proofs by induction were shown in this section.

It may be noted, ALLEOP-proofs do not involve inferences on CTL-assertions, but only symbolic evaluation of CTL-assertions over ECT-networks. ALLEOP-proofs may require inferences in simple propositional logic to determine truth values of predicates occurring at choice points in ECT-networks using initial conditions and predicates already found to be true in the search for causal chains. It is this feature that enables computers to be effectively used to interactively build ALLEOP-proofs for CTL-assertions.

Proving Connectness of Pthreads: Proving logical characterization of pthreads will also require inference in propositional logic. Since pthreads are likely to be short programs with no ornamentation for coordination and synchronization specifications, and no message exchanges in pthread definitions it is possible to prove correctness of pthreads interactively. Pthreads that are executed by cells in a cell-group in parallel in the same virtualMemory may contain mutual-exclusion locks and data exchanges through scratchpad. These pthreads should be proven jointly and are a little bit more difficult to prove.

8. Protocol for Group-to-Group Communication and the Self Monitoring System

Using ALLEOP models to prove CTL-assertion through ECT-evaluations, and the built-in facility for the Self Monitoring System (SMS) are integral parts of TICC™-Ppde. They are unique to TICC™-Ppde. Without discussing how the infrastructure for SMS is integrated with message exchange protocols, this presentation will be incomplete. We do this in this section, taking a variant of the group-to-group Das-pathway as an example.

For dm-pathways, group-to-group message exchange delivers a joint service request from parent-cells of generalPorts in a port-group in one multiprocessor of a computing grid, to different port-groups of functionPorts in different other multiprocessors in the grid (FIG. 24). Response messages are sent in sequence by the functionPort groups, in a multiplexed mode. Response messages are gathered together by the generalPort group that sent the service request, with the provision, if received messages were not consistent with each other then a re-computation may be requested. Each multiprocessor in a grid dynamically constructs the SMS causalnet that pertains only to cells operating in that multiprocessor. Dm-pathways use 4-state hardware agents, 4-state software ports, and use hardware routers and switches as well. Thus, the protocol is more complex than the one described here.

We have provided for three types of completion signals for three modes of message transmission in sm-pathways: s for send mode, f for forward mode, and h for halt mode for halting computations. The halt mode is used only by generalPorts. In the halt mode no service request message is sent and the pathway may be dismantled. Cells in a cell-group coordinate types of signals they send by exchanging information through the scratchpad of the virtualMemory M in FIG. 19.

In shared memory environments, as mentioned earlier, the read/write memories of the virtualMemory of the pathway are switched in the send mode and not switched in the forward mode. The choice between sending and forwarding is determined by the TIP. In distributed memory message exchanges, there is no forward mode or halt mode, instead there are end of data signal, e, and abort signal, a, to dismantle a pathway and cause the network routers and switches to go to their active states, waiting for new signals to start a new dm-pathway establishment process.

The modified Das-pathway for group-to-group message passing is shown in FIG. 19. Message is exchanged between a group of generalPorts, $G=[g_0, g_1, \ldots, g_{n-1}]$, and a group of functionPorts, $F=[f_0, f_1, \ldots, f_{m-1}]$. The pathway has four agents: a0, a1, a2 and a3. They are connected to each other by h-branches as shown in the figure. All the four agents are attached to the virtualMemory, M. To make the diagram clear, a2 and a3 are shown in FIG. 19 in an offset attached to M.

Think of M as a three dimensional object. The agent a0 is tuned to port-group G, a1 is tuned to port-group F, a2 is tuned to the functionPort $eb.f_1$ and a3 is tuned to the functionPort $eb.f_2$ of the eb cell, which is the EventBuilder cell. Agent a0.nxt=[a1,a2] and a1.nxt=[a0,a3]. The functionPort vector [eb, $eb.f_2$] is attached to the eb cell. We will soon see the task performed by this cell. Each eb cell may service several distinct pathways, connected to each pathway through a separate pair of ports in a functionPort vector and associated agents, like the ports [$eb.f_1$, $eb.f_2$] and agents, a2 and a3 in FIG. 19. An application may have several such eb cells. Each eb cell communicates with a small collection of ea cells, EventAnalyzer cells, associated with it.

Each port in port-groups G and F has associated with it the protocol that is needed to transport a message from one end of the pathway shown in FIG. 19 to its other end. When a parent-cell of a port in a port-group, either G or F, completes its computation and is ready to transmit a message, the cell begins executing the protocol associated with that port. G and F cannot both transmit messages at the same time. Thus, all parent-cells of ports in a port-group will begin to evaluate the protocols at their, respective, ports in parallel at time points, which are mutually incomparable. Agents on the pathway coordinate message transmission.

Agents, ai for i=0, 1 in FIG. 19 have each three attributes defined for it: one is ai.selectedPort, which could be any port tuned to ai, the second one is a Boolean attribute, ai.dC ('dC' for 'deliveryComplete'), which is initialized to false, the third is a vector called completion signals Vector, ai.csV, which has one vector element for each port that is tuned to ai, to store signal received from that port, and one element for signal received from ai.nxt[1]. Each element assumes one of four possible values >0: ai.csV[j]=(c|f|h|ignore)>0, c('c' for completion signal), used to send a message, f for forwarding a message, and h for halt, for $0 \leq j < ai.csV:size(\ )-1$; these signals are sent by ports that are tuned to ai. The last element, ai.csV[ai.csV:size( )-1] stores the signal c sent by agent, ai.nxt[1]. The fourth signal, ignore, may be used by ai to set ai csV[j] for $0 \leq j < ai.csV:size(\ )-1$, based on conditions computed during message transmission, to indicate that the port tuned to ai corresponding to index j should be ignored. We will soon see how elements of ai.csV are used.

GeneralPorts in G send a joint service request to functionPorts in F. The generalPort group is $G=[C_i.g_i|0 \leq i < n-1]$, where n−1=G:size( ) and a0.csV:size( )=n. Protocol at each $C_i.g_i$.protocol for port $g_i$ in the generalPort group, G has the form shown below (we use '.' to specify concatenation of successive sequential components of a program). $C_i.g_i$:protocol( ) has two concatenated components, $C_i.g_i$:prefix( ) and $C_i.g_i$:suffix( ). Statement (8.2a) below describes what $C_i.g_i$:prefix( ) does. We will later see what $C_i.g_i$:suffix( ) does. In the following m−1=F:size( ) and a1.csV:size( )=m.

$C_i.g_i$:protocol( ) = $C_i.g_i$:prefix( ) . $C_i.g_i$:suffix( );   (8.1)
$C_i.g_i$:prefix( ) =
  [(a0.selectedPort≠$C_0.g_0$)?( ){
    a0.selectedPort=$C_0.g_0$} .
  (a0.csV[0]≠0)?( ){ a0.csV[0...n−2]=0; a1.csV[0...m−2]=0;} .
  a1.dC?( ){a1.dC = false;} . ($C_i$:$x_i$ → $g_i$:$x_i$ → a0) .
  (a0:selectedPort ≠ $C_i.g_i$)?( ) {a1:dC?( )*{ };}]   (8.2a)
$C_i.g_i$:suffix( ) =
  (a0:selectedPort=$C_i.g_i$)?( ) {
    AP1(a0.csV[0...n−1])?( )*{$C_i.g_i$:suffix-body( );}}   (8.2b)

When a parent-cell $C_i$ is ready to send a message it immediately executes $C_i.g_i$:prefix( ), in parallel with the parent-cells of other ports in group G. This parallel execution is not synchronized; different parent-cells $C_i$ may do this at different times. While executing $C_i.g_i$:prefix( ), $C_i$ first sets a0.selectedPort=$C_0.g_0$ if it has not been already set, then initializes the vectors, a0.csV and a1.csV, if they have not been already initialized; the last elements of these vectors are not initialized. $C_i$ then sets a1.dC=false if it is not already false. It is possible that two or more cells $C_i$ perform the same initialization simultaneously. There will be no mutual interference; no pthread-lock is needed here.

After initialization, each cell sends one of three possible completion signals, $x_i$=c|f|h>0, to its port $C_i.g_i$ and the port forwards this signal to a0. After this, $C_i$ evaluates the expression, (a0.selectedPort≠$C_i.g_i$)?( ){a1:dC?( )*{ };}. This causes all cells $C_i$ other than the parent-cell of a0.selectedPort to wait until a1:dC becomes true; thus they stop executing the protocol any further. When a1.dC becomes true each cell $C_i$ may begin to process its next port in its servicing order. Meanwhile, before a1.dC becomes true, while all the other cells are waiting for a1:dC?( ) to become true, the parent-cell $C_0$ of a0.selectedPort begins to execute $C_0.g_0$:suffix( ); this will be the only cell executing $C_0.g_0$:suffix( ).

The agent a0 will expect to receive signals, $x_j$>0, from each $C_j.g_j \in G$ for which a0.csV[j]≠ignore, and one signal, c= $x_{n-1}$>0, for a0.csV[n−1], from a0.nxt[1]=a2. When a0 receives signal $x_j$>0 from port $C_j.g_j$, it will know that cell $C_j$ has completed its computation. When it receives signal, c>0, from a2, it will know, whatever cell eb did during the previous message exchange through the same pathway, has been completed. These signals become the arguments of the agreement protocol function, AP1 in the guard, a0:AP1(a0.csv [0 . . . n−1])?( )* in (8.2b). $C_0$ executes this guard, since it is the only cell still continuing to execute the protocol. The guard evaluates to true only when all its elements are >0; i.e., after it has received all the expected signals. It is executed repeatedly until it becomes true. When it becomes true, the parent-cell $c_0$ of a0.selectedPort executes $C_0.g_0$:suffix-body( ). The suffix-body is the same for all generalPorts, $C_j.g_j$, in G. So it does not matter which generalPort is chosen as the selectedPort. We will soon see what this suffix-body does. Before defining $g_i$:suffix-body( ), we have to define some more variables and methods. They are all associated with agents and ports in the sm-pathway; we do this now.

Security Specification: In the following, a1.vM refers to the virtualMemory attached to a1. For 0≦j<m−1=F:size( ), agent a1 sends delivery signal to port, $D_j.f_j$ that is tuned to it, only if the port $D_j.f_j$ satisfies a specified security condition, a1:Sy($D_j.f_j$, a1.vM)?( ). If for any j, a1:Sy($D_j$, a1.vM) ?( ) is false then a1.csV[j]=ignore is set, i.e., the $j^{th}$ port is then ignored. It is possible that users define different security functions for different pathways. After delivery signal has been sent to all secure ports the variable, a1.dC is set to true.

TICC™-Ppde has two default security definitions: In one, every port in F receives message. In this case, there is no security check. In the other, a security level, M.security, a security mode M.rd:msg( ).mode, and for each f∈F a security level, f.security, are defined. A message in M is delivered to port f if and only if M.security≦(f.security+M.rd:msg ( ).mode). Messages may thus be delivered to less secure ports by setting the M.rd:msg( ).mode high. Cells have privileges. A cell may request other cells or pathways to be dynamically installed only if it had the requisite privileges. A cell may temporarily delegate its privileges to another cell. A cell may also temporarily delegate the security status at one of its ports to a port of another cell, if both cells had appropriate privileges to do so, the delegated security status being associated with a condition that specifies when the delegated security should be automatically revoked. The condition could be based on the number of messages exchanged using the delegated security status. This security system is built into the prototype TICC and TICC-Ppde.

Other Pathway Variables and methods: The variable a0.ccS holds the value of the composite completion Signal computed by the second agreement protocol method, AP2, used in (8.4-(i))) below. AP2 is defined in (8.3). The method, a0:resetPathway( ) is used in (8.4) to reset the sm-pathway in which a0 appears, to its initial state. The method exception (f) issues an exception at port feF to warn users about security failure at port f. The method a0:swMem( ) switches the read/write memories of a0. The method, p:timeStamp( ) sets the time stamp at a port p, in the local time of the parent-cell of p, indicating when the delivery signal was delivered to p. The condition p:active?( ) checks whether the parent-cell of p is already running in a CPU; the method, p:activate( ) activates the parent-cell of p in an available CPU. As mentioned earlier, TICC-Ppde itself manages all CPU assignments and cell activations.

We are now ready to define $g_i$:suffix-body( ): It uses the second Agreement Protocol function, a0:AP2[a0:csV[0 . . . n−2]]. Notice, this does not include in it the signal, a0:csV [n−1] received from agent a2. It only examines the completion signals that a0 has received from the generalPorts in G, and sets the composite completion Signal, a0.ccS=a0:AP2 [a0.csV[0 . . . n−2], where a0:AP2[a0.csV[0...n−2]] = c if ∃i(0≦i<n−1)(a0.csV[i] = c) else
a0:AP2[a0.csV[0...n−2]] = f
  if [(∃i(0≦i<n−1)(a0.csV[i]= f ))
    &(∀i(0≦i<n−1(a0.csV[i] = (f | ignore)))]
  else a0:AP2[a0.csV[0...n−2]] = h.     (8.3)

We now present $g_i$:suffix-body( ) and then discuss what it does.
(8.4-i) $g_i$:suffix-body( ) = //executed by the parent-cell of a0:selectedPort.
  [a0:AP2[a0.csV[0...n−2]] = a0.ccS;//signal c from agent a2 is excluded here.
  // abandons protocol execution and stops message transmission if a0.ccS = h.
  (a0.ccS= h)?( ){ a0:resetPathway( ); a1.dc=true}
    else true{ a1:ckSecurity&Proceed( );}]
(8.4-ii) a1:ckSecurity&Proceed( ) =
  /* This is also executed by the parent-cell of a0:selectedPort; sets a1:csV to ignore insecure ports and generates a violation message for each such insecure port.*/
  [∀j(0≦j<F:size( ))?( ){ ¬a1:S($f_j$,a1.vM)?( ){ ;
a1.csV[j]=ignore a1:exception($f_j$);}}
  /*If all the functionPorts in F are insecure, then abandons protocol execution;
  ∀j is used here as an enumerator.*/
  (∀j(0≦j<F:size( ) & (a1.csV[j]=ignore))?( ){
              a0:resetPathway( ); a1.dC=true}
  else true{ a0:sendSignals( );
        a1:activate&DeliverSignals( );}]
(8.4-iii) a0:sendSignals( ) = //executed by the parent-cell of a0:selectedPort.
  [//initializes the signals previously received from a2 and a3 to zero.
  a0.csV[n−1]=0; a1.csV[m−1]=0;
  /* if a0.ccS=c then switches memories, delivers c to eb.$f_1$ and sets time stamp in the local time of cell eb.*/
  (a0.ccS= c)?( ){ a0:swMem( ); a0:s → a1;
        a0:c → a2:c→ eb.$f_1$:timestamp( );}.
  /*else, does not switch memories and delivers f to eb.$f_1$ and sets time stamp.*/
  else true{ a0:s → a1; a0:f → a2:f → eb.$f_1$:timeStamp( );}]
(8.4-iv) a1:activate&DeliverSignals( ) =
  /* Also executed by the parent-cell of a0:selectedPort. ∀j is used as enumerator. Activates parent-cells of secure functionPorts, if they are dormant.*/
  [(∀j(0≦j<F:size( )){ (a1.csV[j]≠ignore) & ¬$f_j$:active?( ))?( ){
                   $f_j$:activate( );}}

-continued

```
/*delivers signal s and sets time stamp in the local time of the
  parent-cells of secure ports f_j.*/
    (∀j(0≦j<F:size( )){ (a1.csV[j]≠ignore)?( ){
                    a1:s → f_j:timeStamp( );}}
/*sets a1.dC=true, sends delivery-complete signal s to eb.f_2. Sets
  time stamp in local time of eb.*/
    a1:s → a3:s → eb.f_2:timeStamp( ); a1.dC=true;]      (8.4)
```

Associating the same suffix-body with every $g_i \in G$, simplifies coordination of dynamic changes to the port-group G; ports may be added to or deleted from G dynamically before new transactions begin. Let us now consider what $g_i$:suffix-body( ) does:

(8.4-(i)): If (a0.ccS=h) then the pathway is reset and a1.dC is set to true. In this case, no message is sent. If (a0:ccS≠h) then $C_0$ begins to execute the rest of the protocol starting with (8.4-(ii)) and at the end of this execution sets a1.dC=true. The following happens:

(8.4-(ii)): Security check is first performed and the vector a1.csV is updated with ignore signals for insecure functionPorts and exceptions (messages notifying the security failure) are generated for the insecure ports. If all functionPorts are insecure, then protocol execution is abandoned. Else, it continues.

(8.4-(iii)): First, resets the signals in a0:csV[n−1] and a1:csV[m−1] that were previously received from agents, a2 and a3. Agent a0 then does the following: If (a0.ccS=c) (see (8.3)) then the read/write memories are switched and a start signal, s, is sent to a1 and signal, c, is delivered to eb.f1 via a2; else the read/write memories are not switched, and a forward signal, f, is delivered to eb.$f_1$, and signal, s, is sent to a1. In either case, a signal delivery time stamp is set at eb.$f_1$ in the local time of eb. This time stamp is interpreted by the eb cell as the time of message dispatch. It is referred to by eb.$t_s$ in (8.6) below. Since all eb cells are synchronized to a standardized qlobal time, this message dispatch time will be a global time.

(8.4-(iv)): The protocol first checks whether for each secure functionPort f[j]∈F, whether its parent-cell has been already activated. If not, it activates the parent-cell. Cell activation in TICC™-Ppde, is relatively expensive. It takes about 2.5 to 3.0 microseconds to activate a cell in a 2-gigaHertz computer. The TICC™ subsystem that manages process and pthread activation was implemented by Mr. Rajesh Khumantham. This is the reason the statement describing this operation has been separated out in (8.3-(iv)). Normally, activation is done only once, the first time a signal is delivered to a port. Separating this part out enables delivery signals to be sent to all secure ports in quick succession. After sending delivery signals to all secure ports, agent a1 delivers signal s to port eb.$f_2$ via agent a3, with a time stamp and then sets a1:dC to true; eb interprets this time stamp as the message delivery time, denoted by eb.$t_d$ in (8.6).

If CCPs are implemented as machine instructions, and hardware assist is available to set time stamps (as discussed in Section 10.1), then signals may be delivered to secure ports with less than 3 nanoseconds separation between successive ports in a 2 gigahertz CPU (estimated). For each secure functionPort f the signal delivery time stamp set at port f is the local time of its parent-cell, which may not be synchronized to the standardized global time. When message delivery is completed to all secure ports, or if protocol execution is abandoned, a1.dC is set to true. One may organize processing of the delivered message by parent-cells of functionPorts to begin only after a1:dC becomes true, i.e., after message has been delivered to all secure functionPorts. This may be implemented by modifying f:mR?( ) and g:pR?( ) as follows:

$$\{\langle f:input=s \ \& \ a1.dC=true\rangle (t)\} [\bullet \rightarrow f:mR?( )(t)]$$
$$\{(true \ \& \ f:state=S)(t')\}$$
$$\{\langle g:input=s \vee g:state=S) \ \& \ a0.dC=true\rangle(t)\} [\bullet \rightarrow g:pR?( )(t)]$$
$$\{\langle true \ \& \ g:input=\phi \ \& \ g:state=S\rangle(t')\}. \tag{8.5}$$

Meanwhile, when eb senses signal (c|f) at eb.$f_1$ and signal s at eb.$f_2$, at local times, eb.$t_s$ and eb.$t_d$, respectively, it installs the following communicationEvents associated with the group-to-group message delivery into a growing causalnet:

$$C.g_i^{S|F}(eb.t_s) \text{ for } (0 \le i < n), \text{ and } \langle D.f_j^D \rangle(eb.t_d) \text{ for } (0 \le j < m) \tag{8.6}$$

as specified in equation (8.21), and after integrating them with the causalnet, sends back completion signal c to both a0 and a1, by executing the protocols shown below, at eb.$f_1$ and eb.$f_2$, respectively:

$$(eb.f_1:c \rightarrow a2:c \rightarrow a0) \text{ and } (eb.f_2:c \rightarrow a3:c \rightarrow a1). \tag{8.7}$$

All of this is done while parent-cells of functionPorts $D_j.f_j$, in FIG. 19 are processing the response to the service request that was just delivered to them. Since no two eb cells install communicationEvents at the same place in a growing causalnet, there will be no mutual interference among different eb cells, when they perform their activities in parallel.

Since the eb cell has access to the virtualMemory it could access a1.csV and identify the functionPorts to which message was delivered. Using the ALLEOPs it could determine the location in the growing causalnet where event instances should be installed. Using these data the eb cell installs communicationEvents into the causalnet.

The causalnet fragment that is so installed into the causalnet is shown in FIG. 20. Here dispatch times for $g_i^s$ for $0 \le i < n-1$ is set to $t_s$, the time when signal was delivered to eb.$f_1$. Delivery times to functionPorts are nominally recorded as $t_d$, the time when signal was delivered to eb.$f_2$. FIG. 21 displays the network installed for the reply message transmission. The superscript $^s$ for $g_i^s$ and $f_j^s$ in FIGS. 20 and 21 will be $^F$ if message had been forwarded.

It may be noted, the message sending and message delivery event instances would have all been anticipated by the eb cell from its knowledge of the ALLEOPs. Indeed, if anticipated event nodes do not appear with in a priori specified time limits, then an ea cell (EventAnalyzer cell, described below), that constantly monitors the growing causalnet, in parallel with the eb cells, would issue an error report to observers about a possible system failure. Since the eb cell has access to the virtualMemory of the pathway tuned to eb.$f_1$ and eb.$f_2$, while installing the event instances, it could even check conditions that should hold true in the message sending and receiving cells, to verify that the relation $R_{(G,F)}(srm, rm)$ defined in Section 2.3.2 holds true in the just completed transaction. However, this may unduly delay message transmissions and may not be practical at run time. But this can be done in a test mode.

When parent-cells of functionPorts in F, which received a service request, sense message delivery signal at the functionPorts, $f_j$, they execute the associated $f_j$:tip( ) to send back a response message, by sending a (c|f) signal to a1. At this point, a1 would be expecting signals only from port eb.$f_2$ and from all the secure functionPorts, since ignore signals had been already set in a1.csV for the insecure ports. Protocol for sending (forwarding) back the reply message is similar to the protocol shown in (8.1), (8.2a), (8.2b) and (8.4) with the following differences: a1:selectedPort is set to the first secure port in a1.csV, i.e., the first port $f_j \in F$ for which a1.csV[j]≠ignore. No security checks are done for delivering the response to the generalPorts in G; every port in G receives the response.

During transport of the response message, a1 sends signal s to a0 and signal (c|f) to a3 only after it had received completion signals from all secure ports D.$f_j$ and completion signal from a3 as described in (8.7). Agent a3 forwards signal (c|f) to eb.$f_2$, to inform eb that the response message is being dispatched to the generalPorts in G. After delivering the response message to the generalPorts, a0 sends signal s to a2, which forwards it to eb.$f_1$, to inform eb that the response message has been delivered back to the generalPorts in G. When eb senses signals at both ports eb.$f_1$ and eb.$f_2$, it installs the communicationEvent instances shown in FIG. 21, for each secure $f_j$, at appropriate places in the growing causalnet. After completing this installation eb sends a completion signal c via eb.$f_1$ and eb.$f_2$ to agents, a0 and a1 using protocols shown in (8.7). The combined causalnet fragment of FIGS. 20 and 21 is shown in FIG. 22.

We have already discussed ndFSMs for agents, a0, a1 and ports g and f (see FIGS. 1 through 4). All agents and ports in sm-pathways are identical 2-state ndFSMs. Clearly, the protocol is simpler for point-to-point communications, since there are no selected ports and ai.csV for i=0, 1 will each have only two elements. The protocol uses at most (6+m−1) CCPs, where m−1 is the number of ports in F. This does not count the n−1 CCPs executed in parallel by the parent-cells of $C_i.g_i$ to send completion signals to a0. Group-to-group communications are relatively expensive, but still far cheaper than conventional group-to-group communications.

The SMS-network: Event Builder (eb) and Event Analyzer (ea) cells: As we said earlier, an application may have several eb cells in its SMS-network. No two eb cells will service the same sm-pathway. Each eb cell may service several distinct pathways updating portions of causalnet stored in virtualMemories $M_C$ like the one in FIG. 19. One pair of agents attached to $M_C$ in FIG. 19, is shown in an offset; think of $M_C$ as a three dimensional object. There are two non-intersecting pathways here that share the same virtualMemory $M_C$. This violates pathway rules. However, it is permissible here because these two pathways will never work simultaneously in parallel and also ea cells will only read contents of $M_C$, never write into it. Thus, ea cells will not send back reply messages to eb cells, but will only send back acknowledgement signals. They will send back acknowledgement for receipt of delivery signals, immediately after sensing the delivery signals at their functionPorts. Since eb cells service only one functionPort vector at any given time and ea cells service only one functionPort at any given time, there will be no interference. Of course, there will be several groups of ea cells, each collaborating with a different eb cell. A given ea cell may simultaneously use several distinct causalnet virtualMemories, $M_C$'s, through functionPort vectors attached to it.

The two pairs of agents, one pair in each pathway containing the virtualMemory $M_C$ in FIG. 19, do not communicate with each other but communicate with distinct functionPorts of the two ea cells in that figure. When the ea cells receive delivery signals at their functionPorts, they examine newly written contents of $M_C$, written there by the eb cell, after first acknowledging receipt of delivery signals. Other agents may similarly be attached to $M_C$, in order to communicate with cells that are used to display contents of $M_C$. These display cells will again only read $M_C$ and not write into it. Agents on $M_C$ connected to the display cells will be tuned to ports of the display cells, thereby enabling parent cells of the ports to read contents of $M_C$, but they may not be used to transmit signals to any other agent on $M_C$ or any other port. Thus they will not be used for communications via $M_C$.

The ea cells check for consistency of the growing causalnet with the ALLEOPs, and look for occurrences of a priori specified event patterns in the causalnet to alert observers regarding those occurrences, every time $M_C$ is updated. It is possible that consistency checks are performed by eb cells themselves, before event installations in the causal net, and only recognition of event patterns is done by the ea cells. In most cases the watched for event patterns could be specified by regular expressions that use ALLEOP nodes as terminal symbols.

Comments: This kind of use of TICC™-Ppde calls for a practically unlimited supply of processing units (CPUs). Eb and ea cells are, however, specialized cells. Eb and ea cells do not perform general computations, and ea cells do not need time stamping at signal delivery times. They only check causalnets against ALLEOPs. CPUs for the eb and ea cell may be simpler than other general purpose CPUs. With the advent of multicore chips and nanotechnology, all needed CPUs should soon become easily available. TICC™-Ppde not only provides a natural environment for using arbitrary numbers of processing units, but also effectively makes use of available processing units to build automatically the Self-Monitoring System (SMS) network of ea and eb cells for each application without interfering with efficiency of parallel program execution. It is possible to automate organization of SMS-network needed for an application based on its design specifications. We have not does this as yet.

ALLEOPs specify event patterns that may occur, when an application is running. Deviations from specified patterns are construed as errors by SMS. It is, of course, possible that event patterns in the causalnet could be correct, while computed values are wrong. However, this possibility is precluded by the correctness proofs generated during and after implementation, as discussed in Section 7.5.

These Features are all Unique to TICC™-Ppde.

8.1. One-Way Ring-Streets

So far we have used the convention that replies are sent through the same pathways through which service requests were sent. At times, this may contribute to complicating the pthreads and increasing the number of ports attached to a cell, when different sequential computation are spawned by one cell in different other cells. It may also contribute to decreasing the efficiency of sequential computations. The modified Das-pathway in FIG. 23 avoids this problem (pathway augmentations for SMS, using eb and ea cells, are not shown in this figure, in order to keep the figure simple).

Here, the ports in the generalPort group, G1, in FIG. 23 send their joint service request message to ports in the functionPort group F1. When G1 does this its ports get reset to receive a reply. It will receive this reply from the ports in F3. Ports in F1 receive the request sent by ports in G1, and send their joint reply, which could be viewed as another service request, to ports in F2. When F1 does this its ports get reset to receive the next service request message from G1. This clockwise passing of messages proceeds through the pathway loop in FIG. 23, until at the end ports in G1 receive reply from ports in F3. G1 may send its next service request to F1 only after it had received this reply from F3. One may attach arbitrary numbers of agents to the virtualMemory in FIG. 23. We refer to the modified Das-pathway in FIG. 23 as ring pathway since it has one virtualMemory and several agents associated with it, organized into a ring. This arrangement is useful to execute sequential computations in a parallel network. Cells in any one group around the compound pathway work in parallel when they process received messages.

8.2. SMS Attachments for Simple Pathways

It should be clear that the simple pathways in FIGS. 1 and 3 cannot communicate with SMS while transmitting signals via the pathways. The structure of these pathways for enabling them to communicate with SMS is shown in FIG. 25, where the object marked S is the signalMemory used by the communicating ports. This signalMemory may also contain compiled codes for protocols used by the communicating ports. Agents a0 and a1 play the same roles as the agents in FIG. 2, and agents a2 and a3 play the same roles as corresponding agents in FIG. 19. Similar modification also applied to the pathway in FIG. 3. Thus, there are no pathways without some memory embedded in it.

8.3. Parameterized Protocol Definition

One may define a top level Sm-Pathway class and define protocol for the Sm-Pathway class as a parameterized macro, which is used to compile a distinct protocol for each port p connected to a Sm-Pathway instance, smP, after substituting the parameters that define the sm-pathway smP for the corresponding arguments as in a macro definition. For example, parameters for any point-to-point or group-to-group sm-pathway at cell $C_i$ and generalPort $g_i$ for $1 \leq i \leq n$ shown in FIG. 19 will then be, $$(C_i, g_i, a0, [a1, a2], eb.f_1, [f_1, f_2, \ldots, f_m]), S), m \geq 1, \qquad (8.8)$$

where S is the name of the security function and [a1,a2] are the agents tuned to a0, eb.f1 is tuned to a2, and a1 sends delivery signals to the functionPorts $f_i$. Parameters for the protocol from a cell $D_j$ with port $f_j$ shown in FIG. 19 will be $$(D_j, f_j, a1, [a0, a3], eb.f_2, [g_1, g_2, \ldots, g_n]), n \geq 1. \qquad (8.9)$$

The protocol definitions shown in (8.1), (8.2a), (8.2b) and (8.4-(i)) through (8.4-(iii)) may all be combined into one definition with appropriate arguments for the parameters.

For any sm-pathway, smP, the compiled protocol code for each port p connected to smP is installed in the signalMemory component of the virtualMemory of smP at the time the Sm-Pathway instance smP is installed in a TICC™-network, and the attribute p.protocol is set to the starting address of this compiled code in the signalMemory. One may then use the eval instruction defined in Section 10.2 to invoke and execute this compiled code by using eval(p.protocol). It may be noticed, no dynamic state checking or signal checking are necessary for the components in such pathways, since all components that exchange signals are always tuned to each other.

This parameterized protocol definition will define protocols for all sm-pathways, whether it is a point-to-point or group-to-group pathway. The same parametrized protocol definition may also be used for all ports connected to the one-way ring pathway shown in FIG. 23. Thus, TICC™-Ppde defines protocols for all sm-pathways. Similar parameterized protocol definitions are also used for dm-pathways, but the protocols are a bit more complex. We will not discuss the details here.

8.4. Uniqueness of TICC™-Ppde Pathways

It may be noted, TICC™-Ppde pathways are different from RESTCLK pathways [Das [19]] and also different from the original TICC™ pathways [U.S. Pat. No. 7,210,145 B2], even though at an abstract level they all look the same. The two important differences are (i) change in protocol execution mechanism, and (ii) SMS mechanism embeddings in pathways.

Differences between RESTCLK [Das, [19]] and TICC™-Ppde pathways: RESTCLK pathways have no communication protocols defined for them and do not use CCPs for signal exchange. Mechanisms used to transmit signals over REST-CLK pathways are more complex than those used in TICC™-Ppde. RESTCLK does not guarantee message deliveries and RESTCLK message delivery latencies are several orders of magnitude higher than in TICC™-Ppde. Also RESTCLK pathways cannot be used to perform ad hoc synchronization and coordination with predictable timings, or be extended from shared memory to distributed memory communications without using a conventional local area network.

These differences make guaranteed parallel simultaneous message exchanges and efficient reliable parallel program executions impossible in RESTCLCK. Lack of predictable timings of events makes it impossible to embed SMS mechanisms into RESTCLK pathways to achieve results similar to those in TICC™-Ppde.

Differences between Original TICC™ and TICC™-Ppde pathways: In TICC™-Ppde each cell executes is own pathway protocols immediately after a message becomes ready. There are no message scheduling delays. In the original TICC™, pathway protocols are executed by specially installed dedicated communication processors. Cells send requests to communication processors to send messages, and these requests wait in an input queue until the processors attend to them in the order they are received. This can increase message exchange latency in the original TICC™ to values as high as 6 microseconds, and unfortunately this makes latencies unpredictable, even though message deliveries are guaranteed. In TICC™-Ppde message exchange latencies are always precisely predictable and are always as low as a few hundred nanoseconds.

These differences have four very significant consequences to parallel programming:

(i) The number of parallel simultaneous message exchanges that may occur at any given time in TICC™-Ppde is limited only by the number of cells in a parallel program. This feature enables high efficiency parallel program executions in TICC™-Ppde. In the original TICC™ the number of simultaneous parallel message exchanges is limited by the number of communication processors in the parallel program. Increasing the number of communication processors increases both coordination complexity and unpredictability of latencies. Thus, parallel programs can be much more efficiently and reliably executed in TICC™-Ppde with precisely predicable timings, than in the original TICC™.

(ii) Guaranteed predictable protocol execution timings in TICC™-Ppde in hundreds of nanoseconds makes it possible to embed in to TICC™-Ppde pathways mechanisms to communicate with SMS to install message exchange events with faithful timings, without disrupting on going parallel processes Unpredictability of timings in the original TICC™ makes it impossible to embed such SMS mechanisms into its pathways in order to achieve similar results. Thus, TICC™-Ppde protocol execution mechanisms endow extremely significant and totally new self-monitorinq capabilities to parallel software systems that original TICC™ protocol execution mechanisms cannot do.

(iii) TICC™-Ppde protocol execution mechanism makes it possible to implement ad hoc synchronization and coordination [Section 7.6] in parallel software systems with predictable timings. It is not possible to do such synchronization and coordination with predictable timings in the original TICC™.

(iv) TICC™-Ppde protocol execution mechanism makes it possible to easily extend its communication mechanisms from sm-pathways to dm-pathways. This is not possible in the original TICC™'

Even though differences between the original TICC™ pathways and TICC™-Ppde pathways are quite small, their consequences to parallel programming are extremely significant both for realizing high execution efficiencies and for adding new and dramatic self-monitorinq capability to parallel programs.

For these reasons TICC™-Ppde pathways and protocols are being claimed here as a new invention. There are no other communication mechanisms in published literature or in patent literature with capabilities similar to those of TICC™-Ppde communication pathways.

8.5. Steps Leading to Self-Diagnosis, Self-Repair and Learning Using SMS

It is possible that some day we might implement software systems that "understand" what they do. We speculate here capabilities such a software system should have in the context of SMS in TICC™-paradigm. This will require that we incorporate into Event Analyzer cells (ea cells) a general capability to learn patterns of causal chains that occur in causalnets and are of interest, based on a set of general seed patterns that are built into them. Learning will specialize and refine the seed patterns. Ea cells may do this through interactions with their environments and interaction with applications themselves. Ea cells also, of course, need a capability to represent learned patterns. They may use for this purpose the same kind of grammar that was used to define the seed patterns. These grammars will use ALLEOP nodes as non-terminal symbols. One may think of these patterns as abstractions of causalnets that specify activities that occur in an application and are of interest. One may even have an abstraction hierarchy of patterns of patterns. When a system recognizes occurrences of these patterns, uses them to communicate and direct its own computations, and refines them, a system behavior might manifest that is akin to "understanding". Capabilities of this kind are necessary to build systems that can diagnose and repair themselves. In the long run they may lead to self-understanding software systems. The SMS in TICC™-paradigm provides a context to investigate problems in the design of such systems.

We would like to hypothesize that our cerebral cortex does this kind of dynamic pattern analysis in our brains. Evolution has endowed us with certain innate seed patterns, built into us: Patterns for face recognition, voice recognition, odor recognition, motion recognition, finger coordination, vibration sensing, hand/eye coordination and leg/body coordination are examples of such seed patterns. Recognized patterns dynamically govern the behavior of organisms both internal and external, and also govern how the patterns themselves are refined. Biologists would agree, these innate capabilities, even in primitive forms, have had enormous influence on species survival. They are wide spread in varieties of insect and animal species. With learning, these innate capabilities are improved and specialized and give rise to bewildering multitudes of manifestations we see in Nature. Capacity to learn varies from species to species. When a human sees an image, events occur all over the human brain. We posit, recognition of the image seen is a continuing process, which occurs as a result of dynamic identifications by the cerebral cortex of on going patterns of causal chains of events in the brain, while the image is being seen. Here, the identified patterns influence and direct the on going recognition processes, in parallel with those processes. These kinds of recognition processes cannot be described in terms of combinatorial aggregations of events or patterns, as many pattern recognition works have approached this problem [47].

9. Building Formally Verified Parallel Software Using TICC™-Paradigm 9.1. Abstract Design through Network-Refinements As discussed in Section 3.3 TICC™-network together with CIPs, TIPs and polling cycles defines the abstract design for an application. Once the abstract design is obtained for an application, performing CIP and TIP refinements and message subclass definitions needed to complete the implementation of the application is relatively straight forward.

The difficult tasks in getting an abstract design are (i) defining the TICC™-network for an application, (ii) defining CTL-assertions specifying requirements for the application and (iii) interactive validation of designs. As discussed in Section 3.3 one may design TICC™-network by postulating compound cells and network-refining them iteratively. This has to be based on designers understanding of components that an application should have and what communication pathways they need to communicate with each other. There are no systematic methods that could specify how this might be done. TICC™-Ppde only provides facilities to represent specifications given by designers and use them for model construction and analysis. But, facilities provided by TICC™-Ppde to document design through network-refinement provides some help.

Consider for example the abstract design of a parallel software system to support, manage and organize corporate affairs in a corporation. Let us call the application, CAMS, Corporate Affairs Management System, CAMS for short. One may start system decomposition with the top level compound cell, called CAMS, with external ports CAMS.g, CAMS.f and CAMS.i and decompose CAMS into its component compound cells, CAMS={PRESIDENT,CEO,CFO,MM(Marketing Manager),PM(Personnel Manager),VP-R&D, R&D-Lab,Factories,DC(Distribution Centers), CR(Customer Relations),CC(Corporate Communications),etc.}  (9.1)

each such component coming with three ports attached to it, just like CAMS had three ports. One may then specify communication pathways, attaching as many additional ports to the component compound cells and to CAMS as needed. All ports attached to components in CAMS will be internal ports of CAMS and all ports attached to CAMS will be external ports. The pathways might be for example, $$\forall (X,Y)(X,Y \in CAMS)\ (X.g_0 \leftrightarrow Y.f_0)\ (X.f_1 \leftrightarrow Y.g_1)$$
$$(X.g_2 \leftrightarrow (X.g_2 \leftrightarrow [\forall [(Z \in CAMS) Z.f_2])$$
$$([\forall (Z \in CAMS) Z.g_3] \leftrightarrow X.f_3)), \text{etc.} \quad (9.2)$$

Some pathways will connect some of the internal ports of CAMS to its external ports by branches, like the ones shown in FIGS. 1 and 3, and FIG. 7. Clearly, some of the compound cells in (9.1) represent humans. This is possible, as in the Bill-Ben example in Section 3.1, since all cells are abstract cells. They can represent anything. Communication pathways specify formal channels of corporate communications. There may be other channels of communications as well. But they are not a part of CAMS.

At this point one may unwrap the encapsulation of CAMS by removing all of its external ports and removing the wrapping, allowing its internal ports to be directly connected to ports to which the external ports might have been later connected. After unwrapping one may iterate network-refinement and unwrapping for each component compound cell of CAMS, and continue this network-refinement process until all compound cells have been fully refined to networks of simple cells. A simple cell being one, which cannot be further network-refined. This would specify the TICC™-network for CAMS. One may retain encapsulation for compound cells, which may be used more than once, or used later in other systems. During network refinement designers may define port-vectors and port-groups as needed. Let us call the resultant TICC™-network, CAMS:network( ).

While doing this, designers should begin specifying CTL-assertions that characterize requirements that this network should satisfy. It is not possible to specify design methods for any of these steps, since design would depend on designers understanding of what is needed in CAMS and how networks are interpreted in TICC™-Ppde. Let us call the requirements CAMS:requirements( ).

The resulting CAMS:network( ) is something like an organization chart for the corporation, but specifying information on synchronizations, coordination, scheduling, forks and joins, etc. One may specify CAMS:pollingCycles( ) and CAMS:priorityList( ) at this point, if known. Let us use CAMS:cells( ), CAMS:ports( ), CAMS:pathways( ) to refer to the cells, ports and pathways in the CAMS:network( ).

TICC™-Ppde maintains a name space of all components defined in CAMS:network( ) and TICC™-Gui maintains documentation of all network-refinements and can display any part of the resultant network anchored on any component on demand, and also display known properties of the components. Each simple cell C in CAMS:network( ) will automatically have the default CIP in (2.1) assigned to it as its C:CIP( ).

At this point simple cells C in CAMS:network( ) may be classified according to number of ports of each kind C has and the initialization routine it should have for its C:CIP( ), all cells having the same number of ports of any given kind, and the same initialization routine belonging to the same subclass. Let us use the letter C to refer to the subclass of a cell C.

Designers may now define an abstract TIP, C.p:TIP( ), for each port C.p defined for subclass C. Ports C.p∈CAMS:ports( ) will inherit C.p:TIP( ). Designers will define C.p:TIP( ) by selecting and defining the Tip-guard and Tip-body for the selected kind of TIP, selection being done from one of 12 kinds of TIPs TICC™-Ppde offers and defining the TIP. No guidance can be given to designers for such TIP selections and definitions. Designers should have a good understanding of what each kind of TIP does and functionalities associated with ports in CAMS:ports( ). Once TIPs are defined, designers may update CAMS:requirements( ) by adding more CTL-assertions as needed. For each TIP designers should specify an upper bound for estimated time it might take for the TIP to be executed. These upper bounds will automatically determine upper bounds for transaction completion times for ports connected by pathways.

At this point TICC™-Ppde will automatically derive port-ALLEOPs and port-Traces associated with each port in CAMS:ports 0, as described in Section 3. System will also use port-Traces to automatically construct ECT-networks like the ones illustrated and discussed in Section 7. TICC™-Ppde may now interactively formally verify CTL-assertions in CAMS:requirements( ) using the ECT-networks, as discussed in Section 7. This may call for design revisions and/or updating of CAMS:requirements( ). Formal validation of all CTL-assertions in CAMS:requirements( ) will complete the abstract design of CAMS. Let us call it CAMS:design( ).

It may be noted, no programming considerations were involved in CAMS:design( ) or in finalizing CAMS:design( ), only system decomposition and requirements specifications. All of these are specified not in a programming language, but in abstract terms, which are not executable by computers, but which may be analyzed and used for formal proof constructions. Programming begins only after CAMS:design( ) has been completed.

9.2. Analysis of CAMS:design( )

Designers may at this point analyze CAMS:design( ) based on patterns of interactions and tentative timing bounds. Objective of this analysis might be to ascertain whether the design is capable of satisfying given performance criteria. Criteria might specify conditions for optimal and/or satisfising performance of the design. Analysis methods may be based on postulated interaction efficiencies in CAMS:design( ) and CAMS:ALLEOPS( ), postulated data on products of the corporation, product development, distribution, marketing and re-cycling times, costs and benefits, cost and timing cycles for production of products and development of future products, projected customer satisfaction surveys, projected demands for products, production capabilities to meet the demand, administrative efficiencies, and projected economic well being of the corporation over given number of years.

ALLEOP-proof methods would not be sufficient to perform this analysis. It is quite possible that methods of analysis used here are based on economic theories of optimal and satisfising performance. It is possible to develop such analysis methods using information in CAMS:design( ), CAMS:ALLEOPS( ) and information listed above. Need for such analysis is clear. But at this time, we do not have any formalized analysis methods of this kind that we could use. Hopefully, they will emerge in the future.

9.3. CIP and TIP Refinements

Programming begins at this time. Before programming pthreads in TIPs and defining message subclasses, designers should specify input/output logical characterizations for the pthreads to be programmed. Programmers are usually not trained to do this. Designers must do this. Pthreads jointly executed in parallel by cells in cell-groups in same virtualMemories should be jointly implemented. After each pthread and its associated message subclasses have been implemented it should be formally verified that each pthread satisfies its specified characterization, and each TIP execution is likely to satisfy its specified upper bound.

At this point designers may specify relations $R_{[p,q]}$ defined in Section 2.3.2, specifying the well-matched property of ports [p,q] connected by pathways and interactively verify whether timing upper bounds specified for transactions are likely to be satisfied. As TIPs and CIPs are refined, TICC™-Ppde will automatically update port-TIPs, port-ALLEOPs, port-Traces and ECT-networks. Implementers may verify whether CTL-assertions in CAMS:requirements( ) are satisfied, using TICC™-Ppde. This may call for revision of pthread implementation, or their characterizations or estimated timing upper bounds associated with them, or may even call of revision of CAMS:design( ).

This TIP and CIP refinement process is iterated until a fully validated CAMS:implementation( ) is obtained. At this point designers should verify whether statement (7.44) characterizing satisfactory validation of CAMS holds true. This may call for more iterations of design, refinement and validation steps. Eventually this process will yield completed CAMS:implementation( ).

SMS-network Design: After doing all of these, designers may specify organization of eb and ea cells in CAMS:SMS( ), using already postulated eb cells embedded in the pathways of CAMS:TICC™-network( ). Design of SMS involves assigning to each eb cell all pathways in CAMS:pathways( )

that it should service, assigning ea cells with which each eb cell should communicate, and setting up specialized pathways for communications between eb and ea cells. We refer to this as SMS-network design. This may be done by designers interactively with TICC™-Ppde. It is even possible to fully automate this process. We have not done this yet. SMS-network design will result in elimination of many eb cells initially postulated by TICC™-Ppde, since TICC™-Ppde initially assigned one eb cell for each pathway, and in the final design each eb cell will service several pathways.

Run time Validation: Once CAMS:design( ), CAMS:implementation( ), and their validation, and CAMS:SMS( ) design are completed, the fully refined and validated system may be dynamically tested by running it and examining the causalnets generated by SMS. At this point it is not likely that dynamic run time testing might call for recycling of design, refinement and validation processes. But, it is possible!

Focus-Shift in TICC™-Paradigm for building Software Systems: The design and implementation procedure outlined above, shifts the focus of system design and implementation from programming to system decomposition, analysis and validation. TIP-refinements begin only after system design has been completed. This guarantees that programming considerations would not influence system decomposition, contrary to current practices in software engineering, where system design is highly influenced by programming considerations. Our software engineering methodologies are highly influenced by available programming technologies. In TICC™-paradigm there is a clear demarcation between system design, programming and validation, and TICC™-paradigm relegates programming to a lower level clerical operation, elevating verifying operations to a higher level.

TICC-Paradigm Sets New Basis for Software Engineering: As described above, system design and implementation using the TICC™-paradigm does not require much programming expertise, but requires considerable expertise in network-refinement, system analysis, logical characterization of systems, and formal validation techniques. Expertise in programming will not help in these tasks. System designers, software engineers and implementers have to be trained differently to effectively use TICC™-paradigm to build formally verified parallel software. They have to be trained in system decomposition, interaction analysis, formal requirements specifications, logical input/output characterization of pthreads, and formal validation techniques. This will dramatically change the nature of software engineering from what it is today.

Examples presented in this disclosure: Implementation specifications for examples discussed in this disclosure specify abstract designs for those examples in different stages of refinements. Implementations in Appendices I through III specify logical characterizations of most actions and conditions appearing in implementations, but they do not specify computer programs for all of them. All proofs presented here are proofs of CTL-assertions on implementations in different stages of refinements. Thus, ALLEOP-proof methods may be used to validate characteristics of both designs and implementations at every stage of refinement.

TICC™-CPUs: We present in the next section special facilities that computing units used to execute TICC™-Ppde parallel programs should have in order to facilitate efficient program execution, and automatically provide all needed data and system security to validated implementations. We refer to the computing units with requisite special facilities as TICC™-CPUs.

10. Design for TICC™-CPUs in Multi-Core Chips

TICC™-CPU Requirements: TICC™-Ppde simplifies designs for TICC™-CPUs by eliminating the need for cache memories and the need to use speed up techniques, as explained in Section 5.6. However, TICC™-Ppde requires each TICC™-CPU to provide some special facilities to run cells and execute communication protocols. These special facilities pertain to the following: In the following we use C.cpu to refer to the TICC™-CPU assigned to run a cell C.

(i) Time Stamping: Each C.cpu, should contain a hardware clock to enable time stamping of message deliveries to ports C.p attached to C, time stamping being done at times when other CPUs, C'.cpus, deliver messages to ports of C, messages being delivered in parallel to the ports of C by the other cells C'. Messages may be simultaneously delivered to multiple ports of C by different C'.cpus. Therefore, in order to set time stamps it should be possible for multiple message delivering C'.cpus to simultaneously interrogate the hardware clock of C.cpu.

Since this facility was not available at the time of implementation of prototype TICC™ and TICC™-Ppde, no time stamping was used in the prototypes. Thus SMS infrastructure in the prototypes is not tested.

(ii) CCP Machine Instruction: Each C.cpu should implement CCP (Causal Communication Primitive) as a hardware machine instruction. State of the art methods for implementing CCP as a machine instruction are quite straight forward, since they just require programmed implementation of sequential machine state transitions implemented as a hardware instruction, and therefore are not described here. CCP was implemented in software in the prototypes.

(iii) Interrupt Handling: Each C.cpu should contain interrupt handling facilities to communicate directly with interruptPorts of C, C.cpu responding to detected interrupt signals only between successive TIP executions by C. This was also implemented in software in the prototypes. Operating system cannot interrupt any cell in the prototypes, only other cells or human users may interrupt cell activities.

(iv) Memory Allocation: Each virtualMemory should have its own dynamic memory allocation software associated with it, this software being run by CPUs assigned to cells that are tuned to that virtualMemory, as and when needed. Dynamic memory allocation was done in the prototypes using the LINUX operating system in the shared memory environment of PROLIANT 760 multiprocessor. Input/output and secondary memory accesses were also handled by the operating system.

(v) Shared Memory Organization: Each DMP (Distributed-Memory multi-Processor) with SMPs (Shared-Memory multi-Processors) as its computing nodes may contain a TICCNET™ interconnecting the SMPs. If DMP is integrated in a multi-core chip then the TICCNET™ may also be integrated in the chip. However, it is possible to dispense with the need for TICCNET™ in multi-core SMP chips, if the shared-memory organization described below that exploits virtualMemories is used. Prototypes were implemented in a conventional shared memory multiprocessor. So issues raised here did not arise.

Above requirements do not complicate CPU designs, but do complicate chip designs. Simplified CPU designs increase achievable CPU densities in multi-core chips.

10.1. Organization for Time-Stamping Message Deliveries

Organization described here facilitates time-stamping of multiple simultaneous message deliveries to multiple ports of a cell $C_R$ (R' for 'Receipt') by message delivering CPUs, $C_D$.cpus, (SD' for 'Delivery') using local times of the clock of $c_R$.cpu. The described organization facilitates simultaneous polling of the clock time by multiple message-delivering $C_D$.cpus.

Signal Memory Data: For each port C.p, tuned to virtualMemory C.p.vM, let C.p.clock and C.p.delivery be two distinguished time registers associated with C.p: C.p.clock=C.p.sm.clock and C.p.delivery=C.p.sm.delivery, where C.p.sm=C.p.vM.sm is the signalMemory component of C.p.vM. These registers are thus in C.p.sm. Let C.cpu be the CPU that runs cell C. C.cpu broadcasts its clock time to time registers $C.p_i$.clock for $0 \leq i < n$. Each pair ($C.p_i$.clock, $C.p_i$.delivery) will reside in the signalMemory component of the distinct virtualMemory $C.p_i$.vM together with registers containing $C.p_i$.state=$C.p_i$.sm.state and $C.p_i$.input=$C.p_i$.sm.input. As described below, $C.p_i$.delivery will contain the time at which the latest message was delivered to $C.p_i$. To facilitate broadcast of time to the clock registers in all $C.p_i$.sm for $0 < i \leq n$, C.cpu should have access to C.clock at all times. C.cpu should also have access to $C.p_i$.delivery, $C.p_i$.state and $C.p_i$.input, at all times. Access at all times to $C.p_i$.state and $C.p_i$.input is needed in order to evaluate guards at any time, access at all times to $C.p_i$.delivery is needed to sort ports at any time, and access at all times to $C.p_i$.clock is needed, of course, to set clock times. These are requirements necessary for TICC™ communication.

Time-Stamping: Let us now suppose, port D.q of cell D is delivering a message to port C.p of cell C, via pathway D.q↔C.p. Then D.q.vM=C.p.vM, and D.q.protocol for message delivery will be executed by D.cpu. Suppose D.cpu was delivering the message to ports in a port-group G={$C_j.p | 0 \leq j < m \geq 1$}. Let $C_j$.cpu be the CPU that runs cell $C_j$ and let D.q.vM=G.vM=$C_j$.p.vM for $0 \leq j < m$. Then, while D.cpu is executing D.q.protocol, D.q will have access to all registers in the signalMemory G.vM.sm. All registers $C_j$.p.clock and $C_j$.p.delivery for $0 \leq j < m$, will be in this signalMemory. Thus, D.cpu will have access to all of them at the time of message delivery. As described in statements (8.4-iii) and (8.4-iv) of Section 8, 4584 when D.cpu delivers message to port $C_j$.p, D.cpu executes the method $C_j$.p.timeStamp( ), which does the following: It temporarily locks the register $C_j$.p.clock in G.vM.sm from getting updated by time signals being broadcast by $C_j$.cpu, transfers the contents of $C_j$.p.clock to the register $C_j$.p.delivery, and then unlocks the register $C_j$.p.clock. Thus $C_j$.p.delivery register will always contain the delivery time of the latest message delivered to port $C_j$.p.

Time-Stamping in Group-to-Group Communications: For any cell $C_j$ for $0 \leq j < m$, let $C_j.p_i$ for $1 \leq i < k_j$ be the other ports in $C_j$, besides $C_j$.p. Then registers $C_j.p_i$.clock for $1 \leq i < k_j$ will all contain identical time, namely the time broadcast to all of them by $C_j$.cpu and each pair of time registers ($C_j.p_i$.clock, $C_j.p_1$.delivery) will be in the distinct signalMemory $C_j.p_i$.sm. Let us suppose $D_{ij}.q_j$ is delivering message, respectively, to $C_j.p_i$ for $1 \leq i < k_j$ and $0 \leq j < m$. Then $D_{ij}.q_j$.sm=$C_j.p_i$.sm and $D_{ij}$.cpu will have access to both registers $C_j.p_i$.clock and $C_j.p_i$.delivery while $D_{ij}$.cpu is delivering message to $C_j.p_i$. Thus, at the same time D.cpu is setting delivery time in $C_j$.p.delivery, for any or all i,j $1 \leq i < k_j$ and $0 \leq j < m$, $D_{ij}$.cpu, which is delivering message to $C_j.p_i$, may also set delivery time in $C_j.p_i$.delivery, since both $C_j.p_i$.delivery and $C_j.p_i$.clock will be in $D_{ij}.q_j$.sm and $D_{ij}$.cpu will have access to both of them. This facilitates simultaneous access to the clock time of the clock in $C_j$.cpu by different message delivering $D_{ij}$.cpu for $1 \leq i < k_j$ and $0 \leq j < m$.

10.2. Shared-Memory Organization that Exploits virtualMemories

Shared-memory organization, described below, for TICC™-CPUs in multi-core chips uses virtualMemories to minimize memory interference, provide increased data security, increased execution efficiencies and eliminate the need for TICCNET™ in integrated multi-core processors.

Private Memories of CPUs and SMMs: Each CPU in a multi-core chip will contain a small private memory of no more than 16 mega-words. This private memory is intended to store the state of the cell that is run by that CPU, state of the CPU and methods and conditions defined in that cell. Other than this private memory, the CPU will have no dedicated main memory attached to it. However, each CPU will have the capability to dynamically connect to a subset of a collection of independent hardware memory modules, called Shared Memory Modules, SMMs, using programmable logic networks. The SMMs are kept in a pool of such hardware memory devices associated with the chip. SMMs in the pool have varying memory capacities ranging from 10 kilo-words to a few giga-words. Dynamic connections between the CPUs and SMMs are controlled by ports, as described later below.

SMMs Assigned to VirtualMemories by TICC™-Ppde: Each virtualMemory in an application will have a unique SMM assigned to it by TICC™-Ppde, this assignment being done at compile time or run time, no two distinct virtualMemories having the same SMM assigned to them. The SMM assigned to a virtualMemory is never changed. The maximum number of CPUs serviced by an SMM will be equal to the maximum number of cells that a cell-group may have. This is because, cells in a cell-group are all tuned to the same virtualMemory and thus all CPUs that run those cells will use the same SMM. We assume here, the maximum number of cells serviced by an SMM is likely to be no more than 16, which is the maximum likely size of a cell-group. In practice, cell-group sizes are likely to be in the range of 1 to 4.

Machine Instructions for setting up connections between CPUs and SMMs: Let C.p.smm be the SMM assigned to the virtualMemory C.p.vM. We introduce two machine instructions: Connect(C.ports) and Disconnect(C.ports), where C.ports is the set of all ports attached to cell C, which are polled by C in its polling cycles. These are the ports with non-embedded TIPs. Connect(C.ports) connects C.cpu to C.q.smm for every port C.q∈C.ports, and Disconnect (C.ports) disconnects C.cpu from C.q.smm for every port C.q∈C.ports. When C.cpu is assigned to C, Connect(C.ports) is executed. When C releases C.cpu, Disconnect(C.ports) is executed. One may implement connect and disconnect operations between CPUs and SMMs through a suitable crossbar switch.

Machine Instructions for granting and revoking access to SMMs: We introduce two additional machine instructions: GiveAccess(Ports) and DenyAccess(Ports), where Ports is a subset of ports appearing in a C.p:tip( ). Of course, all ports in this subset would be attached to C. The instruction GiveAccess(Ports) gives C.cpu access to data (messages and methods) in C.q.smm for ports C.q∈Ports only if C.q.state=S, and DenyAccess(Ports) removes access rights to data in C.q.smm already given to C.cpu, for every port C.q∈Ports. C:giveAccess(Ports) and C:denyAccess(Ports) are here implemented as hardware instructions in C.cpu. These instructions work in the context of connections already established between C.cpu and C.q.smm for C.q∈Ports. These instructions have to set and reset just one bit in order to give and deny access through an already established connection. Thus, giving and denying access to a CPU for an SMM can be performed at high speeds.

Before proceeding to discuss how dynamic access control for CPUs to access SMMs is used to drive a TICC™-CPU it is necessary to consider the instruction execution protocol of TICC™-CPU.

Instruction Execution Protocol of TICC™-CPU: As before, let us use C.cpu to refer to a generic TICC™-CPU assigned to cell C. The instruction address register of C.cpu is a stack of address registers. We will use C.cpu.iar to refer to this stack and use C.cpu.iar[j] for j=0, 1, . . . to refer to the address register at level j of this stack, C.cpu.iar[0] being the top of the stack. Eval is a machine instruction in C.cpu that sets and modifies C.cpu.iar. It is used only by the compiler when it compiles programs written by application programmers. Eval takes a vector of two addresses as its argument. We will use Adrs to refer to this vector of two addresses, Adrs= [Adrs[0], Adrs[1]. Adrs[0] is the beginning address of an area of memory in which compiled binary code for a program is stored. Adrs[1] is the address to which program execution control returns after executing the binary program code that starts at Adrs[0].

Eval Instruction Execution: When eval(Adrs) is executed, if Adrs[1]=φ then C.cpu sets C.cpu.iar[0]=eval-next, which is the address of the next instruction following eval in the program currently being executed. If Adrs[1]≠φ then C.cpu first sets C.cpu.iar[0]=Adrs[1]. After setting C.cpu.iar[0], C.cpu pushes Adrs[0] onto C.cpu.iar by performing C.cpu.iar:push (Adrs[0]). This sets C.cpu.iar[0]=Adrs[0] and C.cpu.iar[1]= Adrs[1] or eval-next. This completes execution of eval.

Instruction Execution Cycle: After executing eval, C.cpu continues its instruction execution cycle as follows: Instruction at address C.cpu.iar[0] is retrieved and executed. After instruction execution, if the executed instruction did not itself reset C.cpu.iar[0] or change cpu.iar through a push or pop operation, then C.cpu updates C.cpu.iar[0] to the address of the next instruction to be executed in the program that is being currently executed, without popping cpu.iar, and continues in this manner until the current program execution is completed. Completion of this program execution will always cause C.cpu.iar:pop( ) to be executed, there by transferring execution control to Adrs[1] or eval-next thus resuming the earlier program in which the just executed program was started.

Push and pop operations are thus, respectively, done on cpu.iar only when a program (program segment) is invoked through eval and the invoked program (program segment) terminates. Eval is the only instruction that can push a new address onto C.cpu.iar. For every push there should be a corresponding pop, in order to keep C.cpu.iar in sync with programs being executed in cell C.

Protocol Executions: Notice, eval(C.p.protocol) will simply set C.cpu.iar[0]=C.p.protocol and C.cpu.iar[1]=eval-next. This will cause C.cpu to begin executing C.p.protocol. At the end of protocol execution C.cpu.iar:pop( ) will be executed. This will cause the instruction at eval-next to be executed next. There will always be an eval-next, because every compiled program ends with C.cpu.iar:pop( ). If the instruction at eval-next is C.cpu.iar:pop( ) then it will again pop C.cpu.iar and this will result in terminating C.p:tip( ), as we shall see below, else it will continue executing the remaining portion of C.p:tip( ), starting at eval-next. C.p:s( ) and C.p:f( ) appearing in C.p:tip( ) are simply compiled to eval (C.p.protocol). We refer to eval(X) as inline invocation of X.

TIP Executions: For each C.p, we use eval together with C.p:tip( ):invocation( ) and C.p:tip( ):termination( ) protocols to execute C.p:tip( ). These protocols give dynamic access to C.cpu for SMMs assigned to virtualMemories that are needed to evaluate C.p:tip( ), and revoke given access permissions at the end of C.p:tip( ) execution. These invocations and revocations are done at the level of executions performed by a computing machine without having to invoke an operating system or any other process that is external to cell C.

Invocation/Termination Protocols for C.p:tip( )s, for external ports, C.p: Let C.p.tipStart, C.p.tipEnd, C.p.tipInvoke, C.p.beginningPorts, C.p.endingPorts and C.p.stack be attributes defined on C.p. C.p.tipStart holds the beginning address of the memory area in which the compiled binary code for C.p:tip( ) is stored. This binary code for C.p:tip( ) is normally kept in the execution memory C.p.vM.ex of the virtualMemory C.p.vM. For port-vectors c.p it is kept in the local memory of C.cpu, C.cpu.rM ('rM' for 'real Memory'). C.p.tipInvoke holds the beginning address of the memory area in C.cpu.rM, in which compiled binary code of the invocation protocol C.p:invocation( ) is stored. C.p.tipEnd holds the beginning address of the memory area in C.cpu.rM, in which compiled binary code of the termination protocol C.p:termination( ) is stored.

C.p.beginningPorts specifies the subset of ports appearing in C.p:tip( ) such that for every C.q∈C.p.beginningPorts. C.cpu should have access to C.q.smm before it can begin to execute C.p:tip( ). C.p.endingPorts specifies the set of all ports such that for every C.q∈C.p.endingPorts, C.cpu should be denied access to C.q.smm when execution of C.p:tip( ) terminates. C.p.tipStart, C.p.beginningPorts and C.p.endingPorts are all set during compile time of C.p:tip( ). Finally, C.p.stack is a stack of length two that holds a vector of two memory addresses (pointers) at each level:

$$C.p.stack[j] = [C.p.stack[j,0], C.p.stack[j,1]] \text{ for } j=0,1. \qquad (10.1)$$

Invocation and termination protocols for C.p:tip( ) are specified by the following program segments:

```
C.p:invocation( ) = [giveAccess (C.p.beginningPorts);
   eval ([C.p.tipStart, C.p.tipEnd]);]                     (10.2)
C.p:termination( ) = [denyAccess (C.p.endingPorts);
   C.cpu.iar:pop( );]                                      (10.3)
```

For convenience, let us define C.p.tipStart, C.p.tipInvoke, and C.p.tipEnd as

```
C.p.tipStart   := [C.p:tip( )]                             (10.4)
C.p.tipInvoke  := [C.p:invocation( )]                      (10.5)
C.p.tipEnd     := [C.p:termination( )]                     (10.6)
``` where ':=' is read as "beginning address of the compiled code of". Reason for the "pop" in (10.3) will become clear later below.

Using C.p.stack: Normally, C.p.stack[0]=[C.p.tipInvoke, C.p.CIP-resume], where C.p.CIP-resume is the address at which C.cpu should resume execution when C.p:tip( ) execution terminates. C.p.CIP-resume will be an address in C.cpu.rM, in which compiled binary code for C:CIP( ) is kept. Intention here is, C.cpu should resume execution of C:CIP( ) starting at C.p.CIP-resume after executing C.p:tip. Value of C.p.CIP-resume is fixed at the time of compilation of C: CIP( ) for every port C.p of cell C whose TIP is not an embedded TIP, and C.p.stack [0,1]=C.p.CIP-resume is set. After the state of C.p changes to S and when c:CIP( ) is ready to execute C.p:tip, C.cpu will simply execute eval(C.p.stack [0]). This will cause the following to happen:

Evaluating C.p.stack: Eval(C.p.stack[0]) first sets C.cpu.iar[0]=C.p.CIP-resume=C.p.stack[0,1]. After doing this, eval(C.p.stack[0]) performs C.cpu.iar:push(C.p.stack[0, 0]) making the new C.cpu.iar[0]=C.p.tipInvoke and C.cpu.iar [1]=C.p.CIP-resume. This will cause C.cpu to begin executing C.p:invocation( ) in (10.2), which will first give access to C.cpu to all virtualMemories that are needed in order to begin executing C.p:tip( ). After access has been given, eval([C.p.tipStart, C.p.tipEnd]) appearing in (10.2) will set C.cpu.iar[0]=C.p.tipStart, C.cpu.iar[1]=C.p.tipEnd and C.cpu.iar[2]=C.p. CIP-resume. This will cause execution of C.p:tip( ) to begin. Compiled code for C.p:tip( ) will always end with C.cpu.iar:pop( ) which will cause C.p:termination 0 to be executed starting at the address C.p.tipEnd, at the end of C.p:tip( ) execution. This termination protocol revokes all accesses given to C.cpu during C.p:tip( ) execution and then pops C.cpu.iar, which will cause execution control to be returned back to C:CIP( ) at address, C.p.CIP-resume.

TIP Compilation: For TIPs that are not embedded in other TIPs, compiled codes for program segments shown on the right side of (10.2) and (10.3) will be kept in the execution-Memory C.p.vM.ex of port C.p at compile time, and C.p.tipInvoke and C.p.tipEnd will be set to the beginning addresses of their, respective, compiled codes in C.p.vM.ex. Similarly, C.p.tipStart will be set to the beginning address of the compiled code for C.p:tip( ). These addresses (pointers) are also saved in C.p.vM.ex by setting C.p.vM.ex.tipStart=C.p.tipStart, C.p.vM.ex.tipInvoke=C.p.tipInvoke and C.p.vM.ex.tipEnd=C.p.tipEnd. Of course, C.p.stack[0,0]=C.p.tipInvoke will also be set. C.p.stack [0,1] is set to C.p.CIP-resume while compiling C:CIP( ). All of these are thus done at compile time and all the compiled codes and pointers will reside in C.p.smm.ex, where C.p.smm≅C.p.vM.

When C is activated in C.cpu, the compiled codes for program segments C.p:invocation( ) and C.p:termination( ) in (10.2) and (10.3) will be copied into C.cpu.rM (the real Memory, local to C.cpu) from C.p.smm.ex and C.p.tipInvoke and C.p.tipEnd will be suitably reset to their, respective, new addresses in C.cpu.rM. This is done for every port C.p of cell C whose TIP is not an embedded TIP. This would be a part of cell activation at run time. Thus cell activation can be an expensive process taking 2.5 to 5 microseconds to complete. But it is usually done only once.

Embedded TIPs: If C.p:TIP( ) is an embedded TIP then let C.q:tip( ) be the TIP in which C.p:TIP( ) is embedded. In this case, C.p:<guard>?( ) {GiveAccess (C.p.beginningPorts);
    C.p:tip( ); denyAccess (C.p.endingPorts);}    (10.7)

will be compiled in line with C.q:tip( ). Here, C.p.tipInvoke, C.p.tipStart, C.p.tipEnd and C.p.stack are set to φ, since they are not needed, but C.p.beginningPorts and C.p.endingPorts will be set to their, respective, values.

Activations in Cell-Groups: It is possible that C.p is just one of the ports in a port-group, G=[$C_1$.p, $C_2$.p, . . . , $C_n$.p]. C.p=$C_1$.p. Parent-cells of ports in G constitute a cell-group. Let C=[$C_1$, $C_2$, . . . , $C_n$] be this cell-group. All the ports in G are tuned to the same virtualMemory, C.p.vM. Let G.vM=C.p.vM and G.smm=$C_i$.p.smm. Each port $C_i$.p gives access to its parent-cell $C_i$ to the virtualMemory G.vM after $C_i$.p.state=S becomes true. $C_i$.cpu will get this access when eval($C_i$.p.stack[0]) is executed and access will get revoked when $C_i$.p.tipEnd is evaluated. Access to G.smm and revocation of this access may not happen at the same time for all the CPUs in the set {$C_i$.cpu|$c_i$∈C}, since activities of cells in cell-group C may not be synchronized to each other. Eventually, all CPUs in {$C_i$.cpu|Ci∈C} will access the same G.smm while each is executing $C_i$.p:tip( ) in parallel.

Programmed Suspension of C.p:tip( ) Execution: It is possible to have a programmed suspension of C.p:tip( ) execution in the middle, and resume from where it was left off. Notice, there is a distinction between programmed suspension and suspension caused by an interrupt message: In programmed suspension cell is not suspended, only C.p:tip( ) execution is suspended. The method, C.p:suspendTip(C.p.TIP-resume) is used for programmed suspensions of C.p:tip( ), where C.p.TIP-resume is the address in the compiled code of C.p:tip( ) at which execution of C.p:tip( ) should be resumed. Code for C.p:suspendTip(C.p.TIP-resume) should be embedded in-line into a pthread in C.p:tip( ); it cannot be activated through an interrupt message. The value of C.p.TIP-resume gets set at compile time. Suspension of C.p:tip( ) execution will be based on conditions, evaluated at run time, that will depend on the state of cell C and its ports.

Additional C.p Attributes: We introduce two new attributes for C.p: C.p.resumeStart and C.p.resumingPorts. The value of C.p.resumeStart is the address at which C.p:tip( ) should resume operations. The value of C.p.resumingPorts is a set of ports such that for every port C.q∈C.p.resumingPorts, C.cpu has access to C.q.smm at the time C.p:tip( ) is suspended. C.cpu should reacquire access to C.q.smm for every C.q in C.p.resumingPorts before it resumes execution of C.p:tip( ); hence the name, C.p.resumingPorts. Both C.p.resumingPorts and C.p.resumeStart are set at run time, when C.p:suspendTip (C.p.TIP-resume) is executed.

C.p:suspendTIP(resume) Method: Definition of C.p:suspendTip(C.p.TIP-resume) is given below. In the following, this refers to the instance of Port in whose tip( ) suspendTip (C.p.TIP-resume) is being executed. Suspend-TIP is always compiled in-line with the code of the pthread in which it occurs.

void Port::suspendTip(C.p.TIP-resume){
  cell= this:parent( );//declares cell to be the parent of the port referenced by 'this'.
  this.resumeStart = C.p.TIP-resume;
  this.input=s;
  this.resumingPorts = cell:hasAccessTo( );
  Adrs = [this.tipResume, this.stack[0,1]];
  this.stack:push (Adrs);
  cell.cpu.iar:pop( );}   (10.8)

If suspendTip is executed in C.p:tip( ) then this=C.p will be true. For a port C.p, both C.p.stack[0] and C.p.stack[1] are reset by suspendTip at run time as follows:

C.p.stack[0]= [C.p.tipResume, C.p.CIP-resume] and   (10.9a)
C.p.stack[1]= [C.p.tipStart, C.p.CIP-resume],   (10.9b)
Here,
  C.p.tipResume := [C.p.stack:pop( );
    giveAccess(C.p.resumingPorts);
    eval([C.p.resumeStart, C.p.tipEnd]);]   (10.10)

It is possible that several instances of C.p:suspendTip(C.p. TIP-resume) appear embedded in a C.p:tip( ). At compile time compiled code for the right side of C.p.tipResume in (10.10) is kept in C.p.vM.ex. When C.cpu is assigned to C, the compiled code corresponding to C.p.tipResume is copied into the private memory C.cpu.rM('rM' for 'realMemory') of C.cpu, and C.p.tipResume is reset to the local address of C.p.tipResume in C.cpu.rM.

Programmed Suspension of C.p:tip( ): When a programmed suspension of C.p:tip( ) occurs, C.cpu is not suspended and released, but C.cpu simply proceeds to service the next port in C:CIP( ), after executing C.p:suspendTip(C.p.

TIP-resume). When C.p is polled in an ensuing polling cycle of C:CIP( ), it will evaluate to true, since C.p.input=s has been set in (10.8). When this happens, C.cpu will simply execute eval(C.p.stack[0]). At this point C.p.stack[0] will hold [C.p.tipResume, C.p.CIP-resume] and therefore cause C.p.tipResume to be executed, which in turn will cause C.p.stack to pop as shown in (10.10), returning C.p.stack[0] to its normal value shown in (10.9b), then give access to C.cpu to all C.q.vM for every C.q in C.p.resumingPorts, and then evaluate eval ([C.p.resumeStart, C.p tipEnd]). This will cause C.p:tip( ) to resume operations starting at C.p.resumeStart and execute C.p.tipEnd at the end of C.p:tip( ) execution, which in turn will cause control to be returned to C:CIP( ) at C.p.CIP-resume. Or may be, C.p:tip( ) may get suspended again.

Comment: It may be noted, C.p:suspendTip (C.p.TIP-resume) could be a source of possible deadlock in an application. Thus for every use of c p:suspendTip(C.p.TIP-resume) it should be shown that eventually when computation resumes at C.p:tip( ) it will complete the transaction at port C.p.

System and Data Security: In the above described scheme, access to SMMs is given to TICC™-CPUs dynamically, based on computational contingencies that arise in parallel computations at run time. The number of C.cpus that may simultaneously access a SMM has been assumed to be at most 16, but, as mentioned earlier, in most cases it will be between 1 through 4, since cell-group sizes are likely to be no more than 4. This reduces memory interference in shared-memory operations. This also dramatically improves data protection and security because, (i) for each port C.p, message in virtualMemory C.p.vM is delivered to port C.p only if C.p and the message satisfy a priori specified security requirements, (ii) each port C.p gives access to C.p.vM only to its parent-cell C and (iii) only at times after C.p.state has moved to S.

All methods, pthreads and processes are automatically activated in each cell only through message deliveries. A cell may get activated, and access and respond to a received message in a virtualMemory, only if a priori defined security requirements are satisfied. Enforcement of this security restriction does not require intervention by an operating system. It is intrinsic to TICC™-Ppde execution mechanisms. Giving and revoking access rights to data in SMMs are built into hardware at its innermost level.

Cell activations are done at message delivery times, when needed, by CPUs that that deliver messages (see statement (8.4-iv)). There are no method or process activation directories, there are no monitors to schedule activations and no Dynamic Link Libraries, DLLs. Thus, there is no way for an unauthorized intruder to enter an application and interfere with method and process activations; there is no way to find out which CPU is executing which pthread at what times and what messages are being exchanged by cells at any given time, unless intruder gets access to causal net generated by SMS and access to ALLEOPs stored in an application. Even if an intruder gets access to the causalnet he/she/it can find out about events that occurred only after they have already occurred. There is no way for an intruder to interfere with occurrences of on going events, unless intruder tricks the system, acquires access to ALLEOPs and changes them, which can be made impossible to do. It is, of course, possible that the intruder is a spy who already had access to the system. Preventing that is a human administrative problem, not a problem for the software application.

Data and system security thus becomes an intrinsic built-in feature of TICC™-Ppde at its innermost level in the shared-memory system with SMMs, and not a feature added-on to an application using an operating system to enforce it. These characteristics erect practically impenetrable barriers against data theft and system intrusions.

Designing a Security System for an application: Problems in designing and implementing secure TICC™-based systems are not in efficient, secure and reliable implementations of such systems, but in designing and defining a consistent set of message attributes, port attributes, virtualMemory attributes, security functions, and security delegation/revocation protocols (where one port temporarily delegates its security status to another port), which guarantee application security. The problems here are no different from the usual problems encountered in security system definition, but problems of reliable and correct implementation of a defined security system are totally eliminated. Defined attributes and security functions are automatically invoked at the time of message delivery by communication protocols built into TICC™-Ppde (see security specifications in Section 8). Thus, efficient secure implementation of a defined security system is automatic.

Comments: The SMM scheme complicates memory implementation, since it requires use of multiple shared-memory buses, one for each SMM, multiple memory access networks in each CPU, and programmable logic networks (in the form of a cross-bar switch) to efficiently set up connections between CPUs and SMMs, and dynamically change access rights. The scheme, however, simplifies CPU designs, since CPUs do not have cache memories or any other speed-up ornamentation. Most importantly, the scheme contributes intrinsically to greater efficiency, software security, privacy and protection.

10.3. Using TICC™-Ppde to Design Asynchronous Hardware Systems

It is possible to use TICC™-Ppde for designing, refining, and formally verifying asynchronous hardware systems that run with automatic SMS (Self-Monitoring System). Registers in hardware systems would become virtualMemories. Hardware subsystems may be encapsulated into compound-cells, as illustrated in the example in Section 3.2, the compound-cells hiding encapsulated components from other components in a hardware system, and each compound-cell having its own SMS. Such compound-cells may be used as hardware components that are plugged into larger hardware systems in contexts where the external-ports of the compound-cells are well-matched, as defined in Section 2.3.2, to ports of the larger system in to which they are plugged.

11. Programming Abstractions in the TICC™-Paradigm

Abstractions 1: Cell & Pathway: These abstractions are not new, but their particular incarnations in TICC™-Ppde are new. They integrate computation and communication, while at the same time isolating and protecting computations performed by each CPU in a multi-core chip and preventing mutual interference among computations performed simultaneously in parallel by distinct shared-memory CPUs in the chip. Pathways isolate, protect and preserve messages, and prevent mutual interference among asynchronous messages exchanged simultaneously in parallel between distinct groups of CPUs in a chip.

Abstractions 2: Attachment, Tuning, Port & Agent: Attachment and tuning as programming abstractions are new to programming. Only attached or mutually tuned hardware/software components may share each others methods and data, and exchange signals between each other. This restriction facilitates high-speed message exchanges, cell isolation, self-synchronization and self-coordination. Attachments and tunings are performed automatically by TICC™-Ppde when instances of cell and pathway subclasses are installed, ports are installed on cells, pathways are connected to ports of cells, ports are connected to agents, and agents are installed on virtualMemories. Implementers do not have to write programs to implement attachments and tunings. They are automatic built-in features of TICC™-Ppde.

The concept of software ports and agents is not new. However, the particular characteristics of ports and agents in TICC™-Ppde are unique to TICC™-Ppde. Subclasses of pathways, agents and ports likely to be used in any parallel programming application are predefined in TICC™-Ppde. Implementers have to define only unusual pathway, agent and port subclasses not already defined in TICC™-Ppde, following appropriate subclass definition formats.

Abstraction 3: VirtualMemory: It is common in computing systems to associate dedicated hardware memories with hardware systems. But the concept of using dedicated virtualMemories as software abstractions of hardware memories used in software systems is new. This concept was first introduced by Gopinath [21]. It was adapted by this author, with some enhancements, for parallel program development and execution in TICC™-Ppde. The way virtualMemories are defined and used in TICC™ is new. Real memory areas, or real SMMs (Shared Memory Modules) are allotted to virtualMemories during compile or run time.

VirtualMemories simplify parallel programming with multi-core chips and provide opportunities to implement new shared-memory organizations with SMMs in multi-core chip designs. They introduce intrinsically enhanced execution efficiency, data isolation and data protection, and contribute to system security. Subclasses of virtualMemories likely to be used in any parallel programming application are predefined in TICC™-Ppde. Implementers have to define only unusual virtualMemories subclasses not already defined in TICC™-Ppde, following appropriate subclass definition formats.

Abstractions 4: CCP and Protocol: The most significant abstraction in TICC™-Ppde, which in fact makes integration of all other abstractions possible, is CCP (Causal Communication Primitive), which is an abstraction of signal exchange between software/hardware components. They are used in TICC™-Ppde to define communication protocols, which when executed cause signals to travel over pathways associated with those protocols. They enable hardware/software components to exchange signals dynamically and programmatically, thus isolating them and yet enabling them to collaborate with each other. CCP induced signal exchanges synchronize, coordinate and manage asynchronous software/hardware components very much like start/completion signals synchronize, coordinate and manage asynchronous hardware components.

Communication protocols define a restricted class of computations containing no declarations but containing CCPs. They not only deliver signals and messages but also control access rights to delivered messages. Using CCP as a basic programming language primitive is new to programming technology and implementing it as a machine instruction is new to design of CPUs. Protocols likely to be used in any parallel programming application are predefined in TICC™-Ppde. Implementers have to define only unusual protocols not already defined in TICC™-Ppde, following appropriate definition formats.

Abstraction 5: TIP: TIPs are Thread Interaction Protocols. Each port C.p attached to a cell C has a TIP, C.p:TIP( ), defined for it. TIPs perform the following functions: (i) facilitate software development through abstract specifications of interactions among ports in an application and progressive refinements of abstract specifications to final implementations; (ii) isolate communications from message processing and message building computations in each cell; (iii) Isolate parallel computations performed by different cells; (iv) allow automatic derivation of modularized event based port-ALLEOPs from implementations at various stages of refinements; (v) enable flexible use of port-ALLEOPs for formal verification of an implemented system at various stages of refinement; and (vi) enable SMS (Self-Monitoring System) organization. As a programming abstraction, TIPs are new to programming technology. There are a total of 10 different kinds of TIPs, five synchronous and five asynchronous.

Abstraction 6: Synchronizations: There are two kinds of synchronizations, cycle synchronization and temporal synchronization. Cycle synchronization imposes coordination (ordering) of activities in an application. Two TIPs, p:tip( ) and q:tip( ) associated with any two distinct ports p and q in an application are cycle synchronized if evaluation of q:tip( ) always begins after the evaluation of p:tip( ) has been completed, and the next evaluation of p:tip( ) begins only after the completion of the previous evaluation of q:tip( ). Ports p and q may belong to any two cells in the application; they may even belong to the same cell. Two TIPs, $C_i$.p:tip( ) and $C_j$.q:tip( ) belonging to ports of any two distinct cells $C_i$ and $C_j$ are temporally synchronized if their evaluation always begins at the same time, possibly separated by a few nanoseconds, picoseconds or femtoseconds, depending on the technology.

TICC™-Ppde provides systematic methods to introduce cycle synchronization and temporal synchronization into a design or implementation through installations of predefined pathways and specifications of appropriate TIPs. TICC™-Ppde totally eliminates need for using semaphores or rendezvous methods. This relieves programmers from having to ever embed synchronization and coordination methods into object codes of software components.

Ad hoc synchronization and Coordination: TICC™-Ppde provides methods to introduce synchronizations and coordination in to an implementation as an after thought, at any stage of refinement of the implementation with no need to change any of the refinements done up to that point (Section 7.6). We call them ad hoc synchronization and coordination methods.

All synchronization and coordination methods used in TICC™-Ppde are new to programming technology and unique to TICC™-Ppde.

Abstraction 7: CIP: CIPs are Cell Interaction Processes. Each CIP defines a unique process that runs in a unique CPU in parallel with all other processes in a parallel processing system. C:CIP( ) executes cyclically TIPs at the ports of cell C that have messages delivered to them or C sends out messages through those ports. C continues its operations until it is terminated or suspended. CIP-processes are the only processes in TICC™-Ppde parallel program execution. Their scheduling, activation in a CPU, suspension, resumption, synchronization and coordination are all managed entirely by TICC™-Ppde without need to use an operating system, and without need for implementers to embed any object code into any of the application programs. All needed synchronizations and coordination in an application are implicitly defined by the TICC™-network of that application.

Using polling to recognize receipt of service requests and responding to them in some order is not new. It is widely used in all software systems. But the particular incarnation of this service in CIPs is unique to TICC™-Ppde.

Abstraction 8: TICC™-Network: This specifies in a graphical form cells used in an implementation and pathway interconnections among ports attached to the cells. TICC™-network specifies the control structure of parallel computations in an application. It implicitly specifies and enforces all forks/joins, and synchronization and coordination of parallel computing activities that occur in an application. Implementer has responsibility to specify the TICC™-network for an application. Once this is done implementers are totally relieved of all responsibility to schedule, control or monitor activities in parallel processes, or perform synchronization and coordination of those activities. The system becomes self-scheduling, self-monitoring self-synchronizing and self-coordinating.

Just as data-structure abstraction makes it possible to run the same sequential program with different data-structure definitions, as long as the structure of the sequential program matches with structure of the data-structure, the TICC™-network makes it possible to run the same set of parallel application programs (pthreads) with different TICC™-networks, as long as initialization routines in each C:CIP( ) in an application and TIPs defined at ports in that application match with the structure of TICC™-network.

Using a graphical representation to capture the control structure of interactions among components of a system is not new. But the specific incarnation of TICC™-network with its unique interpretation in TICC™-based parallel software systems is new.

Abstractions 9: ALLEOP, Trace and ECT: The manners in which these abstractions are derived from implementations and used are new and unique to TICC™-Ppde. TICC™-Ppde provides tools to derive ALLEOPs from implementations and use them to interactively validate software systems. The concept of a trace is not new. The term trace is used to refer to a description of what happens in a particular run of a program. Different programming disciplines use different syntactic structures or graphical tools to specify traces. TICC™-Ppde traces have the unique characteristic that they not only specify all of what may happen in a particular run of an application, but also define the logical semantics of computations. Traces are derived automatically from ALLEOPs and logical input/output characterizations of actions. TICC™-Ppde provides methods that use ECT-networks (Event Characterization Table networks) automatically derived from traces to validate properties of implementations.

Abstractions 10: SMS, Causalnet & Eb Cell: Causalnets are abstractions of traces; they contain only causal chains of communication events that occur in traces. Causalnet for an application Ap is built by the SMS (Self-Monitoring System) of TICC™-Ppde, while Ap is running, in parallel with the running of Ap. Agents in each pathway, P, in application Ap send signals to specialized Event Builder cells (eb cells), connected to P, while signals are traveling over P. Each P is serviced by a unique dedicated eb cell. A given eb cell may service several pathways. Signals received by the eb cell of P instruct the eb cell to install into a growing causalnet of the application, message dispatch and delivery events occurring in P.

Signaling of eb cell occurs during signal transmission over a pathway, and dispatch and delivery event installations occur in parallel with message processing done by the message receiving cells, in a manner that prevents interference between timings of SMS events and timings of application events. There are four activities that run in parallel while a growing causalnet is being built by the eb cells in SMS: (i) activities of all cells that run in the application, (ii) activities of agents in pathways signaling eb cells in SMS, (iii) activities of eb cells while they update the growing causalnet with new message dispatch and delivery events, and (iv) activities of ea cells of SMS that analyze the growing causalnet (see Abstractions 11 below).

The times at which signals are delivered to an eb cell specify the time instances at which message in the virtualMemory of the pathway connected to that eb cell is either dispatched or delivered. These time instances are specified in the local time of eb.cpu that runs that eb cell. Since local times of all CPUs that run eb cells are synchronized to a standardized global clock, all timings associated by eb cells with event instances in the causalnet would be synchronized to the same global clock. CPUs that run other cells in the application may use different local clocks not synchronized either to the global clock or to each other.

Each pathway in TICC™-Ppde is connected to the SMS components needed for that pathway. Thus, when an application is defined its associated SMS structures get automatically defined. The defined SMS structures are automatically invoked and used to dynamically monitor every run of that application. Application implementers do not have to write any programs to facilitate this. Each SMP (Shared-Memory multi-Processor), X, in a distributed-memory computing grid, interconnected by a TICCNET™, will have its own unique local SMS, X:SMS( ). The causalnet built by X: SMS( ) will reside in a local shared-memory of X. TICC™-Ppde can integrate the causalnets in different SMPs of a distributed-memory computing grid and display any portion of it centered on given cells or ports in an application, using TICC™-GUI (Graphical User Interface), as and when needed.

Application programmers do not have to write programs for any component of SMS. SMS is an automatic built-in feature of all parallel program executions in TICC™-Ppde.

Abstractions 11: SMS & Ea Cell: SMS uses specialized Event Analyzer cells (ea cells), to monitor a growing causalnet, while it is being created, during each run of an application. The objective is to identify and report errors and pending errors in the growing causalnet. Ea cells also monitor the causalnet to identify occurrences of a priori defined event patterns in the causalnet and issue alerts. They may use the recognized event patterns also to modify behavior of an application. As technology advances, this may be used for general complex pattern recognition, for incorporating self-diagnosis, self-repair and learning capabilities into applications. It is a built-in part of TICC™-Ppde parallel program communication mechanism.

Comments: All of the above programming abstractions and methods used in TICC™-Ppde parallel program development, validation, execution and self-monitoring are unique to TICC™-Ppde. The most important feature of TICC™-Ppde organization is, security and protection of data, and error monitoring. These are built into the system at its innermost level, with no need for application programmers to embed any of the security and protection features, or error monitoring features, into application programs, except for defining needed data security attributes and security functions specific to pathways attached to ports in an application, and defining event patterns that are significant to the application, the defined attributes, functions and event patterns being automatically invoked and used by built-in protocols and SMS of TICC™-Ppde.

Features of TICC™-Ppde platform that are significant to this enterprise are itemized below.

11.1 Significant Features of TICC™-Ppde Platform

Feature 1: Integrated Environment: TICC™-Ppde performs CPU assignments to cells, cell activations in assigned CPUs, parallel process management, pthread (parallel thread) management, communications, scheduling, interrupt management, security enforcement, synchronization and coordination, without having to invoke an operating system or any other software to perform any part of these services. In the current shared memory prototype implementation, TICC™-

Ppde uses operating system only for memory management, cache management, access to secondary storage devices, input/output and internet access. As mentioned in Feature 4 cache memories and all other kinds of speed-up techniques commonly used in CPU designs can be totally dispensed with in SMMCs (Shared-Memory Multi-core Chips) used to run TICC™-Ppde programs. All services currently provided by an operating system to TICC™-Ppde may then be incorporated with in TICC™-Ppde itself. Thus TICC™-Ppde provides an integrated parallel program design, development, verification, execution and run-time monitoring environment that is ideally well suited to develop, validate, run and monitor parallel programs in SMMC, or in a computing grid consisting of several SMMCs interconnected by a TICCNET™.

Feature 2: TICC™-GUI: This displays graphical representations of segments of TICC™-networks anchored at given cells, and segments of ALLEOPs anchored at given ports or cells, and segments of causalnets anchored at given ports or cells. Examples of TICC™-network displays appear in this paper, since these are the only ones implemented in the existing prototype implementations. TICC™-GUI should provide facilities to examine the state of any cell in an application, while it is running, at time points at which the GUI polls for cell states, in response to received service requests. It is practically impossible to display the state of a cell at time points which precisely coincide with the times when display requests were made. However, one could set break points (see [Srinivasan 48]) in TIP-bodies and have the states displayed when certain events occur. A rudimentary version of this is available in the prototype TICC™-Ppde and was used to debug parallel programs. Introducing such break points into an application Ap will however alter timings of events occurring in Ap. Thus break points may be used only in a testing mode. GUI is useful both to document system implementation and for dynamic system monitoring. TICC-GUI is an integral part of TICC-Ppde.

Feature 3: Arbitrary Scalability: As long as interaction overhead caused by scaling is small, when compared to program execution times, parallel programs in TICC™-Ppde are arbitrarily scalable. What is unique to TICC™-Ppde parallel programs is that interaction overhead may be defined precisely relative to the structure of a TICC™-network. Let N be a TICC™-Network of cells and pathways and $n_{max}(N, C)$ be the maximum number of messages exchanged by cell C in N in any one of its polling cycles. Let $n_{max}(N)$ be the maximum of all $n_{max}(N, C)$ for C in N: $n_{max}(N)=\text{Maximum}\{n_{max}(N,C)|C \in N\}$. Let v(N) be the number of cells in network N, and let N' be the scaled up version of N with v(N') cells. Then the requirement for arbitrary scalability is: $n_{max}(N')$ should be independent of the scaling factor, $\alpha=[v(N')/v(N)]$. The value of $\alpha$ could run into millions, if this condition is satisfied. This essentially says that communication and coordination overhead per cell should not increase in proportion to the scaling factor.

Feature 4: Eliminating Cache Memories and Speed-up Techniques: Cache memories may be dispensed with for running TICC™-Ppde parallel programs. In our prototype implementations we found cache memories more of a nuisance. It took us a long time to realize, inexplicable crashes were happening in our parallel programs because of cache incoherence. We had to update data in main memories in order to avoid cache incoherence. With small grain-size executions, too much time was wasted in cache replenishments and cache incoherence was an annoying problem. Cache memories are not needed for high throughput program executions in TICC™-Ppde. High throughputs may be realized by arbitrary scaling of low grain-size parallel program executions in cells. Indeed none of the usual speed-up techniques such as, multiple instruction-stream executions [29], look-ahead scheduling [30], pipe-lined processing [31] and cached executions [32] are needed for high efficiency and high throughput in TICC™-Ppde.

In TICC™-Ppde each CPU is dedicated to servicing only one cell, using only the virtualMemories associated with that cell. Each cell may execute only one TIP at any given time and TIP executions are uninterruptible by any external agent. The time taken to execute a TIP including both computation and communication may be as small as 1 to 100 microseconds. There are no synchronization, coordination, scheduling and monitoring overheads. Thus, there is no natural context in TICC™-Ppde to profitably employ any of the speed-up techniques. This enables prediction of event timings with in tightly specified bounds.

Feature 5: Ideal Environment for Validated Cyber-physical Real-time Systems with Self-Monitoring: Software execution with predictable timings within given bounds is a necessary and important requirement for building cyber-physical real-time systems. TICC™-Ppde provides the ideal environment to design, implement and validate cyber-physical systems with automatic self-monitoring using SMS. This is useful to design and implement systems like, auto-pilot of an aircraft or a space-craft system, automated multi-sensor reactive systems, automated systems for defensive/offensive coordination of military vehicles, automated factories, robots, or any other time critical reactive system.

TICC™-Ppde may also be used to build secure information systems like medical information systems or intelligence information systems or data-base (or knowledge based) systems. A significant most widely used application for TICC™-Ppde is likely to be, however, in SMP-based personal computer systems using SMM (Shared Memory Module) memory architecture, that guarantee privacy and protection against unauthorized intrusions.

Feature 6: Dynamic Flexibility and Mobility: TICC™-Ppde parallel programs may be dynamically modified and updated, by changing pathway connections dynamically and by introducing dynamically new cells and pathways (see in situ testing in [Das 19]). Program mobility in distributed environments is achieved by transferring entire contents of a virtualMemory in one processor to other virtualMemories in other processors.

12. Concluding Remarks

What has been accomplished: We have introduced here a parallel programming paradigm which adapts and combines concepts from various other paradigms. TICC™ provides the necessary glue for all of them to work together in TICC™-Ppde. TICC™-Ppde provides methods to (i) define parallel processing TICC™-networks; (ii) abstractly specify interactions among ports in the networks using TIPs (Thread Interaction Protocols) and interactions among cells in the networks using CIPs (Cell Interaction Processes); (iii) methods to refine compound cells to sub-networks of cells and pathways and encapsulate the sub-networks, (iv) complete implementations through successive refinements of abstract specifications (v) automatically derive ALLEOP models from TIPs, TICC™-networks and refinements of TIPs; (vi) automatically derive traces from ALLEOPs using action characterizations; (vii) automatically build ECT-networks (Event Characterization Table networks) from traces (viii) use ECT-networks to produce interactive proofs of valid properties of implementations, stated as CTL-assertions, both at the FSP and NFSP levels; (ix) automatically incorporate run-time SMS (Self-Monitoring System) into every completed implementation; (x) perform limit testing and ad hoc synchronization and coordination; (xi) use arbitrarily large numbers of parallel processing units; and (xii) provide abstractions needed to develop, verify and run complex parallel programs in multi-core chips.

On Communications and Computations: TICC™ defines high-speed computing mechanisms for communications. Computations performed by the communication mechanisms are integrated with parallel processing computations performed by cells. Mechanisms for scheduling, synchronization, coordination, security enforcement and self-monitoring are built into the communication mechanisms. For each message exchange one can predict within tight bounds when the message sending event might begin and when the message would be delivered, based on the history of message exchanges available in the causalnet that is built by the SMS and knowledge of ALLEOPs. Similarly, for each action event the time it might begin execution and the time it would complete execution are predictable within reasonably tight bounds, based on the history in the causalnet and knowledge of ALLEOPs. It is not possible to do these in Actor systems or in π-calculus.

Asynchronous communication is integrated with computations in a manner that is analogous to the way CSP integrates synchronous communications with computations, but with much greater flexibility, and power. Message processing parallel computations and communication protocol evaluations are mutually isolated from each other, even though both are performed by same cells. Mutual isolation is also enforced among asynchronous parallel cells that communicate with each other, also in parallel. TICC™-Ppde programs are self-scheduling, self-synchronizing, self-coordinating and self-monitoring. They do not require monitors, semaphores, schedulers, synchronizers, rendezvous, coordinators, serializers or any other ornamentation to make them work correctly.

On Interaction Specifications: A common feature of TICC™-Ppde and π-calculus is that they both specify parallel computations through interactions among computing components. This is essentially the only significant common feature between the two. The interaction and computational mechanisms are quite different.

Each π-calculus agent runs in parallel with other agents. The only computing operations performed by π-calculus agents are: name substitutions for parameters defined in an agent, exchanging names between pairs of agents via links, dynamically establishing links between agents, and hiding links. II-calculus does not specify computing mechanisms needed for communicating names via links. Indeed, the needed mechanisms cannot be specified in the π-calculus formalism. Communicating names via links is assumed as a given primitive. There is no concept of refinement, but hiding should in principle enable encapsulation. It is not clear though, what the criteria would be to find matching ports to plug-in an encapsulated component into a larger system.

These features of π-calculus may be compared with the following features of TICC™-Ppde: Each TICC™-Ppde cell runs in parallel with other cells. TIPs specify interactions among ports attached to cells. Interactions specified by TIPs describe two kinds of computations, both conventional sequential computations: (i) computations performed by a cell to process and build messages and (ii) computations performed by the same cell to send messages it builds to other cells through its ports. TIPs isolate the two computations. TIP computations may be specified at an abstract level, and reduced to their final implementations through progressive refinements. Subsystems may be encapsulated into compound cells and used as plug-in components, and compound cells may be refined into encapsulated sub-networks, with a well defined criterion to connect with matching ports in a larger system. Of course, besides all of these, TICC™-Ppde also provides facilities for verification and self-monitoring.

On Verification: Model based verification of design specifications using FSP[15] and CTL [40-44, 49] have played significant and important roles in system design. They are needed to verify designs and validate properties that implementations should satisfy. The problem with FSP is, abstract FSP specifications cannot be directly reduced to implementations through successive refinements. This makes it necessary to verify implementations using different tools, and this task is more complex, than design verification.

Model based verification by Clark et al [38-40], [41] verify synchronous hardware design specifications, not hardware implementations, because issues of coordination, synchronization and race-conditions do not seem to be a part of the verification system. Nevertheless, verification methods introduced by Clark et al are widely used by hardware designers to validate designs. There are hardware description languages like GEZEL [Schaumont, et al, 46] which allow design and verification of race free hardware systems. It is not, however clear, whether they are being widely used.

TICC™-Ppde specification methodology may be used to specify and verify implementations of race-free asynchronous hardware systems. All timings, synchronization and coordination requirements of an implementation are implicitly a part of specifications. They are taken into account during verification. The only restriction is, components should interact asynchronously using CCPs. This may make TICC™-Ppde not suitable to verify clock pulse driven synchronous hardware designs.

Advantage of using TICC™-Ppde: One advantage is that abstract specifications of intended computations look somewhat similar to FSP specifications of abstract designs, and TICC™-Ppde provides a methodology to reduce the abstract designs directly to implementations through successive refinements. At any stage of refinement ad hoc synchronization and coordination may be introduced into implementations without having to change any of the refinements done up to that point. TICC™-Ppde makes it possible to use model based formal verification to validate implementations at any stage of refinement. Besides providing such verification capabilities, the TICC™-paradigm automatically incorporates SMS into completed implementations to monitor correct performance throughout the life time of applications, whether hardware or software, as long as components interact asynchronously and use communication mechanisms based on CCP-driven signal exchanges. Abstractions in TICC™-Ppde simplify and codify design, implementation, verification and run-time monitoring.

On Abstractions in TICC™-Ppde: Abstractions introduced by the TICC™-paradigm are not really programming abstractions, even though we have used the phrase "programming abstractions" in this paper. TICC-Network, Cell, Port, Agent, VirtualMemory and Pathway are abstractions of system components, and pthread, protocol, TIP, CIP, ALLEOP, trace, ECT-tables and Causalnet are process abstractions. TICC™-Ppde provides a programming framework for specifying these abstractions or deriving them from specifications. They are distinct from conventional programming abstractions such as variables, blocks, assignments, declarations, conditional statements, while-loops and data-structures, they are also distinct from conventional process abstractions like methods, functions, threads, sub-routines and co-routines, and finally, they are distinct from conventional component abstractions such as class, object and message. Conventional programming abstractions and conventional process abstractions do not directly identify and relate to system components and processes as TICC™-Ppde abstractions do. Conventional component abstractions do abstract system components, but mapping classes to system components in implementations is a non-trivial task.

On System Design and Implementation: TICC™-Ppde shifts the focus of system development from programming to system decomposition, interaction specification and verification. Programming through refinements becomes a trivial task once system organization and interaction specifications are in place, and verification follows as a natural consequence of implementation. At present, we do not have systematic methods for system decomposition. One faces this problem in the specification of any complex system, software, hardware, physical or social systems. Perceived realizability conditions always influence system decomposition and design. Allowing realizability conditions that depend on programming idiosyncrasies to guide system decomposition and design is, however, not a good practice. By shifting the focus to system decomposition and interaction specification, and delegating programming to successive refinements of an already defined design, TICC™-Ppde attempts to avoid this problem.

Modes of interactions between software/hardware components in the TICC™-paradigm are not the same as they are in conventional software systems, time sliced concurrent software systems, π-calculus framework or synchronous hardware systems. Designing TICC™-networks, defining TIPs and CIPs, developing logical characterizations of pthreads and identifying CTL-assertions to be validated are important and difficult problems. Expertise in programming will not help solve these problems.

TICC™-paradigm calls for new approaches to the way system designers and programmers should be trained; they should be trained in component interaction analysis, logic and verification techniques. We hope, methods for interaction analysis and concepts of optimal system designs expressed in terms of TICC™-networks and interactions, will emerge. They are necessary.

TICC™-Ppde will radically change "Software Engineering" as we know it today, and hopefully allow it to evolve as a discipline with scientific principles of system design providing further support to the already existing support it enjoys through an evolving set of sound but ad hoc current practices, which have been mostly influenced by our programming technology.

Significance: The goal of realizing a high quality, secure and fully operational TICC™-Ppde is with in reach using only currently available technologies. There is no need to develop new technologies to realize this goal; it can be realized with in three to five years, if enough resources are devoted to it. Proof of concept prototype implementations of TICC™ and TICC™-Ppde substantiate this claim. They were implemented in two man-years by this author, with some assistance from Mr. Rajesh Khumanthem and Dr. Saeed Rajput. It took about four man years for this author to understand its significance and scope. The list below itemizes short term projects (ST) requiring 3 to 5 years to complete. All but the last one in the list have to be successfully completed in order to realize the above stated goal; the last one being optional.

ST Projects (3 to 5 years):
(i) developing new compilers compatible with TICC™-Ppde;
(ii) developing sound principles for security specification;
(iii) implementing TICC™-CPU designs discussed in Section 10;
(iv) implementing TICCNET™;
(v) implementing TICC™-GUI for design, verification and run-time monitoring;
(vi) creating TICC™-based Internet Browser, TICC™-IB;
(vii) implementing interactive ALLEOP-proof methods;
(viii) implementing TICC-based parallel operating system, TICC™-OS;
(ix) designing and verifying asynchronous self-monitoring hardware systems using TICC™-Ppde.

Realization of high quality, secure and fully operational TICC™-Ppde is likely to profoundly impact the way individuals use their desk-top and lap-top computers, and use supercomputer systems; the way computers are used in scientific and technical applications, the way social, educational, business, governmental organizations use computers, and the way software industries produce and market software. New regulatory standards for marketing validated software might emerge. Eventually, we may produce complex validated secure self-correcting software that operate independently in space based and terrestrial robotic systems as well as personal, business, governmental, social, scientific and educational computers, in all cases providing guaranteed protection against data theft, invasions of privacy and malicious attacks. Universally available gigantic computational resources, unprecedented since the dawn of computer era, will become common place, being at the command of every individual who seeks them. The list of long term (LT) projects itemized below points to the scope of potential applications for TICC™-Ppde in the near future, with in a period of ten years:

LT Projects (5 to 10 Years):
(i) incorporating self-diagnosis, self-repair and learning capabilities into SMS;
(ii) defining and analyzing relationships between ALLEOPs and FSPs (;
(iii) developing a theory of system decomposition;
(iv) developing TICC™-Ppde compatible principles of software/hardware engineering and training of programmers;
(v) using SMS for complex pattern recognition and learning based on dynamically recognized event patterns in a causalnet;
(vi) using SMS to dynamically control behavior of an application based on recognized event patterns in a causalnet;
(vii) developing TICC™-based Knowledge Based system, TICC™-KB;
(viii) building secure massive efficient self-monitoring TICC™-based parallel applications in a variety of important areas, possibly using TICC™-KB, such as,
a) medical information systems, b) intelligence information systems, c) business information systems, d) natural language systems, e) complex simulations, f) robotics, g) multi-sensor reactive systems h) cyber physical systems, i) weather prediction systems, etc. (LT)

We have introduced here a system architecture that sets a basis for a new era of computing technology and computer science to emerge and evolve, whose long term consequences in the 21$^{st}$ century and beyond is currently unpredictable.

13. References for Chapter 2.
1. Abadi, Martin; Luca Cardelli. "*A Theory of Objects*", Springer-Verlag. ISBN 0-387-94775-2
2. Kay, Alan. "*The Early History of Smalltalk*", ©1993 ACM 0-89791-571-2/93/0004/0069 . . . .
3. Armstrong, Deborah J. (February 2006). "*The Quarks of Object-Oriented Development*", *Communications of the ACM* 49 (2): 123-128. ISBN 0001-0782.
4. Meyer, Bertrand (1997). *Object-Oriented Software Construction*. Prentice Hall. ISBN 0-13-629155-4.
5. Carl Hewitt, (1976) "*Viewing Control Structures as Patterns of Passing Messages*", A. I. Memo 410, M.I.T, Artificial Intelligence Laboratory, 545 Technology Square, 02139.

6. Gul Agha, (1986) "*ACTORS: A Model of Concurrent Computation in Distributed Systems*", The MIT Press Series in Artificial Intelligence, Dec. 17, 1986.
7. Milner, R., Parrow, J. and Walker D., *A calculus of mobile processes, Parts I and II*, Journal of Information and Computation, Vol. 100, pp 1-40 and pp 41-77, 1992.
8. Robin Milner (1993), "*Calculi* for Interaction", Cambridge University Tech. Report. 1995
9. Robin Milner [1989] "*Communication and Concurrency*", Prentice Hall, 1989
10. Hoare, C. A. R., [1978] "*Communicating Sequential Processes*," CACM, vol. 21, No. 8, (August 1987), pp 666-677.
11. INMOS Ltd., "*OCCAM programming manual*," Prentice Hall, ISBN 0-13-629295-8.
12. Hoare, C. A. R., "Communicating Sequential Processes," Prentice Hall, ISBN 0-13-153271-5.
13. Jeff Magee and Jeff Kramer, "*Concurrency, State Models & Java Programming*," John Wiley & Sons, Ltd., 2006, ISBN-13 978-0-470-09335-9.
14. Robin Milner, "*A Calculus for Communicating Systems*", Springer-Verlag, ISBN 0-387-10235-3, New York, Heidelberg, Berlin, 1980.
15. Hoare, C. A. R., "*An axiomatic basis for computer programming*,", CACM, Volume 12, Issue 10, October 1969, ISSN:0001-0782.
16. Zohar Manna, "*Is 'sometimes' better than 'always'?: intermittent assertions in proving program correctness*", CACM, Volume 21, Issue 2, February 1978, pp 159-172, 1978, ISSN:0001-0782.
17. Zohar Manna, "*Mathematical Theory of Computation*", ISBN: 0070399107, McGraw-Hill College, 1974.
18. Zohar Manna, "Lectures on the Logic of Computer Programming", (ISBN: 0898711649) SIAM.
19. Das, Souripriya, "*RESTCLK: A Communication Paradigm for Observation and Control of Object Interactions*," Ph.D. Dissertation, Department of Computer Science, Rutgers University, New Brunswick, N.J. 08903, January 1999. DCS-TR-450, http://www.cs.rutgers.edu/pub/technical-reports.
20. Alan M. Turing, "*On Computable Numbers, with an application to the Entscheidungsproblem*", Proc. London Math. Soc., ser, 2, vol. 42, (1936-37), pp 230-265, "A Correction", ibid, vol. 43 (1037), pp 544-546.
21. B. Gopinath, David Kurshan, "Composition of Systems of objects by interlocking coordination, projection and distribution," U.S. Pat. No. 5,640,546, Filed Feb. 17, 1995.
22. Charles E. Spurgeon, "*Ethernet, The Definitive Guide*," O'Reilly and Associates
23. Dijkstra, E. W., (1965) "*Solution to a problem of concurrent programming control*", CACM, 8, 9, (September), pp 569.
24. Dijkstra, E. W., (1968) "*Cooperating Sequential Processes*", in F. Genuys (ed.) "*Programming Languages*", 43-112 New York: Academic Press.
25. William Gropp, et al [1999] "*Using MPI, Portable Parallel Programming with Message-Passing Interface, second edition*", The MIT Press, ISBN 0-262-57134-X. Also see http://www-unix.mcs.anl.gov/mpi/
26. G. E. Karniadakis and R. M Kirby II, "Parallel Scientific Computing in C++ and MPI: A Seamless Approach to Parallel Algorithms and Their Implementation," Cambridge University Press, 2003.
27. A. Geist, et al, "PVM: Parallel Virtual Machine, A Users' Guide and Tutorial for Networked Parallel Computing", MIT Press, 1994.
28. Myrinet, Myricom home page, arrens@cs.ucdavis.edu, International Journal of Parallel Programming, http://www.myri.com, http://www.myri.com/Myri-10G/documentation/Myri-10G_PHYs.pdf
29. Gary Tyson and Mathew Farrens, "*Code Scheduling for Multiple Instruction Stream Architectures*," Computer Science Department, University of California, Davis, Davis, Calif. 95616 tel: (916) 752-678, fax: (916) 752-4767, email: tyson@cs.ucdavis.edu.
30. Barbara Bluestein Simmons and Vivek Sarkar, "System, method, and program product for instruction scheduling in the presence of hardware look-ahead accomplished by the rescheduling of idle slots," patent issued Mar. 23, 1999, filed Jun. 18, 1996, U.S. Pat. No. 555,719.
31. Gary T. Corcoran and Robert C. Fairfield, "*Apparatus for controlling instruction execution in pipelined processor*," US patent issued Jul. 5, 1994, Filed on May 18, 1993, U.S. Pat. No. 4,873,630.
32. Donald L. Sollers, "*Cache memory based instruction execution*," Issued May 23, 2000, Filed on Mar. 11, 1997, U.S. Pat. No. 963,389.
33. Edward A. Lee "*Cyber-Physical Systems—Are Computing Foundations Adequate?*," Position Paper for NSF Workshop on Cyber-Physical Systems: Research Motivation, Techniques and Roadmap, Austin, Tex., Oct. 16-17, 2006.
34. Edward A. Lee, "*The Problem Threads*," in IEEE Computer, 39(5):33-42, May 2006 as well as an *EECS Technical Report, UCB/EECS*-2006-1, January 2006
35. Edward A. Lee and Yang Zhao, "*Reinventing Computing for Real Time*" in *Proceedings of the Monterey Workshop* 2006, LNCS 4322, pp. 1-25, 2007, F. Kordon and J. Sztipanovits (Eds.) © Springer-Verlag Berlin Heidelberg 2007. The 2006 *Technical Report* that preceded this publication
36. Yang Zhao, Jie Liu and Edward A. Lee, "*A Programming Model for Time-Synchronized Distributed Real-Time Systems*", in *Proceedings of the 13th IEEE Real-Time and Embedded Technology and Applications Symposium (RTAS 07)*, Bellevue, Wash., United States, Apr. 3-6, 2007.
37. William D. Clinger, "*Foundations of Actor Semantics*", MIT Artificial Intelligence Laboratory, Technical Report 633, Ph.D. Dissertation. May 1981.
38. Clark, E. M., "*Automatic Verification of Sequential Circuit Designs*": DBLP:conf/chdl/Clarke93, CHDL, 1993 IFIP conference proceedings, page 165.
39. Clark, E. M., Emerson, E. A., and Sistla, A. P., "*Automatic Verification of Finite State Concurrent Systems Using Temporal Logic Specifications*", ACM Transactions on Programming Languages and Systems, 8, 2 (April), 626-643 (1986).
40. Clark, E. M. and Wing, J. M., et al, "*Formal Methods, State of the Art and Future Directions*", ACM Computing Surveys, 28, 4, 607-625 (1996)
41. E. Allen Emerson, "*Model Checking, Theory into Practice*", DBLP:conf/fsttcs/Emerson00, Proceedings, pp: 1-10, 2000.
42. Joseph Sifakis, "*On the composition of timed systems*", DBLP:conf/apn/Sifakis97, [ICATPN], pp: 21-22, 1997.
43. Plotkin, G. D., "*A Powerdomain Construction*", SIAM Journal of Computing, 5, 3, Sep. 1976. Pages 452-487.
44. R. Milner, "*An Approach to the semantics of parallel programs*," Proceedings of the Convegno di Informatica Teorica, Instituto di Elaborazione delle Informazione, Pisa, 1973.
45. R. Milner, "*Processes: A Mathematical Model of computing agents*," Logic Colloquium, '73 North Holland, Amsterdam, 1973.
46. P. Schaumont, S. Shukla, I. Verbauwhede, "Design with Race-free Hardware Semantics", 2006 Design Automation and Test in Europe Conference (DATE06).[PDF]. See also http://www.ee.ucla.edu/~schaum/gezel
47. Francis Crick, "*The Astonishing Hypothesis*," Charles Scribner's Sons, New York, ISBN 0-684-19431-7, 1994.

48. Srinivasan, Chitoor V. "*TICC-Paradigm to Build Formally Verified Parallel Software for Multi-core Chips*", Utility patent application, May 5, 2009, U.S. Ser. No. 12/435,426. PCT international application, May 14, 2009, PCT/US09/43880.
49. Clark, E.M, Yuan Lu, Grumberg, 0, Veith, H., Jha, S., "*Counter example guided abstraction refinement for symbolic model checking*," Journal of the ACM, Vol. 50, No. 5, September 2003, pp. 752-794.

APPENDIX I

OG-Solution: TIPS, ALLEOPs and Traces

Environment Cell:

$$E.i:TIP(\ ) = [(i:mR?(\ )\& g:pR?(\ ))\{g:s(\ );/*\text{Starts all cells}*/\ i:s(\ );/*\text{acknowledges to user}*/\}] \quad (I.1)$$

Entrance Turnstile Sensors:

$$Se[j:0...1].f:TIP(\ ) = \\ (Se[j].f:personAtGate?(\ ) \& Se[j]f:mR*?(\ ))\{ \\ Se[j].g:s(\ );//\text{signals } Et[j].f_r \\ Se[j].g:pR?(\ )*\{Se[j].g.personAtGate=false;\}\} \quad (I.2)$$

When a person approaches a gate (turnstile) the sensor at the gate sets Se.g.personAtGate=true. After letting a person into the park or after denying entry to the person because the park is full, the person leaves the gate. At that point, the functionPort, $Et[j].f_r$, of the entrance turnstile sends back reply to Se.g. When sensor receives this reply it resets Se.g. personAtGate to false. It will become true again when the next person gets to the gate. Thus, a second person may enter only after the first person has left the gate.

Entrance Turnstiles:

$Et[j:0...1].f_r:TIP(\ ) =$
/*On sensing the signal at $Et[j].f_r$, $Et[j]$ signals the counter C via pathway, $Et[j].g \leftrightarrow C.f[j]$. After doing this, waits for response from C by performing the non-deterministic polling below.*/.
$[Et[j]:personEntering?(\ ) \{// \text{ receives signal from } Se[j].g, \text{ see (I.4)}$
  $Et[j].g:s(\ );$ //signals $C.f[j]$ to get entry permission.
  //Waits for response.
  $(\exists p)(p = (Et[j].g \mid Et[j].f))p:mR?(\ ))*\{$
    selectOne$\{ (p=Et[j].g)?(\ )\{Et[j].g:letPersonIn(\ );\}$
      $(p=Et[j].f)?(\ )\{Et[j].f:denyEntry(\ ).s(\ );\}\}$
    /*when $Et[j].g$ becomes ready to send signal sends reply signal to $Se[j].g$.*/
    $Et[j].g:pR?(\ )*\{ Et[j].f_r:s(\ );\}\}$ (I.3)

Definitions:

$$Et[j]:personEntering?(\ ) \Leftrightarrow Et[j].f_r.input = s \\ \Leftrightarrow Et[j].f_r:mR?(Et[j].f_r^D)[T(Se.g,1)]) \quad (I.4)$$

This predicate is being used for discourse convenience. It is true only if a signal has been delivered to $Et[j].f_r$ by $Se[j].g$ and $Et[j]$ has sensed that signal. When $Et[j].f_r$ replies to $Se[j].g$, after responding to the person at the gate, $Et[j]:personEntering?(\ )$ automatically becomes false, since $Et[j].f_r.input = s$ will no longer be true.

$$\{ Et[j].g:mR?(\ )*\}[\bullet \rightarrow Et[j].g:letPersonIn(\ )] \\ \{Et[j]:personInPark?(\ )\} \quad (I.5)$$

$$\{Et[j].f:mR?(\ )*\}[\bullet \rightarrow Et[j].f:denyEntry(\ )] \\ \{\neg Et[j]:personInPark?(\ )\} \quad (I.6)$$

Exit Turnstiles Sensors:

$$Sx[j:0...1].f:TIP(\ ) = \\ Sx[j].f:personAtGate?(\ )\{ \\ Sx[j].g:s(\ );//\text{signals}Xt[j].f_r \\ Sx[j].g:pR?(\ )*(Sx[j].g.personAtGate=false;\}\} \quad (I.7)$$

Exit Turnstiles:

$$Xt[j:0...1].f_r:TIP(\ ) = \\ (Xt[j]:personLeaving?(\ )\{ Xt[j].g:s(\ );\}//\text{signals } Xt[j].f_r \\ Xt[j].f_r:mR?(\ ))\{ \\ Xt[j].g:s(\ );/*\text{signals counter}*/. \\ Xt[j].g:mR(\ )*\{letpersonLeave(\ );\} \\ Xt[j].f_r:s(\ );\} \quad (I.8)$$

Definitions:

$$(Xt[j].f_r:mR?(\ )\}[\bullet \rightarrow Xt[j].g:letPersonLeave(\ )] \\ \{\neg Xt[j].g:personInPark?(\ )\} \quad (I.9)$$

$$Xt[j]:personLeaving?(\ ) \Leftrightarrow Xt[j].f_r.input = s \\ \Leftrightarrow Xt[j].f_r:mR?(Xt[j].f_r^D)[T(Sx.g,1)]) \quad (I.10)$$

counter: When cell C starts operations, counter is initialized to zero and max is set to a value > 0. C increments the counter on sensing signals at ports C.f[j:0...1], if there is room in the park, i.e., counter.count < max, and responds to Et[j].g via C.f[j]$\leftrightarrow$Et[j].g giving permission to enter, else C sends response via C.g[j]$\leftrightarrow$Et[j].f to deny entry, then waits for response and then acknowledges signal received through C.f[j].

$C.f[j:0...1]:TIP(\ ) =$
  $C.f[j]:mR?(\ )\{$ //senses notice from Et[j].g that a person is trying to enter.
  /*increments counter if counter.count < max)?( ) is true, then permits entry by sending back a signal to Et[j].g; this also acknowledges the signal received above from Et[j].g.*/
  (counter.count < max)?( )\{ counter++; C.f[j]:s\}

/*else, denies entry by sending signal to Et[j].f from its port C.g[j]. Does not yet acknowledge signal received from Et[j].g.*/
       else true{ C.g[j]:s( );
/*on receipt of acknowledgement from Et[j].f sends back acknowledgement for signal received earlier from Et[j].g */
  C.g[j]:mR?( )*{ C.f[j]:s( );}}             (I.11)

Decrements counter on sensing signals at ports C.f[j:2...3], and responds to Xt[j].g allowing the person at the gate to leave.
  C.f[j:2...3]:TIP( ) = C.f[j]:mR?( ){
     counter--; C.f[j]:s( );}             (I.12)

Sends out counter.count to the display unit on sensing signal at C.f[4].
  C.f[4]:TIP( ) =
   C.f[4]:mR?( ){C.f[4]:make(C.f[4].rd:msg( ).count=counter.count);
    C.f[4]:f( );}             (I.13)

Definitions:

{counter.count < max)?( )}[•→ counter++]
    {counter.count ≦ max)?( )}         (I.14)
{counter.count ≦ max)?( )}[•→ counter--]
    {counter.count < max)?( )}         (I.15)

Display Unit: On sensing signal at its InterruptPort forwards request for count to counter. Displays the count when it is received.
  D.i:TIP( )=
   D.i:mR?( ){ D.i:s( ); D.g:f( );
    D.g:mR?( )*{ D.g:displayCount( ).s( );}}        (I.16)

Definitions:

{D.g:mR?( )* & (∃integer c)(D.g:rd.msg( ).count=c)}
  [•→ D.g:displayCounT( )]{D.g:rd:msg( ).count=c}      (I.17)

POLLING CYCLES: Ignoring interruptPorts, except for the display unit.
E:Polling( ):[E.i:mR?( ) → E:Polling( )]          (I.18)
Se[j]:Polling( ): [Se[j].f:personAtGate?( ) → Se[j]:Polling( )]     (I.19)
Sx[j]:Polling( ): [Sx[j].f:personAtGate?( ) → Sx[j]:Polling( )]     (I.20)
Et[j:0...1]:Polling( ): [Et[j].$f_r$:mR?( ) → Et[j]:Polling( )]     (I.21)
Xt[k:0...1]:Polling( ): [Xt[k].$f_r$:mR?( ) → Xt[k]:Polling( )]     (I.22)
C:Polling( ): [C.f[0]:mR?( ) → C.f[1]:mR?( )→ C.f[2]:mR?( ) →
   C.f[3]:mR?( ) → C.f[4]:mR?( ) → C:Polling]     (I.23)
D:Polling( ): [D.i:mR?( ) → D:Polling( )]          (I.24)

It is not necessary to define the CIPs for the cells, since they should be obvious. From the above definitions, the system computes the following ALLEOPs and Traces.
ALLEOPS:
Et[j:0...1]:ALLEOP( ):

Et[j:0...1]:ALLEOP( ) =
  [Et[j].$f_r$:ALLEOP( ) •→ Et[j]:ALLEOP( )]        (I.25)
Et[j:0...1].$f_r$:ALLEOP( ) =
[Et[j]:personEntering?( ){
  Et[j].$g^S$[T(Et[j].g,0)]> →
  (⟨C.f[j]$^D$⟩[T(Et[j].g,1)] ||→...→ C.f[j]:ALLEOP(...)) •→
  //puts here the alternates from the non-deterministic polling
  (Et[j].g:mR?(⟨Et[j].$g^D$⟩[T(C.f[j],1)])*{
   Et[j].g:letPersonIn( )} |
  Et[j].f):mR?(⟨Et[j].$f^D$⟩[T(C.g[j],1)])*{
   Et[j].f:DenyEntry( ) •→
   //acknowledges receipt of signal at Et[j].f
   Et[j].$f^S$[T(Et[j].f,0)] →
   (⟨C.g[j]$^D$⟩[T(Et[j].f,1)]
   ||[C.g[j]:mR?(⟨C.g[j]$^D$⟩[T(Et[j].f,1)])* •→...•→)})}
 •→ Et[j].g:mR?(⟨Et[j].$g^D$⟩[T(C.f[j],3)])*{
  Et[j].$f_t^S$[T(Et[j].$f_r$,0)]
  (→ ⟨Se[j].$g^D$⟩[T(Et[j].$f_r$,1)]]
  ||[Se[j].g:pR?(⟨Se[j].$g^D$⟩[T(Et[j].$f_r$,1)])•→...•→])}]   (I.26)

Xt[j:0...1]:ALLEOP( ):.

Xt[j]:ALLEOP( ) = [Xt[j].$f_r$:ALLEOP( ) •→ Xt[j]:ALLEOP( )]   (I.27)
Xt[j].$f_r$:ALLEOP( ) =
[Xt[j]:personLeaving?( ){
 Xt.$g^S$[T(Xt[j].g,0)] → /*delivers signal to C.f[j+2]*/
 (⟨C.f[j+2]$^D$⟩[T(Xt[j].g,1)] ||→...→ C.f[j+2]:ALLEOP( ))}
 //on sensing received signal, after count has been decremented.
 Xt[j].g:mR(⟨Xt[j].$g^D$⟩[T(C.f[j+2],1)])*{
    Xt[j].g:letPersonLeave( )}
 Xt[j].$f_t^S$[T(Xt[j].$f_r$,0)]]
 → (⟨Sx[j].$g^D$⟩[T(Xt[j].$f_r$,1)]]
  || Sx[j].g:mR?( )*{ •→...•→})         (I.28)

C ALLEOP( ): Counter ALLEOPs
C:ALLEOP( ) =
 [C.f[0]:ALLEOP( ) •→ C.f[1]:ALLEOP( ) •→ C.f[2]:ALLEOP( )
 •→ C.f[3]:ALLEOP( ) •→ C.f[4]:ALLEOP( )
 •→ C:ALLEOP( )]             (I.29)

```
C.f[j:0...1]:ALLEOP( ) =
  [C.f[j]:mR?(⟨C.f[j]^D⟩[T(Et[j].g,1)]){
    ((counter.count < max){ counter++ •→ C.f[j]^S[T(C.f[j],0)]
      → (Et[j].g^D)[T(C.f[j],1)] //Et[j].g senses signal immediately
        ||Et[j].g:mR?(⟨Et[j].g^D⟩[T(C.f[j],1)])*{•→...•→}•→...•→ )} |
    ¬(counter.count < max){ counter-- •→
      C.g[j]^S[T(C.g[j],0)]
        → (Et[j].f^D)[T(C.g[j],1)] //Et[j].f senses signal immediately
        || Et[j].f:mR?(⟨Et[j].f^D⟩[T(C.g[j],1)])*{•→...•→} •→...•→ )
    •→ C.g[j]:mR?( )*{//waits for response from Et[j].f.
    //sends back acknowledgement to Et[j].g for signal received at C.f[j]
      C.f[j]^S[T(C.f[j],2)] → (Et[j].g^D)[T(C.f[j],3)]
      //Et[j].g senses acknowledgement immediately.
      ||Et[j].g:mR?(⟨Et[j].g^D⟩[T(C.f[j],3)])*{•→...•→})}}]         (I.30)
C.f[j:2...3]:ALLEOP( ) =
  [//senses person leaving signal from Xt[j-2].g.
    C.f[j]:mR?(⟨C.f[j]^D⟩[T(Xt[j-2].g,1)]){ counter--
      •→ C.f[j]^S[T(C.f[j],0)] //responds to Xt[j-2].g
      → (⟨Xt[j-2].g^D⟩[T(C.f[j],1)]
      //Xt [j-2] waits for response from C.f[j] and takes appropriate action.
      ||Xt[j-2].g:mR?(⟨Xt[j-2].g^D⟩[T(C.f[j],1)])*{•→...•→})]         (I.31)
C.f[4]:ALLEOP( ) =
  [C.f[4]:mR?(⟨C.f[4]^D⟩[T(D.g,1)]){
    •→ C.f[4].rd:make(f[4]:msg( ).count = counter.count)
    •→ C.f[4]^F[T(C.f[4],0)]//forwards message
    → (⟨D.g^D⟩[T(C.f[4],1)]
    //D waits for response from C.f[4] and takes appropriate action.
    || D.g:mR?(⟨D.g^D⟩[T(C.f[4],1)])*{•→...•→})}]                    (I.32)
D:ALLEOP( ): Display Unit ALLEOPs. U here is the external user who requests the count.
D:ALLEOP( ) = [D.i:ALLEOP( ) •→ D:ALLEOP( )]                         (I.33)
D.i:ALLEOP( ) =
  [D.i:mR?(( D.i^D)[T(U.g,1)])*{
    D.i^S[T(D.i,0)] → U.g^D[T(D.i,1)]//acknowledges user's signal
    •→ D.g^F[T(D.g,0)] //requests count
    → (⟨C.f[4]^D⟩[T(D.g,1)] || →...→ C.f[4]:ALLEOP( ))
    //displays count on receipt of response.
    •→ D.g:mR?(⟨D.g^D⟩[T(C.f[4],1)])*{D.g:displayCounT( )}           (I.34)
Notice, in (I.35) no reply is needed for message received through D.g. The combined
ALLEOP for the OG-Solution is:
  O-Garden:ALLEOP( ) =
    □(Et[0]:ALLEOP( ) || Et[1]:ALLEOP( ) || D:ALLEOP( )||
      Xt[0]:ALLEOP( )|| Xt[1]:ALLEOP( ) || C:ALLEOP( ))]             (I.35)
```

TRACES: The traces are presented in the ECT-Blocks in Tables 5.1 through 5.3 and Table 6.1 and 6.2. The corresponding ECT-networks are presented in Tables 5 and 6. See discussion in Section 7.1.

APPENDIX II

PC-Solution: TIPs, CIPs, ALLEOPs and Traces

Here we describe the implementation by defining the CIPs for all cell classes in the implementation. It is more convenient to do so in this example. It shows a different style of defining an implementation.

Producer CIP & TIP:

After initialization, in each polling cycle, producer P[j] looks for a signal at its interruptPort, P[j].i. If there is a signal at P[j].i then P[j] terminates its operations. Otherwise proceeds to poll its port P[j].f, produces a new product every time it senses a signal at P[j].f and sends it off to port D.g[j] of the distributor, as defined in P[j]:tip( ) in (II.2).

```
void Producer::CIP( ){
  initialize?( ){i:s( ); stopPolling=initialize = false;}
  while (¬stopPolling){ i:mR?( ){stopPolling=true; i:s( );}
                        f:mR?( ){f:tip( );}}
  prepareToTerminate( );}                                            (II.1)
P[j].f:TIP( ) = [P[j].f:mR?( ){ P[j].product = P[j]:produceProduct( );
                 P[j].f.wr:msg( ).contents = P[j].product);
                 P[j].f:s( );}}]                                     (II.2)
```

-continued

Definition:

$\exists (t_0 < t_1) \{ \langle P[j].f:mR?(\,) \rangle (t_0) \}$
    $[\bullet \rightarrow P[j].product = P[j]:produceProduct(\,)(t_0)]$
    $\{ \exists (Product\ p)(P[j].product = p)(t_1) \}$                      (II.3)

Consumer CIP & TIP:

```
void Consumer::CIP( ){
```
/*During initialization each consumer, C[j] for $0 \leq j < m$, writes an empty package into the readMemory of its port C[j].g and sends it off to the distributor port D.f[j] in order to request a new product. Notice, the package in its readMemory is received in the writeMemory of D.f[j]. In its while-loop C[j] terminates itself on receipt of a message at its interruptPort, C[j].i. Else, receives a new product through C[j].g and when the product is used up, sends off the empty package in its readMemory to the distributor port D.f[j] in order to request another new product. Distributor D receives the empty package in the writeMemory of its port D.f[j]. On receipt of this empty package, D searches for a new product, puts it into the package in the writeMemory of D.f[j] and sends it off to C[j].g. The package is repeatedly used by the consumer to request and receive products.*/ initialize?( ){i:pR?( ){i:s( )}; stopPolling=initialize=false;
                          g.rd:make(package, contents= $\phi$); g:s( );}
    while ($\neg$stopPolling){ i:mR?( ){stopPolling = true; i:s( );}
                      g:mR?( ){g:tip( );}}
    prepareToTerminate( );}                                           (II.4)
C[j].g:TIP( ) = [C[j].g:mR?( ){C[j]:pickUp( );
            /*Sends out a request for a new product only if stopPolling is false.*/
            ($\neg$stopPolling?( ) &
            C[j]:usedUp?( )*){C[j].g:s( );}}]                       (II.5)

Definitions:

$[\exists (t_0 < t_1) \exists (Product\ p)$
    $\{ \langle C[j].g:msg(\,).contents = p \rangle (t_0) \} [\bullet \rightarrow C[j]:pickUp(\,)(t_0)]$
    $\{ \langle C[j].hasProduct = p\ \&$
        $C[j].g:msg(\,).contents = \phi \rangle t_1) \}]$                            (II.6)

C[j].hasProduct is an attribute defined in the Consumer class. C[j]:usedUp?( ) in (II.5) has to be defined in the Consumer class by the designer, in a suitable manner.

Distributor CIP & TIP:

```
void Distributor::CIP( ){//n is the number of producers.
```
    initialize?( ){i:pR?( ){i:s( );}//acknowledges activation
            stopPolling=initialize=false; //initializes itself
            g:s( );//activates all producers and consumers; see network in Figure 12.
/*Writes an empty package in the readMemory of each one of its ports D.g[j] for $0 \leq j < n$ and sends it off to the functionPort, P[j].f, of producer P[j] to place an order for a new product. P[j] receives this empty package in the writeMemory of P[j].f. On receipt of this order, P[j] produces a new product, puts it into the package in the writeMemory of P[j].f and sends it off to D.g[j]. */
            for (int j=0; j < n; j++;){
                g[j].rd:make(package, contents=$\phi$); g[j]:s( );}}
    while($\neg$stopPolling){
/*On receipt of an interrupt signal, sends termination signal to all consumers and sets stopPolling to true.*/
    i:mR?( ){ stopPolling = true; g:s( ); i:s( );}
    consumerServiced = false; D.sortedPortsList:clear( );
    D.sortedPortsList:clear( );
/*Consumers are serviced in the order requests are received from them.*/
        for (int j = 0; j < m; j++){
            f[j]:mR?( ){D:sortInto(D.f[j],D.sortedPortsList);}
        for (int i = 0; i < D.sortedPortsList:size( ); i++){
            D.sortedPortsList[i]:tip( ); consumerServiced = true;}
/*If an interrupt signal was received then i:mR?( ) will still be true. In this case, if consumerServiced is
false, i.e. no consumer was serviced in the current polling cycle, then terminates itself after receiving response from all consumers and producers indicating that they have terminated. If there was a consumer that was serviced then repeats the polling cycle, until there are no more consumers to be serviced.*/
        (stopPolling?( ) & $\neg$consumerServiced?( )){
            g:pR?( )*{prepareToTerminate( )}}}}                     (II.7)
D.f[j:0...m-1]:TIP( ) = [D.f[j]:mR?( ){
        ($\exists k(0 \leq k < n)D.g[k]:mR?(\,))*\{$
            D.g[k]:moveProduct(D.f[j]);
            D.g[k]:s( );D.f[j]:s( );}}]                                     (II.8)

Definitions:

$\{\exists (x)(x = D.g[k]:msg(\,).contents(t_0)\}$
        $[\bullet \rightarrow D.g[k]:moveProduct(D.f[j])(t_0)]$
    $\{D.f[j]:msg(\,).contents = x\ \&$
        $D.g[k]:msg(\,).contents = \phi(t_1)\}$                             (II.9)

ALLEOPs: In the ALLEOPs below, for simplicity, we ignore all interruptPort polling, interrupt message processing and termination processes.

-continued

Consumer C[j:0...(m−1)] ALLEOP:

$C[j:0..m-1]$:ALLEOP( ) =
    [C[j]:INIT-ALLEOP( ) •→ C[j]:BODY-ALLEOP( )]  (II.10)
C[j]:INIT-ALLEOP( ) =
    [C[j]:initialize?( ){
        stopPolling = false •→ initialize = false
        •→ C[j].g.wr:make(package, contents = φ);
        •→ $C[j].g^S[T(C[j].g,0)]$//sends out a request for a product.
        → $(D.f[j]^D[T(C[j].g,1)]$ || D:BODY-ALLEOP( ))}]  (II.11)
C[j]:BODY-ALLEOP( ) = [¬C[j]:stopPolling?( ){C[j].g:ALLEOP( )
        •→ C[j]:BODY-ALLEOP( )}]  (II.12)
C[j].g:ALLEOP( ) =
    [C[j].g:mR?($(C[j].g^D)[T(D.f[j],1)]$){
        g:pickup( ) •→ C[j]:usedUp?( )*{$g^S[T(C[j].g,2)]$
        → $(\langle D.f[j]^D\rangle[T(C[j].g,3)]$ ||D:BODY-ALLEOP( ))}}]  (II.13)

Producer P[j:0...(n−1)] ALLEOP:

P[j]:ALLEOP(...) = [P[j]:INIT-ALLEOP( ) •→ P[j]:BODY-ALLEOP( )]  (II.14)
P[j]:INIT-ALLEOP( ) =
    [P[j]:initialize?( ){
        stopPolling=false •→ initialize=false}]  (II.15)
P[j]:BODY-ALLEOP( ) =
    [¬P[j].stopPolling?( ){P[j].f:ALLEOP( )
        •→ P[j]:BODY-ALLEOP( )}]  (II.16)
P[j].f:ALLEOP( ) =
    P[j].f:mR?($(P[j].f^D)[T(D.g[j],1)]$ | $(P[j].f^D)[(T(D.g[j],3)])${
        •→ P[j].product = produceProduct( )
        •→ P[j].wr:msg( ).contents = P[j].product)
        •→ $P[j].f^S[T(P[j].f,0)]$
        → $(\langle D.g[j]^D\rangle[T(P[j].f,1)]$ ||D:BODY-ALLEOP(...))}]  (II.17)

Distributor ALLEOP:

D:ALLEOP(...) = [D:INIT-ALLEOP( ) •→ D:BODY-ALLEOP( )]  (II.18)
D:INIT-ALLEOP( ) =
    [initialize?( ){stopPolling = false •→ initialize = false
//Places orders with producers for new products. InterruptPort messaging has been ignored.
        ∀(j)(0≤j<n){ •→ D.g[j].rd:make(package, contents = φ)
        •→ $D.g[j]^S[T(D.g[j],0)]$
        →$(\langle P[j].f^D\rangle[T(D.g[j],1)]$||P[j]:BODY-ALLEOP( ))}}]  (II.19)
D:BODY-ALLEOP( ) =
    [¬D:stopPolling{∀(j)(0≤j<m)
        {D.f[j]:mR?($(D.f[j]^D)[(T(C[j].g,1)$ | $(T(C[j].g,3)])${
        •→ D:sortInto(D.f[j], D.sortedPortsList)}
        •→ (for (j=0; j < sortedPortsList:size( ); j++){
            sortedPortsList[j]:tip-ALLEOP( )}
        •→ D:BODY-ALLEOP( )}]  (II.20)
D.f[j]:ALLEOP( ) =
    [D.f[j]:mR?($(D.f[j]^D)[(T(C[j].g,1)$ | $(T(C[j].g,3)])${
        D.f[j]:tip-ALLEOP( )}]  (II.21)
D.f[j]:tip-ALLEOP( ) =
    [(∃k(0≤k<n)D.g[k]:mR?($(D.g[k]^D)[T(P[k].f,1)])$)*{
        •→ D.g[k]:moveProduct(D.f[j])
        •→ $D.g[k]^S[T(D.g[k],2)]$
        → $(\langle P[k].f^D\rangle[T(D.g[k],3)]$ || P[k]:BODY-ALLEOP( ))
        •→ $D.f[j]^S[T(D.f[j],0)]$
        → $(\langle C[j].g^D\rangle(T(D.f[j],1)]$ || C[j]:BODY-ALLEOP( ))}}]  (II.22)
PC-Solution:ALLEOP( ) =
    ☐∃[<partial-ordering-of-timing-functions>]
    ∀(j)(0≤j<m)∀(k)(0≤k<n)
        (|| C[j]:ALLEOP( )|| P[k]:ALLEOP( )|| D:ALLEOP( ))]  (II.23)

Traces: Traces are presented in the ECT-Blocks in FIG. 7.1 through 7.3 and the ECT-network is presented in Table 7.

APPENDIX III

DP-SOLUTION: CIPs, TIPs, ALLEOPs and Traces

Btlr CIPs and Tips: Btlr stands for Butler. Here also we will ignore interruptPort polling, interrupt message processing and start/stop processes.

void Btlr::CIP( ){INIT( ); BODY( )}  (III.1)
void Btlr::INIT( ){
    initialize?( ){stUpTbl( );
        stopPolling=stopPending=initialize=false;

-continued

```
        g:s( );//broadcasts signal to all philosophers in order to activate them.}
      i:s( );//acknowledges receipt of interrupt signal that activated it.}                                (III.2)
void Btlr::BODY( ){
    while(¬stopPolling){
/*Polls its functionPorts btlr.f[j]and responds to messages as specified in btlr.f[j]:TIP( )*/
      for (int j = 0; j < 5; j++;){btlr.f[j]:TIP( );}
/*terminates on receipt of interrupt signal from its environment at its interruptPort, btlr.i.
Termination occurs only after serving all philosophers who are waiting for forks and after all
philosophers have also terminated, as specified in btlr.i:TIP( ),described later below.*/
      btlr.i:mR?( ){btlr.i:TIP( );}
      prepareToTerminate( );}                                                                              (III.3)
Btlr.f[j:0...4]:TIP( ) =
  [//listens to message from P[j].g and responds, if there is a message.
    btlr.f[j]:mR?( ){ btlr:response(j); //this is a pthread defined in Btlr class.
/*btlr.f[j].send is set in btlr:response(j) pthread. If btlr.f[j].send = true then sends
message if true, forwards message if false and does not respond if btlr.f[j].send = φ.*/
    btlr.f[j]:send?( ){f[j]:s( );} else {f[j]:f( );}]                                                      (III.4)
Definition of btlr:response(j).
```

```
void Btlr::response(int j) {//this pthread is executed only if btlr.f[j]:mR?( ) is true.
    {selectOne{
/*If the readMemory at btlr.f[j] is empty, then it means philosopher P[j] is requesting forks. If
forks are available, then packs forks into the container in the writeMemory of btlr.f[j] and sets
btlr.f[j].send= true. This causes the message in the writeMemory of btlr.f[j] to be sent out as
defined in the body of btlr.f[j]:TIP( ) in (III.3). If forks are not available then sets
btlr.frk[j]:rsrvd=true and btlr.f[j].send = φ. In this case, no response is sent. In this case
P[j]will wait for forks. Forks will be sent when they eventually become available in an ensuing
polling cycle. Since no response is sent btlr.f[j]:mR?( ) will evaluate to true in all ensuing polling
cycles, until forks are sent.*/
    btlr.f[j].rd:empty?( ){btlr:frksAvlbl?(j){btlr:packFrks(j);
                                     btlr.f[j].send =true;}
                           else {btlr.frk[j].rsrvd = true;
                                    btlr.f[j].send = φ;}
/*in the following, the readMemory of btlr.f[j] is not empty. It will contain forks returned by P[j].
Btlr puts the forks back on table, and sets btlr.f[j].send = false. This causes reply to be forwarded
back to P[j].g by btlr.f[j]:tip( ) with an empty container in the readMemory.*/
    ¬btlr.f[j].rd:empty?( ){btlr:putFrksOnTbl(j);
                  btlr.f[j].send=false;}}                                                                  (III.5)
btlr.i:TIP( ) =
[/*The following is executed only if there is an interrupt message at btlr.i. If
btlr.pendingStop=false, then broadcasts signal to all philosophers through btlr.g. This asks the
philosophers to end the game. Does not respond to interrupt signal at btlr.i in this case, but instead
sets btlr.pendingStop = true, indicating that there is a pending stop for the game, and proceeds
immediately to service the functionPorts, btlr.f[j]. Since no response has been sent, btlr.i:mR?( )
evaluates to true in the next polling cycle of btlr, and at that point btlr.pendingStop will be true. This
causes the else-clause below to be executed. In this else-cause btlr waits to receive response from
all philosophers, indicating that they have terminated. When this response is received, btlr sets
stopPolling = true and sends back acknowledgement to the interrupt signal received through btlr.i.
The game stops in the ensuing polling cycle. */
    btlr.i:mR?( ){selectOne{
    ¬btlr.pendingStop { btlr.g:s( ); btlr.pendingStop =true;}
    ¬btlr:allFrksOnTbl?( ){ btlr.pendingStop = false;
             btlr.g:mR?( )*{stopPolling=true;
                  i:s( );}}}}]                                                                             (III.6)
```

Notice, btlr services all philosophers with pending service requests in the polling cycle in which the interrupt signal was sensed. Terminates the game only after all forks are on the table and after receiving acknowledgement from all philosophers that they have terminated.

The loop-invariant for the while-loop in btlr:BODY( ) is $\Box$ ($\neg \forall(j)W(j)$), where W[j] means philosopher P[j] is waiting for forks. $\forall(j)W(j)$ is the deadlock state. This state is never reached during the game. The proof for this is given in Section 7.4. All actions and conditions characterized below are defined in the Btlr class. Implementations are not shown here for all actions. Their characterizations are given below.

DEFINITIONS: Characterization of Btlr actions and conditions.

$\Box[btlr.frk[j]:rsrvd?(\ )] \Leftrightarrow btlr.frk[j].rsrvd=true]$ (III.7)

$\Box[btlr:frksAvlbl?(j)] \Leftrightarrow (btlr.frk[j].onTbl \ \& \ btlr.frk[j\oplus_5 1].onTbl \ \&$
$\qquad \neg btlr.frk[j\oplus_5 1].rsrvd)]$ (III.8)

$\exists(t_0 < t_1)[$//characterization of btlr:packFrks(j).
$\quad \{\langle btlr:frksAvlbl?(j)\rangle(t_0)\} \ [\bullet \to btlr:packFrks(j)(t_0)]$
$\quad \{\langle btlr.f[j].wr:msg(\ ).contains=[btlr.frk[j], btlr.frk[j\oplus_5 1]] \ \&$
$\qquad \neg btlr.frk[j].onTbl \ \& \ \neg btlr.frk[j\oplus_5 1].onTbl \ \&$
$\qquad \neg btlr.frk[j].rsrvd\rangle(t_1)\}$ (III.9)

-continued

```
//characterization of btlr::putFrksOnTbl(j).
{⟨btlr.f[j].rd:msg( ).contains = [btlr.frk[j], btlr.frk[j⊕₅1]]⟩(t₀)}
       [•→ btlr:putFrksOnTbl(j)(t₀)]
    {⟨btlr.frk[j].onTbl & btlr.frk[j⊕₅1].onTbl &
       ¬btlr.frk[j].rsrvd)(t₁)&
       btlr.f[j].rd:msg( ).contains=ϕ⟩(t₁)}                              (III.10)
//characterization of btlr:rplnshFd( ).
    {⟨btlr.foodContainer:empty?( )⟩(t₀)} [→ btlr:rplnshFd( )(t₀)]
       {(btlr.foodContainer:full?( )(t₁)}                                (III.11)
//characterization of btlr:stUpTbl( ).
    {true} [→ btlr:stUpTbl( )(t₀)]
       {⟨∀(j)(btlr:frksAvlbl(j))&foodContainer:full?( )⟩(t₁)}]           (III.12)
Philosopher CIP and TIPs:
```

```
void P::CIP( ){P:INIT( ); P:BODY( );}                                    (III.13)
void P::INIT( ){
/*The writeMemory of P[j].g remains empty. An empty instance of package is installed in its
readMemory.*/
initialize?( ){stopPolling = initialize = false; hasforks=ϕ;
       i:s( ); g.rd:make(package, contains=ϕ}}                           (III.14)
void P::BODY( ){
while (¬stopPolling){ //hunger begins when P stops thinking.
    P:thinking( ); P.g:TIP( );
    //receipt of interrupt stops the game, else goes back to thinking.
    P.i:mR?( ){P.i:s( ); stopPolling=true;}}
prepareToTerminate( );}                                                  (III.15)
P.g:TIP( ) = //Sends request for forks, when hunger begins and P.g is ready to send message.
    [P:hungry?( ){P.g:pR?( )*{P.g:s( );
/*After sending request for forks via its port P.g, waits for forks to arrive, picks them up when
they arrive, and begins to eat. After eating packs forks and forwards them back to btlr.*/
    P.g:mR?( )*{P.g:pickUpFrks( ); P:eating( );
           P.g:packFrks( ).f( );}}                                       (III.16)
DEFINITIONS: Philosopher P[j] Actions and Condition Characterizations, for 0≦j<5:
∃(t₀<t₁<t₁)[
    //characterization of P[j].g:pickUpForks( ).
    {⟨P[j].g:msg( ).contains=[frk[j],frk[j⊕₅1]]⟩(t₀)}
       [•→ P[j].g:pickUpForks( )(t₀)]
    {⟨P[j]:hasForks?( )⟩(t₁)}                                            (III.17)
//Definition of P[j]:hasForks?( )
[P[j]:hasForks?( )⇔
       (P[j].hasForks = [btlr.frk[j],btlr.frk[j⊕₅1]]) &
               P[j].g.rd:msg( ).contents = ϕ)]                           (III.18)
//characterization of P[j]:eating( )
{⟨P[j]:hasForks?( ) & P[j]:hungry?( )⟩(t₀)}[•→ P[j]:eating( )(t₀)]
    {⟨¬P[j]:hungry? & P[j]:hasForks?( )⟩(t₁)}                            (III.19)
//characterization of P[j]:packFrks( )
{⟨P[j]:hasForks?( )⟩(t₀)} [•→ P[j]:packFrks( )(t₀)]
    {⟨P[j].g:msg( ).contains=[frk[j],frk[j⊕₅1]] &
       ¬P[j]:hasForks?( )⟩(t₁)}                                          (III.20)
//characterization of P[j]:thinking( )
{⟨¬P[j]:hungry?( )⟩(t₀)}[•→ P[j]:thinking( )⟩(t₁)]
    {⟨P[j]:hungry?(t₁)}                                                  (III.21)
ALLEOPs:
Btlr ALLEOPs:
```

```
btlr:ALLEOP( ) =
    [btlr.init:ALLEOP( ) •→ btlr.body:ALLEOP( )]                         (III.22)
btlr.init:ALLEOP( ) = //E is the environment cell that starts the btlr.
    [initialize?( ){stUpTbl( )//sets up the table
           •→stopPolling=false
           •→stopPending=false •→ initialize=false
           •→ g^S[T(btlr.g,0)] //starts all philosophers.
           →(∀(j)(0≦j<5)(⟨P[j].i^D⟩[T(btlr.g,1)]
               || →...→ P[j].init:ALLEOP( ))
       •→ btlr.i^S[T(btlr.i,0)]
           → (⟨E.g^D⟩[T(btlr.i,1)]|| →...→ E.g:ALLEOP( ))}
    •→ btlr.body:ALLEOP( )]                                              (III.23)
In the following '|' separates alternates.
btlr.body:ALLEOP( ) =
    [(¬stopPolling?( ){∀(j)(0≦j<5)[btlr.f[j]:ALLEOP( )]
                   •→ btlr.i:ALLEOP( )]
                   •→ btlr.body:ALLEOP( )} |
       stopPolling?( ){prepareToTerminate( )}]                           (III.24)
btlr:f[j:0...4]:ALLEOP( ) =
/*skips to poll its next port if there is no signal, else does the following. This alternate is usually not
specified. It is assumed.*/
    ¬[btlr.f[j]:mR?( ){btlr.f[j⊕₅1]:ALLEOP( )}             |
/* message received at time t(P[j].f,1) is a request for forks. In this case, readMemory will be
empty. Message received at time T(P[j].f,3) contains forks returned by P[j] in the readMemory.
Btlr:response(j) processes these messages as described in the next ALLEOP and sets f[j]:send?( )
```

-continued to true, false or $\phi$*/
  btlr.f[j]:mR?($\flat$tlr.f[j]$^D$)[T(P[j].f,1)| t(P[j].f,3)]){
    •$\to$ btlr:responseALLEOP(j)
    •$\to$ (f[j]:send?( ){f[j]$^S$[T(btlr.f[j], 0)]
                          $\to$ ($\langle$P[j].g$^D\rangle$[T(btlr.f[j],1)]
                             || $\to$...$\to$ P[j].g:ALLEOP( ))} |
          $\neg$f[j]:send?( ){f[j]$^F$[T(btlr.f[j],0)]
                          $\to$ ($\langle$P[j].g$^D\rangle$[btlr.f[j],1)]
                             || $\to$...$\to$ P[j].g:ALLEOP( ))} |
          true{ }/*no message is sent in this case*/)}}
    •$\to$ btlr.f[j$\oplus_5$1]:ALLEOP( )/* proceeds to poll its next port*/.] (III.25)
btlr:responseALLEOP(j:0...4) =
/* If message from P[j].g is empty then P[j] is requesting forks. In this case, if forks are available
packs forks into container in writeMemory of btlr.f[j and sets btlr.f[j].send =true in order to
send it off to P[j].g. Else puts the left fork, btlr.frk[j], on reserve and sets btlr.f[j]send =$\phi$ in
order to not send any message back to P[j].g. It may be noted, in the next polling cycle of btlr,
btlr.f[j]:mR?( ) will still evaluate to true and the same response activities will be repeated again.
This cycle of activities continues until forks become available and are sent to P[j].g. If message
is not empty, then P[j].g is returning forks. In this case puts forks back on table and sets
btlr.f[j].send=false in order to forward the empty container in the readMemory back to P[j].g. */
  btlr.f[j].rd:empty?( ){
    (btlr:frksAvlbl?(j){btlr:packFrks(j)
                          •$\to$ btlr.f[j].send =true;} |
    $\neg$btlr:frksAvlbl?(j){btlr.frk[j].rsrvd = true
                          •$\to$ btlr.f[j].respond = $\phi$;})} |
    $\neg$btlr.f[j].rd:empty?( ){btlr:putFrksOnTbl(j)
                          •$\to$btlr.f[j].send=false;})))] (III.26)
btlr.i:ALLEOP( ) =
/*E is the environment cell that started the butler. E.g sends the interrupt signal to btlr.i. ALLEOP
for E.g is not shown here. On sensing the interrupt signal btlr does the following: if
btlr.pendingStop is false then it is now set to true and a signal is broadcast from port btlr.g, to
interruptPorts of all philosophers advising them that dinner is over.*/
  [btlr.i:mR?($\flat$tlr.i$^D$)T(E.g,3)]){
    ($\neg$btlr:pendingStop?( ){
      btlr.pendingStop=true
      •$\to$ g$^S$[T(btlr.g,2)]
        ($\forall$(j)((0$\leq$j<5)[$\hookrightarrow$ P[j].i$^D$)[T(btlr.g,3)]
                      || $\to$...$\to$ P[j].i:ALLEOP( ))]}   |
/* if btlr.pendingStop is true and all forks are on the table then waits for response from all the
philosophers. On receipt of the response acknowledges receipt of interrupt signal from E.g and
then prepares to terminate. Terminates in the ensuing polling cycle. btlr:allFrksOnTbl?( )
signifies that all philosophers have finished eating and returned the forks. */
    btlr: pendingStop?( ) & btlr:allFrksOnTbl?( )){
      btlr.g:mR( )*{•$\to$ i$^S$[T(btlr.i,2)]
        $\to$ ($\langle$E.g$^D\rangle$[T(btlr.i,3)] || $\to$...$\to$ E.g:ALLEOP( ))}
      •$\to$ btlr.stopPolling = true
      •$\to$ btlr.pendingStop = false})}] (III.27)

As we have already mentioned, btlr terminates operations only after all waiting philosophers have been serviced and all philosophers have stopped eating and returned the forks.

Philosopher ALLEOPs:

P[j:0...4]:ALLEOP( ) = [P[j].init:ALLEOP( ) •$\to$ P[j].body:ALLEOP( )] (III.28)
P[j:0...4].init:ALLEOP( ) =
  [P[j]:initialize?( ){P[j].stopPolling = false
    •$\to$ P[j].initialize = false
    •$\to$ P[j].hasForks = $\phi$
    •$\to$ P[j].i$^S$[T(P[j].i,0)]
      $\to$ (btlr.g$^D$[P[j].i,1)]
        || $\to$...$\to$ btlr.body:ALLEOP( ))}
    •$\to$ P[j].g.rd:make(package, contains=$\phi$)}
  •$\to$ P[j].body:ALLEOP( )] (III.29)
P[j:0...4].body:ALLEOP( ) =
  [($\neg$P[j]:stopPolling?( ){ P[j].g:ALLEOP( ) •$\to$ P[j].i:ALLEOP( )}
    •$\to$ P[j].body:ALLEOP( )} |
   P[j]:stopPolling?( ){prepareToTerminate( )})] (III.30)
P[j:0...4].g:ALLEOP( ) =
  [P[j]:thinking( ) •$\to$
    P[j]:hungry?( ){
      P[j].g:pR?( )*{
        P[j]:g$^S$[T(P[j].g,0)]
          $\to$ ($\langle$btlr.f[j]$^D\rangle$[T(P[j].g,1)]||$\to$...$\to$ btlr.f[j]:ALLEOP( ))
      •$\to$ P[j].g:mR?( )*{P[j].g:pickUpForks( ) •$\to$ P[j]:eating( )

-continued

| Philosopher ALLEOPs: |
|---|
| /*packs forks into the container in the readMemory of P[j].g and forwards it to btlr.f[j after eating.*/<br>•→ P[j].g:packFrks( )<br>•→ P[j].g$^F$[T(P[j].g,2)]<br>→ (•btlr.f[j]$^D$)[T(P[j].g,3)]<br>    ‖→...→ btlr.f[j]:ALLEOP( ))}}]    (III.31)<br>P[j].i:ALLEOP( ) =<br>/*Notice in (I.30), P[j] polls its interruptPort only after he/she has finished eating and sent back the forks.*/<br>[P[j].i:mR?(•P[j].i$^D$)[T(btlr.g,3)]){i$^S$[T(P[j].i,2)]<br>→ (btlr.g$^D$[T(P[j].i,3)] ‖ btlr.body:ALLEOP( ))<br>•→ stopPolling=true }]    (III.32) |

A waiting philosopher responds to the termination signal only after he/she has eaten. Thus, before game ends every philosopher would have been satiated.

| Polling Cycles: |
|---|
| btlr:Polling( ) =<br>  [btlr.f[0]:mR?( ) → btlr.f[1]:mR?( ) → btlr.f[2]:mR?( )<br>  → btlr.f[3]:mR?( )→ btlr.f[4]:mR?( ) → btlr.i:mR?( )<br>  → btlr:Polling( )]    (III.33)<br>P[j:0...4]:Polling( ) =<br>  [P[j].g:pR( )* → P[j].i:mR?( )→ P[j]:Polling( )]    (III.34) |

Distinguished Predicates & Initial States:

The set of distinguished predicates is used to specify initial states before evaluation of ETC-network begins. Generally speaking, distinguished predicates include conditions that determine choices to be made at choice points in TIPs. Thus, any non-standard guards and status of messages in virtualMemories and states defined for cells will be included in this set. For example, in this example, the guard and status of message in a virtualMemory are included in this set, if a service request at a functionPort is not responded to before execution of the next TIP begins. Rule for symbolic evaluation of ECTs is: if a predicate determining the choice at a choice point is not specified in the initial state, or among predicates used earlier in the ECT-evaluation, then all causal chains emanating from that choice point should be included as possible alternates in the symbolic evaluation.

For DP-solution, the distinguished predicate set includes the following conditions:

| |
|---|
| btlr:frksAvlbl?(j), E[j], T[j] and W[j], btlr.f[j]:mR?( ) and btlr.f[j].rd:empty?( ),for 0≦j<5.    (III.35) |

The states of philosophers, T[j] (thinking P[j]) W [j] (waiting P[j]) and E[j] (eating P[j]) are defined in Section 7.4. Axioms of the game and its initial conditions are also defined there. The proofs presented In Section 7.4 require only P[g]: trace(p[j].g.t$_0$) and btlr.f[j]: trace (bf[j].t$_0$) for 0≦j<5. ECT-networks derived from traces are shown in Tables 8, 8.1, 9, 9.1 and 9.2. For convenience and clarity we have split up the network into easy to read blocks that follow one another, or activate each other through parallel activations. Reader may notice that in each ECT-block the pre and post conditions defined for actions are included in the block. Information needed for proofs are picked up from these tables.

BRIEF DESCRIPTION OF FIGURES AND TABLES

1. Simple Pathway: Used to exchange signals between two cells, LEGEND in Table 1.
2. Point-to-Point Das Pathway with virtualMemory: Used to exchange messages between two cells, LEGEND in Table 2.
3. A simple Point-to-Group pathway: Used to broadcast signal from one cell to a group of cells, LEGEND in Table 3.
4. Point-to-Group Das Pathway with virtualMemory: Used to broadcast messages from one cell to a group of cells, LEGEND in Table 4.
5. TICC™-Network for Bill-Ben game: Used to illustrate synchronization and coordination.
6. 6A. ALLEOPs-Network for Bill-Ben Game. Used as a model of Bill-Ben implementation.
    6B. Causalnet for a single run of Bill-Ben game: Used to dynamically monitor the game.
    6C. Causalnet for multiple iterations of Bill-Ben game.
7. TICC™-Network for Talking-Itching Problem Solution: An example showing decomposition of a compound cell, its encapsulation, parallelism and coordination.
8. Moving apart dependent ports in a cell to two different cells.
9. Comparing Conventional and TICC™ Parallel Processing System Architectures.
10. TICC™-Network for Ornamental Garden Solution (OG-Solution).
11. Schematic Diagram of a VirtualMemory.
12. TICC™-Network for Producer/Consumer problem Solution (PC-Solution).
13. TICC™-Network for Dining Philosopher problem solution (DP-Solution).
14. Branching tree of Configurations in a Polling Cycle of Butler cell in DP-Solution.
15. Illustrating State Transitions in Butler cell in successive Polling Cycles.
16. Illustrating Ad Hoc Coordination in TICC™-Ppde.
17. Illustrating Ad Hoc Synchronization in TICC™-Ppde.
18. A growing TICC™-Network with Non-Finite State ALLEOPs.
19. Group-to-Group sm-pathway and SMS infrastructure.

20. Causalnet Fragment of message sending cells installed by SMS in Group-to-Group Communications.
21. Causalnet Fragment of message receiving cells installed by SMS in Group-to-Group Communications.
22. Causalnet Fragment of message receiving cells installed by SMS in Group-to-
23. Group Communications.
24. Combined sending/receiving causal net fragment in Group-to-Group communications.
25. One-way Ring Sm-Pathway.
26. A Schematic Diagram of a dm-pathway from a generalPort group in one SMP (Shared memory Multi-Processor) to functionPort groups in other SMPs in a super-computing grid, interconnected by dm-pathways in a TICCNETT™.
27. Schematic diagram of a simple pathway with facilities to drive the SMS.
2. Tables
1. LEGEND for FIG. 1: TIPs, pathway states, protocols and CCP-characterizations.
2. LEGEND for FIG. 2: TIPs, pathway states, protocols and CCP-characterizations.
3. LEGEND for FIG. 3: TIPs, pathway states, protocols and CCP-characterizations.
4. LEGEND for FIG. 4: TIPs, pathway states, protocols and CCP-characterizations.
5. ECT-Network for Entrance Gate of OG-Solution.
　5.1. Events in Block(5a) of Table 5.
　5.2. Events in Blocks(5b) through Block(5d) of Table 5
　5.3. Events in Counter during Entrance, Block(e) through Block(5g).
6. ECT-Network for Exit Gate of OG-Solution.
　6.1. Events in Exit Gate, Block(6a) through Block(6c) in Table 6.
　6.2. Events in Counter during Exit, Block(6d) of Table 6.
7. ECT-Network for Philosopher P[j] in PC-Solution.
　7.1. Events in Blocks (7a) and (7b) of Table 7, Consumer Events.
　7.2. Events in Blocks (7c) and (7d) of Table 7, Distributor Events.
　7.3. Events in Block(7e) of Table 7, Producer Events.
8. ECT-Network for Philosopher P[j] in DP-Solution.
　8.1. Events in Blocks(8b) through (8d), Philosopher Events.
9. ECT-Network for Butler in PC-Solution.
　9.1. Events in Blocks (9i) ad (9j) in Table 9, Butler Events
　9.2. Events in Block (9m) in Table 9, Butler Events continued.

| | | |
|---|---|---|
| TIPS: | 1) | C.g:pR?(){C.g:x().s();} |
| | 2) | D.f:mR?(){D.f:r().s();} |

| COMMUNICATION PROTOCOLS: |
|---|
| 1)   C.g:s() = [C:c → C.g:s → D.f]<br>2)   D.f:s() = [D:c → D.f:s → C.g] |

| STATE CHANGES: [S,R] → [R,S] → [S,R] |
|---|

| LOGICAL CHARACTERIZATIONS OF CCPs: |
|---|
| 1.   {C.g.state=S}[C:c → C.g]{C.g.input=c}<br>2.   {C.g.state=S & C.g.input=c & C.f.state=R}<br>                     [C.g:s → C.f]{C.g.state=R & C.f.input=s}<br>3.   {C.f.input=s}[C.f:mR?()]{true & C.f.state=S}<br>4.   {C.f.input≠s}[C.f:mR?()]{false}<br>5.   {D.f.state=S}{D:c → D.f}{D.f.input=c}<br>6.   {C.f.state=S & f.input=c & C.g.state=R}<br>                     [C.f:s → C.g]{D.f.state=R & C.g.input=s}<br>7.   {C.g.input=s ∨ C.g.state=S}[C.g:pR?()]<br>                     {true & C.g.state=S & C.g:input=φ}<br>8.   {C.g.input=s & C.g.state=S}[C.g:pR?()]<br>                     {true & C.g.state=S & C.g.input=φ}<br>9.   {C.g.input≠s & C.g.state=S}[C.g:pR?()]{false}<br>10.  {C.g.input≠s}[C.g:mR?()]{false} |

TABLE 1: LEGEND FOR FIGURE 1.
TIPs, Protocols and Logical Characterizations of
CCPs appearing in the protocols, for the components in Figure 1.

| | | |
|---|---|---|
| TIPs: | 1. | C.g:pR?(){g:x().s();} |
| | 2. | D.f:mR?(){f:r().s();} |

| COMMUNICATION PROTOCOLS: |
|---|
| 1.    C.g:s()= [C:c → C.g:c → a0:s → a1:s → D.f;] |
| 2.    D.f:s()= [D:c → D.f:c → a1:s → a0:s → C.g;] |

| STATE CHANGES:   [S, S, R, R]   →   [R, R, S, S]   →   [S, S, R, R] |
|---|

| LOGICAL CHARACTERIZATIONS OF CCPs: |
|---|
| 1.    {C.g.state=S}[C:c → C.g]{C.g.input=c} |
| 2.    {C.g.state= S & C.g.input=c & a0.state= S}[C.g:c → a0]<br>           {C.g.state= R & a0.input=c} |
| 3.    {a1.input=c & a1.state= R & a0.state= S}[a0:s → a1]<br>           {a0.state= R & a1.input=s} |
| 4.    {a1.input=s & a1.state= R & D.f.state= R}[a1:s → D.f]<br>           {a1.state= S & D.f.input=s} |
| 5.    {D.f.input=s}[D.f:mR?()]{true & D.f.state= S] |
| 6.    {D.f.input≠s}[D.f:mR?()]{false} |
| 7.    {D.f.state= S}[D:c → D.f]{D.f.input=c} |
| 8.    {D.f.state= S & D.f.input=c & a1.state= S}[D.f:c → a1]<br>           {D.f.state= R & a1.input=c} |
| 9.    {a1.input=c & a0.state= R & a1.state= S}[a1:s → D.f]<br>           {a1.state= R & a0.input=s} |
| 10.   {a0.input=s & a0.state= R & C.g.state= R}[a0:s → C.g]<br>           {a0.state= S & C.g.input=s} |
| 11.   {C.g.input=s ∨ C.g.state = S}[C.g:pR?()]<br>           {true & C.g.state= S & C.g.input=φ} |
| 12.   {C.g.input≠s & C.g.state ≠ S}[C.g:pR?()]{false} |
| 13.   {C.g.input=s}[C.g:mR?()]{true & C.g.state= S & C.g.input=φ} |
| 14.   {C.g.input≠s}[C.g:mR?()]{false} |

TABLE 2: LEGEND FOR FIGURE 2.
TIPs, Protocols and Logical Characterizations of
CCPs appearing in the protocols, for the components in Figure 2.

| | |
|---|---|
| TIPS: | 1.     C.g:pR?(){C.g:x().s();} |
| | 2.     $D_1$.f:mR?(){$D_1$.f:r().s();} |
| | 3.     $D_2$.f:mR?(){$D_2$.f:r().s();} |
| PROTOCOLS: | 1. C.g:s() = [C.g:c → a0:s → [$D_1$.f, $D_2$.f]] |
| | 2. ($D_1$.f:s() ‖   $D_2$.f:s()) = |
| |       [$D_1$.f:$c_1$ ‖   $D_2$.f:$c_2$] → a0:AP[$c_1$,$c_2$]*:s → C.g] |

TABLE 3: LEGEND FOR FIGURE 3.

| | |
|---|---|
| TIPS: | 1. C.g:pR?(){C.g:x().s;} |
| | 2. $D_1$.f:mR?(){$D_1$.f:r().s();} |
| | 3. $D_2$.f:mR?(){$D_2$.f:r().s();} |
| PROTOCOLS: | 1. C.g:s() = [C.g:c → a0:s → a1:s → [$D_1$.f, $D_2$.f]] |
| | 2. [$D_1$.f:s() ‖ $D_2$.f:s()] = |
| |       [$D_1$.f:$c_1$ ‖   $D_2$.f:$c_2$] → a1:AP[$c_1$,$c_2$]*:s → a0:s → C.g] |

TABLE 4: LEGEND FOR FIGURE 4.

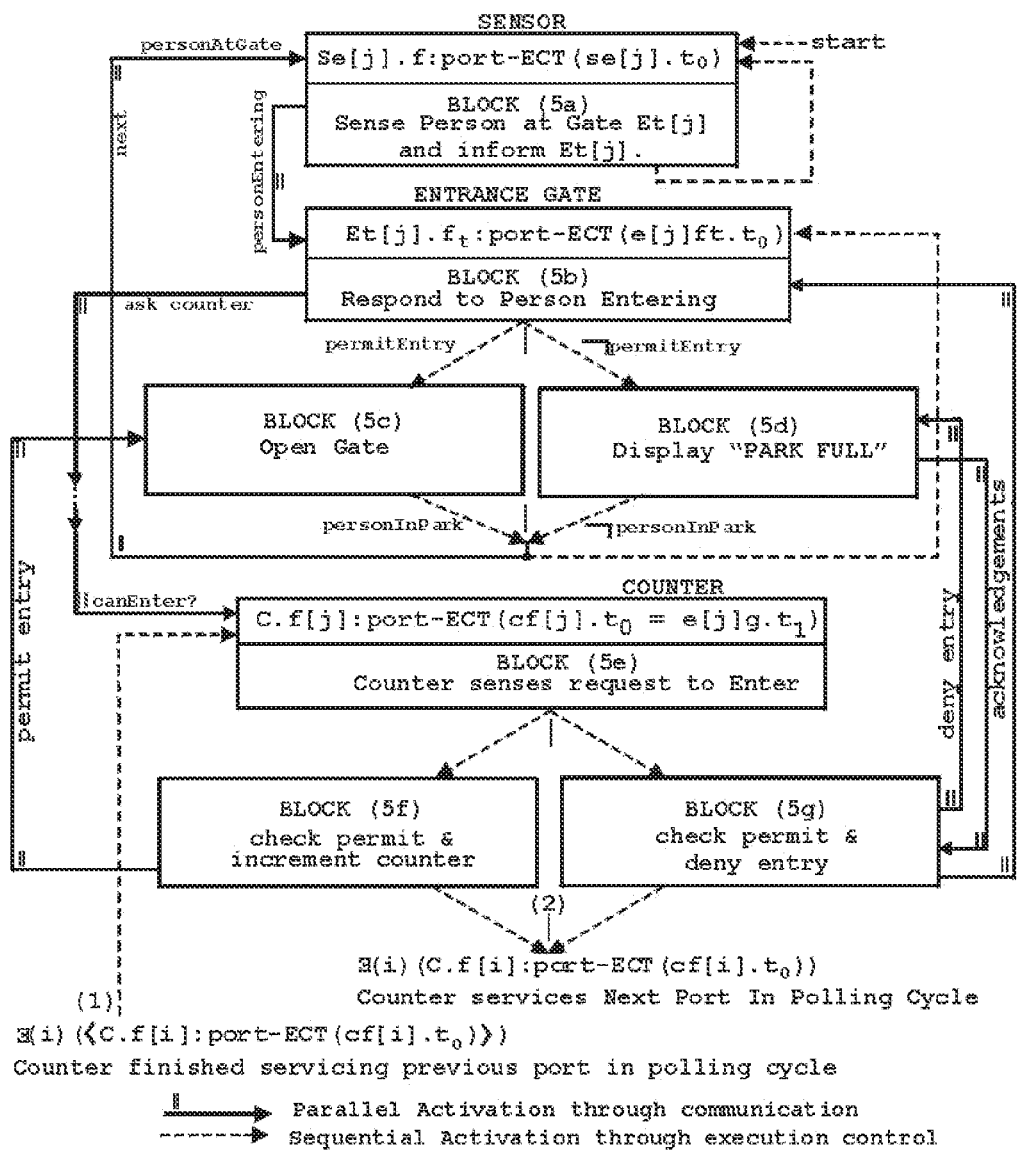
TABLE 5: STRUCTURE OF ECT-NETWORK FOR THE ENTRANCE GATE

BLOCK(5a)                                                                      SENSOR ECT

| | Se[j].f:port-ECT(se[j].$t_0$) | |
|---|---|---|
| Nos. | Events | Time |
| 1. | [⟨Se[j].$f^D$⟩] | se[j].$t_0$ |
| 2. | ⟨Se[j]:mR?(⟨Se[j].$f^D$⟩)⟩ //person at gate | se[j].$t_1$ |
| 3. | Se[j]:personEntering | se[j].$t_1$ |
| 4. | [→ Se[j].$g^S$] | se[j].$t_1$ |
| 5. | [⟨→ Et[j].$f_t^D$⟩] //to (5b,2) | se[j].$t_2$ |
| 6. | ⟨Se[j].$g^D$⟩      (e[j]ft.$t_3$ \| e[j]ft.$t_5$) = | se[j].$t_3$ |
| 7. | ⟨Se[j].g:mR?(⟨Se[j].$g^D$⟩) *⟩ //from ((5c.6) \| (5d,9)) | se[j].$t_3$ |

TABLE 5.1: ENTRANCE SENSOR ECT

BLOCK (5b)  ENTRANCE GATE   ECTs

| | Et[j].f$_t$:port-ECT(e[j]ft.t$_0$) | |
|---|---|---|
| Nos. | Events | Time Points |
| 1. | [⟨Et[j].f$_t^D$⟩]                       se[j].t$_2$ = | e[j]ft.t$_0$ |
| 2. | ⟨Et[j].f$_t$:mR?(⟨Et[j].f$_t^D$⟩)*⟩ //from (5a,5) | e[j]ft.t$_1$ |
| 3. | Et[j]:personEntering?() | et[j].t$_0$ |
| 4. | [→ Et[j].g$^S$] | e[j]g.t$_0$ |
| 5. | [⟨→ C.f[j]$^D$⟩] //to (5e,2) | e[j]g.t$_1$ |
| 6. | ∃(p)(Et[j].g | Et[j].f)p:mR?()* | e[j]g.t$_2$ |

BLOCK (5c)       Entry Permitted

| Nos. | Events | Time |
|---|---|---|
| 1. | [⟨Et[j].g$^D$⟩]                       cf[j].t$_4$ = | e[j]g.t$_2$ |
| 2. | ⟨Et[j].g:mR?(⟨Et[j].g$^D$⟩)*⟩ //from (5f,4) | e[j]g.t$_2$ |
| 3. | [→ Et[j]:letPersonIn()] | et[j].t$_1$ |
| 4. | Et[j]:personInPark?() | et[j].t$_2$ |
| 5. | [→ Et[j].f$_t^S$] | e[j]ft.t$_2$ |
| 6. | [⟨→ Se[j].g$^D$⟩] //to (5a,7) | e[j]ft.t$_3$ |

BLOCK (5d)       Entry Denied

| Nos. | Events | Time |
|---|---|---|
| 1. | [⟨Et[j].f$^D$⟩]                       cg[j].t$_1$ = | e[j]f.t$_0$ |
| 2. | ⟨Et[j].f:mR?(⟨Et[j].f$^D$⟩)*⟩ //from (5g,3) | e[j]f.t$_0$ |
| 3. | [→ Et[j]:letPersonLeave()] | et[j].t$_3$ |
| 4. | ¬Et[j]:personInPark?() | et[j].t$_4$ |
| 5. | [→ Et[j].f$^S$] | e[j]f.t$_2$ |
| 6. | [→ ⟨C.g[j]$^D$⟩] //to (5g,5) | e[j]f.t$_3$ |
| 7. | ⟨Et[j].g:pR?(⟨Et[j].g$^D$⟩)*⟩ //from (5g,7) | e[j]g.t$_3$ |
| 8. | [→ Et[j].f$_t^S$] | e[j]ft.t$_4$ |
| 9. | [⟨→Se[j].g$^D$⟩] //to (5a,7) | e[j]ft.t$_5$ |

TABLE 5.2: ENTRANCE TURNSTILE ECT

BLOCK(5e)　　　　　　　COUNTER ECTs FOR ENTRANCE GATE RESPONSE

| | C.f[j]:port-ECT(cf[j].t$_0$) | |
|---|---|---|
| Nos. | Events | Time Points |
| 1. | [⟨C.f[j]$^D$⟩]　　　　　　　　　　e[j]g.t$_1$ = | cf[j].t$_0$ |
| 2. | ⟨C.f[j]:mR?(⟨C.f[j]$^D$⟩)⟩　//from (5b,5) | cf[j].t$_1$ |

BLOCK(5f)　　　　　　　　　　　　　　　　　ENTRY POSSIBLE

| Nos. | Events | Time |
|---|---|---|
| 1. | ⟨(counter.count < max)?()⟩ | cf[j].t$_2$ |
| 2. | [→ counter++] | cf[j].t$_2$ |
| 3. | [→ C.f[j]$^S$] | cf[j].t$_3$ |
| 4. | [⟨→ Et[j].g$^D$⟩]　//to (5c,2) | cf[j].t$_4$ |

BLOCK(5g)　　　　　　　　　　　　　　　　　ENTRY NOT POSSIBLE

| Nos. | Events | Time |
|---|---|---|
| 1. | ⟨¬(counter.count < max)?()⟩ | cf[j].t$_2$ |
| 2. | [⟨→ C.g[j]$^S$⟩] | cg[j].t$_0$ |
| 3. | [⟨→ Et[j].f$^D$⟩]　//to (5d,2) | cg[j].t$_1$ |
| 4. | [⟨C.g[j]$^D$⟩]　　　　　　　　e[j]f.t$_3$ = | cg[j].t$_2$ |
| 5. | ⟨C.g[j]:mR?(⟨C.g[j]$^D$⟩)*⟩　//from (5d,6) | cg[j].t$_2$ |
| 6. | [→ C.f[j]$^S$] | cf[j].t$_3$ |
| 7. | [⟨→ Et[j].g$^D$⟩]　//to (5d,7) | cf[j].t$_4$ |

TABLE 5.3: COUNTER ECT FOR ENTRANCE

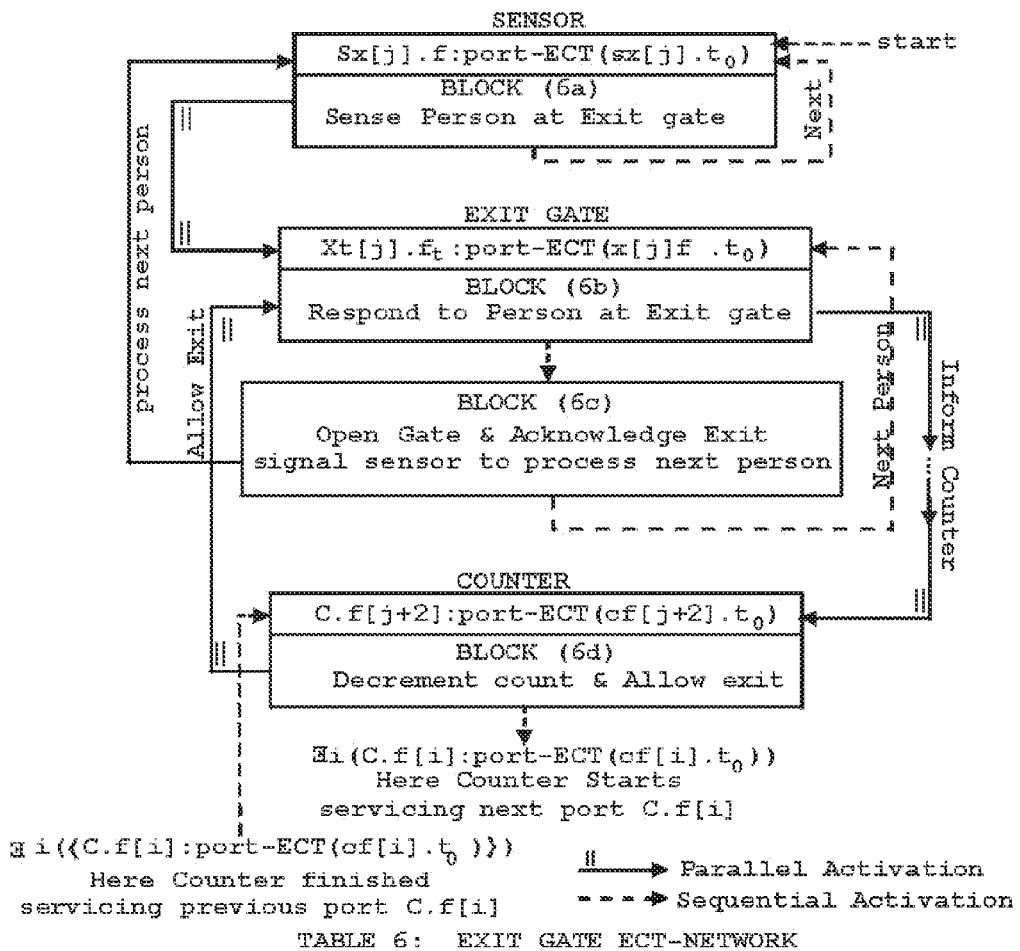
TABLE 6: EXIT GATE ECT-NETWORK

BLOCK(6a)   in Table 6.                                    EXIT SENSOR ECT.

| \multicolumn{3}{c}{Sx[j].f:port-ECT(sx[j].t$_0$)} |||
|---|---|---|
| Nos. | Events | Time Points |
| 1. | [⟨Sx[j].f$^D$⟩] | sx[j].t$_0$ |
| 2. | ⟨Sx[j]:mR?(⟨Sx[j].f$^D$⟩)⟩  //signal from sensor | sx[j].t$_1$ |
| 3. | Sx[j]:personLeaving | sx[j].t$_1$ |
| 4. | [→ Sx[j].g$^s$] | sx[j].t$_1$ |
| 5. | [⟨→ Xt[j].f$_t^D$⟩]  //to (6b,2) | sx[j].t$_2$ |
| 6. | ⟨Sx[j].g$^D$⟩              x[j]ft.t$_2$ = | sx[j].t$_3$ |
| 7. | Sx[j].g:mR?([⟨Sx[j].g$^D$⟩)*]  //from (6c,6) | sx[j].t$_3$ |

TABLE 6.1: EXIT SENSOR ECT.

BLOCK (6b)                                              EXIT TURNSTILE ECT.

xt[j].f$_t$:port-ECT(x[j]ft.t$_0$)

| Nos. | Events | | Time Points |
|---|---|---|---|
| 1. | [⟨Xt[j].f$_t^D$⟩] | sx[j].t$_2$ = | x[j]ft.t$_0$ |
| 2. | ⟨Xt[j].f$_t$:mR?(⟨Et[j].f$_t^D$⟩)*⟩ //from (6a,5) | | x[j]ft.t$_1$ |
| 3. | Xt[j]:personLeaving?() | | xt[j].t$_0$ |
| 3. | [→ Xt[j].g$^S$] | | x[j]g.t$_0$ |
| 4. | [⟨→ C.f[j+2]$^D$⟩] //to (6d,2) | | x[j]g.t$_1$ |

BLOCK (6c) 

| Nos. | Events | | Time Points |
|---|---|---|---|
| 1. | [⟨Xt[j].g$^D$⟩] | cf[j+2].t$_4$ = | x[j]g.t$_2$ |
| 2. | ⟨Xt[j].g:mR?(⟨Xt[j].g$^D$⟩)*⟩ //from (6d,6) | | x[j]g.t$_2$ |
| 3. | [→ Xt[j]:letPersonOut()] | | xt[j].t$_1$ |
| 4. | ¬Xt[j]:personInPark?() | | xt[j].t$_2$ |
| 5. | [→ Xt[j].f$_t^S$] | | x[j]ft.t$_1$ |
| 6. | [⟨→ Sx[j].g$^D$⟩] //to (6a,7) | | x[j]ft.t$_2$ |

BLOCK (6d)                                                      COUNTER ECT.

C.f[j+2]:port-ECT(cf[j+2].t$_0$)

| Nos. | Events | | Time Points |
|---|---|---|---|
| 1. | [⟨C.f[j+2].g$^D$⟩ | x[j]g.t$_1$ = | cf[j+2].t$_0$ |
| 2. | ⟨C.f[j+2].g:mR?(⟨C.f[j+2]$^D$⟩)*⟩ //from (6b,4) | | cf[j+2].t$_1$ |
| 3. | [→ counter--] | | cf[j+2].t$_2$ |
| 4. | (counter.count < max) | | cf[j+2].t$_3$ |
| 5. | [→ C.f[j+2]$^S$] | | cf[j+2].t$_3$ |
| 6. | [⟨→ Xt[j].g$^D$⟩] //to (6c,2) | | x[j]ft.t$_2$ |

TABLE 6.2: COUNTER ECTs FOR EXIT

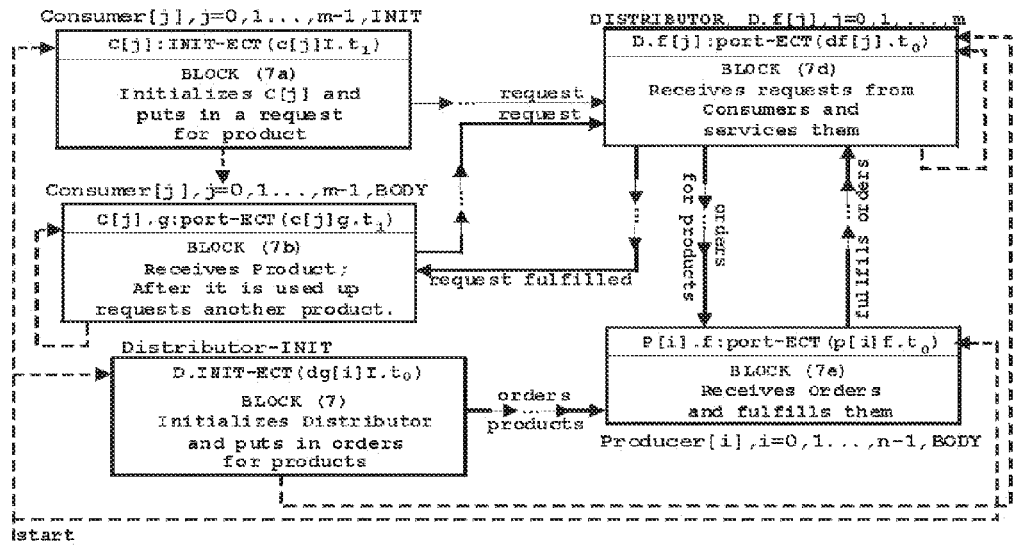
TABLE 7: PC-SOLUTION ECT-NETWORK

BLOCK(7a)  CONSUMER INIT, for j = 0,1,…,m

| | C[j]:init-ECT(c[j]I.$t_1$) | |
|---|---|---|
| Event Nos. | Events | Time Points |
| 1. | [→ C[j].g:make(package)] | C[j]I.$t_1$ |
| 2. | C[j].g:msg().contents=ϕ | C[j]I.$t_2$ |
| 3. | [→ C[j].$g^s$] | C[j]I.$t_2$ |
| 4. | [⟨→ D.f[j]$^D$⟩]  //to (7d,2) | C[j]I.$t_3$ |

BLOCK(7b)  CONSUMER, for j = 0,1,…,m

| | C[j].g:port-ECT(c[j]g.$t_0$) | |
|---|---|---|
| Event Nos. | Events | Time Points |
| 1. | [⟨C[j].$g^D$⟩]  dg[k]t.$t_4$ = | C[j]g.$t_0$ |
| 2. | C[j].g:mR?(⟨C[j].$g^D$⟩)  //from (7d,12) | C[j]g.$t_1$ |
| 3. | C[j].g:msg().contents=ϕ | C[j]g.$t_1$ |
| 4. | [→ C[j].g:pickUp()] | C[j]g.$t_1$ |
| 5. | C[j]:hasProduct | C[j]g.$t_2$ |
| 6. | ⟨C[j].g:usedUp?()*⟩ | C[j]g.$t_3$ |
| 7. | [→ C[j].$g^s$] | C[j]g.$t_3$ |
| 8. | [⟨→ D.f[j]$^D$⟩]  //to (7d,2) | C[j]g.$t_4$ |

TABLE 7.1:  CONSUMER[j] ECT, j=0,1,…,m

BLOCK(7c)                                  DISTRIBUTOR INIT, k=0,1,...,n

| Nos. | D.init:ECT(dg[k]I.$t_0$) Events | Time Points |
|---|---|---|
| 1. | [→ D.g[k].g:make(package)] | dg[k]I.$t_0$ |
| 2. | D.g[k]:msg().contents=$\phi$ | dg[k]I.$t_1$ |
| 4. | [→ D.g[k]$^S$] | dg[k]I.$t_1$ |
| 5. | [⟨→ P[j].f$^D$⟩]  //to (7e,2) | dg[k]I.$t_2$ |

BLOCK(7d)                                                    DISTRIBUTOR

| Nos. | D.f[j]:port-ECT(df[j].$t_0$) Events | Time |
|---|---|---|
| 1. | [⟨D.f[j]$^D$⟩]     (c[j]I.$t_3$ | c[j]g.$t_4$) = | df[j].$t_0$ |
| 2. | ⟨D.f[j]:mR?(⟨D.f[j]$^D$⟩)⟩  //from ((7a,4)|(7b,8)) | df[j].$t_1$ |
| 3. | ∃(i) [⟨→ D.g[i]$^D$⟩]  //from (7e,7) | dg[k].$t_3$ |
| 4. | ∃(k) ((0≤k<n) (D.g[k]:mR?())* | dg[k]t.$t_0$ |
| 5. | ∃(Product x) (D.g[k]:msg().contents=x) | dg[k]t.$t_0$ |
| 6. | ∃(j) [→ D.g[k]:moveProduct(f[j])] | dg[k]t.$t_1$ |
| 7. | D.g[k]:msg().contents=$\phi$) | dg[k]t.$t_2$ |
| 8. | (D.f[j]:msg().contents=x) | dg[k]t.$t_2$ |
| 9. | [→ D.g[k]$^S$] | dg[k]t.$t_2$ |
| 10. | [⟨→ P[k].f$^D$⟩]  //to (7e,2) | dg[k]t.$t_3$ |
| 11. | [→ D.f[j]$^S$] | dg[k]t.$t_3$ |
| 12. | [⟨→ C[j].g$^D$⟩]  //to (7b,2) | dg[k]t.$t_4$ |

TABLE 7.2: DISTRIBUTOR ECTs

BLOCK(7e)                           PRODUCER[i], i=0,1,...,n

| P[k].f:port-ECT(p[k]f.$t_0$) ||| 
|---|---|---|
| Nos. | Events | Time Points |
| 1. | [⟨P[i].$f^D$⟩]    (dg[i]I.$t_2$ \| dg[i]t.$t_3$) = | p[i]f.$t_0$ |
| 2. | ⟨P[i].f:mR?(⟨P[i].$f^D$⟩)⟩ //from ((7c,4)\|(7d,10)) | p[i]f.$t_1$ |
| 4. | ∃(Product x)(x=P[i]:produceProduct()) | p[i]f.$t_2$ |
| 5. | P[i].f.wr:msg().contents=x) | p[i]f.$t_3$ |
| 6. | [→ P[i].$f^S$] | p[i]f.$t_4$ |
| 7. | [⟨→ D.g[i]$^D$⟩] //to (7d,3) | dg[i]t.$t_4$ |

TABLE 7.3:   PRODUCER[k] ECT, k = 0,1,...,n

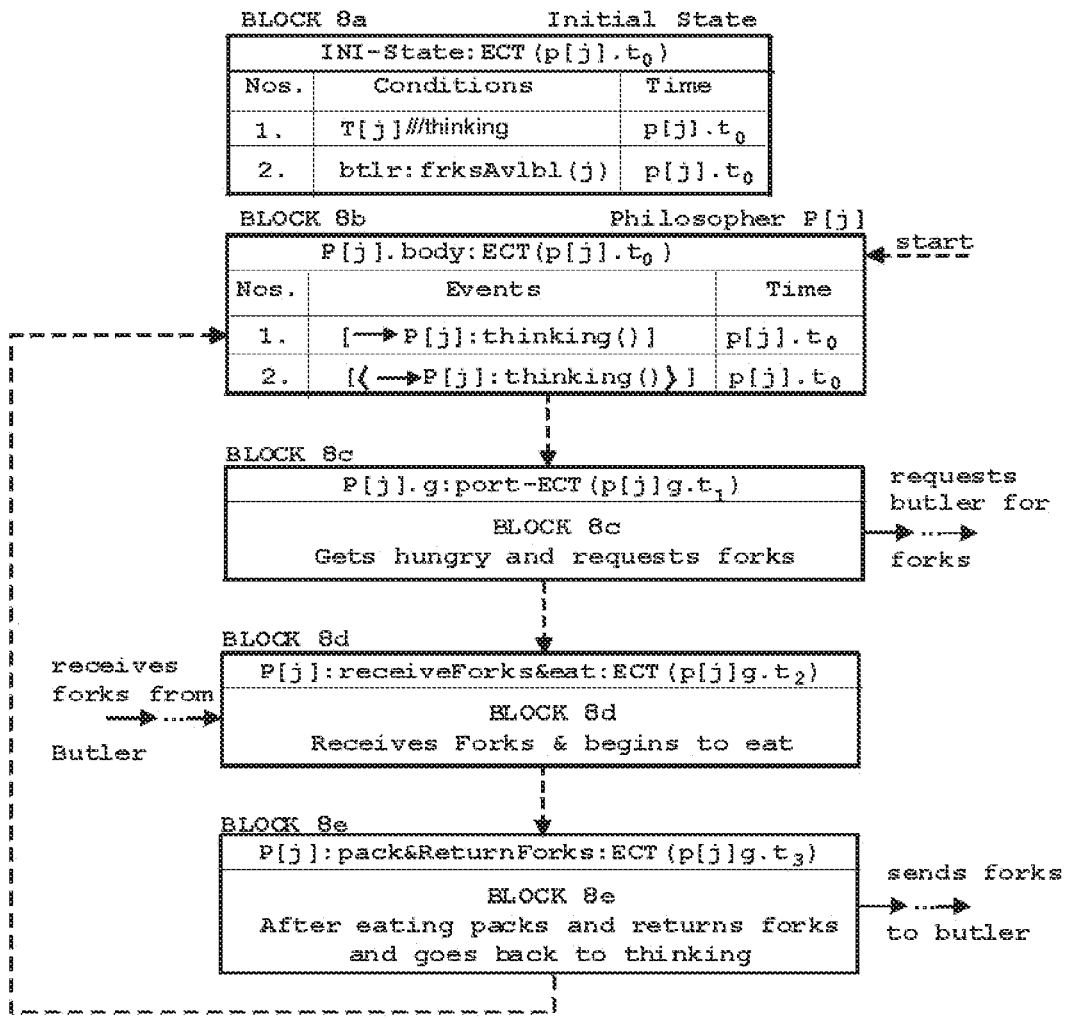
TABLE 8: PHILOSOPHER ECT-NETWORK

BLOCK(8b)  $0 \leq j < 5$                                           SENDS REQUEST FOR FORKS

| Nos. | Events | Time |
|---|---|---|
| | $P[j].g:port\text{-}ECT(p[j]g.t_1)$ | |
| 1. | $[\langle P[j]:hungry?()\rangle]$ | $p[j]f.t_1$ |
| 2. | $\langle P[j].g:pR?()*\rangle$ | $p[j]g.t_0$ |
| 4. | $\langle P[j].g.wr:empty?()\rangle$ | $p[i]g.t_0$ |
| 5. | $[\rightarrow P[j].g^S]$ | $p[j]f.t_0$ |
| 6. | $[\langle \rightarrow btlr.f[j]^D\rangle]$ //to (9b,1) | $p[j]f.t_1$ |

BLOCK(8c)                                                           RECEIVES FORKS & EATS

| Nos. | Events | Time |
|---|---|---|
| | $P[j].receiveForks\&Eat:ECT(p[j]g.t_2)$ | |
| 1. | $[\langle P[j].g^D\rangle]$        $bf[j].t_4 =$ | $p[j]g.t_2$ |
| 2. | $\langle P[j].g:mR?(\langle P[j].g^D\rangle)*\rangle$ //from (9m,7) | $p[j]g.t_2$ |
| 4. | $\langle P[j].g:msg().contents =$ $[btlr.frk[j], btlr.frk[j\oplus_5 1]]\rangle$ | $p[j]g.t_2$ |
| 5. | $\langle[\rightarrow P[j]:pickUpForks()]\rangle$ | $p[j]f.t_2$ |
| 6. | $P[j].hasForks()$ | $p[j]f.t_2$ |
| 7. | $P[j].g:msg().contents=\phi$ | $P[j]g.t_2$ |
| 8. | $[\rightarrow P[j]:eating()]$ & $E[j]$ | $P[j]g.t_3$ |

BLOCK(8d)                                                           RETURNS FORKS

| Nos. | Events | Time |
|---|---|---|
| | $P[j].g:pack\&ReurnForks:ECT(p[j]g.t_4)$ | |
| 1. | $[\rightarrow P[j]:packForks()]$ | $p[j]f.t_4$ |
| 2. | $\langle P[j].g:msg().contents =$ $[btlr.frk[j], btlr.frk[j\oplus_5 1]]\rangle$ | $p[j]g.t_4$ |
| 4. | $\neg P[j].hasForks$ | $p[i]g.t_4$ |
| 5. | $[\rightarrow P[j].g^F]$ //returns forks to butler | $p[j]f.t_0$ |
| 6. | $[\langle \rightarrow btlr.f[j]^D\rangle]$ //to (9b,1) | $p[j]f.t_1$ |
| 7. | $\langle[P[j].g^D]\rangle$ //acknowledgement from (9h,8) | $p[j]f.t_2$ |

TABLE 8.1: PHILOSOPHER[j] ECTs.

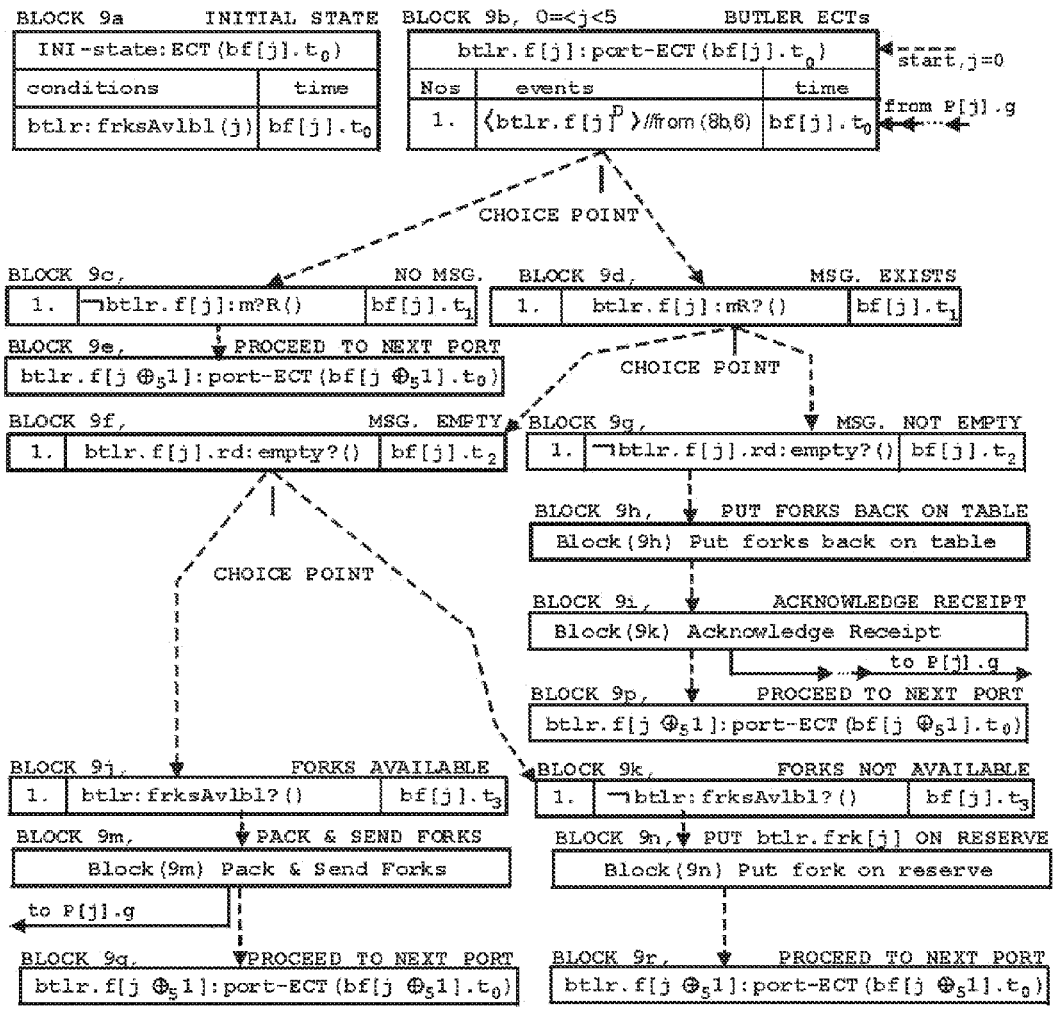
TABLE 9: BUTLER ECT-NETWORK

BLOCK(9m)   PACK AND SEND FORKS   $0 \leq j < 5$

| Btlr.f[j].pack&SendForks:ECT(bf[j].t$_3$) ||| 
|---|---|---|
| Nos. | Events | Time Points |
| 1. | $[\langle \rightarrow$ btlr:packForks()$\rangle]$ | bf[j].t$_3$ |
| 2. | Btlr.f[j].wr.msg().contains<br>[btlr.frk[j], btlr.frk[j$\oplus_5$1]] | bf[j].t$_3$ |
| 3. | ¬btlr.frk[j].rsrvd | bf[j].t$_3$ |
| 4. | btlr.frk[j].onTbl | bf[j].t$_3$ |
| 5. | btlr.frk[j$\oplus_5$1].onTbl | bf[j].t$_3$ |
| 6. | $[\rightarrow$ btlr.f[j]$^S$] | bf[j].t$_3$ |
| 7. | $[\langle \rightarrow$ P[j].g$^P \rangle]$  //to (8b,1) | bf[j].t$_4$ |
| 8. | ¬btlr:frksAvlbl?(j) | bf[j].t$_4$ |
| 9. | ¬btlr:frkAvlbl?(j$\oplus_5$1) | bf[j].t$_4$ |
| 10. | ¬btlr:frkAvlbl?(j$\oplus_5$4) | bf[j].t$_4$ |

BLOCK(9h)   PUT FORKS BACK ON TABLE   $0 \leq j < 5$

| Btlr.f[j].putForksBack:ECT(bf[j].t$_3$) ||| 
|---|---|---|
| Nos. | Events | Time Points |
| 1. | btlr.f[j].rd:msg().contains<br>[btlr.frk[j], btlr.frk[j$\oplus_5$1]] | bf[j].t$_3$ |
| 2. | $[\langle \rightarrow$ btlr:packForks()$\rangle]$ | bf[j].t$_5$ |
| 3. | ¬btlr.frk[j].rsrvd | bf[j].t$_5$ |
| 4. | btlr.frk[j].onTbl | bf[j].t$_5$ |
| 5. | btlr.frk[j$\oplus_5$1].onTbl | bf[j].t$_5$ |
| 6. | btlr.f[j].rd:msg().contains=$\phi$ | bf[j].t$_5$ |
| 7. | $[\rightarrow$ btlr.f[j]$^F$] | bf[j].t$_5$ |
| 8. | $[\langle \rightarrow$ P[j].g$^P \rangle]$  //to (8d,7) | bf[j].t$_6$ |

TABLE 9.1: BUTLER ECTS

BLOCK(9n)                                          PUT FORKS ON RESERVE

| Btlr:putForkOnReserve(j):ECT(bf[j].$t_3$) | | |
|---|---|---|
| Nos. | Events | Time Points |
| 1. | [⟨→ btlr.frk[j].rsvd=true⟩] & W[j] | bf[j].$t_7$ |
| 2. | ¬btlr:frkAvlbl?(j) | bf[j].$t_7$ |
| 3. | ¬btlr:frkAvlbl?(j$\oplus_5$4) | bf[j].$t_7$ |
| 4. | ⟨btlr.f[j]:mR?(⟨btlr.f[j]$^D$⟩(pjf.$t_1$))⟩ | bf[j].$t_8$ |
| 5. | btlr.f[j].rd:empty?() | bf[j].$t_8$ |

TABLE 9.2: BUTLER ECTS (CONTD.)

The invention claimed is:

1. A method of building formally verified parallel software for multi-core chips using TICC™-Paradigm, the term TICC™-Paradigm being used to refer to a collection of abstractions, each abstraction being simultaneously a programming abstraction and an abstraction of a component in parallel software systems, with associated methods of implementation, use and validation, said abstractions being embodied in a parallel program development and execution platform called TICC™-Ppde, all abstractions embodied together in TICC™-Ppde enabling the following:

(i) specification of abstract designs for parallel software systems: designers of a parallel software system for an application Ap specifying the abstract design, Ap:design( ), for application Ap using abstractions, the term "abstract" being used to refer to specifications of intended computations in a manner not necessarily executable by a computer, but amenable for computers building a theory of intended computations using event classes, interactively validating the theory and reducing models specified by the theory to their final validated implementations of computer programs;

(ii) event class theory of intended computations being called ALLowed Event Occurrence Patterns, ALLEOPs for short, the event class theory derived from Ap:design( ) being called Ap:ALLEOPS( ), Ap:ALLEOPS( ) specifying patterns of causal chains of event classes that may occur in the intended computations, requirements to be satisfied by Ap:design( ) being specified by designers in a Causal Temporal Logic (CTL) language, the set of CTL-assertions that specify requirements for Ap:design( ) being called Ap:requirements( ), computers using Ap:design( ), Ap:requirements( ) and Ap:ALLEOPS( ) to perform the following tasks:

(a) TICC™-Ppde automatically deriving Ap:ALLEOPS( ) from Ap:design( ), TICC™-Ppde using Ap:ALLEOPS( ) to interactively formally validate all CTL-assertions in Ap:requirements( ) for the Ap:design( ), the term "formally validate" being used to refer to validations performed without having to execute in a computer any of the intended computations;

(b) TICC™-Ppde assisting designers to reduce abstract Ap:design( ) to its validated implementation of computer programs through successive refinements, at each stage of refinement designers and implementers specifying intended computations in greater detail in a manner such that all formal validations done in all previous stages are preserved, at each stage of refinement designers updating Ap:requirements( ), TICCT™-Ppde automatically updating Ap:ALLEOPS( ), TICC™-Ppde assisting designers and implementers to formally interactively validate updated Ap:requirements( ), successive refinements, successive automatic theory updating and successive validations preserving all validations performed in all previous stages of refinements, this iterative refinement process ultimately yielding the complete validated implementation of executable computer programs for the parallel software system for application Ap, implementation at any stage of refinement being called Ap:implementation( ), Ap:implementation( ) satisfying all requirements in Ap:requirements( ) at every stage of refinement;

(iii) automatically implement a Self-Monitoring System (SMS) for Ap:implementation( ) called Ap:SMS( ), Ap:SMS( ) monitoring Ap:implementation( ) while it is running, in parallel with its running, without interfering in any way with timings of computational events, instances of event classes specified in Ap:ALLEOPS( ) occurring while Ap:implementation( ) is running, Ap:SMS( ) using Ap:ALLEOPS( ) while monitoring Ap:implementation( ) to dynamically identify, report and take appropriate a priori defined actions, if errors are detected in event instance occurrences, while running Ap:implementation( ), or if pending errors are detected, or if a priori defined critical event instance patterns occur while Ap:implementation( ) is running, any departure of event instance occurrence patterns at run time from those specified for event classes in Ap:ALLEOPS( ) being construed as errors, any deviation of timings of event instances from those specified in Ap:ALLEOPS( ) being construed as a pending error, critical behaviors being defined by designers in terms of specific patterns of causal chains of event classes in Ap:ALLEOPS( ), Ap:SMS( ) providing the infrastructure for development of self-diagnosis, self-repair and learning capabilities for applications Ap;

abstractions in TICC™-paradigm enabling TICC™-Ppde to provide above services being independent, it being possible to use each abstraction independently of other abstractions to build and run software systems, such software systems not providing all above services, in the following the phrase "programming abstraction" being used to refer to abstractions used in developing computer programs, the phrase "component abstraction" being used to refer to abstractions of components used in TICC™-Ppde parallel programs.

2. A method as recited in claim 1 further including the following steps for using cell abstraction:

cell abstraction being at once both a programming abstraction and a component abstraction, there being two kinds of cells, simple-cells and compound-cells, the term "cell" being used to denote both simple and compound cells, compound-cells encapsulating a network of cells interconnected by TICC™-Ppde pathways (hereinafter simply referred to as pathways), such encapsulated compound cells being usable as plug-in software units in larger software systems, provided ports matching the ports in a compound cell exist in the larger software system, networks of cells interconnected by pathways being called TICC™-networks, specifying the TICC™-network encapsulated by a compound-cell being called cell decomposition, a simple-cell being not so decomposable, TICC™-network for application Ap being called Ap:network( ), Ap:network( ) being obtained through successive network-refinement (decomposition) of postulated abstract compound-cells, features of cell abstraction in TICC™-paradigm being the following:

(i) same unique cell process for all simple-cells: the top level simple-cell class, Cell, in TICC™-Ppde has a unique abstract Cell Interaction Process called Cell:CIP( ) defined in it, the same CIP-process Cell:CIP( ) being inherited by all cell subclasses C of Cell, the CIP-process inherited by C being referred to by C:CIP( ), C:CIP( ) specifying how instances of C should interact with their ports, C:CIP( )s for different subclasses C differing from each other only in the initialization routine C:init( ) of C:CIP( ), the cell process inherited by an instance c of C being referred to as c:CIP( ), compiled code for each c:CIP( ) being kept in the private memory of the ComPuting Unit, called c.cpu, assigned to c by TICC™-Ppde, this compiled code being used to run cell instance c in c.cpu, no two cell instances ever having the same CPU assigned to them, c:CIP( ) being the only process associated with cell instance c and CIP-processes being the only processes in any parallel software system in TICC™-paradigm, programmers having to define only the initialization routine C:init( ) and attributes, C.portPriority and C.sortedPortsList, for each instance c of C;

(ii) simple-cell structure: each simple-cell subclass C having software port subclasses attached to it, there being three port subclasses, generalPort, functionPort and interruptPort, the same port subclass being attached to a cell subclass C multiple number of times, the term C.p being used here to refer to the subclass of a port attached to C, instances c.p of port subclass C.p being attached to instances c of C the same number of times class C.p being attached to C, the same port instance c.p being never attached to more than one cell instance c, c being called the parent cell of c.p, each c.p being connected only to one unique communication pathway, the pathway connected to c.p being called c.p.pathway, c.p using c.p.pathway to exchange messages with other ports connected to c.p.pathway, all instances c of C inheriting C:init( ) defined for C, each C having at least three port subclasses attached to it, at least one of each kind, the numbers and kinds of ports defined for each cell subclass C being automatically identified when Ap:design( ) is finalized, thus compound cell decomposition determining subclasses of cells used in an implementation, cell decomposition using domain knowledge of the application domain and no considerations of programming, there being thus no problem for designers having to identify cell subclasses that any application Ap should have based on programming considerations, or define computer programs for C:CIP( ), designers being responsible to define for each cell subclass C only cell attributes defined for C, kinds of port subclasses attached to C and the C:init( ) program;

(iii) refinement of c:CIP( ): each abstract c:CIP( ) being refined by inheriting its initialization program C:init( ) and for each port c.p of each instance c of C its abstract Thread Interaction Protocol (TIP) called c.p:TIP( ) being defined, each abstract c.p:TIP( ) being refined by specifying short sequential programs called pthreads that perform computations in c.p:TIP( ), c.p:TIP( ) specifying how c should interact with its port c.p, refinements of abstract c.p:TIP( ) being called TIP-refinements, TIP-refinements being defined by specifying computer programs for tasks performed by c at port c.p as pthreads, c.p:TIP( ) being fully TIP-refined when computer programs for all computing tasks performed by c while executing c.p:TIP( ) have been defined, the cell process c:CIP( ) being fully refined when all c.p:TIP( )s associated with c have been fully refined, implementers defining new port subclasses Q only when Q should contain special port attributes, specific to a given application, defined for them, these special attributes being not available in the three port subclasses already defined in TICCT™-Ppde;

(iv) simple-cell self-activation: each simple-cell instance c operating independently in parallel with all other simple-cell instances in an application, c being run by the ComPuting Unit (CPU) assigned to it by TICC™-Ppde, the CPU assigned to c being called c.cpu, each cell c activating itself to run its c:CIP( ) process in c.cpu when a first message is delivered to it, c also activating by itself any computer program that c.cpu runs to build messages sent out by c or to process messages received by c, c being self-activating also for running all interrupt processing, c automatically correctly resuming operations suspended by interrupts, c.cpu performing memory allocations in virtualMemories it uses, c automatically performing all of its task scheduling based on message receipts, c never using an operating system, thus eliminating all program scheduling delays and program activation delays in parallel processing, and also thus making every parallel program impenetrable to intruders as long as integrity of system administrators is guaranteed;

(v) simple-cell communications: at each port c.p attached to c having a communication protocol, hereinafter simply called protocol, defined for it, the protocol defined for Cc.p being called c.p.protocol, this protocol being associated with c.p.pathway connected to c.p, machine instruction called Causal Communication Primitive, CCP, being used to exchange signals between components in a pathway, each c.p.protocol being defined by a sequence of successively executed CCPs, each CCP taking only 2 nanoseconds to complete execution, evaluation of c.p.protocol causing signals to travel over c.p.pathway, components in c.p.pathways that exchange signals being always tuned to each other, each being always ready to receive and respond immediately to the signal it receives, thus eliminating delays in signal exchanges caused by synchronization sessions between the components, c.p.protocol appearing only in the definition of c.p:TIPO, c.q.protocol for any port c.q attached to c not appearing in any of the pthreads that define computing tasks performed by c.p:TIP( ), c.p.pathway having a unique virtualMemory, m, associated with port c.p embedded in it, this virtualMemory being called c.p.vM, signals traveling over c.p.pathway eventually delivering message written in c.p.vM to message recipient ports also connected to c.p.pathway only if recipient ports satisfy a priori specified security conditions, only c.cpu assigned to the parent cell c of c.p being allowed to evaluate c.p.protocol, such protocol evaluations by c.cpu always occurring immediately after message to be sent out becoming ready, having been fully written by cell c in to c.p.vM, this feature of immediate message transmission after message writing, eliminating all message scheduling delays in all communications in TICC™-Ppde, no c.p.protocol being ever evaluated by any CPU other than c.cpu, no two simultaneous evaluations of two distinct protocols, c1.p.protocol and c2.q.protocol by two distinct CPUs, c1.cpu and c2.cpu, ever interfering with each other, this enabling simultaneous parallel message exchanges, the number of such simultaneous parallel messages being limited only by the number of cells in an application, all messages being always exchanged by all cell instances asynchronously, each cell instance handling by itself all of its computational contingencies, a computational contingency being a need to invoke and execute a new computer program, or a need to attend to an unanticipated interrupt, or a need to temporarily suspend a program c is currently executing, or a need to resume a suspended program, each message being always delivered with in precisely predictable timings, latencies for message deliveries being as small as a few tens of nanoseconds to a few hundreds of nanoseconds, each computer program being always executed with in precisely predicted timing bounds;

(vi) group-to-group communications: port instances attached to distinct cell instances being organized into port-groups, all ports in any port-group, pG, being always instances of the same port subclass, no two port instances attached to the same cell instance ever belonging to the same port-group pG, no port instance ever belonging to more than one port-group, all communications being always group-to-group communications, each pathway interconnecting two distinct port-groups pG and qG, such distinct pG and qG never containing ports belonging to the same cell instance, c.p.protocol for each c.p in each message sending port-group being executed in parallel by the c.cpu assigned to the parent cell c of c.p, agents in c.p.pathway coordinating this parallel protocol execution, an agent in the pathway dispatching the message only after the parent cell of every port c.p in pG has completed writing its contribution to a joint message produced by all parent cells of ports in pG, this being called dispatch coordination, another agent in the same pathway synchronously delivering the message in the virtualMemory of the pathway to all secure ports in the destination port-group also connected to the same pathway, secure ports being identified by this second agent based on security condition defined for each port in the destination port-group by system administrator of application Ap, the security condition for a port being a function of the virtualMemory in the pathway, message being delivered and said port, all communications in TICC™-Ppde being group-to-group communications, point-to-point communications being just special cases of such group-to-group communications, it being possible to have self-loop pathways in which a port-group sends message to itself;

(vii) guaranteed transaction completions: a cell sending out a service request message to another cell and receiving a response being called a transaction, the CIP-process of cells in an application guaranteeing transaction completions for all service request messages received from any cell at any time, as described in sections 4.1 and 4.2 of Chapter 2, all transactions being completed with in precisely predictable timing bounds, parent cells of ports in a port-group that receive a service-request via the ports in said port-group always sending back a joint response, a port c.p that sends a service request message to another port or port-group via a pathway being able to send its next service request only after c.p has received its response for the first service request it sent, the virtualMemory of c.p.pathway thus never containing more than two messages at any given time, a service-request message and its response message, thereby eliminating the need for multiple service-request messages in a queue maintained by a buffer, this being called buffer-free asynchronous communication.

3. A method as recited in claim 1 further including the following steps for using port abstraction:

port abstraction being at once both a programming abstraction and a component abstraction, the top level port abstraction being defined by the port class Port, subclasses generalPort, functionPort and interruptPort of Port being all pre-defined in TICC™-Ppde, implementers having to define additional port subclasses only when ports require special attributes not available in already defined port subclasses, attributes defined for Port including the following standard attributes: Port.input, Port.state, Port.vM, Port.rd.msg, Port.wr.msg, Port.pathway, Port.protocol, Port.smm, Port.delivery, Port.clock, Port.tipStart, Port.tipEnd, Port.tipInvoke, Port.beginningPorts, Port.endingPorts, Port.stack, Port.tipResume, Port.resumeStart, and Port.resumingPorts, all attributes of a port instance C.p attached to a cell instance c being kept distributed in the virtualMemory c.p.vM and privateMemory c.cpu.pM of the c.cpu assigned to run c, use of these attributes being illustrated in various sections of Chapter 2, standard methods defined in Port class including, Port:mR?( ), Port:pR?( ), Port:suspendTIP(resumingAddress), Port:f( )=eval(Port.protocol), Port:s( )=eval(Port.protocol), Port:suspend( )=Port.input=Ø, Port.rd:msg( ), Port.wr:msg( ), Port.rd:wrt(msg), Port.wr:wrt(msg), Port.rd:make(msg), Port:wr:make(msg) and similar methods being defined for other components of Port.vM, implementers being free to add other methods as needed, subclasses of Port differing from each other only in the attributes and methods defined for them, subclasses predefined for Port in TICC™-Ppde being adequate for most parallel programming applications, features of Port abstraction in TICC™-paradigm being the following:

(i) facilitating asynchronous communications at any time: testing attributes c.p.state, c.p.input, c.p.delivery (c.p.delivery specifying the time at which c.p received its latest message) and c.p.clock for any port c.p at any time chosen by c being necessary for cell c to receive and process messages or to send out messages at any time chosen by c, each c.p giving access to c.cpu to all of the above said attributes of c.p at all times, thereby facilitating asynchronous communication via port c.p at any time chosen by c;

(ii) communication control: c.p permitting its parent cell c to send out a message only when c.p.state=S, c.p accepting messages delivered to it by other cells only if its state is R, thus preventing message receiving and message sending ports from ever simultaneously exchanging messages via pathways connected to said ports at the same time, c.p changing its state from S to R only immediately after sending out a message, c.p changing its state from R to S only after receiving a response message and sensing of that response by its parent cell c, c.p thus enforcing the rule, cell c may send out a second message via c.p only after c has sensed a response message for the previous service-request message sent out by c.p;

(iii) access control: c.p giving access to all methods and all data in c.p.vM to c.cpu only when c.p.state=S, such access not being given to any other CPU, c.p revoking given access to c.cpu as soon as c.cpu completes performing intended tasks, dynamically giving and revoking access to c.cpu in this manner being efficiently done without need to use an operating system, this feature introducing built-in data protection and security at the lowest level of operation of each c.cpu in all TICC™-Ppde parallel software systems, this together with messages being delivered to only secure ports making a TICC™-Ppde parallel program impenetrable to intruders as long as integrity of system administrators is guaranteed;

(iv) preventing memory interference: a cell-group being a group of parent cells of ports in a port-group that may all simultaneously use the same virtualMemory, when cells in a cell-group simultaneously use the same virtualMemory, ports attached to those cells and connected to the pathway containing that virtualMemory specify allocations of distinct memory areas in the virtualMemory to the cells in the cell-group, each cell in the cell-group being allowed to write only in the memory area assigned to it by its port, thereby preventing memory interference, when parent cells of ports in a port-group use the same virtualMemory simultaneously executing programs stored in that virtualMemory, they use the scratchpad provided to them by that virtualMemory as a blackboard on which they post and read information needed to coordinate their activities.

4. A method as recited in claim 1 further including the following steps for using VirtualMemory abstraction:

virtualMemory abstraction being simultaneously a programming abstraction and component abstraction, there being a top level virtualMemory class, M, M containing five component memories called ReadMemory, WriteMemory, ExecutionMemory, SignalMemory and Scratchpad, for any instance, m of M, components of m being referred to by readMemory, writeMemory, executionMemory, signalMemory and scratchpad, each pathway P containing one or more virtualMemories m embedded in P, P being called the parent pathway of m, each shared-memory pathway (sm-pathway), smP, always containing only one unique, m, the term smP.vM referring to m embedded in a smP, distributed-memory pathways (dm-pathways), dmP, containing more than one virtualMemory instance embedded in them, the virtualMemory instances embedded in dmP being referred to by dmP.vMs[i] for $1 \leq i \leq n$ for some n>1, for any virtualMemory instance m, m.rd referring to readMemory component of m, similarly m.wr, m.ex, m.sm and m.sp referring to write, execution, signal and scratchpad memory components of m, methods for reading from and writing into various virtualMemory components being defined in the top level classes of the components, the execution memory m.ex containing all methods used by parent cells of ports connected to the parent pathway P of m, each m.ex providing the execution environment for every method stored in it, m.rd containing message delivered to message recipient ports connected to P, m.wr containing message sent out by parent cells of message sending ports connected to P, m.wr and m.rd being switched with each other before message in m.wr is delivered to a port p, thus parent cell of p reading message delivered to p only from m.rd, m.sm (signalMemory of m) holding data on p.state, p.input, p.delivery, p.clock, and compiled code for p.protocol for every port p connected to pathway P, m.sp (scratchpad of m) providing working memory for cells in a cell-group to exchange information with each other needed to coordinate their activities, while said cells are all using m simultaneously in parallel, virtualMemories having memory sizes in the range of 10 kilo-words to several giga-words, depending on the application, features of the VirtualMemory abstraction in the TICC™-paradigm being the following:

(i) virtualMemories isolating operations performed in parallel by cells in TICC™-Ppde parallel software applications and providing coordination facilities when several cells use the same virtualMemory simultaneously;

(ii) virtualMemories enabling enforcement of distinctive security and data protection features in TICC™-Ppde parallel software applications;

(iii) virtualMemories providing a parallel buffering mechanism to support asynchronous communications, supporting parallel messaging and program mobility;

(iv) virtualMemories enabling a novel design for shared-memory multiprocessor chips, using Distributed Shared Memory Modules (DSMMs), one DSMM being assigned to each virtualMemory in application Ap, the novel DSMM memory organization allowing arbitrary number of shared-memory CPUs to be integrated in said multiprocessor chips, dramatically limiting the number of CPUs that share the same DSMM, most CPUs using distinct DSMMs, each CPU connected to a small number of DSMMs, no CPU being able to access a DSMM that is not connected to it, thereby dramatically reducing memory interference and dramatically increasing data security, system security, and protection from unauthorized intruders;

TICC™-Ppde providing built-in definitions for VirtualMemory class and all its components, implementers not having to define virtualMemories for any parallel software system in TICC™-Ppde.

5. A method as recited in claim 1 further including the following steps for using Agent abstraction:

agent abstraction being both a programming abstraction and a component abstraction, top level Agent class and all subclasses of Agent needed for parallel programming being pre-defined in TICC™-Ppde, instances of various classes of agents being attached to virtualMemories embedded in pathways that interconnect ports in TICC™-Ppde parallel software systems, the virtualMemory to which an agent is attached being called the parent memory of the agent, the parent pathway P of the virtualMemory being also called the parent pathway of the agent, each virtualMemory instance m containing an arbitrary number of agents attached to it, virtualMemories embedded in sm-pathways and dm-pathways usually containing only 2 to 4 agents attached to them, features of the Agent abstraction in the TICC™-paradigm being the following:

(i) agents embedded in a pathway route, coordinate and synchronize signal transmissions in said pathway;

(ii) agents enforce data security by delivering message in their parent virtualMemories only to ports which satisfy a priori defined security conditions associated with the message;

(iii) while transmitting signals over their parent pathway agents send signals also to Ap:SMS( ), the self-monitoring system of application Ap, informing the SMS about message dispatch and message delivery events occurring in their parent pathway, this enabling the SMS to build a causalnet of communication events occurring in application Ap, in real time, while Ap is running, SMS dynamically checking whether said communication events satisfy event class patterns in Ap:ALLEOPS( ), such dynamic checking enabling the SMS to detect errors, pending errors and critical event patterns occurring in Ap in real time while Ap is running, and enabling Ap:SMS( ) to report them, or immediately take appropriate a priori defined remedial actions, such dynamic checking also providing the infrastructure for future development of self-diagnosis, self-repair and learning in parallel software systems.

6. A method as recited in claim 1 further including the following steps for using Pathway abstraction:

pathway abstraction also being both a programming abstraction and component abstraction, each pathway being connected to ports, each pathway having virtualMemories with agents attached to them, there being two kinds of pathways, Sm-pathway interconnecting two port-groups, parent cells of ports in a port-group being called a cell-group, Dm-pathway interconnecting a port-group of generalPorts in one shared-memory multiprocessor (SMP) to a set of other port-groups of functionPorts in other SMPs, parameterized protocols for the top level pathway classes Sm-pathway and Dm-pathway being pre-defined in TICC™-Ppde, implementers not having to define them, the term pathway being used to refer to both sm-pathways and dm-pathways, features of the Pathway abstraction in the TICC™-paradigm being the following:

(i) an sm-pathway, smP, connected to a port c.p, having parameters consisting of the port c.p, other ports that smP is connected to, agents in smP, and the security function, if any, for the smP, such pathway parameters being substituted for the parameters defined in the parameterized protocol definition for Sm-pathway at the time smP is connected to port c.p, the protocol with substituted parameters being then compiled, this compiled protocol being stored in the virtualMemory of c.p.vM, a pointer to this compiled protocol in signalMemory being then set as the value of c.p.protocol, parent cell of c.p then performing eval(c.p.protocol) to evaluate the protocol in order to send message via that smP;

(ii) Dm-pathway also having similar parameterized protocol definition, for any port q connected to a dm-pathway dmP, each dmP also being defined by a set of parameters consisting of components in dmP, the parameterized protocol defined for Dm-pathway being compiled after substituting the parameters of dmP for parameters defined in the protocol, this compiled protocol being stored in the virtualMemory c.q.vM, value of c.q.protocol being the pointer to the compiled code of said compiled protocol, parent cell of port c.q using eval(c.q.protocol) to evaluate the protocol in order to send message over dmP, there by making it possible to use identical invocation primitive eval(c.p.protocol) for message exchange via both sm-pathways and dm-pathways;

(iii) no two pathway instances having any component in common, thus no two distinct protocol executions ever interfering with each other, this enabling multiple parallel asynchronous message exchanges, the number of such parallel message exchanges at any given time being limited only by the number of distinct cells in an application;

(iv) protocol execution with precisely predictable timings enabling real-time communication of message dispatch and delivery times to SMS, thereby enabling self-monitoring;

(v) protocol execution with precisely predictable timings also enabling ad hoc coordination and synchronization, such synchronization and coordination being possible only with TICC™-Ppde pathways;

(vi) all components that exchange signals with each other in any pathway being tuned to each other, so that each component will be always ready to receive and respond to signals sent to it by other components in the pathway, this feature eliminating need for synchronization sessions during signal transmissions, thereby enabling very high-speed message exchanges.

7. A method as recited in claim 1 further including the following steps for using Protocol abstraction:

protocol abstraction being at once a process abstraction and a component abstraction, there being only two distinct kinds of protocol abstractions in TICC™-Ppde, sm-pathway protocol abstraction and dm-pathway protocol abstraction, protocols in both abstractions being defined using Causal Communication Primitives (CCPs), each kind of protocol being defined as a parameterized protocol abstraction, no protocol definition ever containing data declarations, evaluation of protocol changing only attributes associated with the components of pathway to which said protocol applies, no two simultaneous parallel protocol executions ever interfering with each other, evaluation of protocols automatically enforcing real-time message coordination, message synchronization, security enforcement and communication with SMS, messages being always delivered only to secure ports that satisfy specified security conditions, messages being always delivered to all secure ports synchronously with a time-stamp indicating the time of message delivery, each compiled protocol being evaluated by the same cell that builds and sends messages, messages being always sent immediately after they have been built, thereby eliminating message scheduling delays, protocols enabling very high speed guaranteed parallel asynchronous simultaneous message exchanges with latencies as small as 14 nanoseconds for point-to-point communication and 100 nanoseconds for group-to-group communications over sm-pathways, and 400 nanoseconds plus data transmission delay for point-to-group distributed communications, all using 2 gigahertz CPUs, latency for message delivery being always precisely predictable.

8. A method as recited in claim 1 further including the following steps for using Attachment and Tuning abstractions:

attachment and tuning abstractions being purely programming abstractions, being used in TICC™-Ppde to regulate access privileges given to cells to access data and execute methods in different classes of components in TICC™-Ppde parallel programming systems, each component, x, being restricted to access data and execute methods defined only in other components attached to or tuned to x, tuning being done to pairs of components that exchange signals in pathways, tuning being done also between a port c.p and its virtualMemory c.p.vM, as also between cell c and c.p.vM in order to enable c and c.p to access data and methods in c.p.vM, access privileges enabled by tuning and attachments being implemented automatically by TICC™-Ppde at the time pathways are installed and connected to ports, application programmers not having to write any programs to implement tunings and attachments.

9. A method as recited in claim 1 further including the following steps for using ALLEOPs abstraction:

ALLEOPs being a process abstraction of theory of computations, as also a programming abstraction of computer programs that specify computer programs for automatically deriving, interpreting and using the ALLEOPs to formally verify CTL-assertions on properties of computations, Ap:ALLEOPS( ) being automatically made an integral part of every application Ap, computer programs pre-defined for ALLEOPs in TICC™-Ppde enabling formal proof constructions for validity of CTL-assertions, interactively with designers and implementers at any stage of implementation or use of application Ap, Traces being used during ALLEOPs-proof construction to interact with users, presenting to users intermediate results of proofs and receiving from users guidance to complete the proofs as necessary, when ALLEOPs-proofs fail to prove a given CTL-assertion, traces of failed proofs being used by designers and implementers to modify designs and implementations of applications, or to modify the CTL-assertions themselves as needed, failed proofs sometimes requiring users to interrupt the proof process in order to terminate it.

10. A method as recited in claim 1 further including the following steps for using TICC™-CPU:

TICC™-Ppde parallel programs requiring special facilities in ComPuting Units (CPUs) used to execute them, the special facilities in TICC™-CPUs enabling each cell in a parallel software system to operate in parallel with all other cells in said system, completely autonomously, with out need to use an operating system to perform any of the needed services, also enabling efficient execution of parallel programs dramatically minimizing memory interference in shared-memory computers, further enabling a new distributed shared-memory organization using DSMMs, exploiting virtualMemories in TICC™-Ppde parallel software systems, to dramatically increase execution efficiencies and data security, and protection against unauthorized intrusions into any TICC™-Ppde parallel software system.

11. A system for building or running formally verified parallel software for multi-core chips using TICC™-Paradigm, the system comprising:
  a collection of computers; and
  a software system or hardware system running in the collection of computers performing a method as recited in any one of claims 1 through 10.

* * * * *